(12) United States Patent
Land et al.

(10) Patent No.: US 10,127,944 B2
(45) Date of Patent: Nov. 13, 2018

(54) SYSTEM AND METHOD FOR MULTIMEDIA AUTHORING AND PLAYBACK

(75) Inventors: Michael Z. Land, Berkeley, CA (US); Peter N. McConnell, Berkely, CA (US); Michael J. McMahon, Fairfax, CA (US)

(73) Assignee: RESOURCE CONSORTIUM LIMITED (VG)

( * ) Notice: Subject to any disclaimer, the term of this patent is extended or adjusted under 35 U.S.C. 154(b) by 731 days.

(21) Appl. No.: 12/707,172

(22) Filed: Feb. 17, 2010

(65) Prior Publication Data

US 2010/0146393 A1 Jun. 10, 2010

Related U.S. Application Data

(63) Continuation of application No. 11/351,149, filed on Feb. 8, 2006, now abandoned, which is a
(Continued)

(30) Foreign Application Priority Data

Dec. 19, 2001 (WO) .............. PCT/US01/50458
Dec. 18, 2002 (WO) .............. PCT/US02/40623

(51) Int. Cl.
*G06F 3/0481* (2013.01)
*G11B 27/034* (2006.01)
(Continued)

(52) U.S. Cl.
CPC .......... *G11B 27/034* (2013.01); *G06F 3/0481* (2013.01); *G09G 5/00* (2013.01); *G11B 27/34* (2013.01); *H04L 12/1822* (2013.01)

(58) Field of Classification Search
CPC .... G06F 3/0481; G06F 3/0484; G06F 3/0488; H04L 12/1822; G06Q 10/101; G09G 5/00; G11B 27/34
(Continued)

(56) References Cited

U.S. PATENT DOCUMENTS 5,267,155 A 11/1993 Buchanan et al.
5,347,306 A * 9/1994 Nitta .................. H04N 7/00
                                                    345/473
(Continued)

FOREIGN PATENT DOCUMENTS

WO WO 01/28378 A1 4/2001
WO WO 01/77875 A2 10/2001

OTHER PUBLICATIONS

European Patent Office Supplementary Partial European Search Report, dated Sep. 26, 2005 in EPO application 02798540.7-2205 PCT/US02/40623. 5 pages.
(Continued)

*Primary Examiner* — Steven Sax
(74) *Attorney, Agent, or Firm* — The Belles Group, P.C.

(57) ABSTRACT

A multimedia authoring and playback system and method in which the playback of multimedia content is presented in one or more windows or displays called "playback displays," and in which additional windows or displays called "control displays" are included in some embodiments to provide various management and control functions. Included are features for creating, editing and distributing multimedia content, which may be viewed by recipients who play the content (and in some cases may be allowed to modify it); also included are features for programming playback behavior of multimedia content, interconnecting multimedia content, and exploring and navigating through multimedia content.

10 Claims, 98 Drawing Sheets

Related U.S. Application Data continuation-in-part of application No. 10/325,898, filed on Dec. 18, 2002, now abandoned, which is a continuation-in-part of application No. 10/027,430, filed on Dec. 19, 2001, now Pat. No. 7,155,676.

(60) Provisional application No. 60/256,862, filed on Dec. 19, 2000.

(51) Int. Cl.
*H04L 12/18* (2006.01)
*G09G 5/00* (2006.01)
*G11B 27/34* (2006.01)

(58) Field of Classification Search
USPC ....... 715/751, 759, 752, 753, 754, 755, 756, 715/757, 758, 748, 749, 740, 719–726
See application file for complete search history.

(56) References Cited

U.S. PATENT DOCUMENTS

| | | | |
|---|---|---|---|
| 5,542,024 A | 7/1996 | Balint et al. | |
| 5,619,636 A | 4/1997 | Sweat et al. | |
| 5,619,733 A * | 4/1997 | Noe | G11B 27/002 370/503 |
| 5,621,880 A | 4/1997 | Johnson | |
| 5,657,447 A | 8/1997 | Leung et al. | |
| 5,668,736 A | 9/1997 | Douglas et al. | |
| 5,724,503 A | 3/1998 | Kleinman et al. | |
| 5,737,736 A | 4/1998 | Chang | |
| 5,787,450 A | 7/1998 | Diedrich et al. | |
| 5,796,393 A * | 8/1998 | MacNaughton et al. | 715/733 |
| 5,801,687 A | 9/1998 | Peterson et al. | |
| 5,819,043 A | 10/1998 | Baugher et al. | |
| 5,819,282 A | 10/1998 | Hooper et al. | |
| 5,821,933 A * | 10/1998 | Keller et al. | 715/741 |
| 5,832,507 A | 11/1998 | Harper et al. | |
| 5,835,758 A | 11/1998 | Nochur et al. | |
| 5,855,013 A | 12/1998 | Fisk | |
| 5,862,379 A | 1/1999 | Rubin | |
| 5,892,507 A | 4/1999 | Moorby et al. | |
| 5,899,990 A | 5/1999 | Martizen et al. | |
| 5,907,704 A | 5/1999 | Gudmundson et al. | |
| 5,944,785 A * | 8/1999 | Pommier et al. | 709/205 |
| 5,950,214 A | 9/1999 | Rivette et al. | |
| 5,956,028 A * | 9/1999 | Matsui | G06F 3/1454 345/419 |
| 5,960,411 A | 9/1999 | Hartman et al. | |
| 5,960,421 A | 9/1999 | Cline et al. | |
| 5,963,952 A | 10/1999 | Smith | |
| 5,973,694 A | 10/1999 | Steele et al. | |
| 5,974,407 A | 10/1999 | Sacks | |
| 5,974,411 A | 10/1999 | McCool et al. | |
| 5,982,390 A * | 11/1999 | Stoneking | A63F 13/10 345/473 |
| 5,983,176 A | 11/1999 | Hoffert et al. | |
| 5,983,245 A | 11/1999 | Newman et al. | |
| 5,987,501 A | 11/1999 | Hamilton et al. | |
| 5,990,887 A * | 11/1999 | Redpath et al. | 715/758 |
| 5,990,932 A * | 11/1999 | Bee et al. | 348/14.08 |
| 6,002,401 A | 12/1999 | Baker | |
| 6,031,527 A | 2/2000 | Shoji et al. | |
| 6,044,368 A | 3/2000 | Powers | |
| 6,054,986 A | 4/2000 | Kato | |
| 6,055,537 A | 4/2000 | LeTourneau | |
| 6,061,696 A | 5/2000 | Lee et al. | |
| 6,085,185 A | 7/2000 | Matsuzawa et al. | |
| 6,085,223 A | 7/2000 | Carino, Jr. et al. | |
| 6,091,410 A * | 7/2000 | Lection | G06F 3/038 715/706 |
| 6,100,881 A * | 8/2000 | Gibbons et al. | 715/201 |
| 6,108,010 A | 8/2000 | Boezeman et al. | |
| 6,111,590 A | 8/2000 | Boezeman et al. | |
| 6,124,862 A * | 9/2000 | Boyken | G06T 7/20 345/419 |
| 6,144,375 A | 11/2000 | Jain et al. | |
| 6,188,396 B1 | 2/2001 | Boezeman et al. | |
| 6,222,532 B1 | 4/2001 | Ceccarelli | |
| 6,226,669 B1 * | 5/2001 | Huang | G06F 3/011 709/204 |
| 6,237,025 B1 | 5/2001 | Ludwig et al. | |
| 6,253,167 B1 * | 6/2001 | Matsuda et al. | 703/11 |
| 6,263,486 B1 | 7/2001 | Boezeman et al. | |
| 6,275,935 B1 * | 8/2001 | Barlow et al. | 713/182 |
| 6,285,380 B1 * | 9/2001 | Perlin | G06N 3/004 345/473 |
| 6,300,956 B1 | 10/2001 | Apodaca et al. | |
| 6,317,795 B1 | 11/2001 | Malkin et al. | |
| 6,331,853 B1 * | 12/2001 | Miyashita | A63F 13/10 345/427 |
| 6,348,936 B1 | 2/2002 | Berteig | |
| 6,349,300 B1 | 2/2002 | Graf et al. | |
| 6,356,708 B1 | 3/2002 | Krause et al. | |
| 6,377,263 B1 * | 4/2002 | Falacara | G06N 3/006 345/473 |
| 6,426,778 B1 * | 7/2002 | Valdez, Jr. | G06F 17/30014 348/461 |
| 6,445,740 B1 * | 9/2002 | Mallart et al. | 375/240.08 |
| 6,452,598 B1 * | 9/2002 | Rafey et al. | 345/473 |
| 6,493,001 B1 * | 12/2002 | Takagi | G06F 3/04815 715/706 |
| 6,507,824 B1 | 1/2003 | Yon et al. | |
| 6,525,725 B1 | 2/2003 | Deering | |
| 6,535,907 B1 * | 3/2003 | Hachiya et al. | 709/202 |
| 6,564,003 B2 | 5/2003 | Marko et al. | |
| 6,564,246 B1 * | 5/2003 | Varma | G06Q 10/10 709/205 |
| 6,570,837 B1 | 5/2003 | Kikuchi et al. | |
| 6,573,907 B1 | 6/2003 | Madrane | |
| 6,630,934 B2 | 10/2003 | Hoddie et al. | |
| 6,636,220 B1 | 10/2003 | Szeliski et al. | |
| 6,640,304 B2 | 10/2003 | Ginter et al. | |
| 6,665,835 B1 * | 12/2003 | Gutfreund | G06F 17/30017 707/E17.009 |
| 6,732,915 B1 * | 5/2004 | Nelson et al. | 235/375 |
| 6,751,800 B1 | 6/2004 | Fukuda et al. | |
| 6,753,857 B1 * | 6/2004 | Matsuura | G06F 3/011 345/419 |
| 6,763,377 B1 | 7/2004 | Belknap et al. | |
| 6,792,469 B1 | 9/2004 | Callahan et al. | |
| 6,792,607 B1 | 9/2004 | Burd et al. | |
| 6,924,827 B1 * | 8/2005 | Gulati et al. | 715/763 |
| 6,931,451 B1 * | 8/2005 | Logan | G10H 1/0033 348/E7.075 |
| 6,944,622 B1 | 9/2005 | Mitchell et al. | |
| 6,957,395 B1 * | 10/2005 | Jobs et al. | 715/765 |
| 6,957,398 B1 * | 10/2005 | Nayeri | 715/867 |
| 7,086,005 B1 * | 8/2006 | Matsuda | 715/706 |
| 7,136,790 B1 | 11/2006 | Hobbs | |
| 7,143,356 B1 * | 11/2006 | Shafrir | G06Q 10/10 709/201 |
| 7,152,220 B2 * | 12/2006 | Rickards, III | G06F 8/71 717/101 |
| 7,228,305 B1 * | 6/2007 | Eyal | G06F 17/30029 |
| 7,246,045 B1 | 7/2007 | Rappaport et al. | |
| 7,278,115 B1 | 10/2007 | Conway et al. | |
| 7,280,991 B1 * | 10/2007 | Beams | G09B 7/04 706/46 |
| 7,284,202 B1 * | 10/2007 | Zenith | 715/744 |
| 7,333,967 B1 * | 2/2008 | Bringsjord | G06N 5/00 706/45 |
| 7,363,589 B1 * | 4/2008 | Maeng | 715/751 |
| 7,594,166 B1 * | 9/2009 | Ramakrishna et al. | 715/234 |
| 2002/0002562 A1 * | 1/2002 | Moran et al. | 707/500 |
| 2002/0008716 A1 * | 1/2002 | Colburn | G06T 13/40 715/706 |
| 2002/0015577 A1 | 2/2002 | Negishi et al. | |
| 2002/0070960 A1 | 6/2002 | Maine et al. | |
| 2002/0097244 A1 * | 7/2002 | Merrick | G06F 3/0481 345/473 |
| 2002/0107802 A1 | 8/2002 | Philips | |

(56) References Cited

U.S. PATENT DOCUMENTS

| | | | |
|---|---|---|---|
| 2002/0178450 A1 | 11/2002 | Morita et al. | |
| 2002/0180803 A1 | 12/2002 | Kaplan et al. | |
| 2002/0193895 A1 | 12/2002 | Qian et al. | |
| 2003/0043191 A1 | 3/2003 | Tinsley et al. | |
| 2003/0179222 A1* | 9/2003 | Noma | G06F 17/30873 |
| | | | 715/700 |
| 2003/0179230 A1* | 9/2003 | Seidman | G06F 3/1454 |
| | | | 715/750 |
| 2005/0165890 A1 | 7/2005 | McMurdie et al. | |
| 2006/0055713 A1 | 3/2006 | Asao et al. | |
| 2006/0129596 A1 | 6/2006 | Bays et al. | |
| 2007/0146325 A1 | 6/2007 | Poston et al. | |
| 2008/0130918 A1 | 6/2008 | Kimijima | |

OTHER PUBLICATIONS

Muriel Jourdan, Cecile Roisin, Laurent Tardif and Lionel Villard, authors of "Authoring SMIL Documents by Direct Manipulations During Presentation," OPERA Project, INRIA Rhone-Alpes, 655 avenue de l'Europe, 38330 Montbonnot, France, Baltzer Science Publishers BV, World Wide Web 2 (1999) 179-190.

Apple Computer, Inc., "Quick Time VR Authoring Studio, User Manual," Copyright 1997 Apple Computer, Inc. 110 pages.

Ryuichi Ogawa, Kazuo Yanoo and Daigo Taguchi, authors of "Template-Based, Format-Extensible Authoring for BS Digital Data Broadcast Service," Internet Systems Research Laboratories, NEC Res. & Develop., vol. 42, No. 3 Jul. 2001.

Microsoft Press Computer Dictionary, Microsoft Press, Redmond, Washington, 1997, p. 36.

\* cited by examiner

Fig. 4C-1
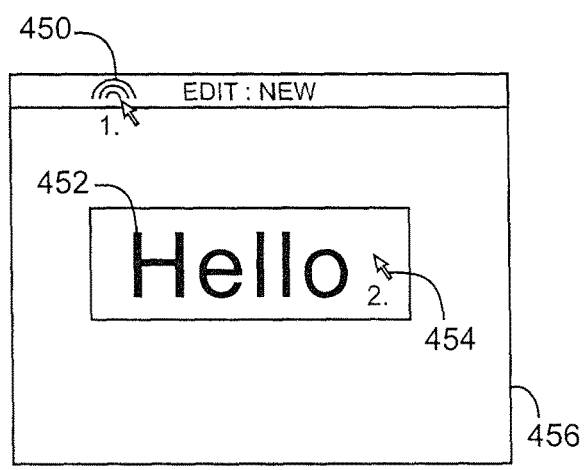
Fig. 4C-2
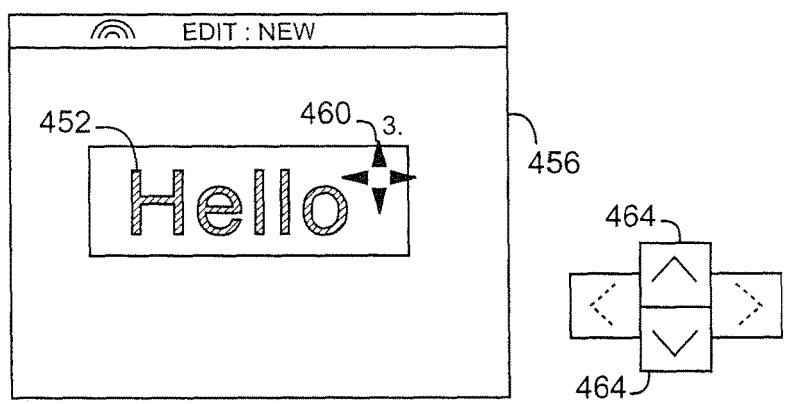
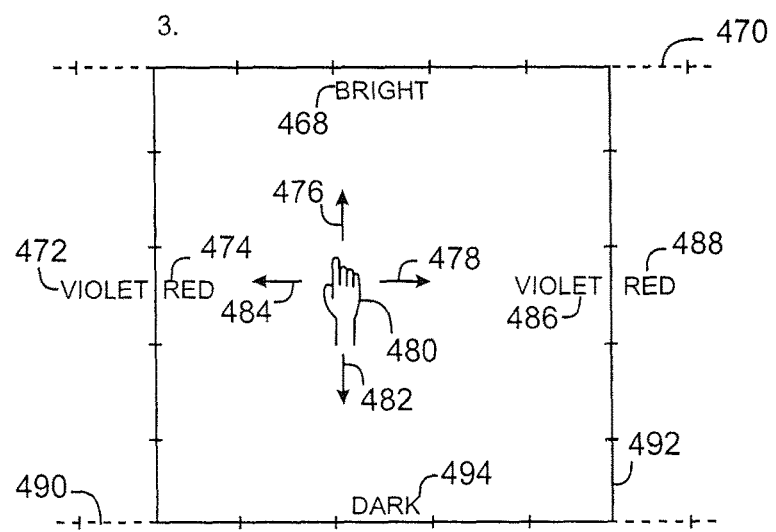
FIG. 4C

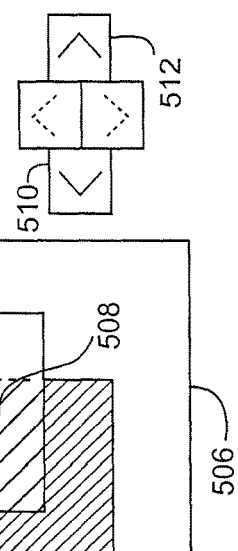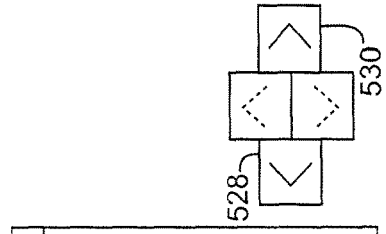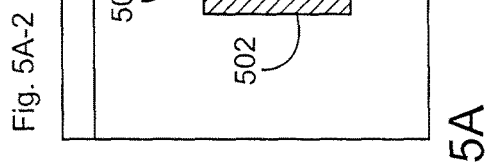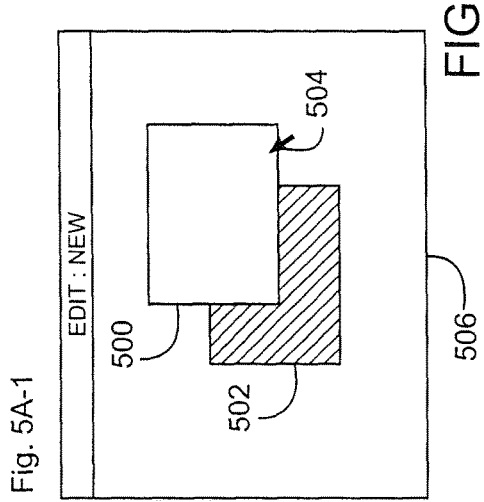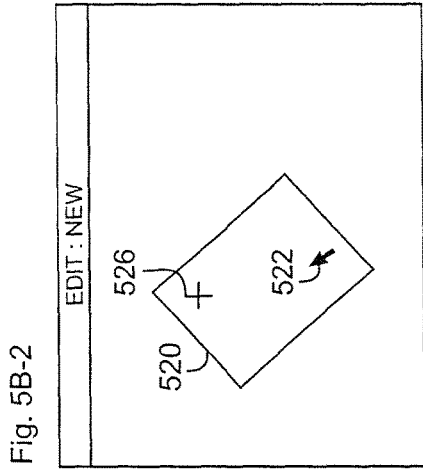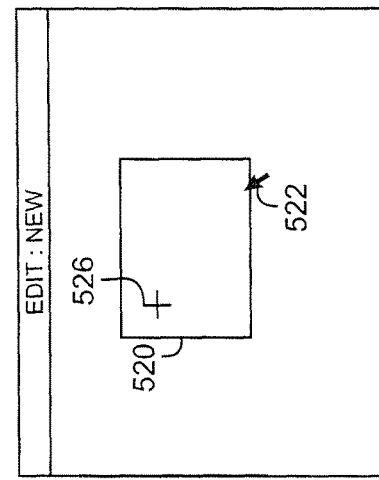
FIG. 5A
FIG. 5B

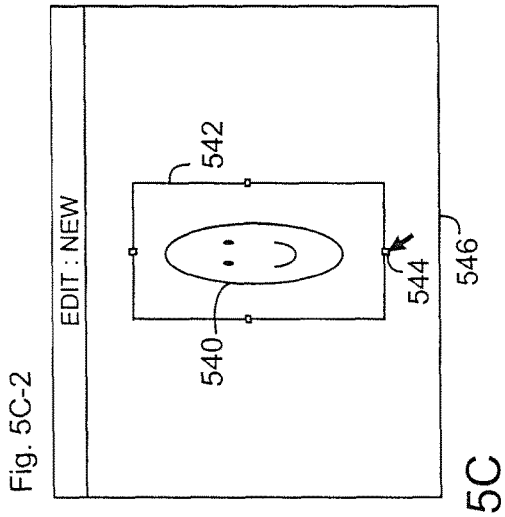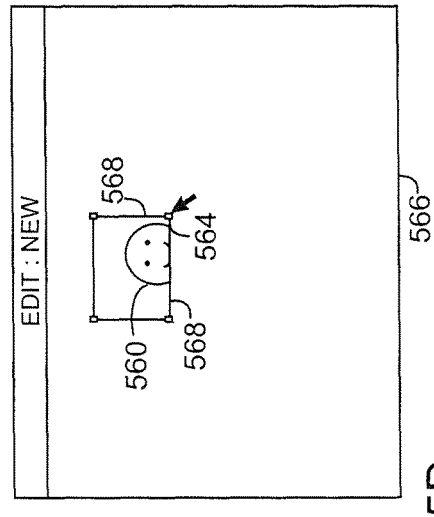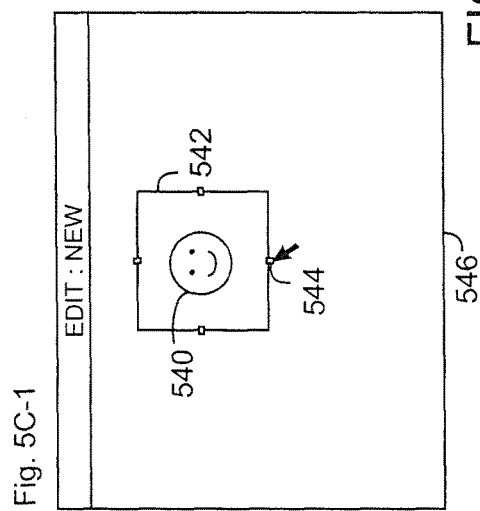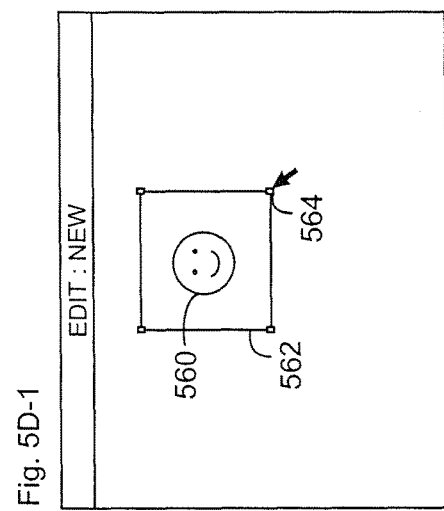
FIG. 5C
FIG. 5D

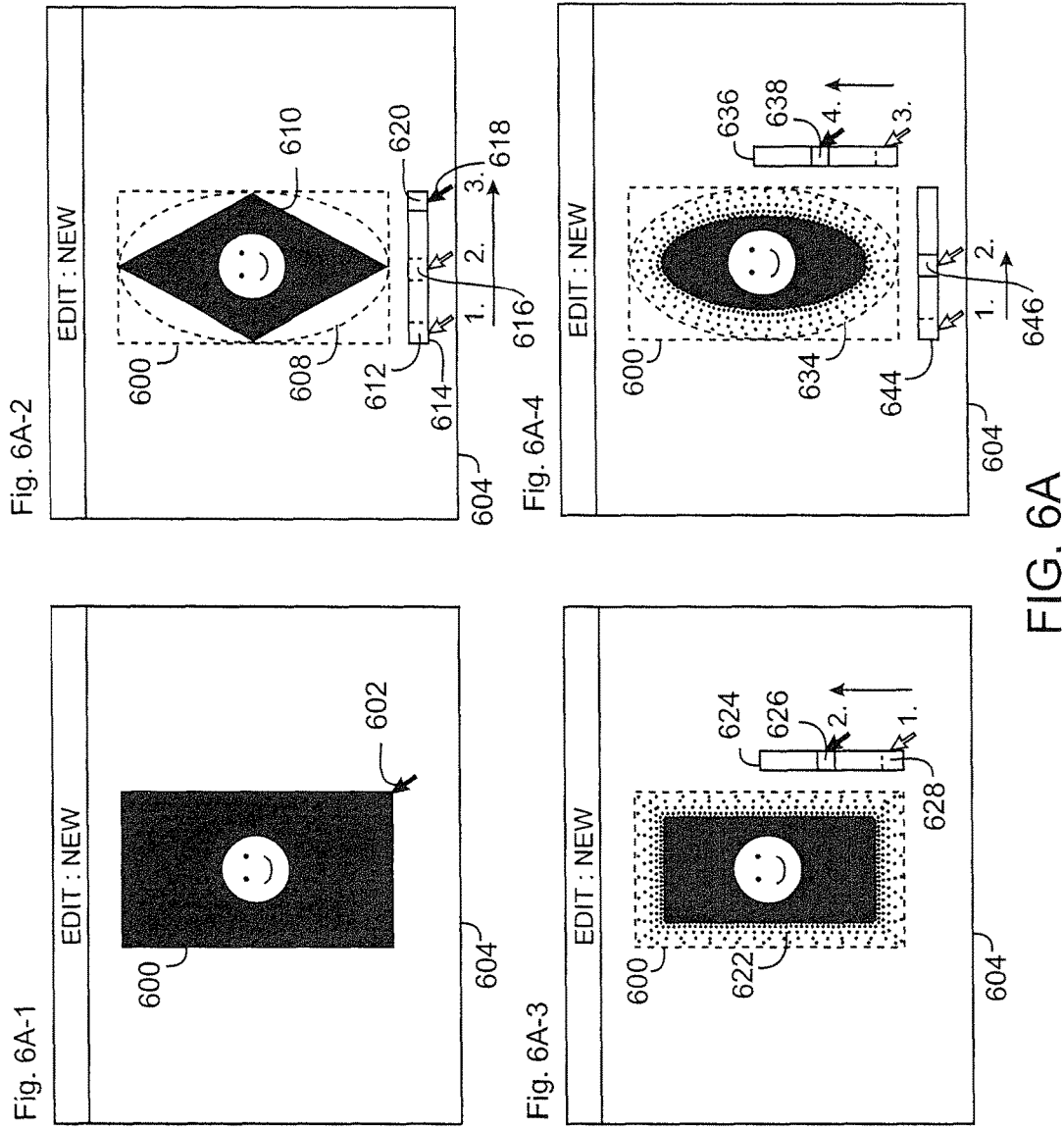

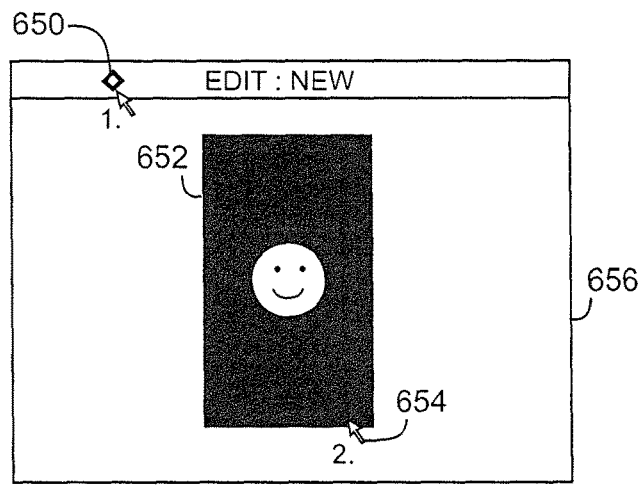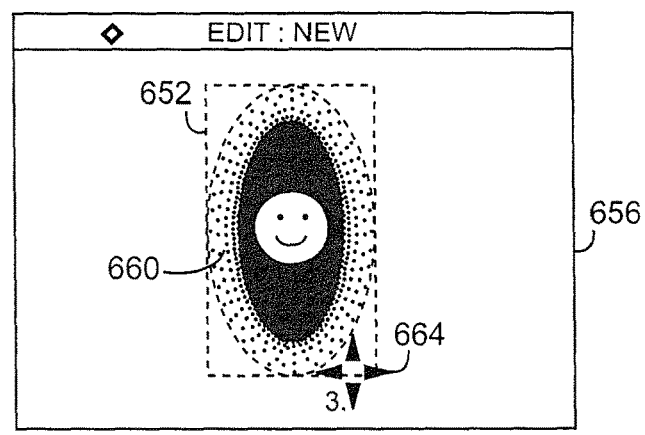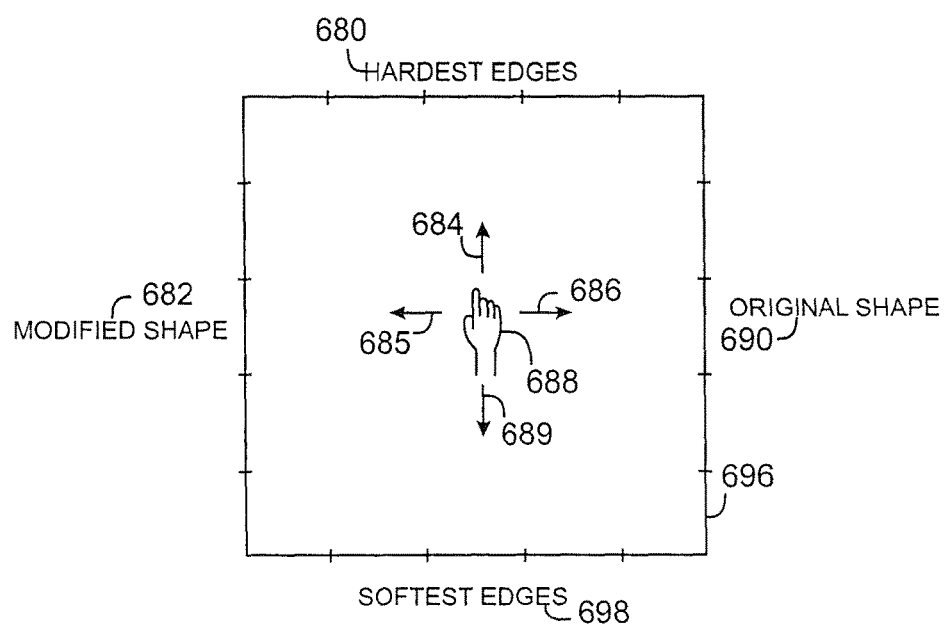
FIG. 6B

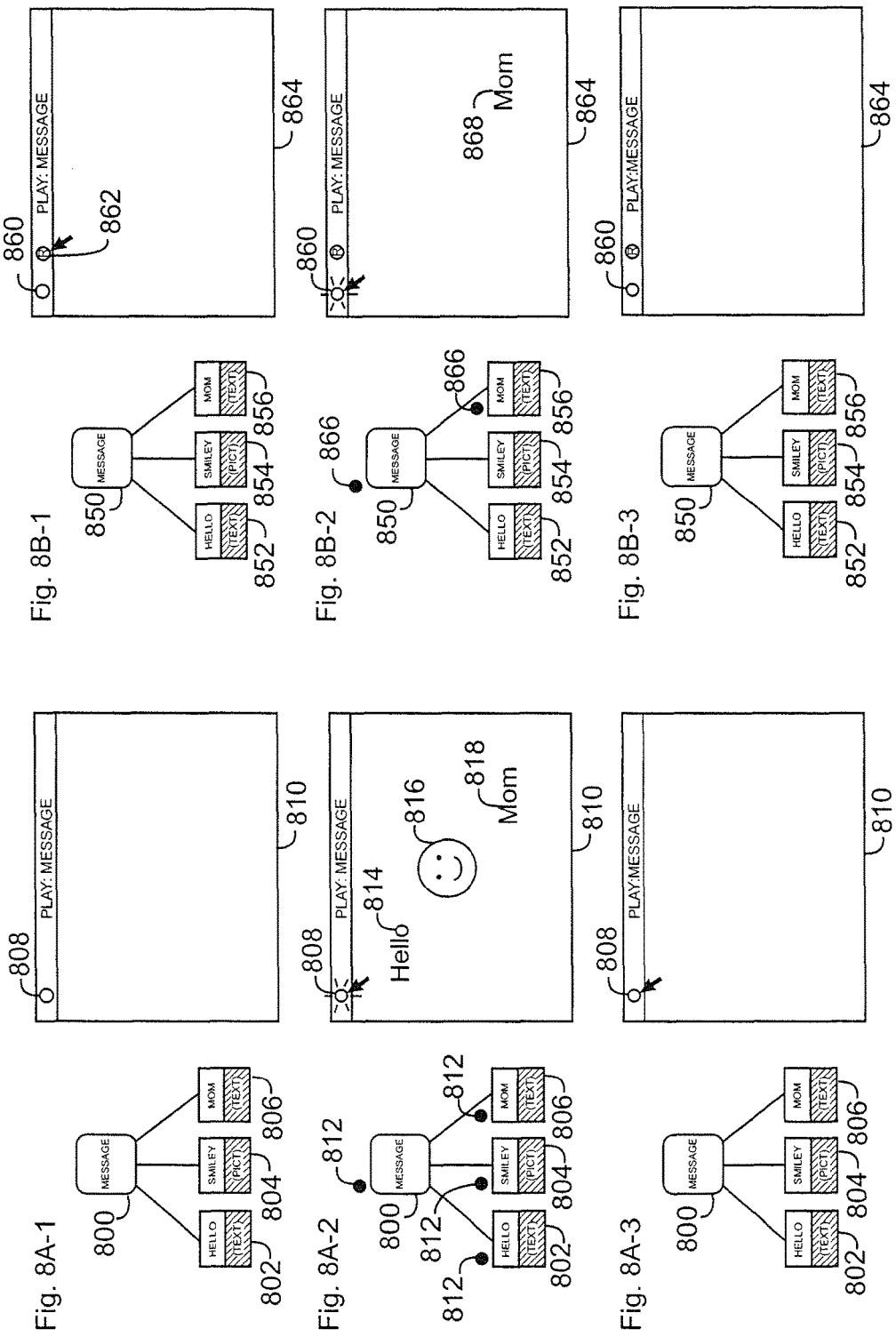

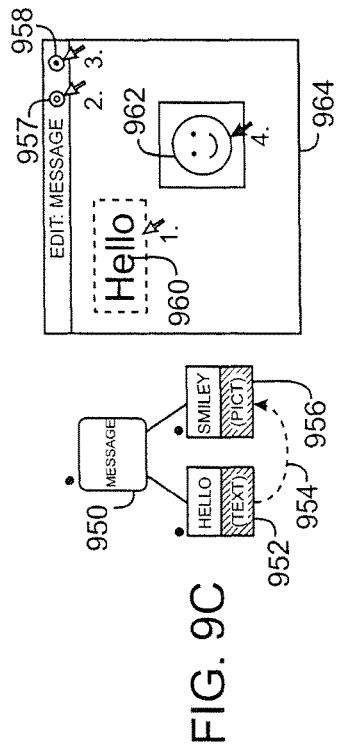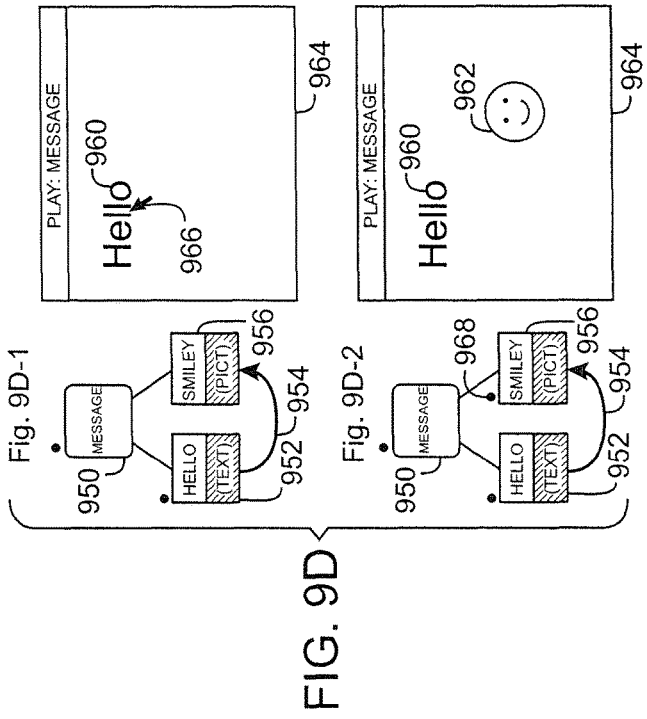
FIG. 9C
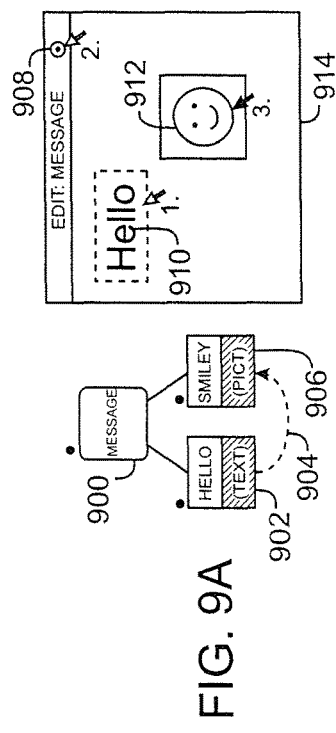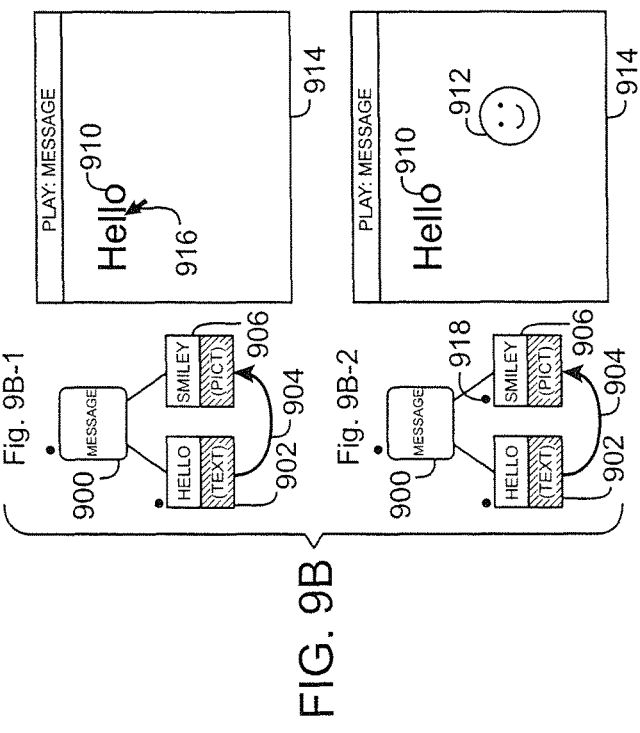
FIG. 9A
FIG. 9B
FIG. 9D

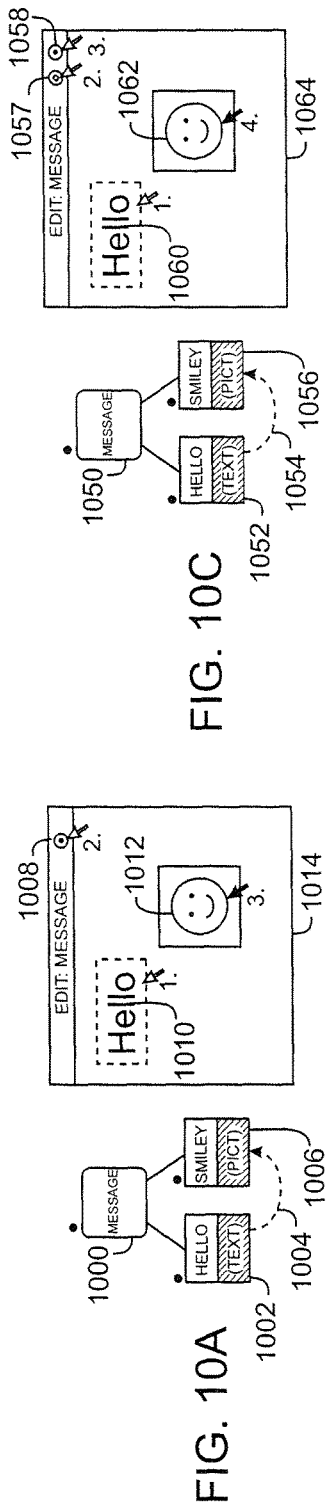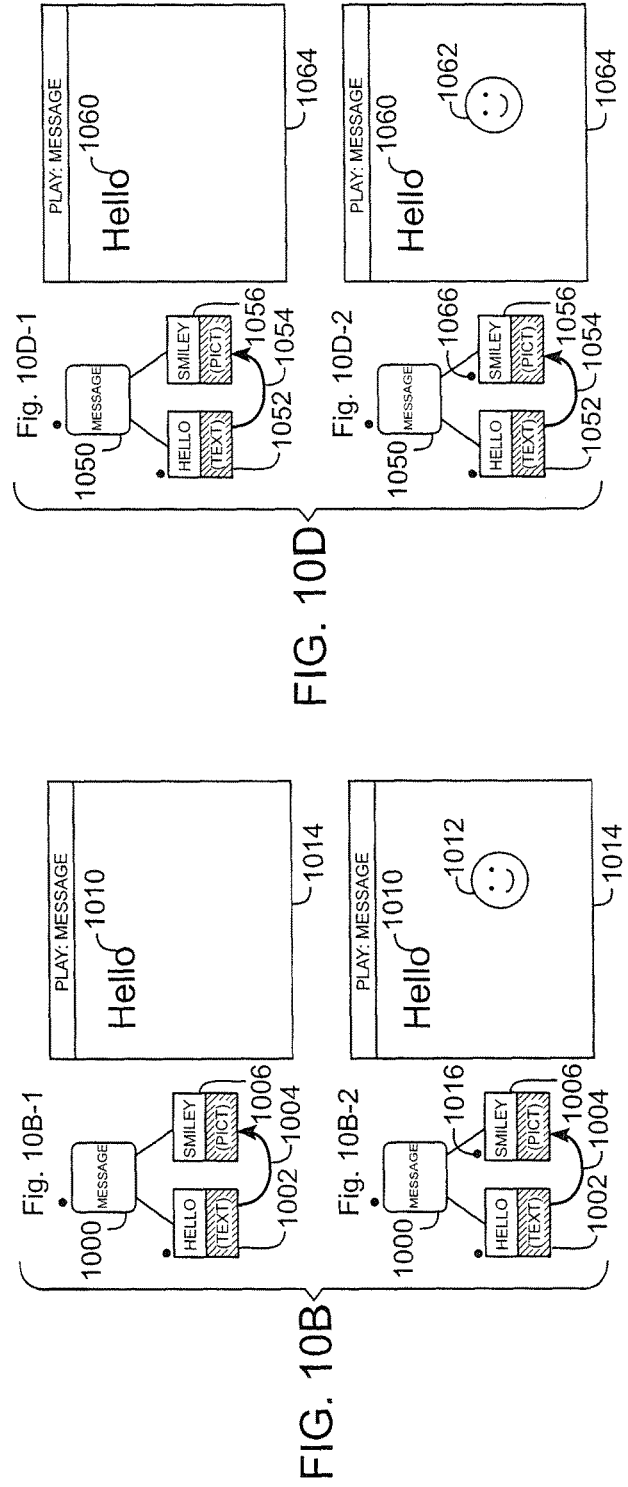

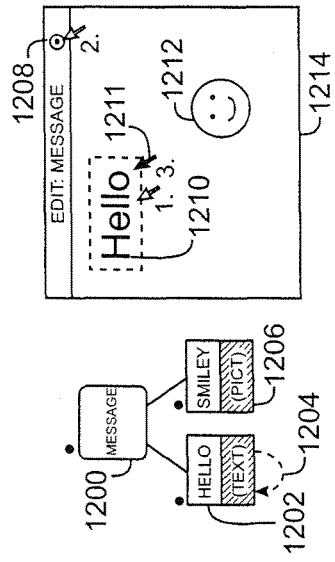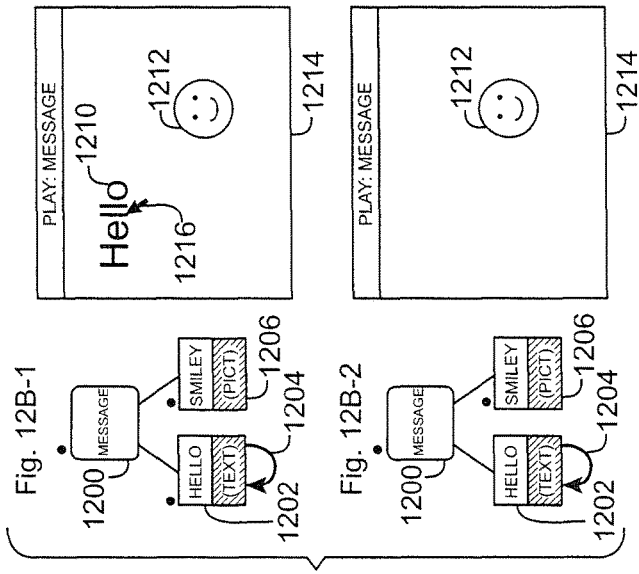
FIG. 12A
FIG. 12B
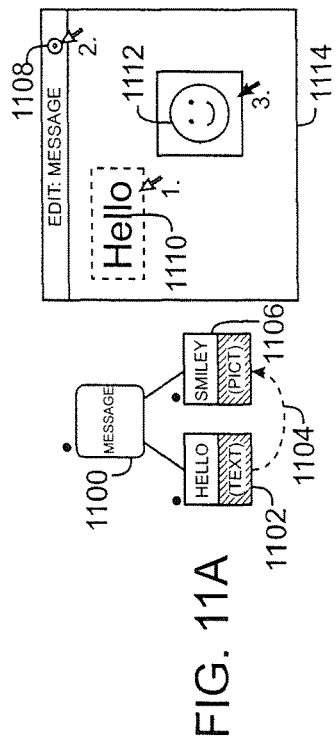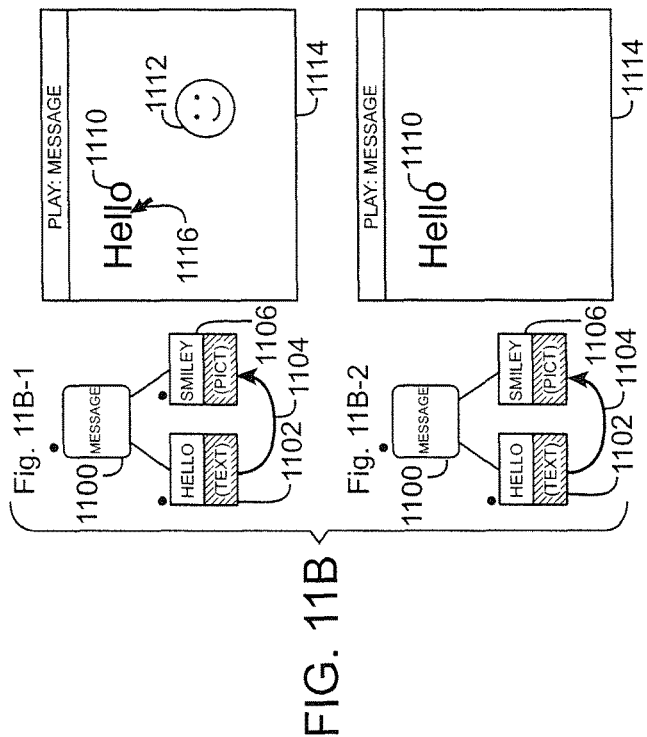
FIG. 11A
FIG. 11B

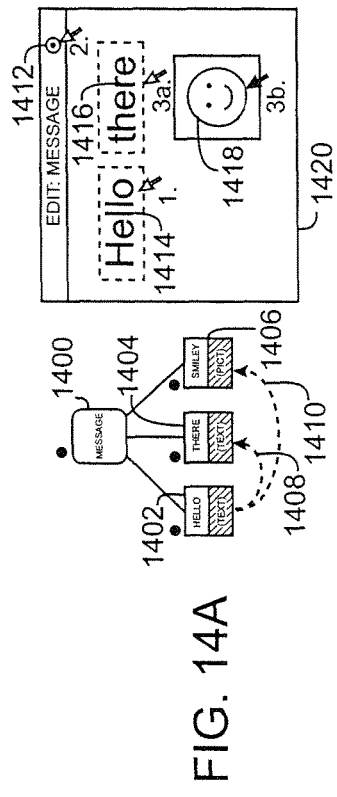
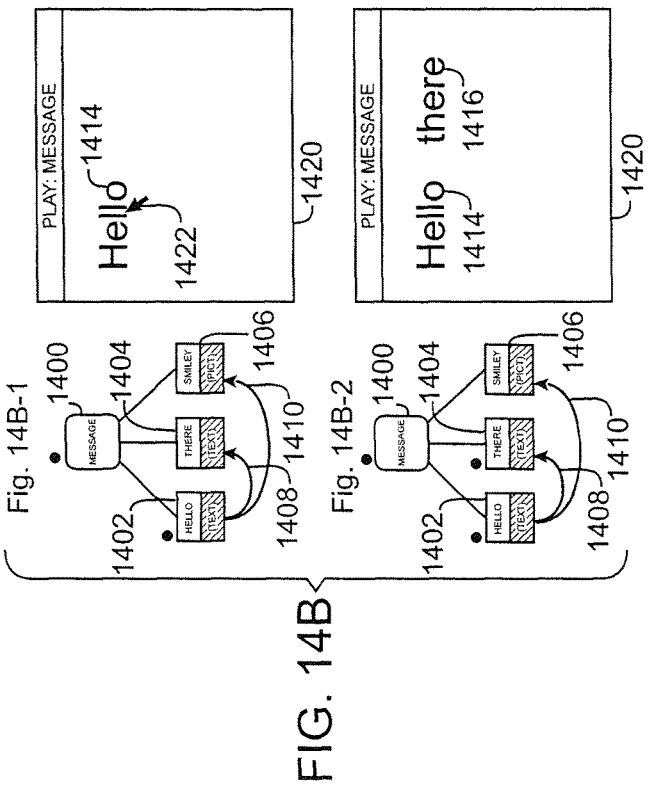
FIG. 13A / FIG. 14A
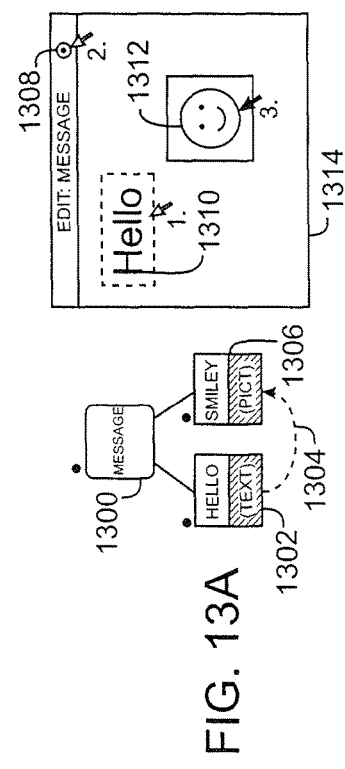
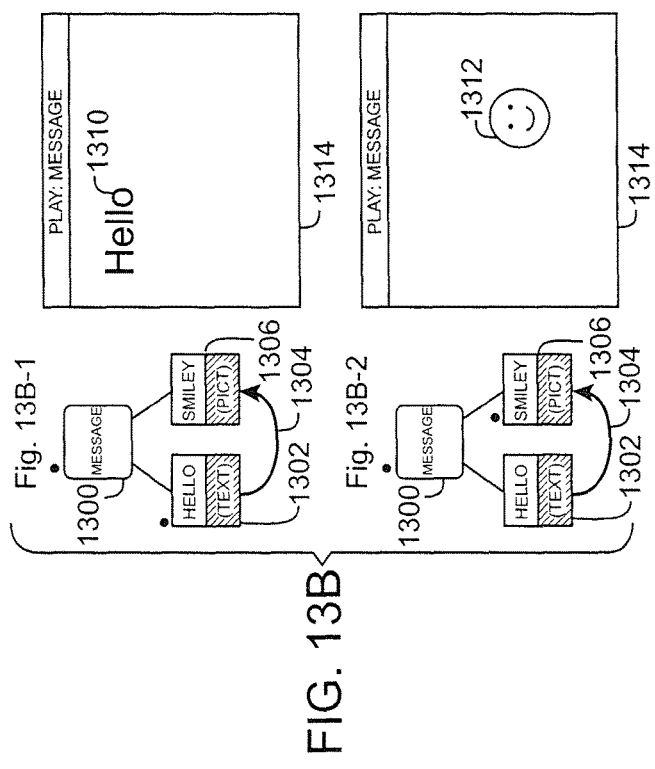
FIG. 13B / FIG. 14B

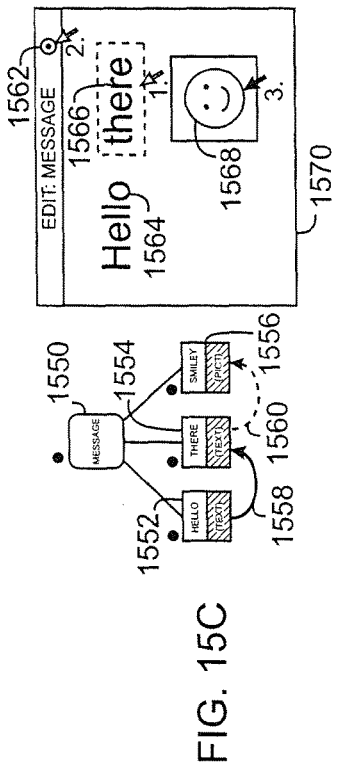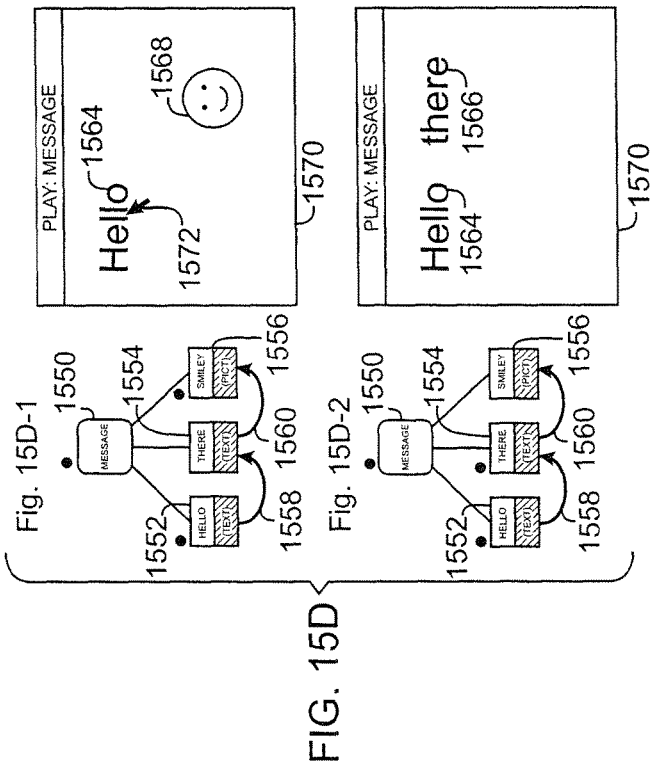
FIG. 15A
FIG. 15C
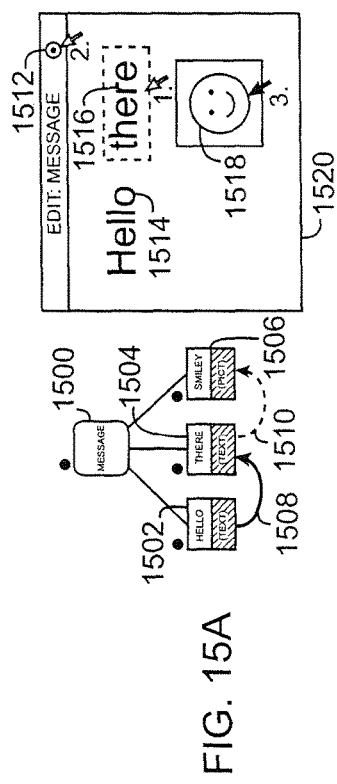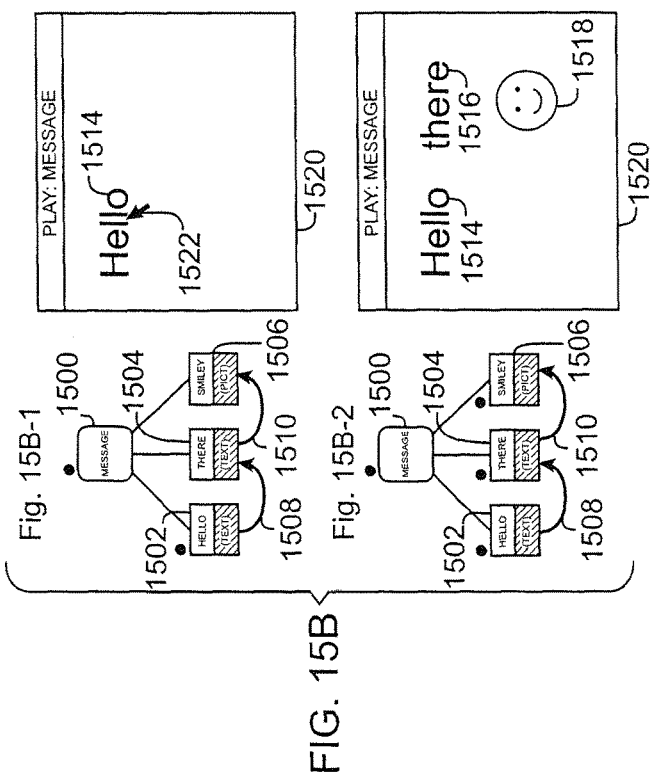
FIG. 15B
FIG. 15D

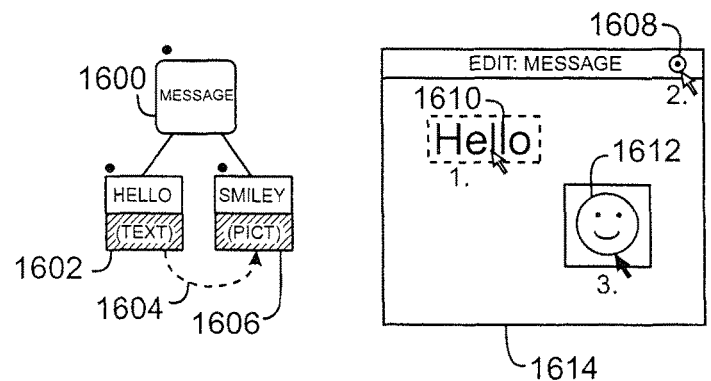
FIG. 16A
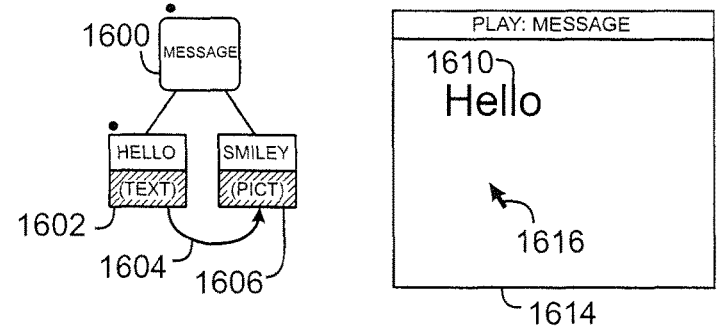
Fig. 16B-1
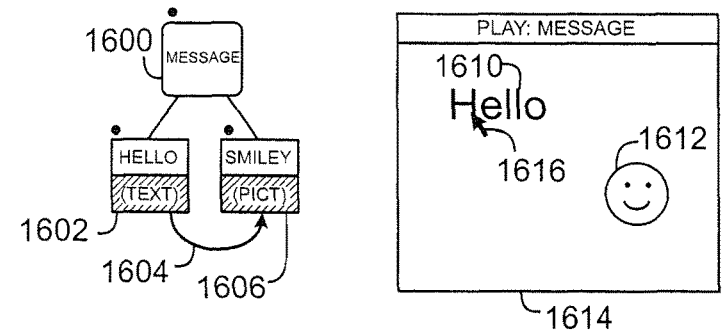
Fig. 16B-2
FIG. 16B
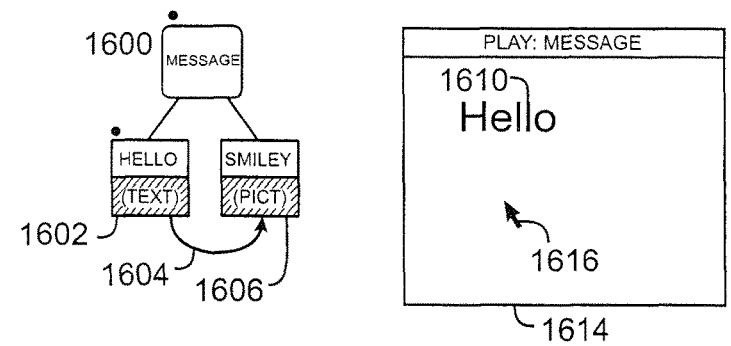
Fig. 16B-3

FIG. 17A
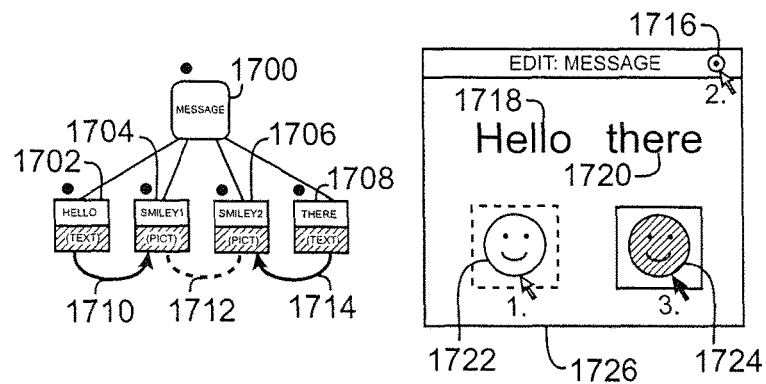
FIG. 17B
Fig. 17B-1
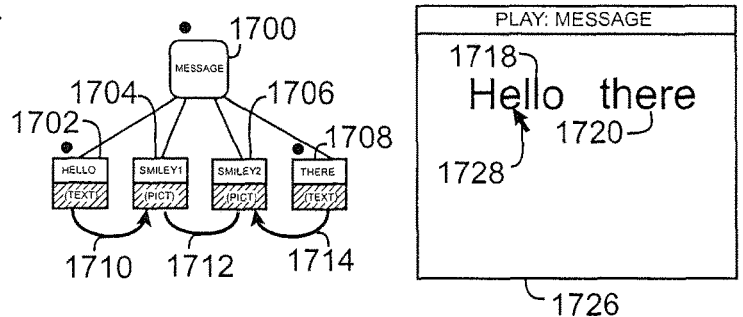
Fig. 17B-2
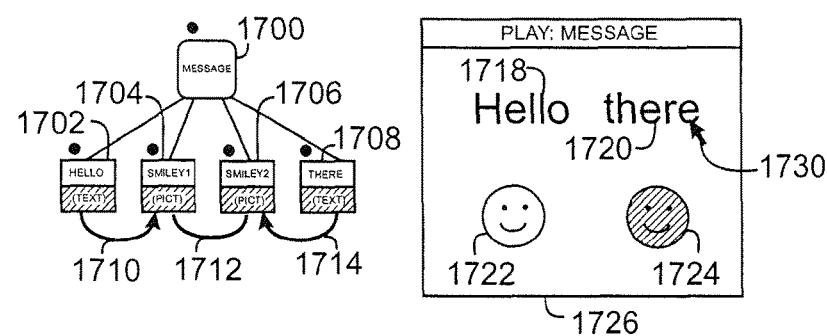
Fig. 17B-3
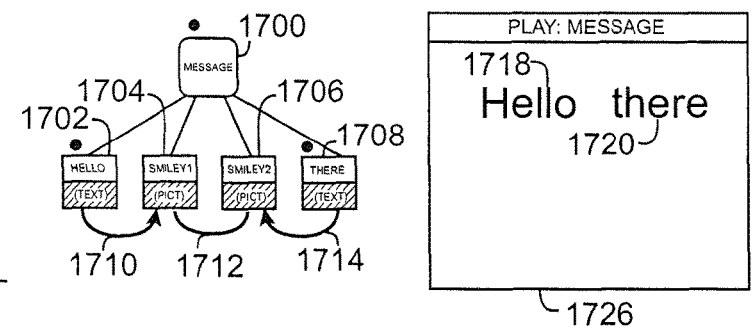

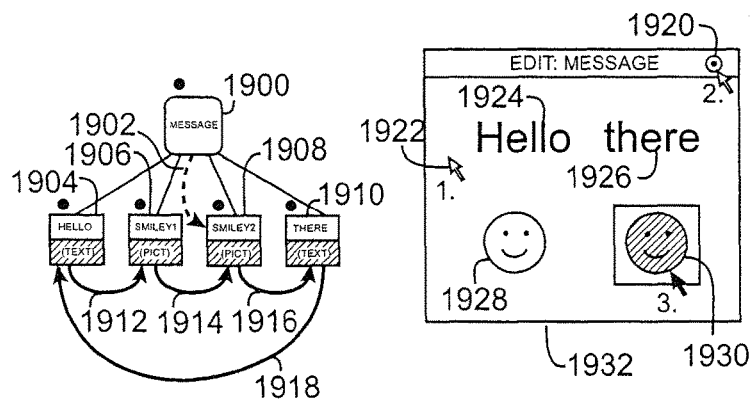
FIG. 19A
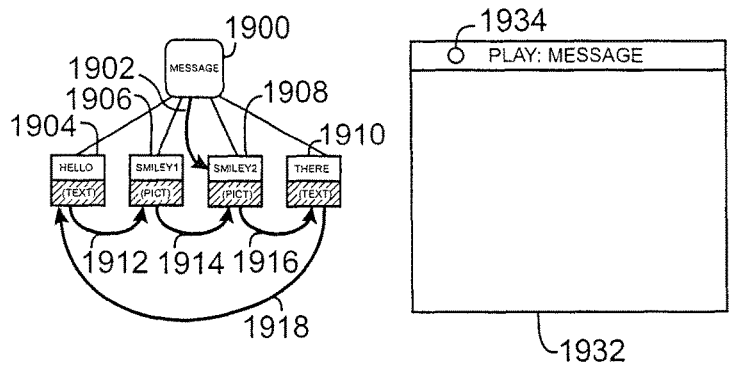
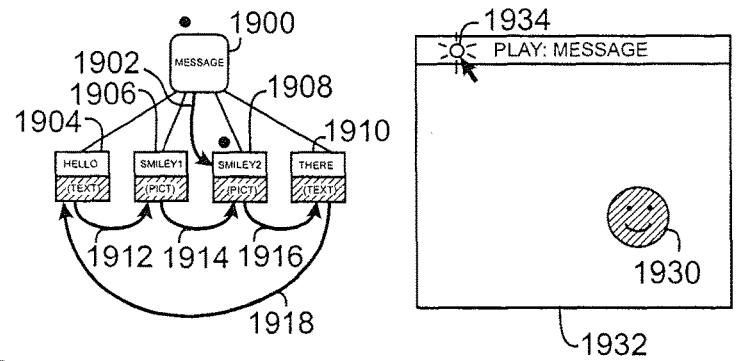
FIG. 19B

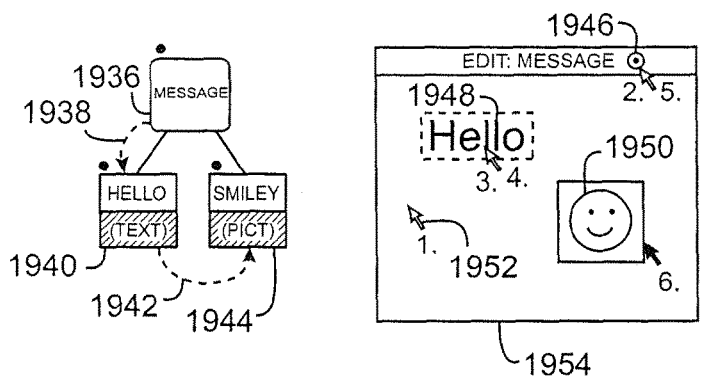
FIG. 19C
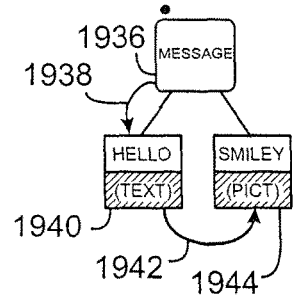
Fig. 19D-1
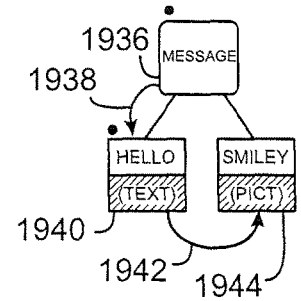
Fig. 19D-2
FIG. 19D
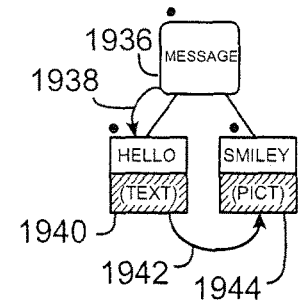
Fig. 19D-3

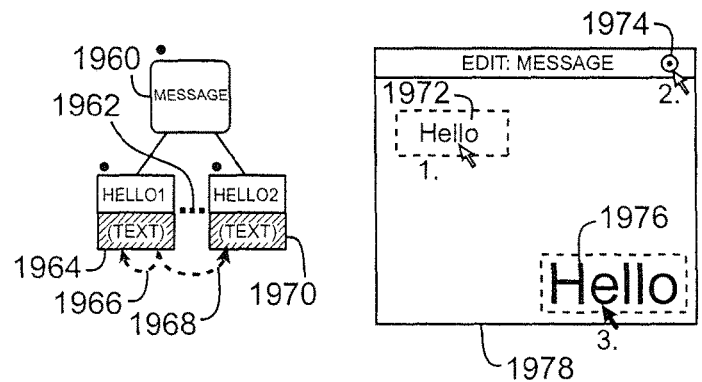
FIG. 19E
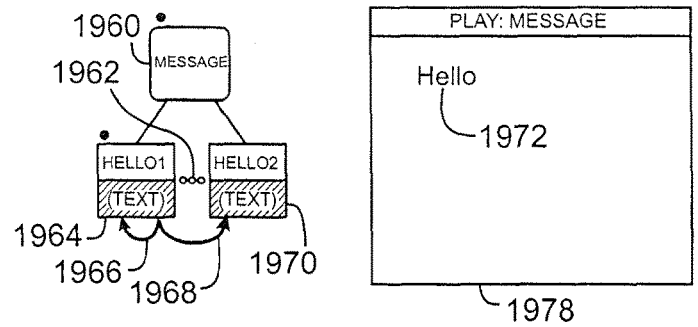
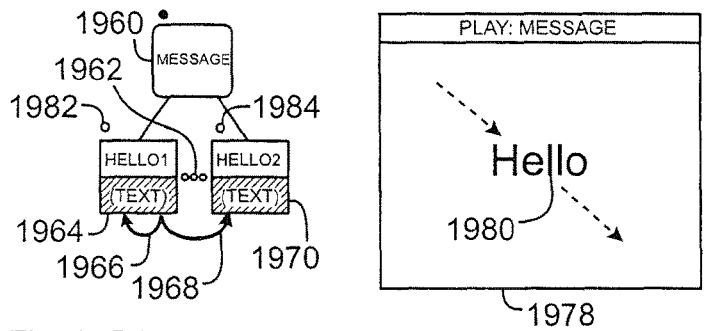
FIG. 19F
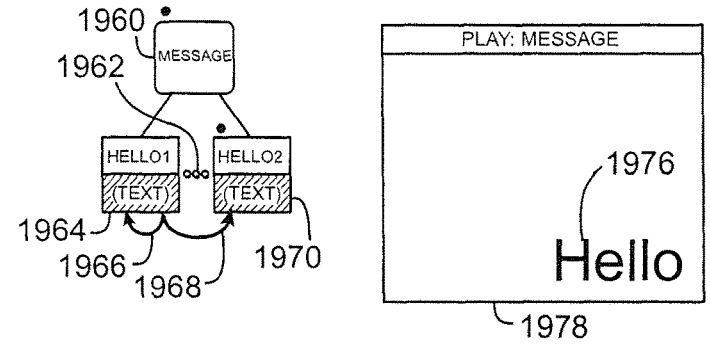

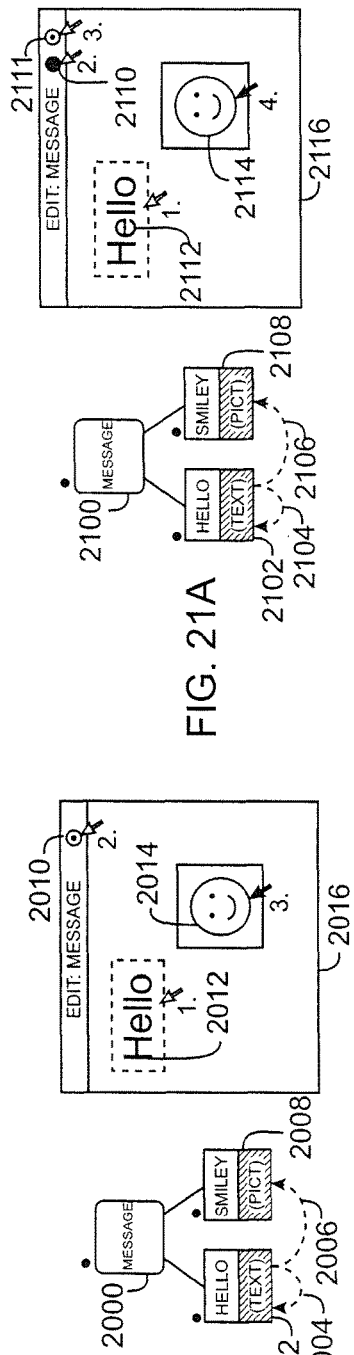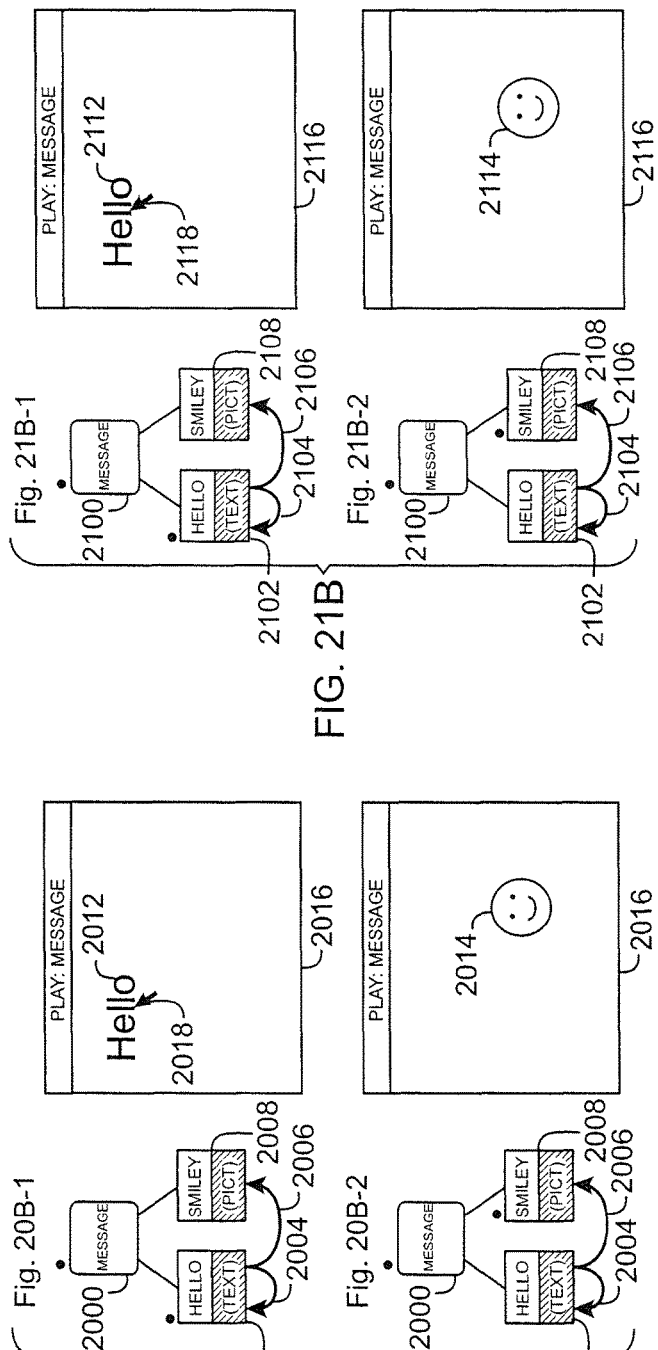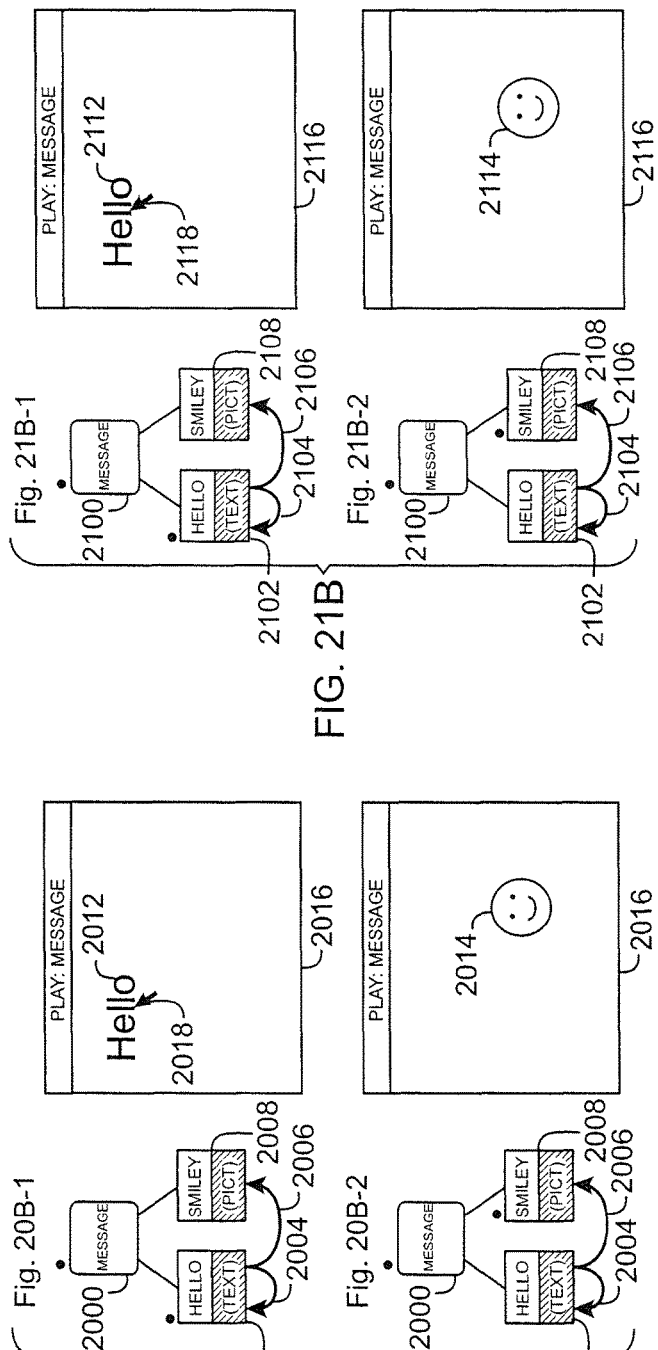
FIG. 20A
FIG. 20B
FIG. 21A
FIG. 21B

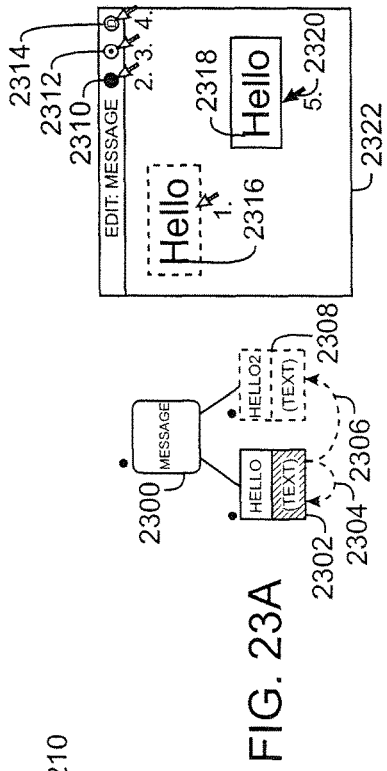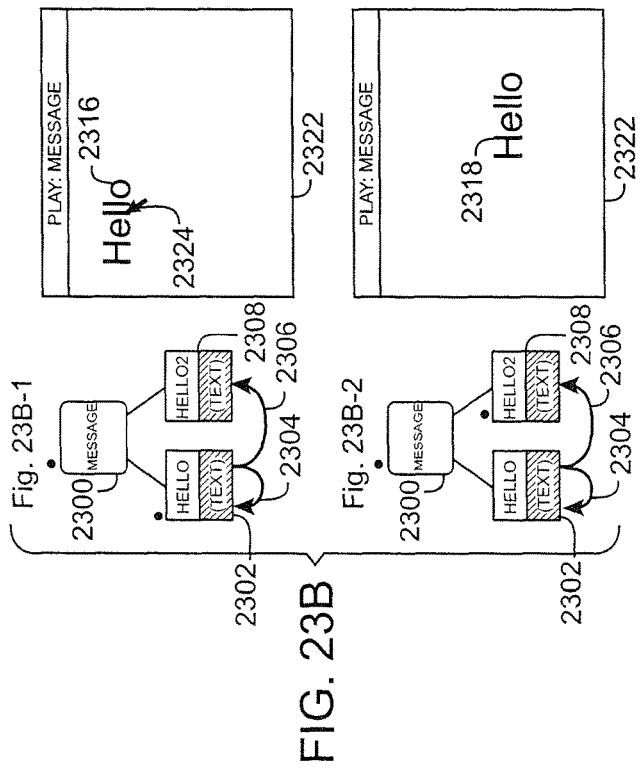
FIG. 23A    FIG. 23B
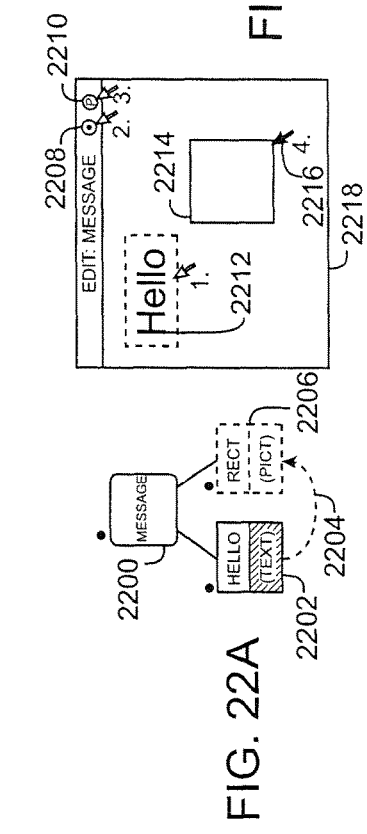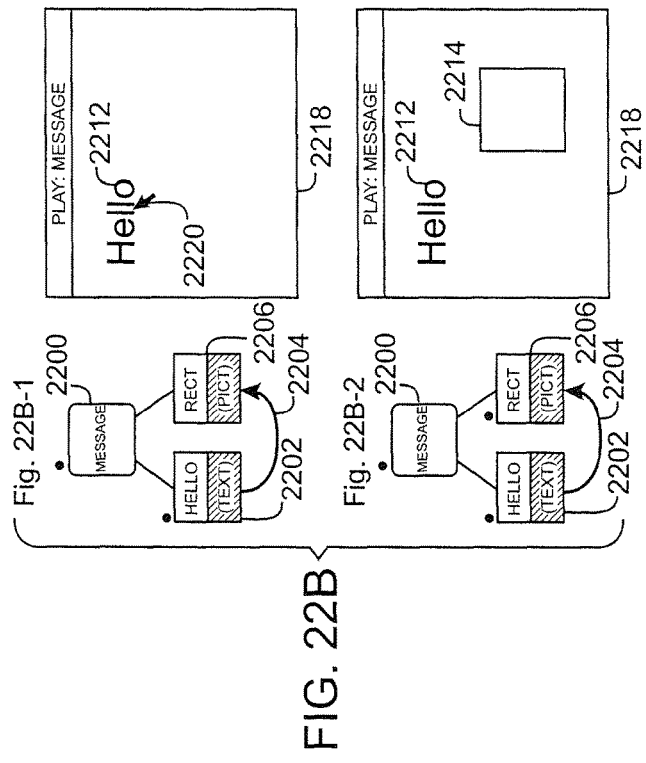
FIG. 22A    FIG. 22B

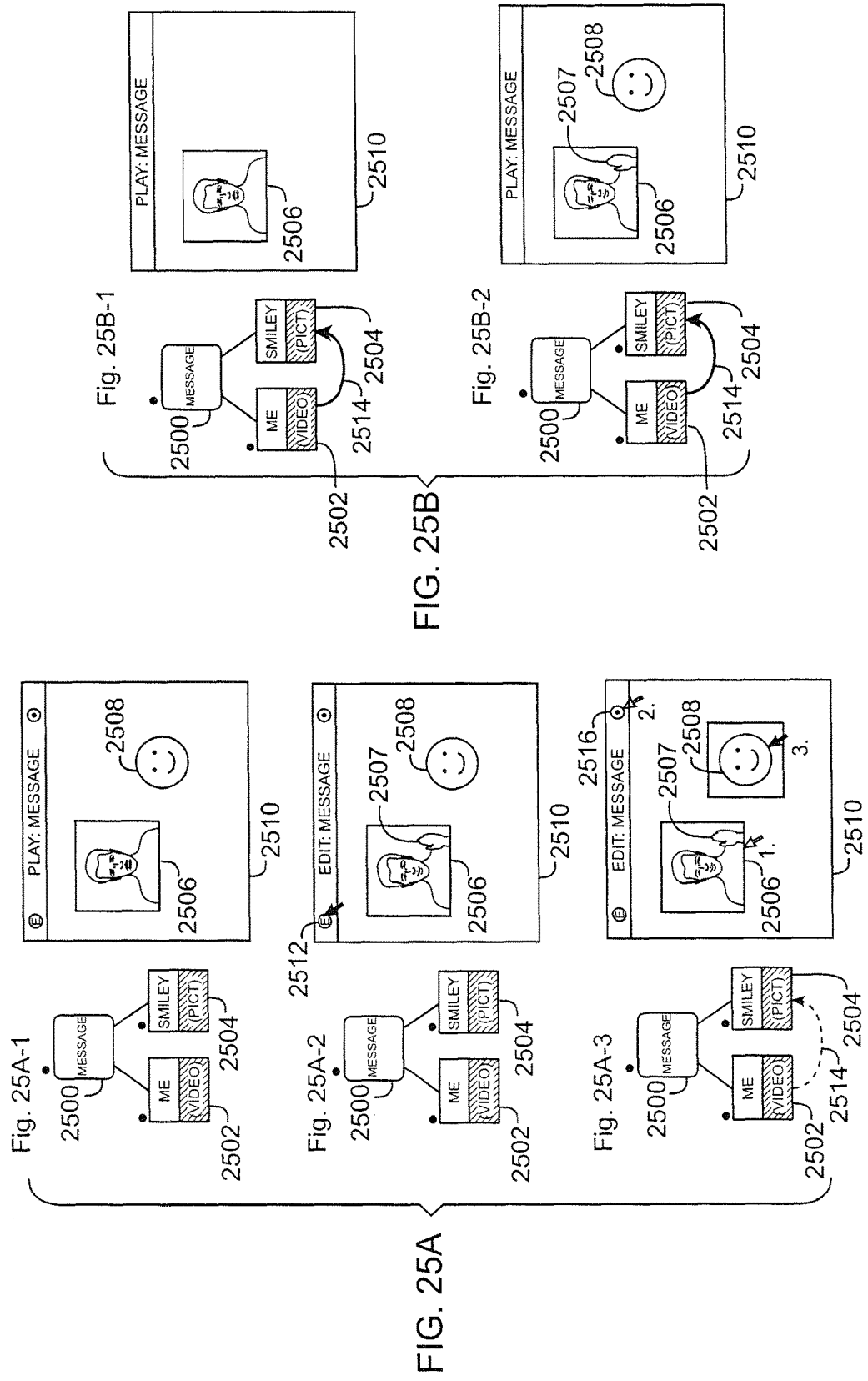

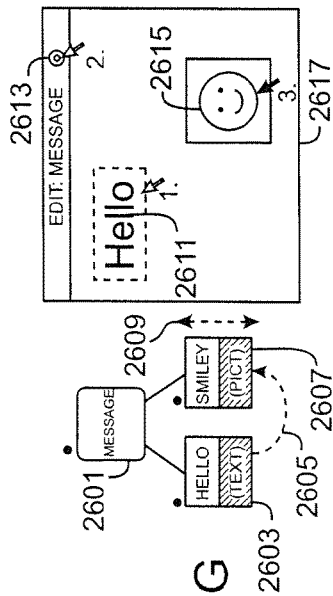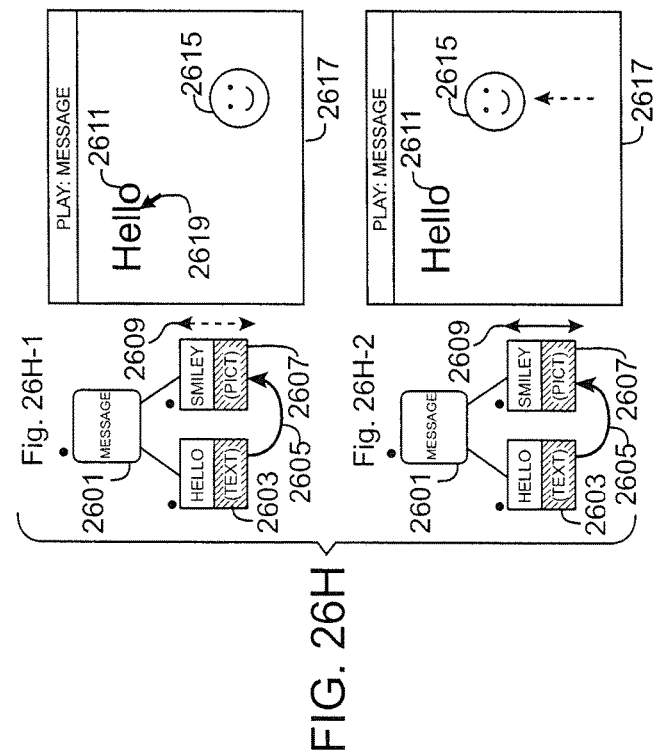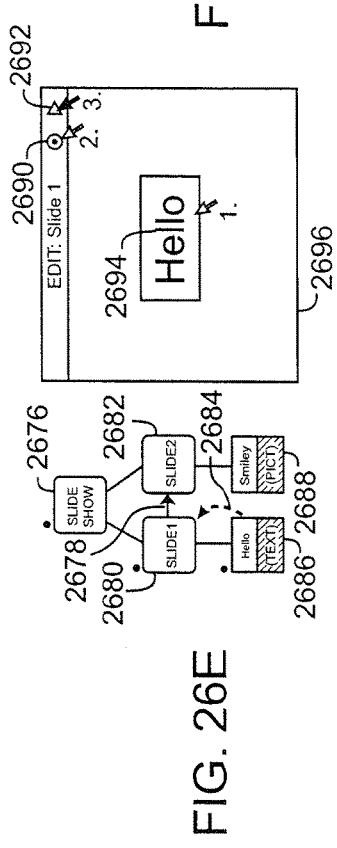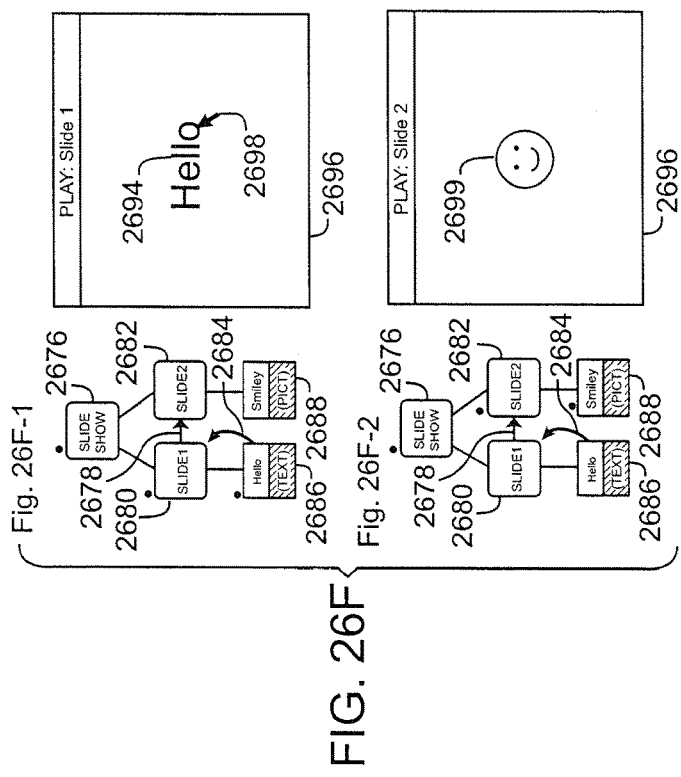

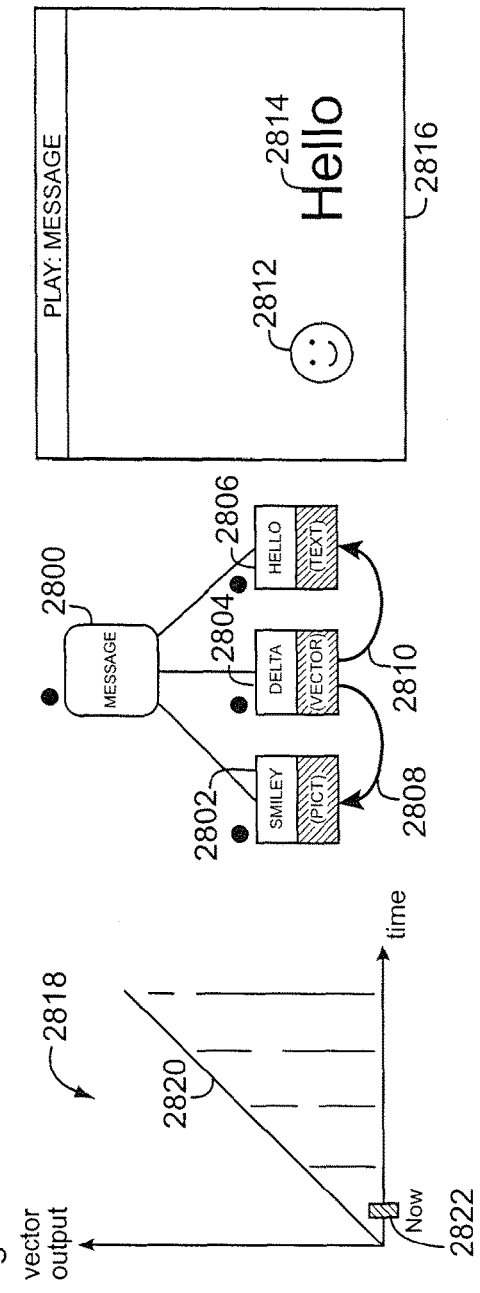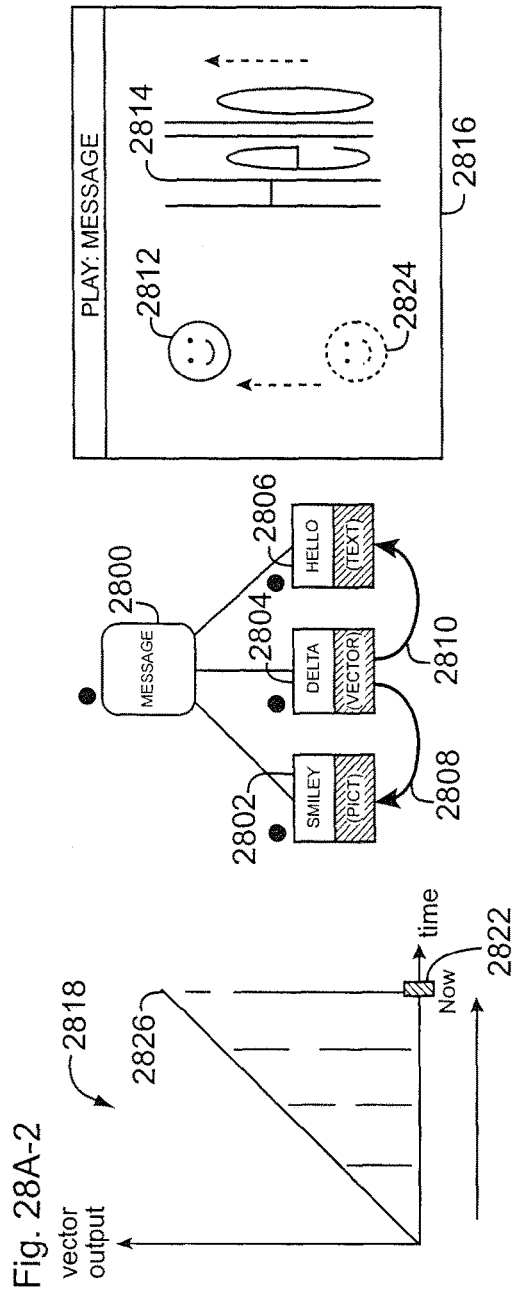
Fig. 28A-1
Fig. 28A-2

Fig. 28B-1
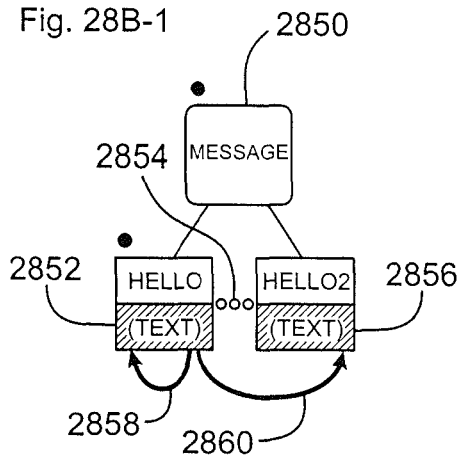
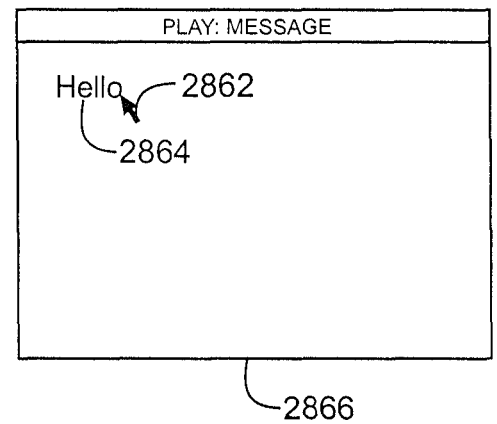
Fig. 28B-2
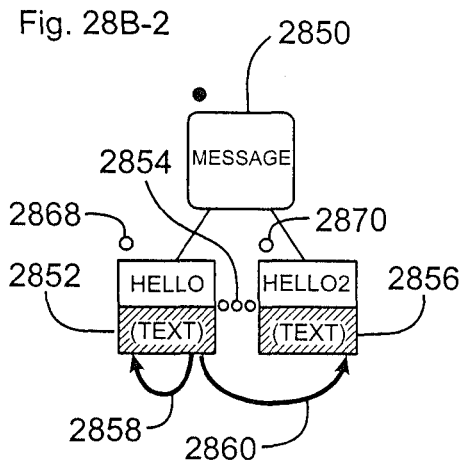
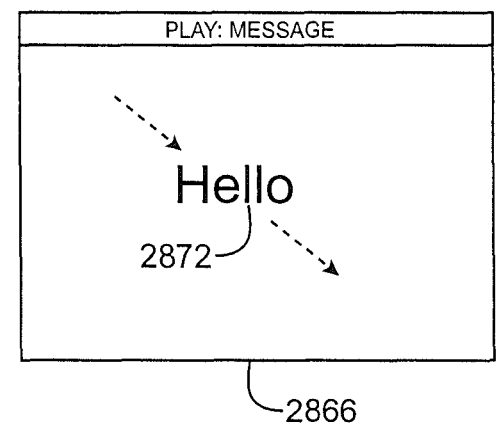
Fig. 28B-3
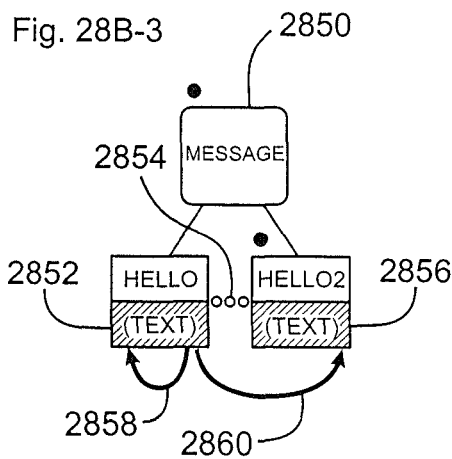
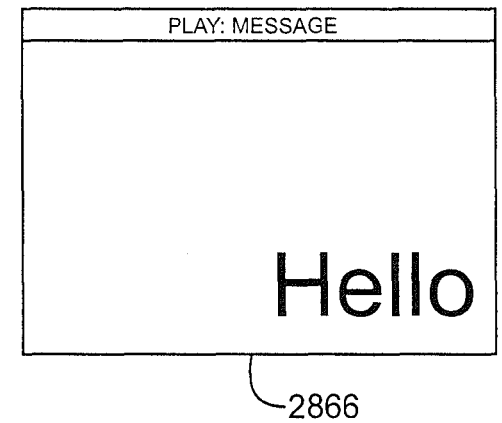

Fig. 28C-1
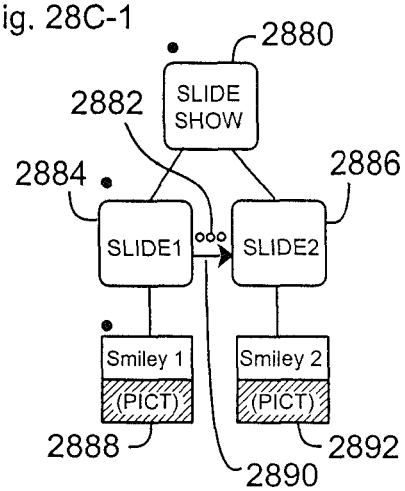
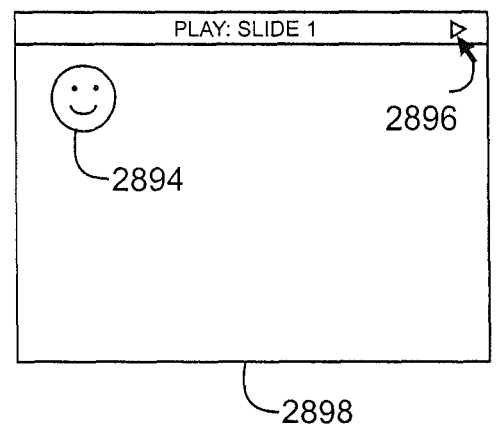
Fig. 28C-2
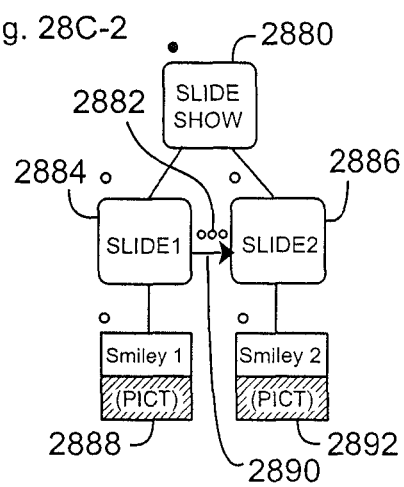
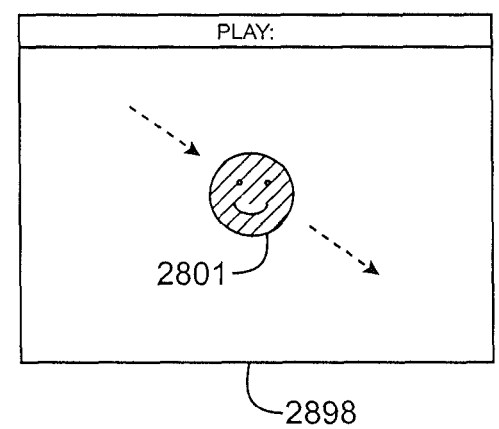
Fig. 28C-3
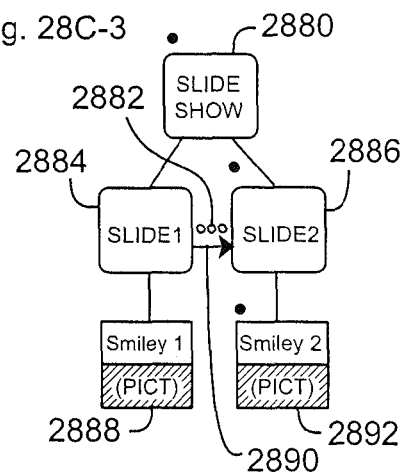
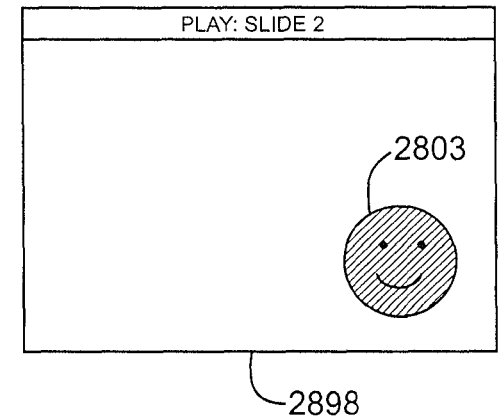

Fig. 28D-1
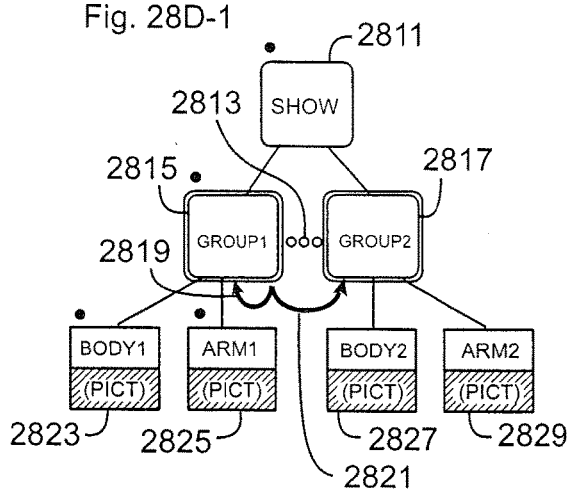
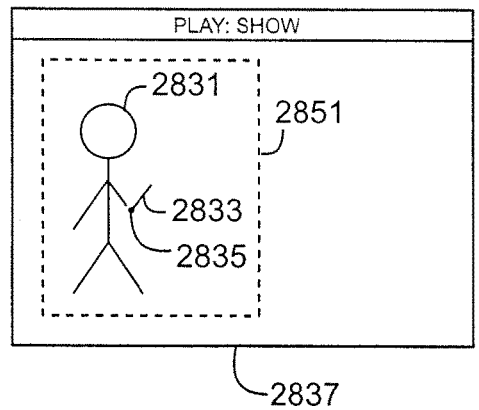
Fig. 28D-2
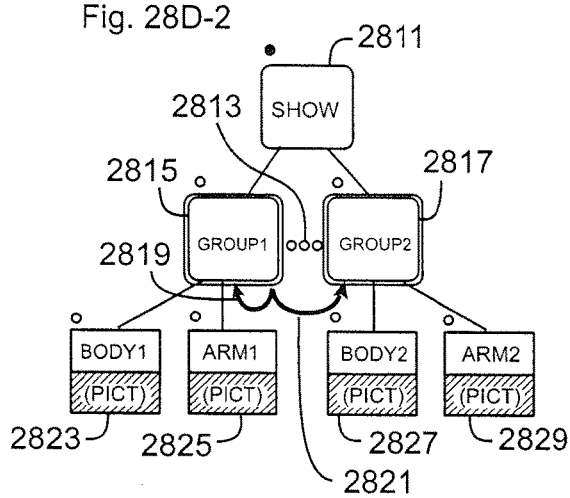
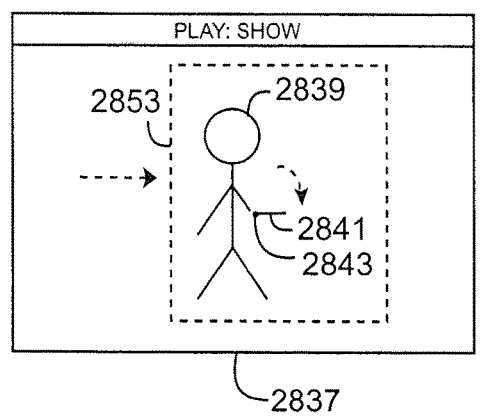
Fig. 28D-3
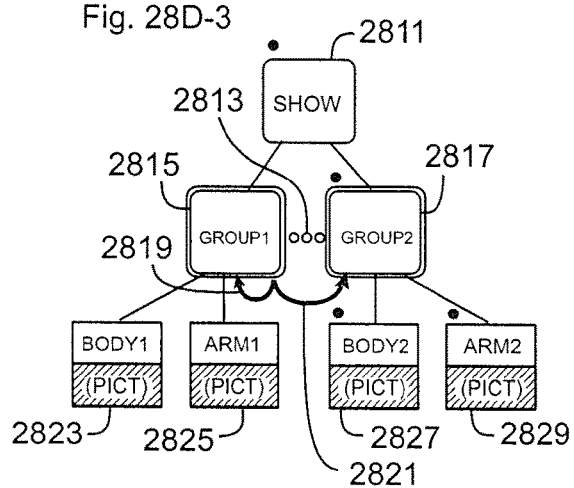
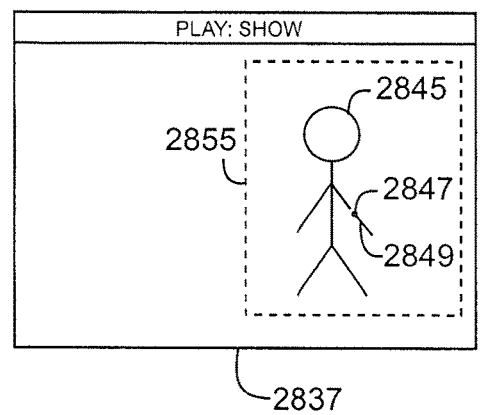

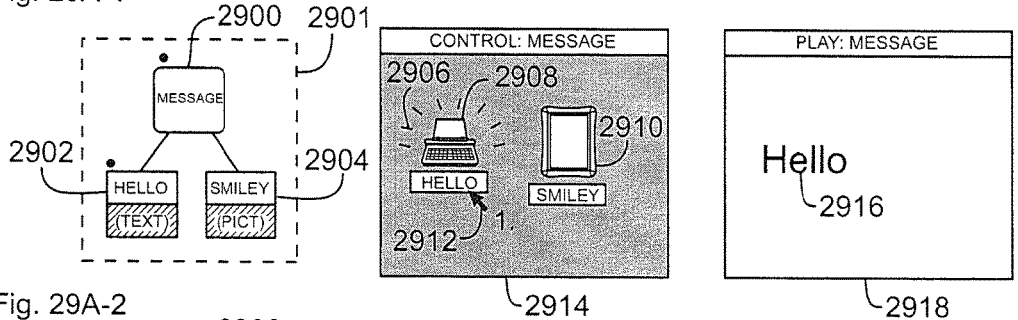
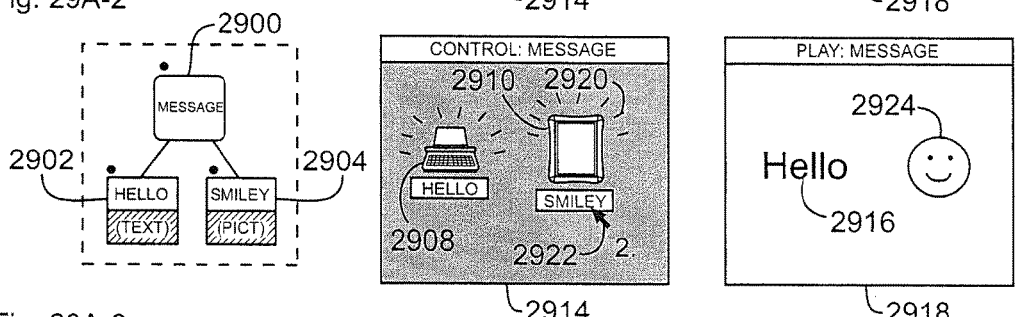
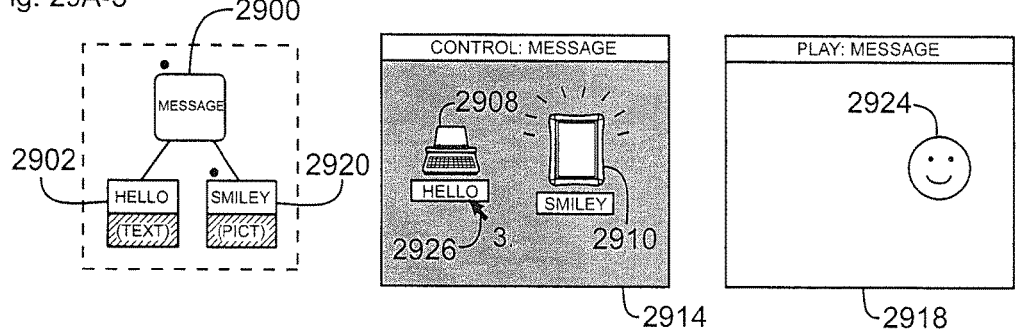
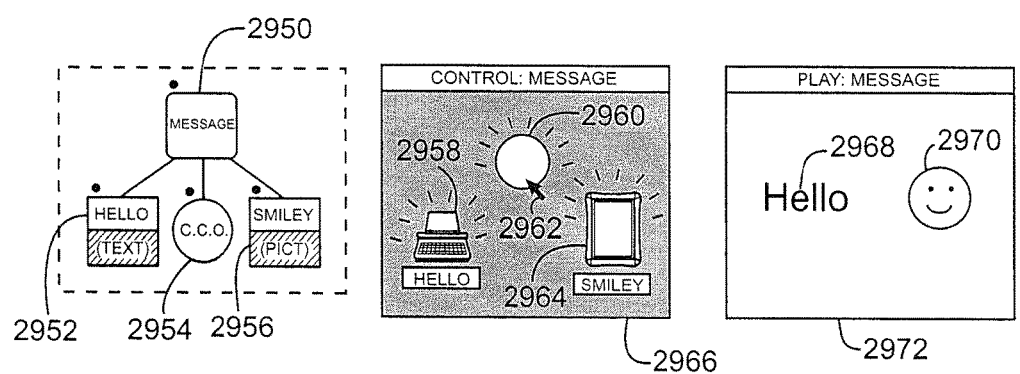
FIG. 29B

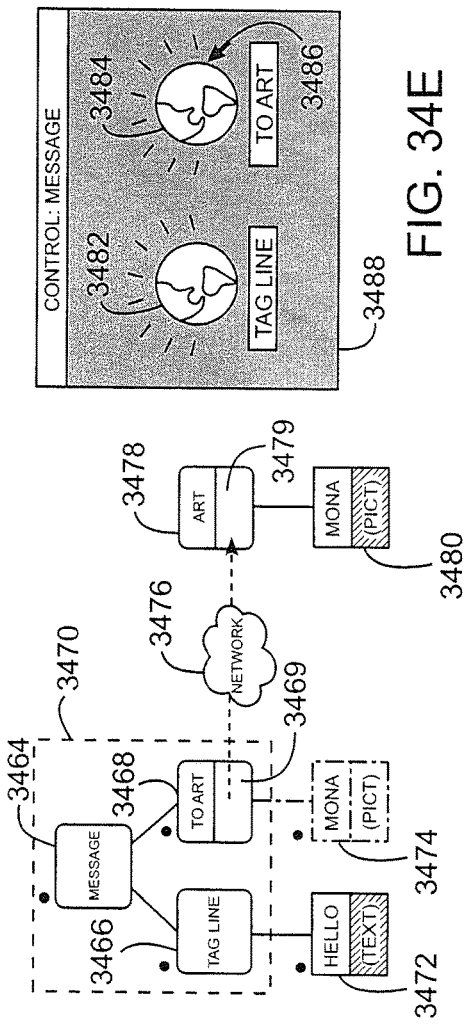
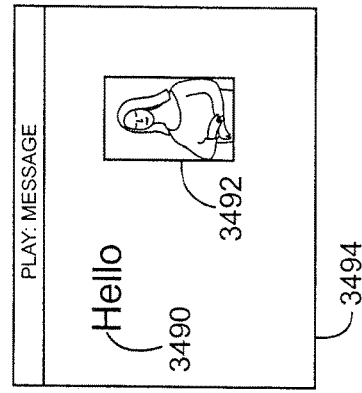
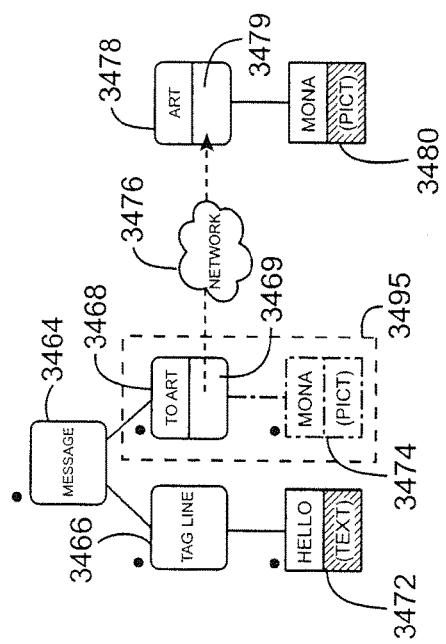
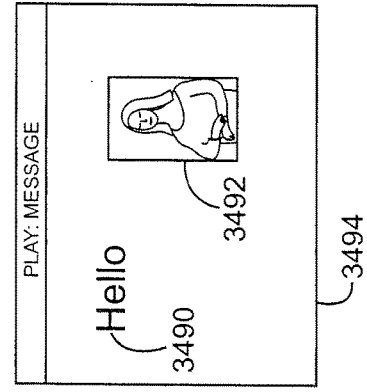
FIG. 34E
FIG. 34F

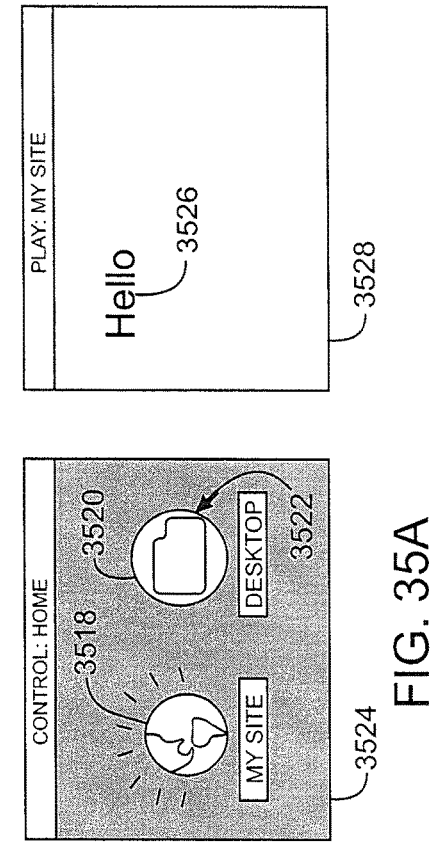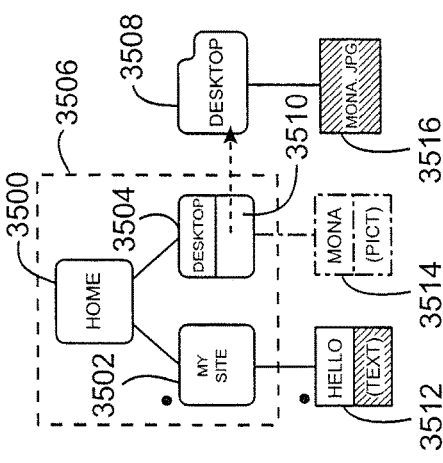
FIG. 35A
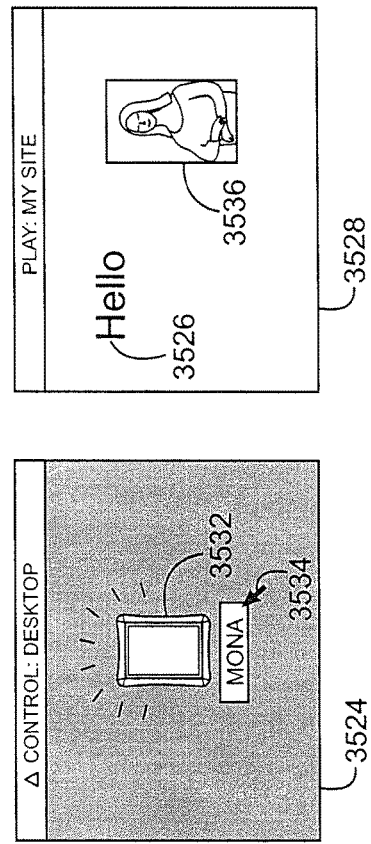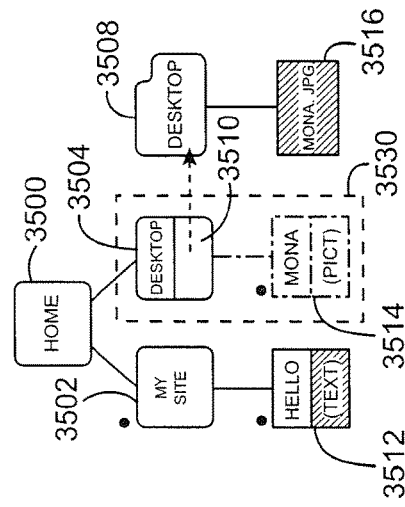
FIG. 35B

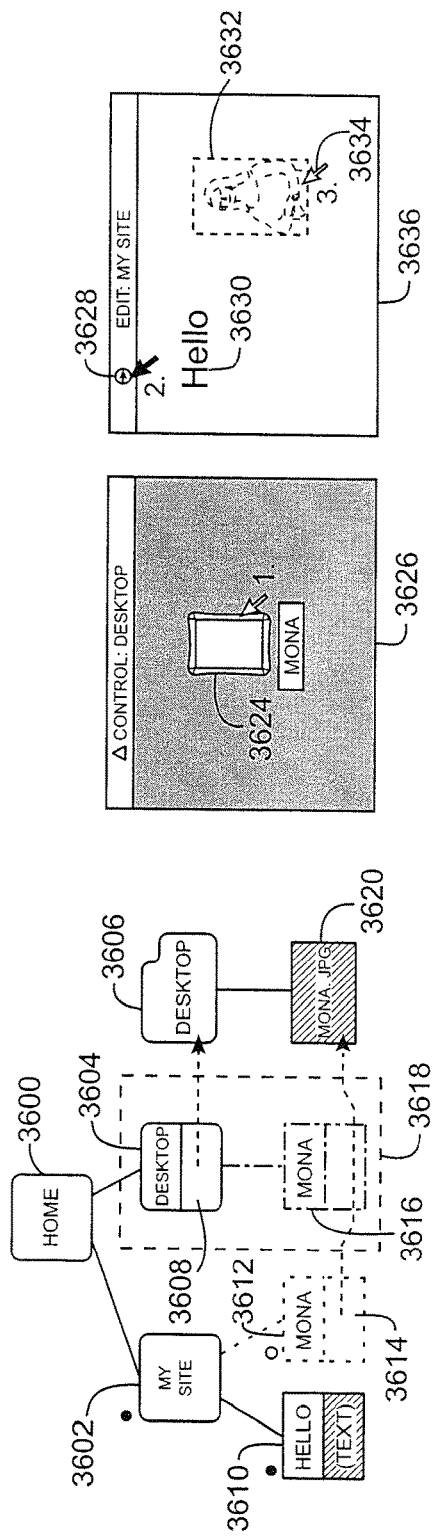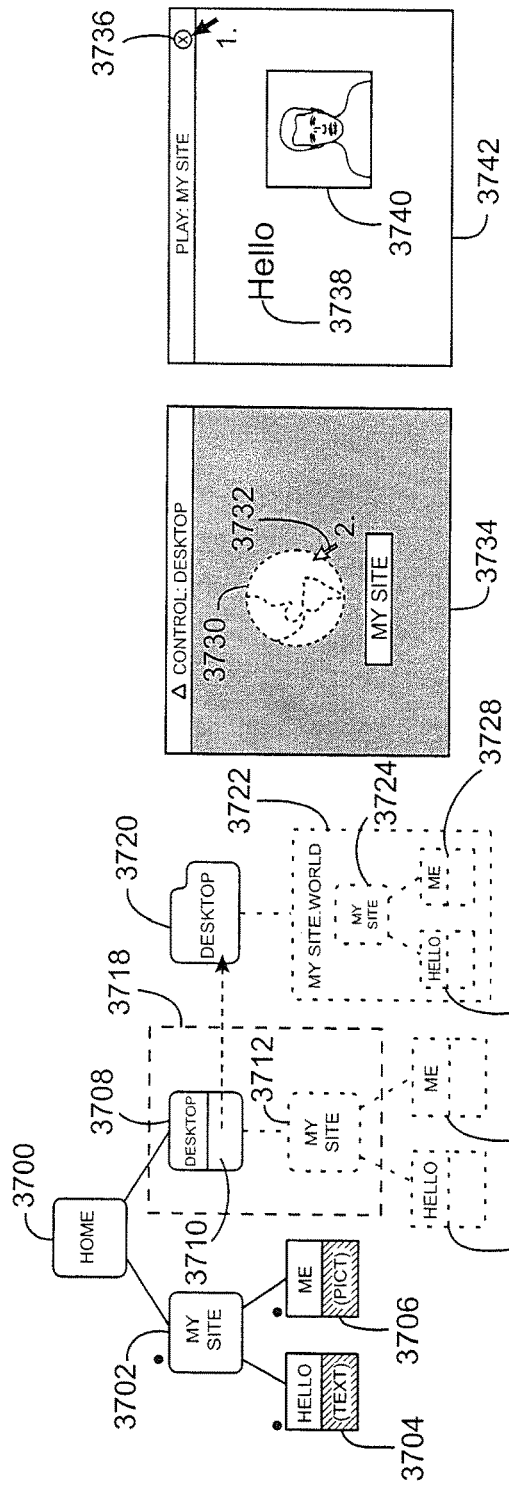
FIG. 36
FIG. 37A

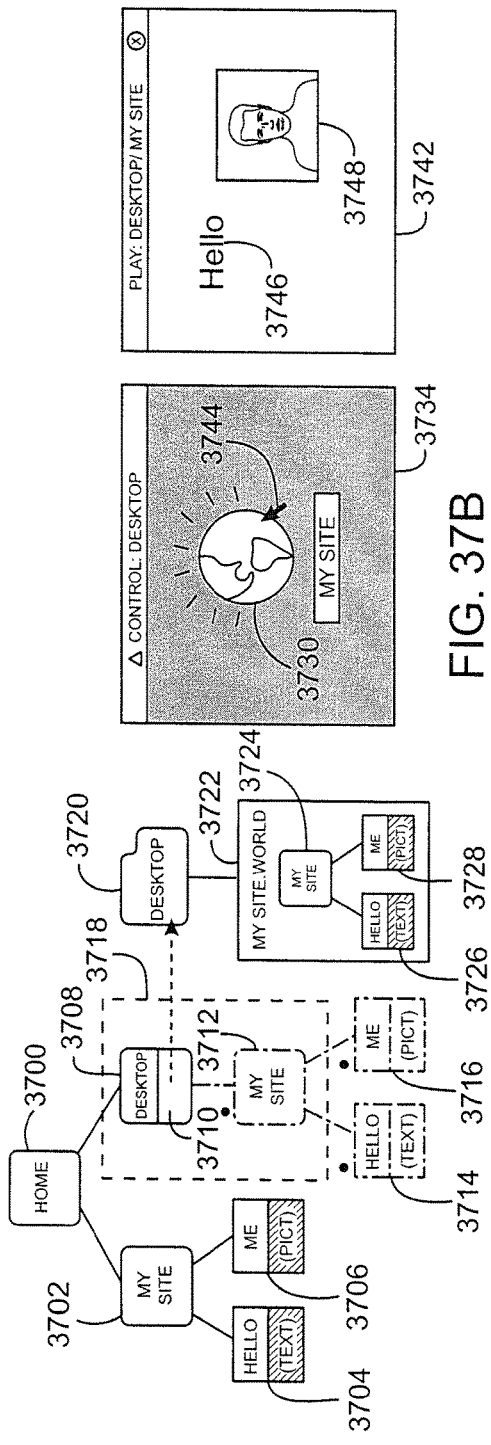
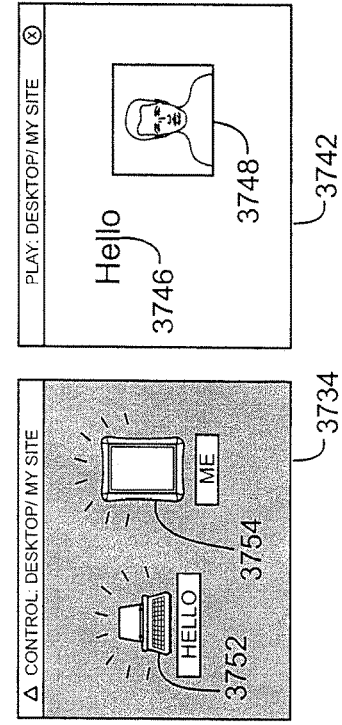
FIG. 37B
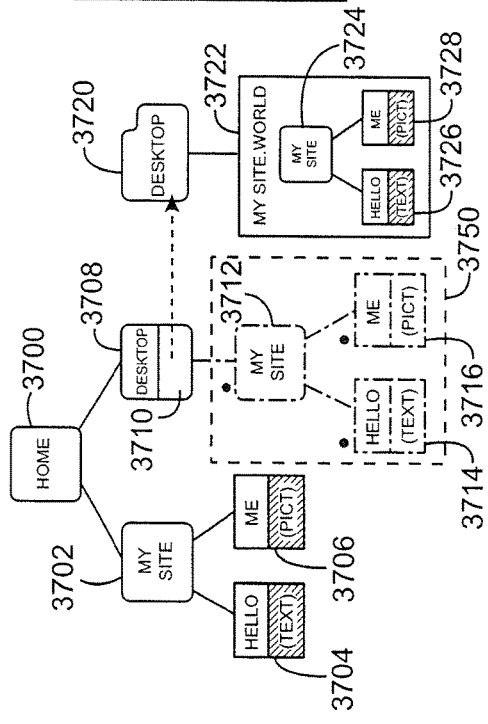
FIG. 37C

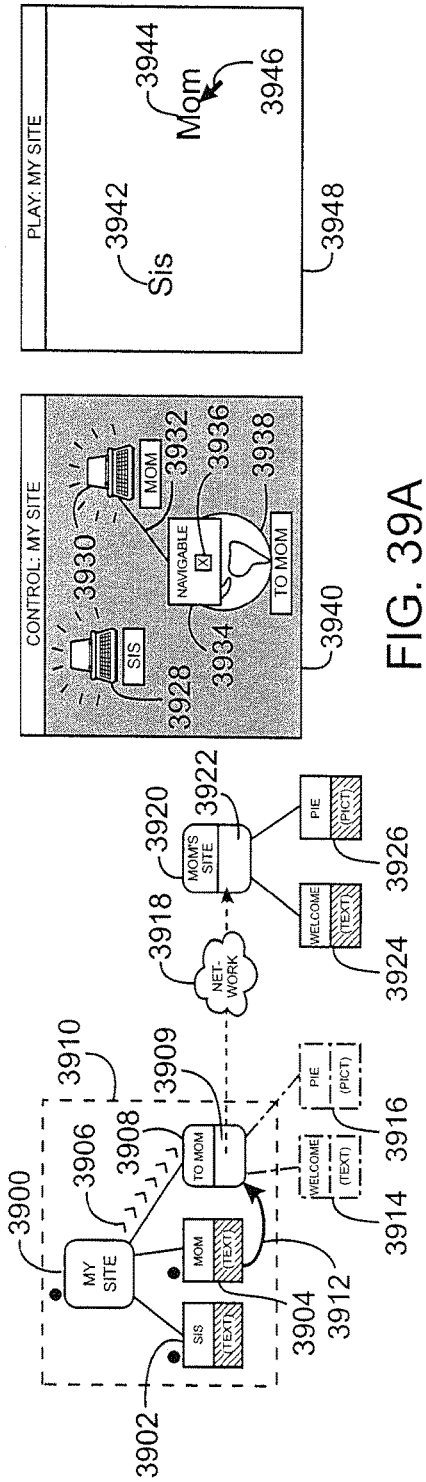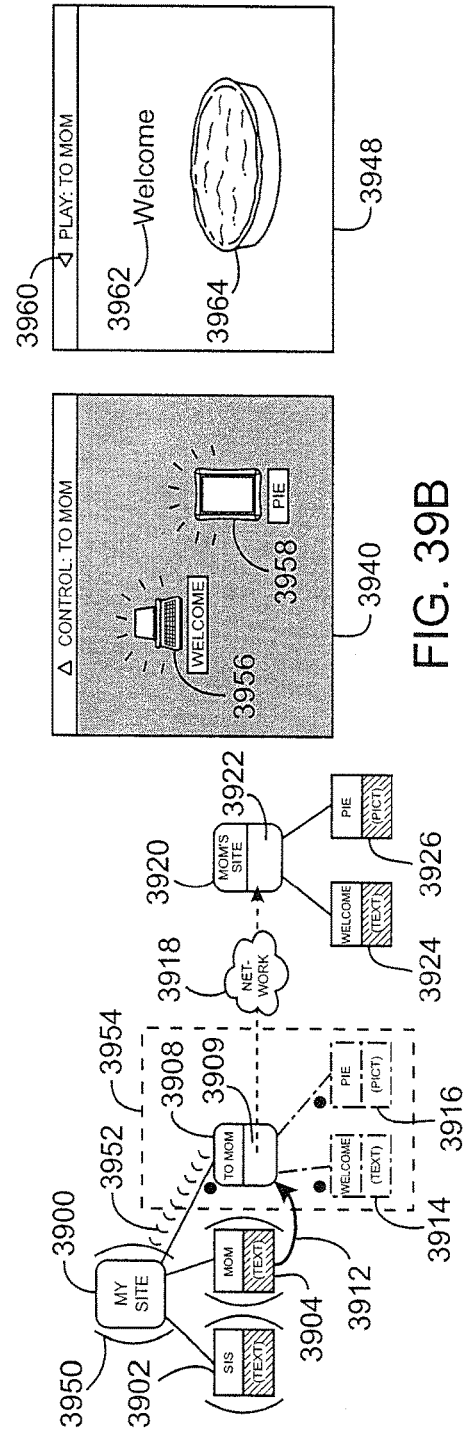
FIG. 39A
FIG. 39B

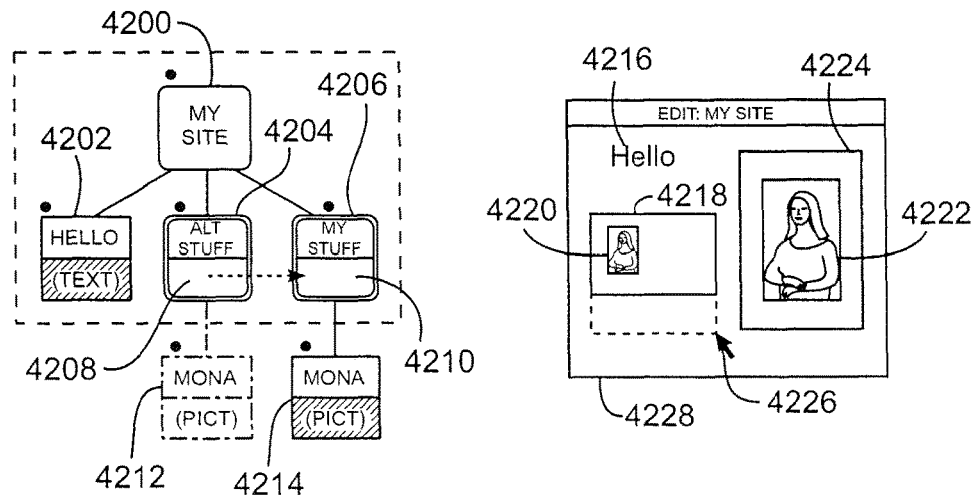
FIG. 42
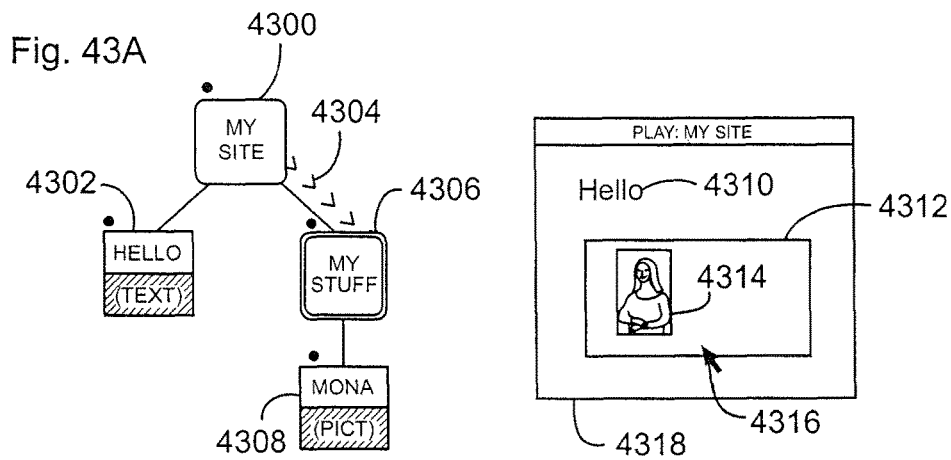
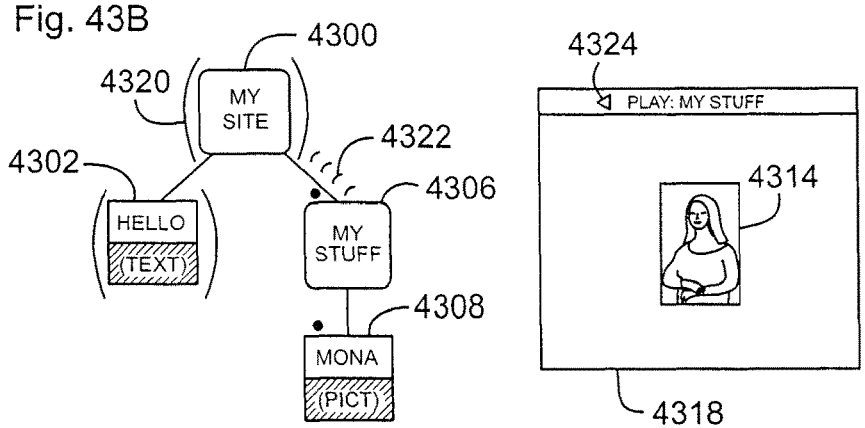
FIG. 43

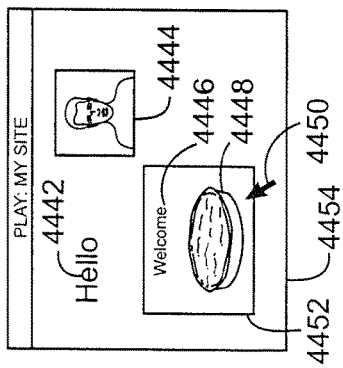
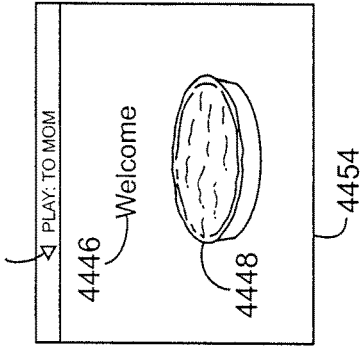
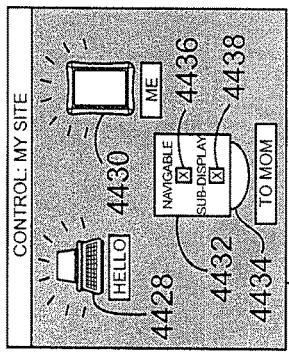
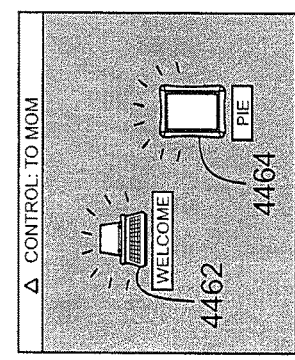
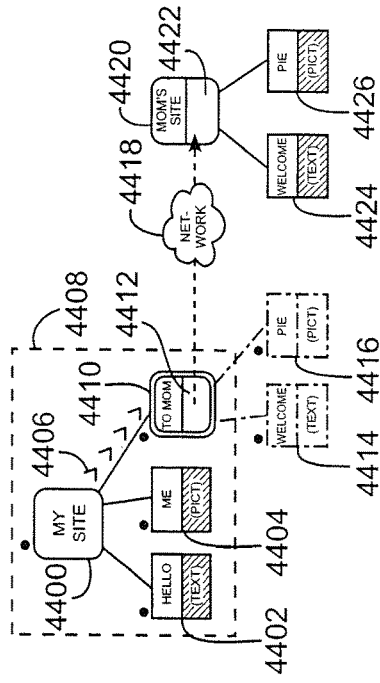
FIG. 44A
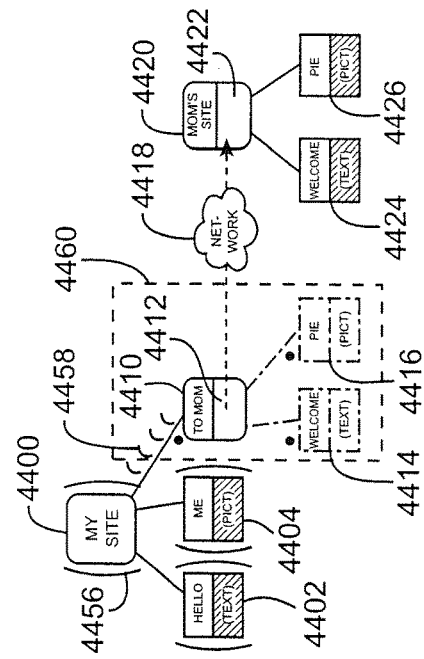
FIG. 44B

| OBJECT MODEL |||||
|---|---|---|---|---|
| PROPERTIES<br>TYPE, ICON POSITION, POINTER FLAG, FOLDER POINTER FLAG,<br>SETUP CHANGE COUNT, CONTENT CHANGE COUNT |||||
| PICTURE<br><br>CONTENT<br>IMAGE DATA<br><br>SETUP<br>DISPLAY SETTINGS<br>PLAYBACK PARAMS | TEXT<br><br>CONTENT<br>TEXT DATA<br><br>SETUP<br>DISPLAY SETTINGS<br>PLAYBACK PARAMS || VIDEO<br><br>CONTENT<br>VIDEO DATA<br><br>SETUP<br>DISPLAY SETTINGS<br>PLAYBACK PARAMS | SOUND<br><br>CONTENT<br>SOUND DATA<br><br>SETUP<br>VOLUME<br>PLAYBACK PARAMS |
| CONTAINER<br><br>CONTENT<br>RELATIONS<br><br>SETUP<br>NAVIGABLE FLAG<br>SUB-DISPLAY FLAG<br>DISPLAY SETTINGS<br>PLAYBACK PARAMS | CCO<br><br>CONTENT<br>NONE<br><br>SETUP<br>BACKGROUND COLOR<br>RANDOM START FLAG<br>PLAYBACK PARAMS || VECTOR<br><br>CONTENT<br>VECTOR DATA<br><br>SETUP<br>SCALE<br>SPEED | SCRIPT<br><br>CONTENT<br>SCRIPT DATA<br><br>SETUP<br>NONE |
| DISPLAY SETTINGS<br>x-position, y-position, size, color, transparency, rotation, rotationAnchor-x, rotationAnchor-y,<br>x-stretch, y-stretch, width, height, x-scroll, y-scroll, shape, softness<br><br>PLAYBACK PARAMS<br>undulateFlag, undulateDelta, undulateRate, bounceFlag, bounceDelta, bounceRate,<br>colorCycleFlag, colorCycleDelta, colorCycleRate, entranceFlag, entranceType, entranceTime,<br>exitFlag, exitType, exitTime, timeoutFlag, timeoutTime, effectBoxFlag, effectBoxPos, effectType,<br>videoEndLoopFlag<br><br>RELATION<br>object1: object name, capability name, capability type<br>object2: object name, capability name, capability type |||||

FIG. 85

SYSTEM AND METHOD FOR MULTIMEDIA AUTHORING AND PLAYBACK

CROSS REFERENCE TO RELATED APPLICATIONS

This application is a continuation of U.S. patent application Ser. No. 11/351,149 filed on Feb. 8, 2006, which is a continuation-in-part application of U.S. patent application Ser. No. 10/325,898 filed on Dec. 18, 2002, which is a continuation-in-part application of U.S. patent application Ser. No. 10/027,430, now U.S. Pat. No. 7,155,676, filed on Dec. 19, 2001. This application claims priority under 35 U.S.C. 120 from U.S. patent application Ser. No. 10/325,898 and U.S. patent application Ser. No. 10/027,430 and claims priority under 35 U.S.C. 365(c) from PCT Patent Application No. PCT/US01/50458, filed Dec. 19, 2001 and PCT Application No. PCT/US02/40623 filed Dec. 18, 2002. Both U.S. patent application Ser. No. 10/027,430 and PCT Application No. PCT/US01/50458 claim priority from U.S. Provisional Patent Application No. 60/256,862, filed Dec. 19, 2000. The subject matter of U.S. patent application Ser. No. 10/325,898, U.S. patent application Ser. No. 10/027,430, PCT Application No. PCT/US01/50458, PCT Application No. PCT/US02/40623 and U.S. Provisional Application No. 60/256,862 are incorporated herein by reference.

FIELD OF THE INVENTION

The present invention relates generally to the creation and presentation of multimedia content, including presentations, electronic greetings, slideshows, websites, movies and other forms of computer-based visual and audio-visual content, and more specifically to a multimedia authoring and playback system with improved features for the creation and presentation of multimedia content.

BACKGROUND OF THE INVENTION

Since the early 1990's, as the processing power of computers has increased, so has their ability to produce and present high-quality visual and audio-visual content in the form of games, applications, animations, presentations and the like. With the Internet explosion of the late 1990's, the ability of computers to share this content over a network and present it online has become increasingly important. Yet the tools for authoring, viewing, publishing and sharing of this content have evolved from disparate sources and specialized needs, and bring with them individual legacies and collective incompatibilities. Furthermore, the evolution of these tools has failed to keep pace with the growing mass market of computer users. In particular, many of the authoring tools were initially designed for professional use, and attempts to "dumb them down" for non-professional users have lead to mixed results.

In general, multimedia tools typically provide certain basic authoring and control features. These include capabilities for creating and/or importing media objects that contain media data (which can include text data, image data, video data, animated graphics data, sound data and other data representative of visual and/or audio information), editing media data, editing display settings that determine how media data is displayed, programming playback behavior that controls how media data is presented, organizing and structuring objects, and outputting finished pieces of multimedia content that can then be stored on Internet-enabled servers and linked together via the World Wide Web. All of these features can vary from system to system.

In general, the features of an authoring system are implemented according to the expected skill level of the user of the system. For example, an author may want to specify the circumstances under which a given media object starts and stops playing, its on-screen size and location, time-based or event-driven changes to its size and location, and various other playback behaviors appropriate to the object. The means by which this is done needs to be tailored to the expected skill level of the author. Therefore, the features of an authoring system tend to vary greatly depending on how sophisticated the author is assumed to be. Typically, some of the most significant variations among system features tend to occur in features which allow playback behavior to be specified by authors.

In systems where the author is assumed to be sophisticated, a great deal of power and control is generally provided for specifying playback behavior, but at a price in terms of difficulty and complexity. For example, a professional Web developer may need to create a cutting-edge, science-fiction-style user interface for a major entertainment website, in which extremely detailed control over the playback behavior of media objects is needed to provide the expected degree of activity and responsiveness. The prevailing method for achieving this level of control involves the use of scripting, exemplified by Javascript used in conjunction with HTML in Web applications and by proprietary scripting languages built into many high end authoring systems (such as Macromedia Flash® MX).

Scripting methods operate at their most basic level by associating a list of instructions, called a script, with a triggering event. The possible triggering events for scripts vary, and can include real-time input from the user interface, timers and clocks, trigger points within media object timelines, other scripts, etc. When the triggering event for a script occurs, a script playback engine, called an interpreter, reads the instructions in the script and performs the actions and procedures specified therein. In a multimedia system, these actions and procedures typically include not only the features customarily found in any programming environment, such as subroutines, conditional branches, general purpose variables, math operations, etc., but they also include facilities for controlling and manipulating the playback of media objects.

Regardless of the specific instructions supported by a particular scripting method, current methods of scripting are often unsatisfactory due to the procedural nature of scripting. Especially when dealing with highly interactive multimedia presentations with numerous possible states and paths, the step-by-step nature of the script tends to obscure the true structure of the content, and requires substantial mental visualization, i.e. sophistication, on the part of the author to be used effectively. As a result, current methods of scripting have significant drawbacks in multimedia authoring systems where ease of use for unsophisticated authors is needed.

One drawback is that the procedures used to create the scripts are abstract and fragmented, and do not correspond either directly or intuitively to the shape and structure of the resulting multimedia presentation. This problem becomes worse as the size and complexity of the multimedia presentation increases. To create a set of scripts that represents a highly interactive or expansive presentation, a large number of non-intuitive, interrelated procedures must be performed, often presenting a complex or frustrating burden to authors, particularly those who are inexperienced.

Another drawback is that current methods of scripting frequently result in rigid or too simplistic algorithms for determining the activity in a presentation. This tendency often leads to mechanical-looking results and misses the objective of creating appealing and entertaining multimedia content. For authors attempting to create multimedia content that is attractive or interesting to a viewing audience, this presents a burden in delivering appropriate results.

Therefore, current methods which use scripting to enable the author to specify the playback behavior of media objects are generally unable to provide the clarity, intuitiveness, and ease of use required to enable unsophisticated authors to produce high quality multimedia content.

In some authoring systems, a primary goal is ease of use for unsophisticated authors. For example, in a system which allows consumers to present a slide-show of family photographs on a personal website, only minimal control over the playback behavior of media objects is needed (i.e., selection of the order of the photographs), but the process of specifying that control must be simple enough to be easily understood by the average consumer. One method for enabling the author to specify the playback behavior of media objects where the manner of specifying is simple and easy to understand involves the use of templates.

Template methods in this field operate at their most basic level by associating to individual media objects or sets of media objects with specified roles or events within a template. A template is a piece of multimedia content in which the playback behavior of the media objects has been programmed in advance, but in which some or all of the media objects have been left unspecified. Once the author has assigned one or more media objects to their desired roles or events within the template, the system incorporates the specified media objects into the template and outputs the combination as a finished piece of multimedia content.

Regardless of the specific methods used to associate media objects with roles or events within a template, current methods that use templates are frequently unsatisfactory due to the pre-programmed nature of the template, and because the author generally has no input into the structure of the template or the functionality it provides. Particularly with regard to multimedia presentations where individuality or uniqueness is desirable, an author's creative intentions are frequently unable to be realized using templates. As a result, current methods using templates have significant drawbacks where flexible or detailed control over the playback of media objects is desired.

One drawback with current methods using templates is that the procedures undertaken to develop templates cannot take into account each individual author's needs and tastes, but must rather make broad assumptions about authors in general. This limits the ability of templates to produce results which satisfy a variety of author's intentions and preferences.

Another drawback is that current methods using templates typically result in media object behavior that is generic or overly simplistic. This tendency often leads to multimedia content which is "canned" looking or otherwise unsophisticated. For authors that wish to create unique or sophisticated content, this presents a burden in delivering appropriate results.

Therefore, current systems and methods using templates to enable the author to specify the playback behavior of media objects are generally unable to provide the flexibility and author-specific control needed for satisfactory authoring of custom multimedia content.

In some authoring systems, the passage of time is used as an organizing principle for controlling the playback behavior of media objects. This would include systems designed to allow a consumer to shoot several minutes of home video and edit it into a one minute "movie" (an example being Apple Computer's® iMovie®); this would also include systems designed to allow a professional graphic artist to create frame-based to animations and animated graphics (an example being Macromedia Flash® MX). In general, such systems provide the ability to take a number of separate media elements, such as text items, images, video segments, sound effects, musical clips, etc., and organize them in time. One way to provide this ability this is through the use of timelines.

Timeline methods in this field operate at their most basic level by providing means for the author to arrange media objects along a line which is divided into frames, each frame representing a discrete, constant unit of time passing. The "frame rate" of a timeline specifies the length of this constant unit; for example, a frame rate of ten frames per second means that each unit is a tenth of a second long. The timeline may further be divided into independent data paths or "layers" which allow the author to develop the behavior of several media objects in parallel. For example, one layer could be used for a background object, and separate layers might be used for each of several foreground objects. Additional features may be provided for organizing timelines into interconnected "scenes", creating looping timelines, nesting timelines within timelines, and exporting the results as completed "movies." Typically, finished movies are played back using a player application or Web browser plug-in. The application or plug-in interprets the movie data on a frame-by-frame basis and displays it to the end user.

Regardless of the specific methods used for defining playback behavior in time, current methods that use timelines are frequently unsatisfactory due to the inherently linear nature of representing object behavior along a timeline. In situations where the content being produced needs to be interactive for the end user, the behavior may involve many branching and converging paths, as well as conditions which may last for indefinite periods of time. Structures such as these are not easy to represent within the linear format of timelines. As a result, current methods using timelines have significant drawbacks when interactive or non-linear behavior for media objects is desired.

One drawback with current methods using timelines is that in order to achieve interactive playback, the timeline must be broken into segments, each of which represents part of the presentation. These segments, while still presented to the author as sequential and linear, may in fact be controlled by various jump, loop and branch commands, so that in fact they do not correspond either directly or intuitively to the shape and structure of the resulting multimedia presentation. This problem becomes worse as the level of interactivity of the presentation increases, often presenting a complex or frustrating burden to authors, particularly those who are inexperienced.

Another drawback is that timelines, even those which have been broken into individually controllable segments, typically produce multimedia content that has a repetitive or "looping" feel. This is because with timelines it is difficult to define several independently occurring processes, each with their own sense of time, that overlap and interact in unpredictable and varied ways. This limitation presents a substantial burden in creating multimedia content with enough variety and interest to merit extended or repeated viewings.

Some tools providers have attempted to address the problems of timeline methods by combining them with other methods, such as scripting and templates. In systems that combine timelines and scripting methods (such as Macromedia Flash® MX), the scripting has the same drawbacks as discussed above. In systems that combine timelines and template methods, the templates are typically canned sequences produced by professionals that can be laid out, interconnected and adjusted somewhat by the author. For example, the author may be able to specify some color schemes, fonts and custom text that appears in the animations. Examples of this approach are found at the website Moonfruit.com. But timeline templates present similar problems to the templates already discussed. They are inflexible, limit the creative input of the user and often result in a canned look.

Therefore, current systems and methods using timelines to enable the author to specify the playback behavior of media objects are generally unable to provide the flexibility and variety needed for satisfactory authoring of non-linear multimedia content.

The techniques described in the preceding discussion for enabling authors to specify playback behavior represent the most common techniques currently in use in the field. There is a broad variety of existing systems available to professional authors and consumers which employ these techniques, and these systems also include various capabilities for handling other aspects of content creation as mentioned above (such as creating and importing media objects, editing media data, editing display settings that determine how media data is displayed, organizing and structuring objects, outputting finished pieces of multimedia content, etc.). A representative overview of these systems is now provided.

The category of tools designed for use by professional authors includes the following systems. Macromedia Flash® MX and Adobe LiveMotion™ are professional authoring and animation tools based on timelines and used for creating animations and interactive objects for Web pages and other presentations. Macromedia Dreamweaver® is a professional Web authoring tool used for creating and updating websites with a variety of text, picture and animation objects. Adobe Photoshop® is a professional art and digital photo editing tool which allows users to create and edit digital images. Tribeworks iShell™ and Quark Systems mTropolis® are professional multimedia authoring tools used to make presentations for CD-ROMs, kiosks and other location-based applications.

The category of tools designed for use by consumers includes the following systems. Roxio (formerly MGI) Photosuite® is a digital photo editing tool used to acquire and touch up digital photos, add effects and text and save them as standard picture files. Logitech QuickCam® is a consumer tool (most recent Windows version is ImageStudio™) for capturing and editing digital photos and videos. Roxio (formerly MGI) Videowave™ is a consumer video editing tool used to acquire digital videos, edit them and add effects, and save the results as video files. Yahoo PageBuilder™ is a web-based consumer Web authoring tool which allows users to create Web pages online and add various animated effects. (Macromedia) Shockwave PhotoJam® allows users to create animated slide presentations using digital pictures and a number of built-in effects. Microsoft PowerPoint® is a slide presentation tool that allows the user to create sequential slide shows of text, pictures, movies and colored backgrounds. Moonfruit Sitemaker™ is a web-based consumer authoring tool (available online at www.moonfruit.com) used for creating and updating websites with a variety of text, picture and animation objects. SWiSHzone.com SWiSH™ is a consumer authoring tool (available online at www.swishzone.com) used for creating Flash animations.

In addition, the following systems, while not strictly focused on authoring, include features which relate to aspects of the present invention. Groove Networks Groove® is a peer-to-peer collaboration tool with basic visual authoring features allowing users to create and edit different types of documents collaboratively online. Jazz™ is a zooming user interface (ZUI) system under development at the University of Maryland, based on an earlier system, Pad++, developed at NYU and University of Mexico, which presents data objects as existing in a virtual space with infinite resolution that provides new ways to organize and view data. An application in the Jazz system is the CounterPoint™ plug-in for Microsoft PowerPoint2000® which allows slides in a slide show presentation to be arranged on a two dimensional surface.

Regardless of which systems and methods are used during the authoring stage, the final stage of multimedia content creation typically involves outputting a finished piece of multimedia content and distributing it. This frequently involves exporting the content to a computer file which can then be stored on an Internet-enabled server and linked with other files via the World Wide Web. For example, someone using a web authoring tool to create a personal home page will typically output the page as a browser-readable HTML file and store it on a Web server, at which point the author's friends and family can view the page in their browsers and can put links to it in their own home pages.

This linking method provided by the World Wide Web allows separate pieces of multimedia content located on different computers and authored by different people to be connected together by including within one piece of multimedia content a reference to the Web address of another. A broad variety of authoring systems used to create multimedia content depend on this linking method of the World Wide Web to interconnect pieces of multimedia content stored on different computers.

The linking method provided by the World Wide Web operates at its most basic level by defining a browser-readable format for Web content called HTML (which may be extended by Javascript and downloadable browser "plug-ins" that read and play custom formats). Authors can associate a triggering event in one piece of Web content, such as the user clicking on a particular line of text displayed in the browser, with the Web address of a second piece of Web content. When the triggering event occurs, the browser discards the current piece of Web content and loads and displays the second piece of Web content, effecting a page change. The address specified in the link identifies the desired Web content in terms of the Web server on which it is stored, using either the Internet Protocol (IP) address of the server or a registered domain name (such as www.amazon.com) that is converted into the IP address by a Domain Name Server (DNS).

Linked pages created and posted to Web servers are viewed in a browser, which is a playback program that allows people to traverse, or "navigate," through the distributed content page by page. It should be noted that this user "navigation" through distributed content is different from user "exploration" of files on the hard drive, such as that provided by Microsoft® Windows®, which involves traversing through a hierarchical file system (HFS) typically presented using a desktop metaphor. With exploration, the current location is defined within the context of the hierarchy, and means are provided to explore up or down in the hierarchy by opening nested containers called folders and presenting their contents. With navigation on the other hand, location is not defined within the context of a hierarchy. Rather, the content of a file or object being examined is displayed directly, and information is maintained about the file or object that was previously examined. A "back" function is provided to return to the previous file or object, and a "forward" function may be provided to return to the most recent content that a "back" function has been executed from.

The method used by Web browsers to effect page changes is conceptually simplistic, involving first discarding the current page and then loading and displaying the next. This approach often results in problems with the quality of the "Web surfing" experience provided to users of the browser. Particularly when it comes to effective presentation of link destinations, and the smoothness of transitions between Web pages, the linking method of the World Wide Web and its implementation by Web browsers can have significant drawbacks.

The main problem with the linking method of the World Wide Web is that the procedures a Web browser uses to access data for a new page do not begin until the triggering event for the link has occurred. This means that after clicking on a link, the user must wait for the data of the new page to load before seeing the new page, which often takes a substantial amount of time. Furthermore, when using a browser, the user cannot preview the actual destination of the link prior to committing to the page transition, but can only evaluate the destination based on information provided in the current page, which is frequently inadequate. As a result, users frequently become frustrated after triggering links which are slow to load, irrelevant to the purposes at hand, or both. This presents a substantial burden in providing an efficient and pleasing "Web surfing" experience for the user.

Therefore, current authoring and playback systems which depend on the linking method of the World Wide Web to provide linking of content across different computers inherit the drawbacks of that method, which include the inability to effectively represent link destinations to users and the inability to implement page changes smoothly.

As discussed above, methods currently in use for authoring multimedia content and for linking and viewing distributed multimedia content present a variety of drawbacks to the user. In authoring, what is needed is a level of control like that provided by scripting, without the complexity, loss of perspective and mechanical results inherent in scripting methods. What is further needed is a simplicity and ease of use like that provided by templates, without the restrictions imposed by template methods. What is also needed is the ability to control time-based processes without the inflexibility imposed by timelines. In linking and viewing distributed content, what is needed is a manner of connecting and presenting distributed content that provides for effective display of navigation destinations to the user and allows for a smooth and pleasing navigation experience for the user.

Finally, when taken as a whole, current systems for authoring, distributing and viewing multimedia content present a collective burden. Each only addresses a specific part of a much larger picture, resulting in incompatibilities and inefficiencies as content is passed from one tool to the next along the authoring, distribution and viewing chain. Therefore, what is further needed is a unified approach to authoring, distribution and viewing that eliminates these inefficiencies and incompatibilities.

SUMMARY OF THE INVENTION

In view of the above-described disadvantages with present systems, it is an advantage of embodiments of the present invention to provide a multimedia authoring and playback system that has more intuitive editing and control interfaces, and offers improved authoring of multimedia content.

It is an advantage of embodiments of the present invention to provide for high-quality authoring of multimedia content without the need for the user to have significant training in authoring methodology.

It is an advantage of embodiments of the present invention to provide system users with faster, more flexible capabilities for developing and managing multimedia content.

It is an advantage of embodiments of the present invention to provide users with advanced control features that maintain clarity, intuitiveness and ease of use.

It is an advantage of embodiments of the present invention to provide a multimedia authoring and playback system that lets users create dynamic and interactive content with less effort.

It is an advantage of embodiments of the present invention to provide more effective content creation and management capabilities through the use of improved object type characterizations and improved hierarchical arrangements.

It is an advantage of embodiments of the present invention to provide more effective content sharing and collaboration via improved methods for distributing multimedia content over a network.

It is an advantage of embodiments of the present invention to provide smoother and more intuitive navigation for users via improved methods for interconnecting and playing back multimedia content stored on different computers.

It is an advantage of embodiments of the present invention to allow users to easily add high quality multimedia content to online communications (such as emails, instant messages, websites, chat rooms, presentations, online communities, virtual private webs, etc.), and to make e-communications more interactive and visually rich.

A system and method for multimedia authoring and playback is disclosed. Depending on system configuration, embodiments of the invention can include features for creating, editing and distributing multimedia content in the form of "presentation data," which may be viewed by recipients who play the content (and in some cases may be allowed to modify it). The playback of content is presented in one or more windows or displays called "playback displays." Playback displays present presentation data which is playing, and in some embodiments may also provide various editing functions which can be used to create and edit presentation data. Additional windows or displays, called "control displays," may be included in some embodiments to provide various management and control functions, and these too can include features for creating and editing presentation data.

These basic capabilities of embodiments of the present invention discussed in the previous paragraph are also found in many widely available multimedia tools and systems. However, compared to these other tools and systems, embodiments of the present invention can include various advantageous capabilities in a number of areas, including: (1) creating and importing objects, (2) editing display settings for objects, (3) time-based object playback behavior, (4) starting and stopping of container objects, (5) the "sentence" paradigm for programming object behavior, (6)

dynamic parameter modification, (7) functions and uses of control displays, (8) publishing and editing over a network, (9) hierarchical structuring of presentation data, (10) user "exploration" of presentation data, (11) indirect data access using "pointer objects," (12) integrating HFS data with presentation data, (13) user "navigation" through presentation data, and (14) nested "sub-displays" embedded within playback displays.

While the advantageous capabilities in each of these areas are fundamentally independent from one another, each providing value and standing on its own as a feature of the invention, in many cases the various capabilities build on one another in ways which are highly complementary. Wherever possible, features have been designed to leverage and take advantage of each other in this way, so that as features are added in the above areas, the system increases in power substantially, but without undermining ease of use. The exact set of features included in any given embodiment of the invention may vary depending on system configuration; the underlying system provides a basic framework in which one or more features may be added depending on system requirements, resulting in a variety of possible configurations for the invention.

The features and advantages of the present invention will be apparent from the accompanying drawings and detailed description that follows.

BRIEF DESCRIPTION OF THE DRAWINGS

The present invention is illustrated by way of example and not limitation in the figures of the accompanying drawings, in which like references indicate similar elements, and in which:

FIGS. 4A through 6B illustrate editing of object display settings, according to embodiments of the present invention;

FIGS. 8A-B illustrate starting and stopping of container objects, according to embodiments of the present invention;

FIGS. 9A through 27D illustrate programming of object behavior following a sentence paradigm, according to embodiments of the present invention;

FIGS. 28A-D illustrate dynamic modification of object parameters, according to embodiments of the present invention;

FIGS. 29A through 30B illustrate functions and uses of control displays, according to embodiments of the present invention;

FIGS. 34A-F illustrate indirect data access using "pointer objects," each of which references a base object for some of its data, according to embodiments of the present invention;

FIGS. 35A through 37C illustrate extending presentation data to include folders and files from a hierarchical file system (HFS), and vice versa, according to embodiments of the present invention;

FIGS. 38A through 39B illustrate user "navigation" through hierarchical presentation data, including over a network, according to embodiments of the present invention;

FIGS. 40 through 45C illustrate functions and uses of nested sub-displays, including user navigation, according to embodiments of the present invention;

FIG. 85 illustrates the object model of the systems of FIGS. 50 and 51, according to an embodiment of the present invention;

DETAILED DESCRIPTION OF THE PREFERRED EMBODIMENTS

Figure 1A:
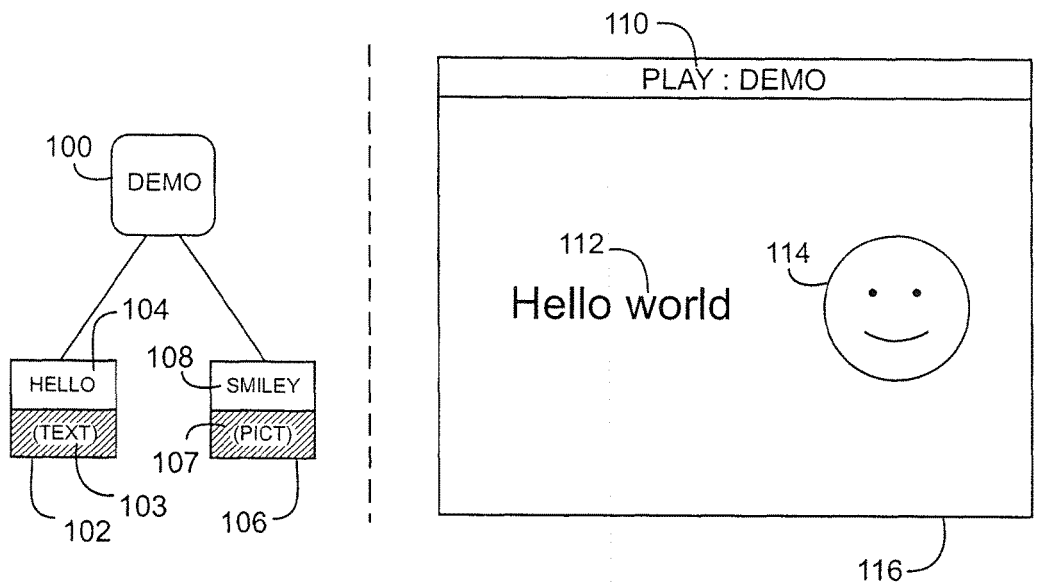
FIGS. 1A-B illustrate the basic elements of the system, according to embodiments of the present invention.

A multimedia authoring and playback system for use in a computer-based environment is disclosed. In the following description, for purposes of explanation, numerous specific details are set forth in order to provide an understanding of the present invention; also, in certain instances, structures and devices are shown in block diagram form to facilitate explanation. However, it will be evident to those of ordinary skill in the art that the present invention may be practiced without the specific details and forms. The description of the preferred embodiments is not intended to limit the scope of the claims appended hereto.

The following description has four sections: (1) Functional Overview, (2) Example Scenarios, (3) Hardware Overview, and (4) System Architecture.

Functional Overview

The present invention is best understood in terms of the user experience it provides. Therefore, the invention is now described with an emphasis on the user experience, along with a moderate amount of explanation of the underlying system operations and data management procedures occurring at each point.

In this functional overview, various examples are shown in which an author creates and manipulates multimedia content by means of a graphical user interface (GUI). This GUI includes a "playback display" for viewing and editing content which is playing, and optionally, a "control display" for performing various management and control functions. These displays can take many forms on many different platforms, and the specific display representations are not to be understood as limiting or restricting the appearance or implementation of the playback display or control display.

To help clarify the workings of the invention, three common representations are used in many of the diagrams that accompany this functional overview: (1) to the left an abstract representation of the presentation data (which is merely for illustration and does not appear to the user), (2) to the right a simplified picture of the playback display, and (3) in the center a simplified picture of the control display (which is included in the diagrams frequently starting at FIG. 29A, and before that is shown in a few instances under the playback display). These three representations may be used separately or in tandem to illustrate different aspects of the workings of the invention.

To help organize the discussion, the various features of the invention have been grouped into a number of categories which were enumerated in the above summary. Briefly, again, these categories are: (1) creating and importing objects, (2) editing display settings, (3) time-based playback behavior, (4) starting and stopping containers, (5) programming behavior using a sentence paradigm, (6) dynamic parameter modification, (7) control displays, (8) publishing and editing over a network, (9) hierarchical structuring of data, (10) exploration of data, (11) pointer objects, (12) integration of HFS data, (13) user navigation, and (14) sub-displays. The organization of the invention's features into these categories is merely intended as an aid to understanding, and is not intended to imply any inherent associations or disassociations among features simply because they are in the same or in different categories.

Finally, it should be noted that great care has been taken to ensure that the various features of the invention have been designed to work well together, and in many cases the use of two or more features in conjunction with one another produces advantages beyond those of the individual features. Throughout the following discussion, various examples and explanations are provided to indicate how different features of the invention may be used in conjunction with one another to achieve further advantage.

The discussion begins with a description of the basic elements of the system, which establishes base levels of functionality for the invention, after which each category of features is discussed in turn.

Figure 1B:
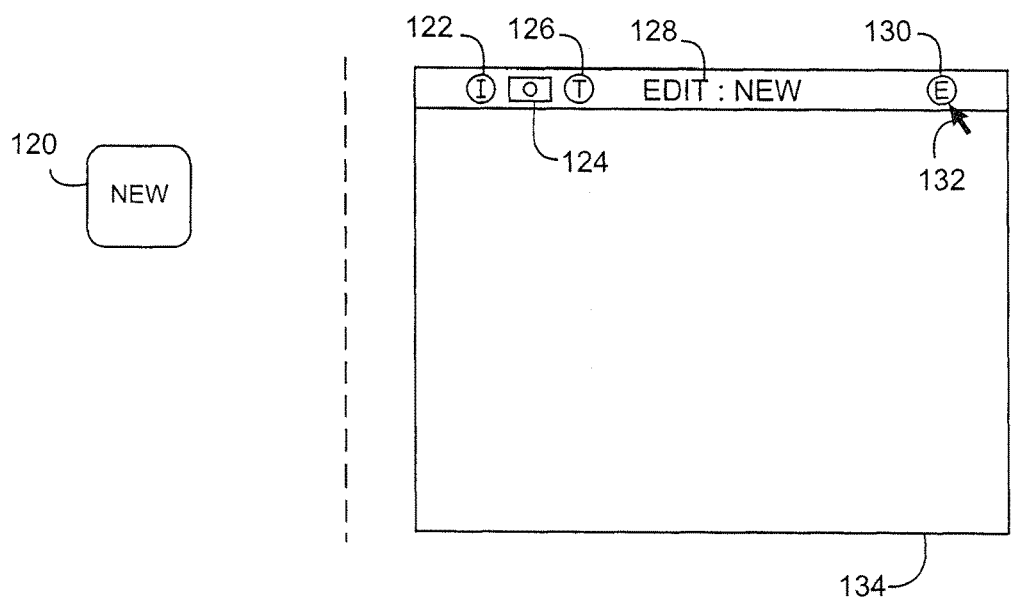

BASIC ELEMENTS OF THE SYSTEM—FIGS. 1A-B illustrate the basic elements of the system, shown operating in exemplary object presentation and editing scenarios. These scenarios present certain base levels of functionality found in this and many other multimedia authoring and playback systems. The scenario of FIG. 1A presents the base level of functionality for multimedia playback, which is included in all configurations of the invention. The scenario of FIG. 1B presents the base level of functionality for multimedia authoring, which is included in configurations of the invention that support user editing of presentation data. These respective base levels for playback and authoring provide a foundation upon which the various features of the invention which follow may be added.

FIG. 1A depicts a basic object presentation scenario, according to one embodiment of the present invention. Shown on the left side of the figure is some exemplary presentation data which consists of a container object containing two media objects. The two media objects are of two different types, such that each media object contains a different type of media data; support for multiple types of media objects is typical in multimedia systems such as the present invention, but not required, since various features of the invention may be practiced effectively using just one media type. Moreover, depending on system configuration, various other types of objects may be supported in addition to, or instead of, those shown in FIG. 1A, as discussed throughout this specification. Shown on the right side of FIG. 1A is an exemplary playback display, which plays back the presentation data by presenting the media data of the media objects in the playback display. Each of these basic elements of the system is now described.

The left side of FIG. 1A shows a representation of a container object 100 containing two media objects 102 and 106. In the present invention, a container object is any data construct which can be used to collect two or more media objects (examples from the field abound, and include such constructs as HTML files, folders in a hierarchical file system, proprietary data formats, etc.). Note that physical containment of media objects by the container object is not required; all that is required is the ability to create a logical collection of two or more media objects.

In the example of FIG. 1A, the two media objects contained by the container object 100 are a text object 102 and a picture object 106. Shown within the text object 102 is media data 103, in this case text data (which can include data representing alphanumeric text such as ASCII characters, data representing other national character sets such as Kanji characters, data representing various text properties such as bold and italic, etc.). In the text object 102, the media data 103 is depicted as distinct from the rest of the object data 104 (the latter of which can include such data as object properties, display settings for the media data, various other presentation options, etc.). Similarly, within the picture object 106 is shown media data 107, in this case image data (which can include various types of data for representing visual images, such as bitmaps, vector graphics, etc.), also depicted as distinct from the rest of the object data 108. This depiction of media data as distinct from the rest of the object data is merely a visual convention used throughout the diagrams to help clarify certain concepts and features, and is not intended to describe or limit the structures used for the actual storage of object data.

The right side of FIG. 1A shows a representation of a playback display 116 which is displaying the text "Hello World" 112 corresponding to the text object 102, as well as the picture 114 corresponding to the picture object 106. The playback display 116 also includes a display title 110 consisting of the words "PLAY: DEMO," which indicates that the playback display is playing presentation data and that the source for what is playing is the container object 100 (which is named "DEMO"). This display title 110 and similar display titles in other figures are included within the diagrams to help clarify how objects depicted on the left relate to displays depicted on the right; however such display titles are not required for the invention, and in actual implementations may vary greatly or be omitted altogether.

FIG. 1B depicts a basic editing scenario, according to one embodiment of the present invention. The figure shows a situation in which the user is preparing to edit a new presentation. The left side of FIG. 1B shows a representation of an empty container object 120 named "NEW." To the right is a playback display 134, which includes a display title 128 with the words "EDIT: NEW" indicating that the playback display is presenting the container object 120 to the user for editing.

In the presently preferred embodiment of the invention, editing takes place within an edit mode, such as might be triggered by a user-initiated click of the pointer 132 on the edit mode command icon 130 (this pointer 132, as well as similar pointers shown in other figures, is controlled by the user via a pointing device, such as a computer mouse, joystick, pen and tablet, PDA stylus, touch screen, etc.). It should be noted, however, that the use of an edit mode which is distinct from presentation playback, as shown in FIGS. 1A-B and in other figures, is only one of various possible approaches for providing authoring and playback functionality to the user, and other approaches may be effective depending on system configuration (such as integrating authoring and playback in a common mode, using separate applications for authoring and playback, etc.). For example, the invention can be configured such that an authoring application (with minimal playback functionality) is used to author content, and then a separate playback application with more complete playback functionality (such as a Web browser or proprietary "player" application) is used to test and evaluate the playback of authored content.

FIG. 1B further includes command icons 122, 124 and 126 as examples of authoring functions that might be selected by the user. It should be noted that the look and placement of command icons throughout the diagrams is exemplary only, and can vary greatly in real embodiments of the system. Moreover, it should further be noted that the use of command icons for selecting authoring functions is merely one approach for doing so, and other approaches may also be effective depending on system implementation (such as single-level menus, multiple-level menus, buttons, lists, sliders, palettes, checkboxes, other types of user interface elements, keypad keys, etc).

Figure 2A:
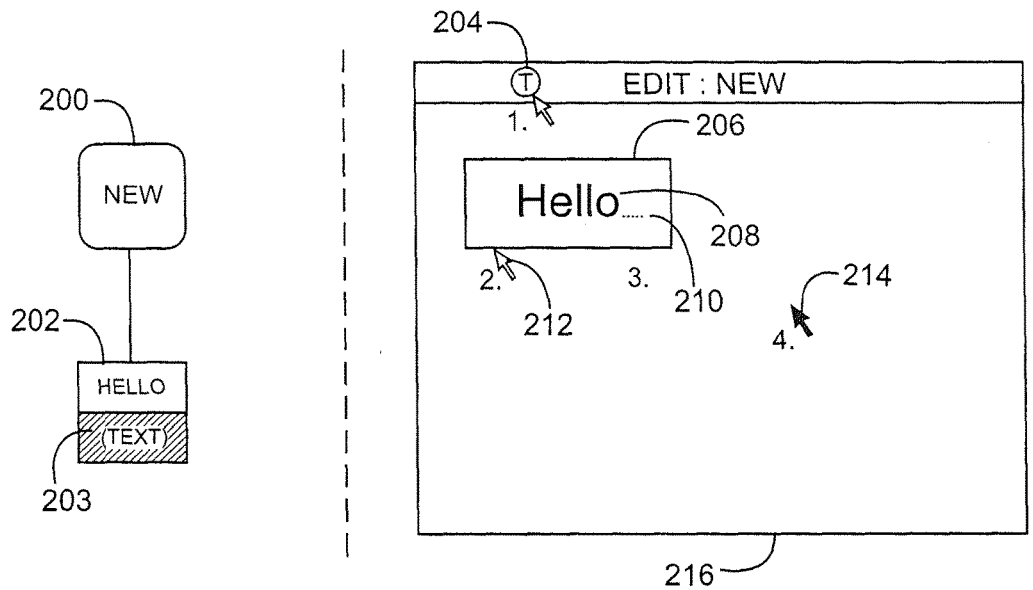
FIGS. 2A through 3D illustrate creating and importing of objects, according to embodiments of the present invention.
Figure 2B:
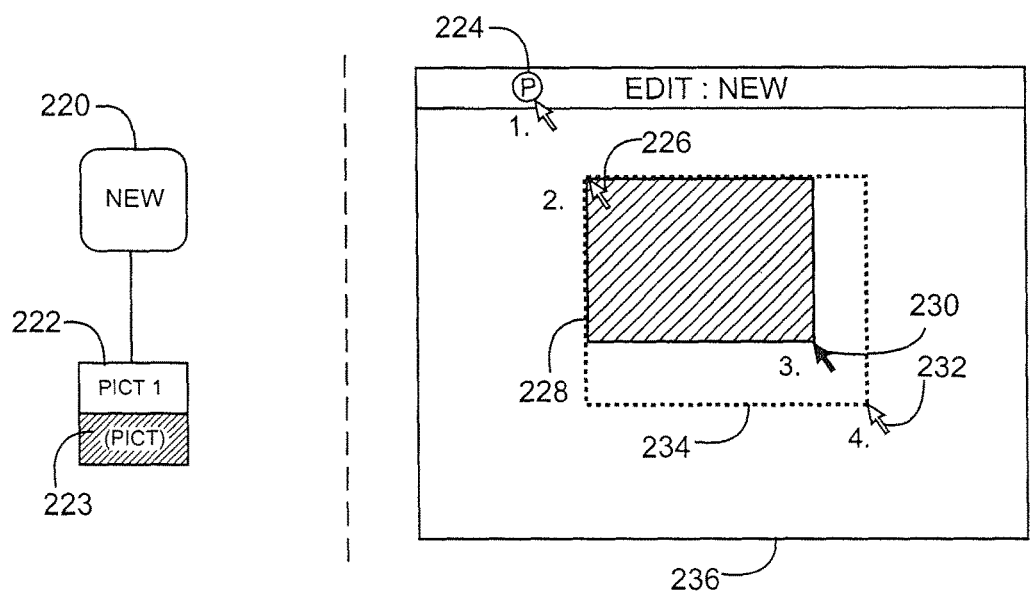
Figure 2C:
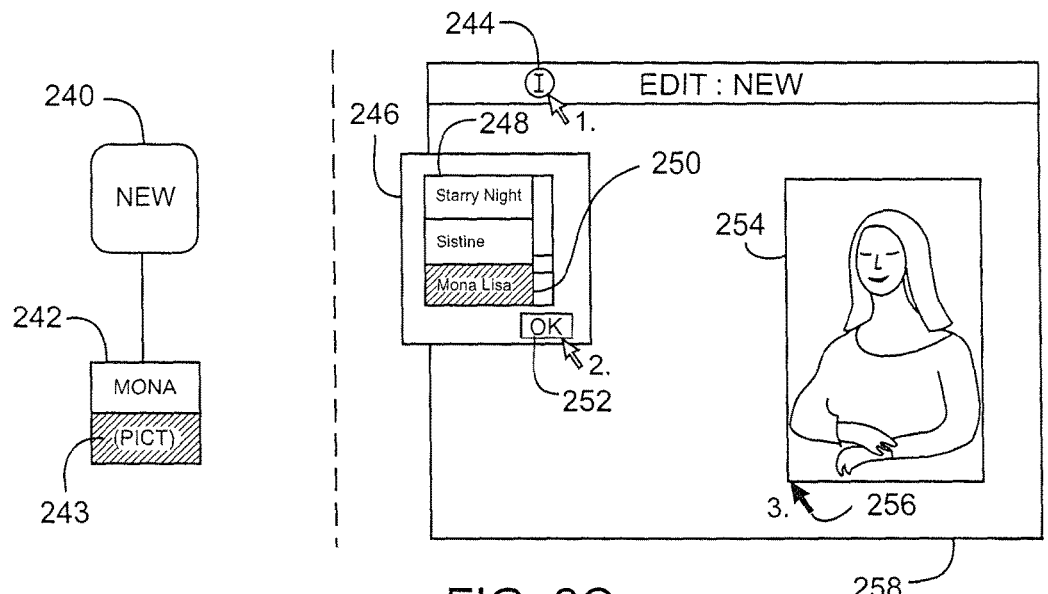
Figure 2D:
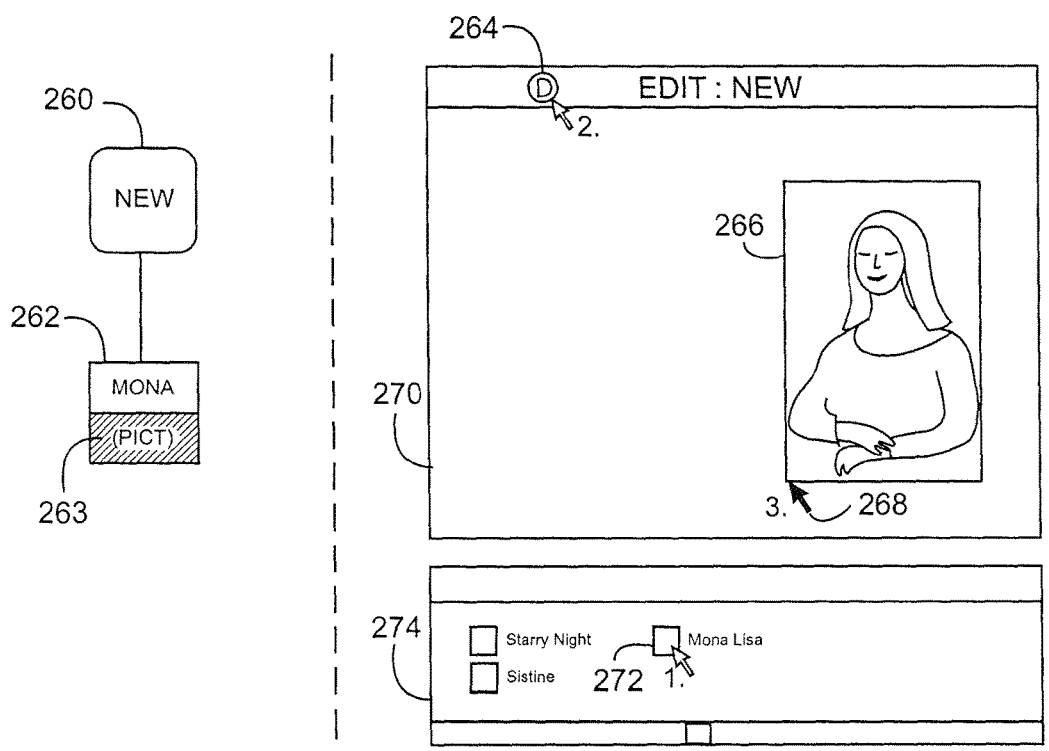
Figure 3A:
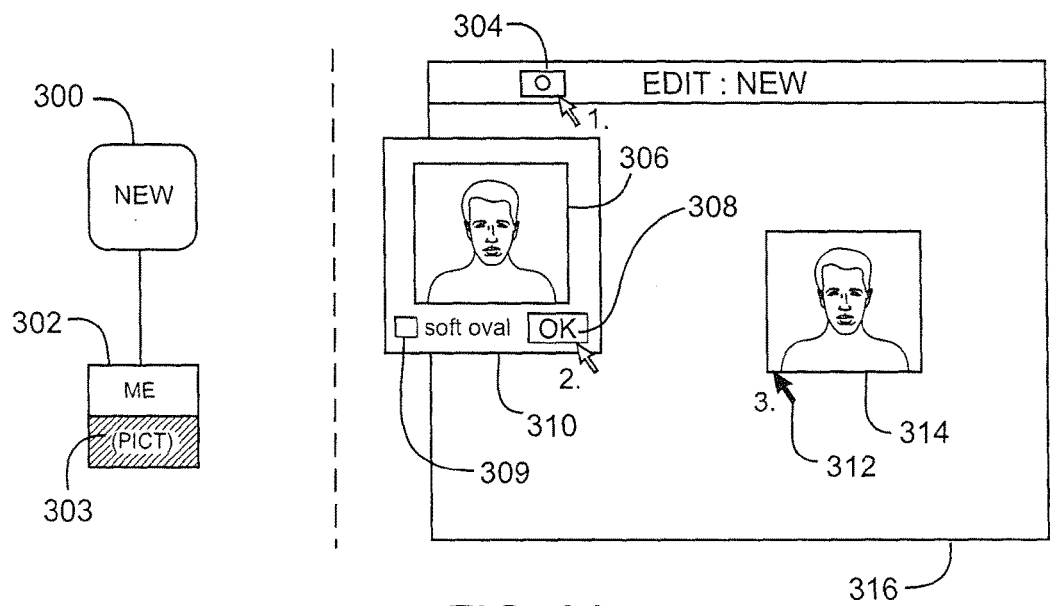
Figure 3B:
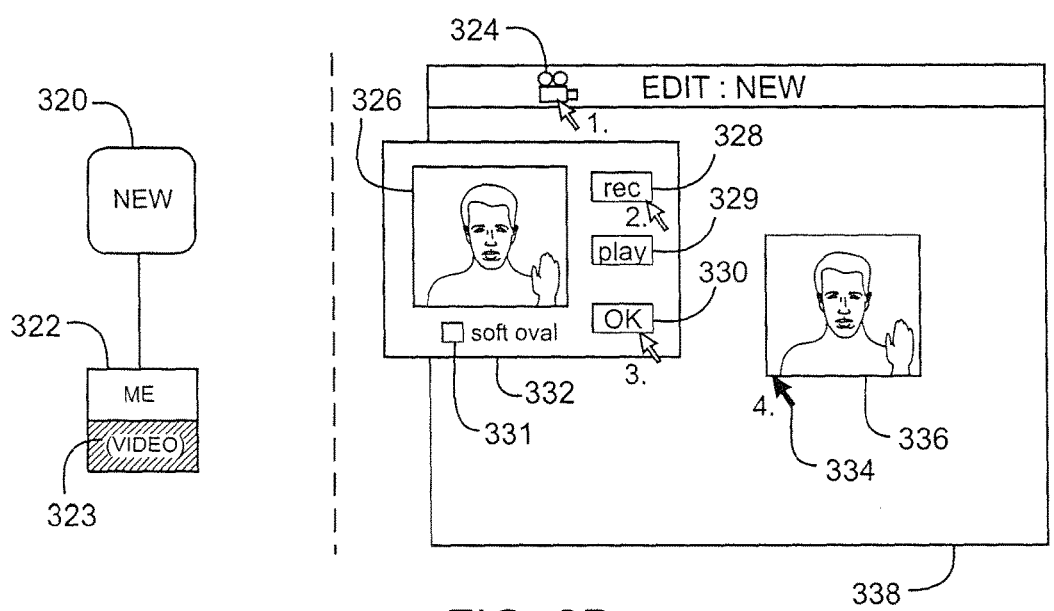
Figure 3C:
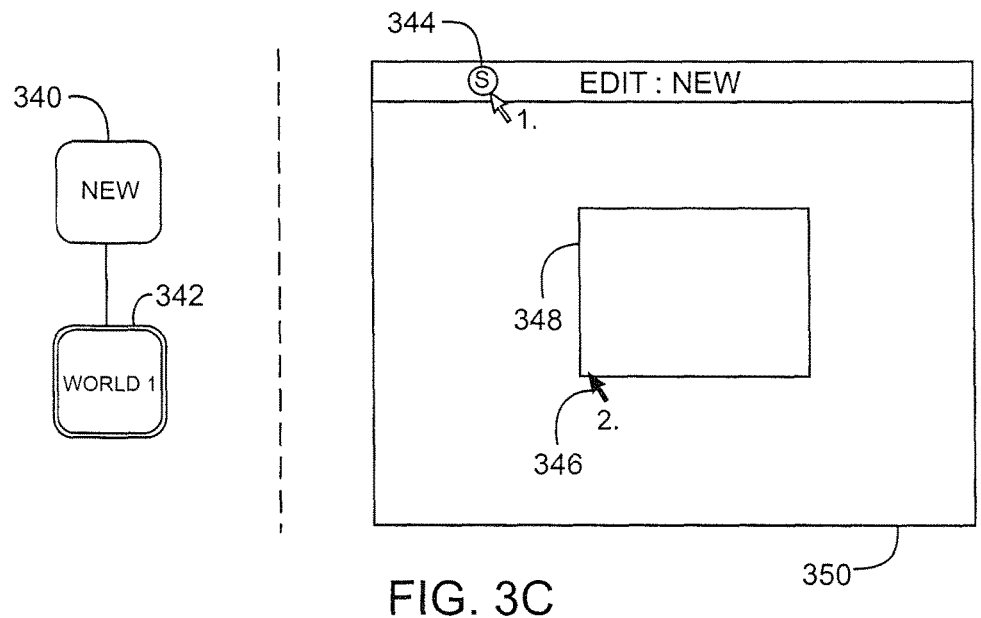
Figure 3D:
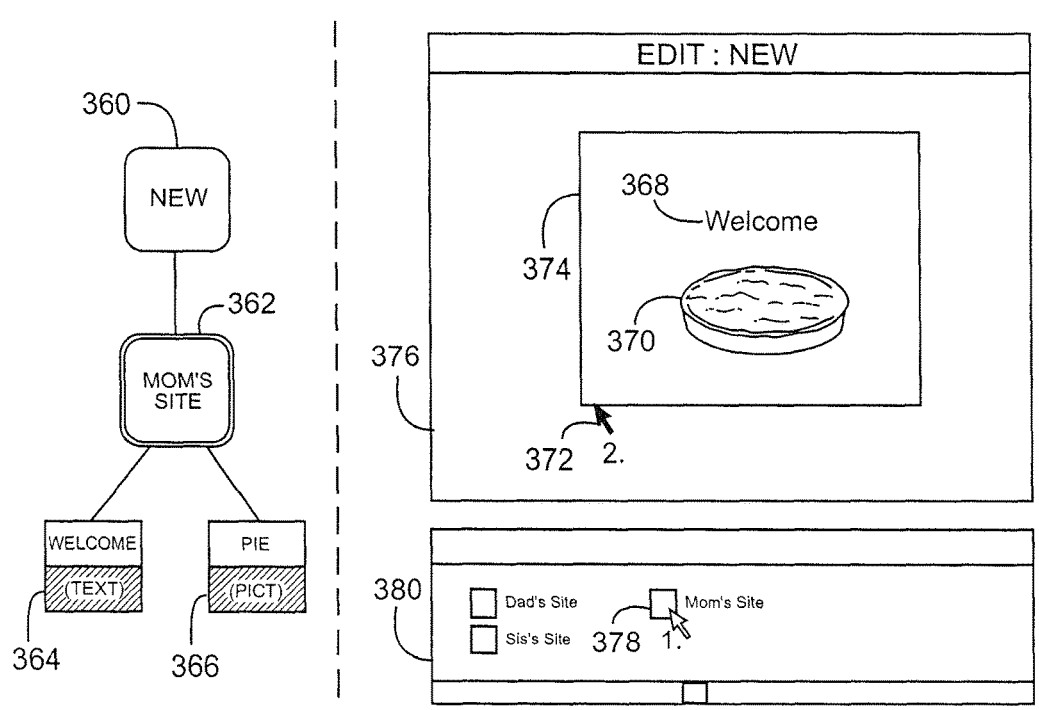

CREATING AND IMPORTING OBJECTS—FIGS. 2A through 3D depict various functions for adding objects to a presentation: (1) FIG. 2A shows creating a new text object, (2) FIG. 2B shows creating a new picture object, (3) FIG. 2C shows importing a picture via dialog box, (4) FIG. 2D shows duplicating a picture using a control display, (5) FIG. 3A shows creating a new picture from a connected camera, (6) FIG. 3B shows recording a new video from a connected camera, (7) FIG. 3C shows creating a new sub-display and associated container object, and (8) FIG. 3D shows importing a sub-display by dragging a container object from a control display. Each of these functions is an independent feature of the invention that may or may not be included in any given system configuration. Moreover, the above functions involving importing and duplicating (FIGS. 2C, 2D and 3D) are general purpose functions which, depending on system configuration, can be used with any of the object types supported by the system.

The functionality illustrated in FIGS. 2A through 3D generally provides the advantage of allowing users to add objects to presentations with greater speed and efficiency, enabling the creation of more interesting presentations with less effort. Also, when the functions of FIGS. 2D and 3D are used with control displays that allow user exploration of a hierarchical file system (such as that shown in FIGS. 35A-B), further advantages are produced in terms of enabling faster, more comprehensive access to external data. In addition, when functions shown in FIGS. 2A through 3D are used within the context of "compound sentence" programming as discussed in connection with the sentence paradigm, their integration into the process of creating programmed object behavior produces further advantages in terms of faster, more streamlined authoring. Moreover, when functions of FIGS. 2A through 3D are used in conjunction with other features of the invention, such as editing display settings, time-based playback behavior, networking, collaborative editing, pointer objects, etc., further advantages are derived in terms of enabling authors to create multimedia content with greater variety among object characteristics with less effort, and to more easily add objects to distributed content.

FIG. 2A shows the creation of a new text object, according to one embodiment of the present invention. The figure shows a playback display 216 presenting a container object 200 to the user for editing. First, the user clicks on the new text command icon 204. Next, the user clicks on a desired spot 212 in the playback display 216, causing a new text box 206 to be displayed there. The new text box 206 contains a cursor 210 indicating that the user can, if desired, enter new text; as new text 208 "Hello" is entered, the cursor 210 follows the last character entered. When the user is done entering text, the pointer 214 is clicked at any spot in the playback display that is outside text box 206, completing the operation. As a result of this process, as seen in the representation on the left side of FIG. 2A, a new text object 202 is created within the container object 200, the new text object containing text data for the new text "Hello" 208 in its media data 203.

FIG. 2B shows the creation of a new picture object, according to one embodiment of the present invention. The figure shows a playback display 236 presenting a container object 220 to the user for editing. First, the user clicks on the new picture command icon 224. Next, the user clicks on a desired spot 226 in the playback display 236, causing a new picture 228 (in this case a solid rectangle) to appear there. The user may then, while still pressing the mouse button or other pointing device, adjust the size of the picture to a desired size 234 by dragging across the playback display (230, 232). As a result of this process, as seen in the representation on the left side of FIG. 2B, a new picture object 222 is created within container object 220, the new picture object containing image data for the new picture 228 in its media data 223. Note that other versions of this function for creating a new picture object may be provided for other kinds of images, such as circles, lines of various types, "spray can" effects, other geometric shapes and patterns, etc., any or all of which may employ a "click and drag" operation such as that seen in the picture creation function of FIG. 2B.

FIG. 2C shows a new picture object being imported into the system from an external picture file using a dialog box, according to one embodiment of the present invention. The figure shows a playback display 258 presenting a container object 240 to the user for editing. First, the user clicks on the import command icon 244, which causes a file selection dialog box 246 to appear. In the file selection dialog box 246, several external picture files 248 are shown, which may be standard graphics files such as JPEG, TIFF, BMP or similar files stored in an accessible storage location. The picture file 250 named "Mona Lisa" is selected and the user clicks the "OK" button 252. The user then clicks at a desired location 256 in the playback display 258, and the picture 254 from the selected picture file appears there. As a result of this process, as seen in the representation on the left side of FIG. 2C, a new picture object 242 is created within the container object 240, the new picture object containing image data for the imported picture 254 in its media data 243.

FIG. 2D shows a new picture object being imported into the system from an external picture file using a duplicate command with a control display, according to one embodiment of the present invention. The figure shows a playback display 270 presenting a container object 260 to the user for editing. Below the playback display 270 is a control display 274. This control display, like the file selection dialog 246 of FIG. 2C, presents several external picture files to the user; however unlike the file selection dialog, the control display can have a persistent presence within the user interface. To import a picture, the user first clicks on a desired picture icon 272 in the control display 274. Next, the user clicks on the duplicate command icon 264. Finally, the user clicks on a desired location 268 in the playback display 270, and the picture 266 appears there. As a result of this process, as seen in the representation on the left side of FIG. 2D, a new picture object 262 is created within the container object 260, the new picture object containing image data for the imported picture 266 in its media data 263. In addition to duplicating an object from a control display to a playback display, as seen in the present example, the duplicate function may also be used to duplicate an object from one control display to another, or to duplicate an object within a single control display or playback display.

FIG. 3A shows a new picture object being created through the use of a connected camera, such as a "web cam," according to one embodiment of the present invention. The figure shows a playback display 316 presenting a container object 300 to the user for editing. First, the user clicks on the camera command icon 304, which causes a dialog window 310 to appear containing a real-time view 306 of the output of a camera (the camera might be directly attached to the user's computer or accessed over a network). When the real-time view 306 presents a desired image, the user clicks the OK button 308 to accept the image. The user then clicks at a desired location 312 in the playback display 316, and the image appears there as a picture 314. As a result of this process, as seen in the representation on the left side of FIG. 3A, a new picture object 302 is created within the container object 300, the new picture object containing image data for the picture 314 in its media data 303.

FIG. 3B shows a new video object being created through the use of a connected camera, such as a "web cam," according to one embodiment of the present invention. The figure shows a playback display 338 presenting a container object 320 to the user for editing. First, the user clicks on the video command icon 324, which causes a dialog window 332 to appear containing a real-time view 326 of the output of a camera (the camera might be directly attached to the user's computer or accessed over a network). The user then clicks the REC button 328 to commence video recording. Optionally, the user may stop recording by clicking again on the REC button 328, and may view what has been recorded by clicking on the PLAY button 329. When the desired recording has been achieved, the user clicks the OK button 330 to accept the recording. The user then clicks at a desired location 334 in the playback display 338, and the recorded video 336 appears there. As a result of this process, as seen in the representation on the left side of FIG. 3B, a new video object 322 is created within the container object 320, the new video object containing video data for the video 336 in its media data 323.

In the case of the functions of FIGS. 3A and 3B just described (new picture from camera and new video from camera), the user interfaces provided in the dialog windows 310 and 332 for capturing (respectively) image data and video data are typical; many variations for such user interfaces are common, and may be effective in the present invention. A significant portion of the advantage of the above functions lies in the fact that after accepting the image or recording (by clicking on the OK button in the above examples), the user need only make one final click (specifying a location in the playback display) to incorporate the new data into the presentation.

Moreover, in either or both of the dialog windows (310, 332) in FIGS. 3A and 3B, a "soft oval" effect may be provided as an optional enhancement. With this enhancement, the user is given an option to apply a soft oval effect to the real-time view (306, 326) of the output of the camera. This soft oval effect is similar to that shown in FIG. 6B-2, except that it affects the live output of the camera in real time. In the examples of FIGS. 3A and 3B, the user can enable this soft oval effect via the checkboxes (309, 331) in the respective dialog windows; however, as mentioned above for dialog windows in general, other user interface variations for enabling this soft oval effect may also be effective. With the soft oval effect enabled, once the picture or recorded video is accepted by the user, the media data of the newly created object (302, 322) exhibits the soft oval effect when displayed in the playback display (which is especially effective when used with "head shot" pictures or "talking head" videos). In the preferred implementation, this is accomplished by setting relevant display settings (shape and softness as discussed in connection with FIGS. 6A-B) at the time the new picture or video object is created, which allows the user to further adjust or disable the soft oval effect afterwards; however it is also possible to implement this feature in ways which do not allow further adjustment of the effect after accepting the picture or video.

FIGS. 3C and 3D show new and import functions (respectively) which involve sub-displays. The sub-display functionality of the present invention is discussed in detail in connection with FIGS. 40 through 45C, but briefly, it involves an association between nested sub-displays in the playback display and container objects, whereby media data of objects contained in a container object is displayed within the sub-display associated with the container object. The examples of FIGS. 3C and 3D also involve the use of another feature of the invention, hierarchically nested container objects, detailed in connection with FIGS. 32A-B.

FIG. 3C shows the creation of a new sub-display and associated container object, according to one embodiment of the present invention. The figure shows a playback display 350 presenting a container object 340 to the user for editing. First, the user clicks on the new sub-display command icon 344. Next, the user clicks on a desired spot 346 in the playback display 350, causing a new sub-display 348 to appear there. As a result of this process, as seen in the representation on the left side of FIG. 3C, a new container object 342 is created within the container object 340. This new container object 342 is associated (as shown by its double outline) with the new sub-display 348 shown in the playback display. Other objects such as text, pictures, etc. may now be added to the new container object using methods such as those shown in FIGS. 2A through 3B, and their media data will be displayed within the new sub-display 348.

FIG. 3D shows importing a sub-display by dragging a container object from a control display, according to one embodiment of the present invention. The figure shows a playback display 376 presenting a container object 360 to the user for editing. Below the playback display 376 is a control display 380 which presents several container objects to the user; these container objects may be external data files located in an accessible storage location, or references to such files (such as via URL), or some other form of collected, contained presentation data. To import a sub-display, the user first clicks on a desired container object icon 378 in the control display 380 (note that the desired container object need not itself be associated with a sub-display). Next, while still pressing the mouse button or other pointing device, the user "drags" the pointer to a desired location 372 in the playback display 376 and releases, causing a sub-display 374 to appear there (this can also be accomplished using either the import function of FIG. 2C or the duplicate function of FIG. 2D). As a result of this process, as seen in the representation on the left side of FIG. 3D, a new container object 362 containing data from the selected container object 378 is created within the container object 360. This new container object 362 is associated (as shown by its double outline) with the sub-display 374, and the media data for its contained objects (the text object 364 and the picture object 366) is seen within the sub-display 374 as the text 368 and the picture 370, respectively.

EDITING DISPLAY SETTINGS—FIGS. 4A through 6B illustrate editing functions for changing various "display settings" that determine how an object's media data is presented in the playback display. The display settings shown being changed in these figures are: (1) position in FIG. 4A, (2) size and position in FIG. 4B, (3) color in FIG. 4C, (4) transparency in FIG. 5A, (5) rotation in FIG. 5B, (6) stretch in FIG. 5C, (7) cropping in FIG. 5D, (8) shape and softness in FIG. 6A, and (9) shape and softness in FIG. 6B. Each of the editing functions shown in these figures, as well as each of the display settings involved, is an independent feature of the invention that may or may not be included in any given system configuration.

The functionality illustrated in FIGS. 4A through 6B generally provides the advantage of faster and more convenient modification of object display settings, which allows users to create more personalized and expressive presentations more quickly. Moreover, the editing features of FIGS. 4A through 6B, when used in conjunction with each other and with other features of the invention, such as time-based playback behavior, functions of the sentence paradigm, networking, collaborative editing, sub-displays, etc., provide the further advantage of increased speed and efficiency in the creation of highly sophisticated and/or distributed multimedia content.

It should be noted that in FIGS. 4A through 6B, editing functions are shown affecting the appearance of exemplary text and picture objects; depending on system configuration, each of these editing functions (or similar editing functions) may be used to change the appearance of any of the following: text, pictures, videos and sub-displays (sub-displays are detailed in connection with FIGS. 40 through 45C). It should also be noted that for the functions of FIGS. 4A through 6B which involve the use of keypad keys, other keypad keys and/or user interface elements (such as sliders, buttons, etc.) may be provided to perform the same functions. It should also be noted that in the examples of FIGS. 4A through 6B, and throughout the present specification, the presence and involvement of selection boxes is merely for clarity in the diagrams, and is not essential to the functionality being shown.

Figure 4A:
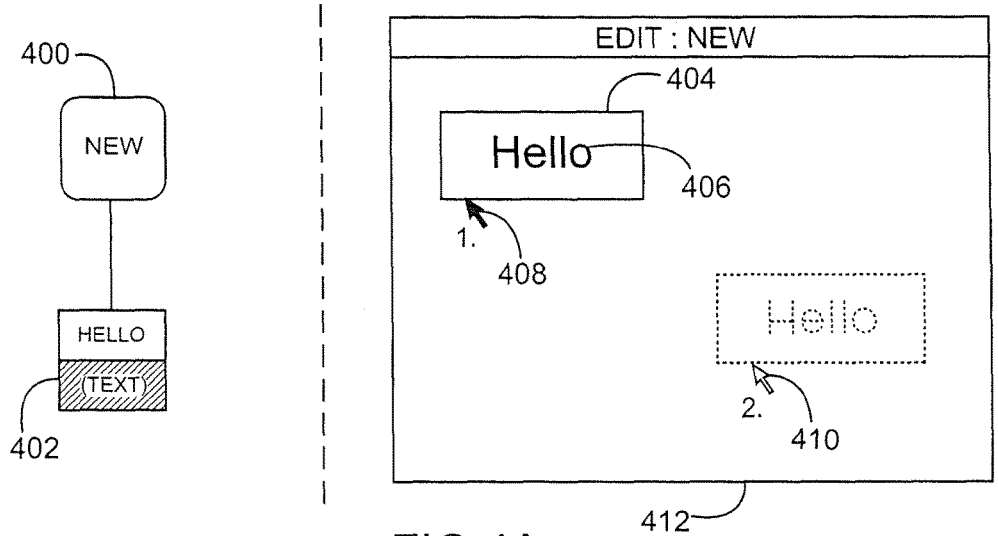

FIG. 4A shows editing of the display position of an object's media data in the playback display, according to one embodiment of the present invention. The figure shows a text object 402 whose media data is seen in the playback display 412 as text 406. The user selects the text by clicking on it with the pointer 408, causing a selection box 404 to appear around the text indicating that it can be dragged. The user can then drag the selected text to a desired location 410 in the playback display 412.

Figure 4B:
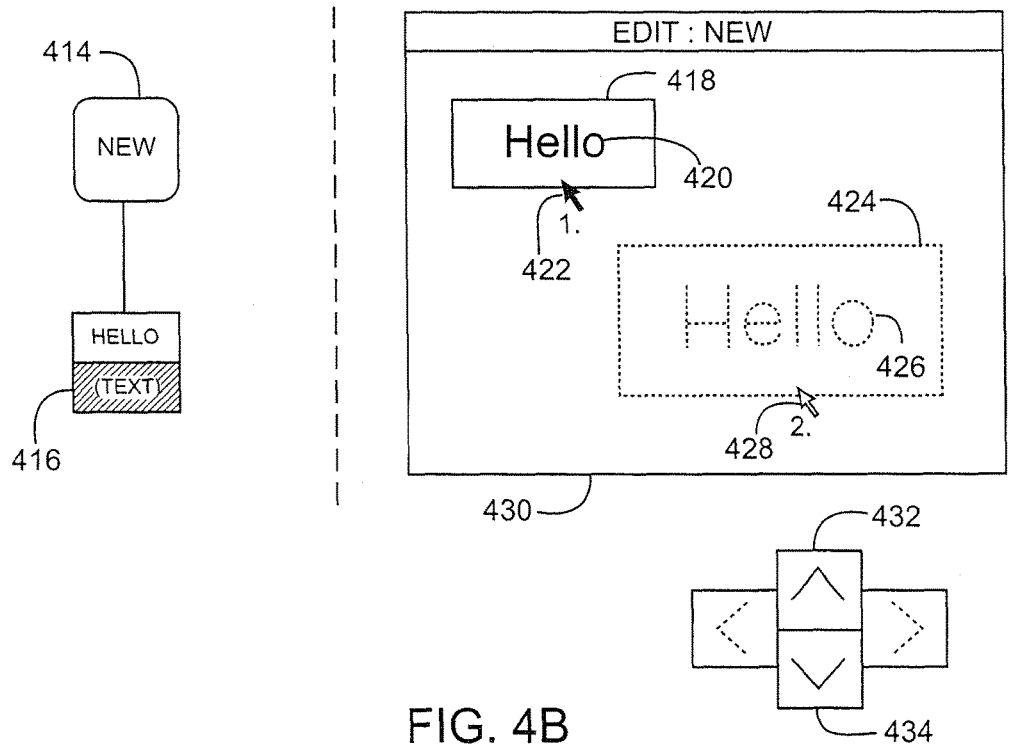

FIG. 4B shows simultaneous editing of the position and size of an object's media data in the playback display, according to one embodiment of the present invention. The figure shows a text object 416 whose media data is seen in the playback display 430 as text 420. The user selects the text by clicking on it with the pointer 422, causing a selection box 418 to appear around the text indicating that it can be dragged. The user can then drag the selected text to a desired location 428 in the playback display 430. During the time that selection box 418 is displayed around the text, the user may also re-size the text (whether dragging it or not) by pressing the up-arrow key 432 on a keypad, making the text larger, as seen in the increased size of the text 426 and its selection box 424. Similarly, the down-arrow key 434 may be used to make the text smaller.

Figures 1, 30A:
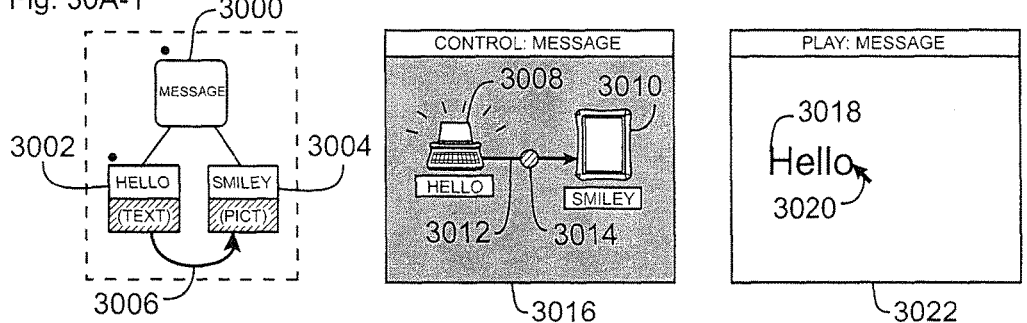

FIG. 4C shows editing of the color of an object's media data in the playback display, according to one embodiment of the present invention. In FIG. 4C-1, the media data of a text object is seen in the playback display 456 as text 452. The user first clicks on the color change command icon 450, then clicks 454 on the text to select it (in an alternate implementation, the text may be selected first and then the command icon; also, in yet another alternate implementation, both the command and the text may be selected at once by clicking on the text using an alternate form of click, such as by pressing the right-side mouse button, or by clicking with a modifier key such as "alt" or "ctrl" held down, etc.).

Figures 2, 30A:
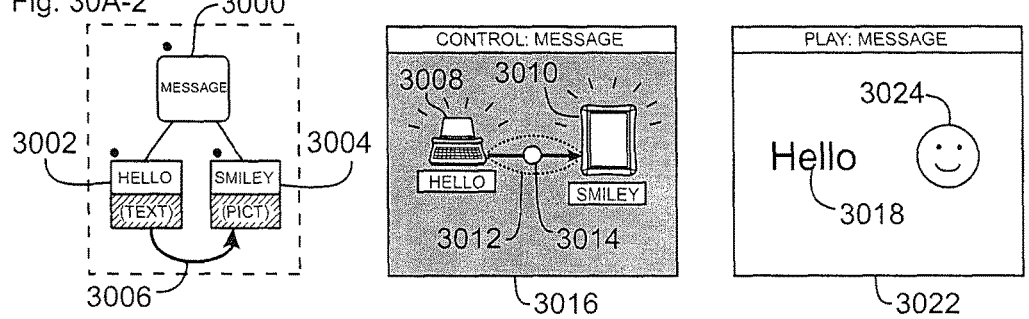

FIG. 4C-2 shows that when the above selection has occurred, a color adjust mode is entered, as indicated by special cursor symbol 460. The user may then move the mouse or other pointing device 480 in any of four directions to adjust the color. Left movement 484 or right movement 478 is used to adjust the hue toward the red end 474 of the color spectrum (left) or the violet end 486 of the spectrum (right). Up movement 476 or down movement 482 is used to make the brightness of the color more bright 468 (up) or more dark 494 (down). In short, the four directions form a "color grid" 492 which controls the hue and brightness of the object being affected. All of the color changes happen in real time to the displayed media data 452 in the playback display 456.

Beyond the basic functionality of color adjust mode just discussed, a variety of variations or enhancements such as the following are possible. For one, the color grid may be extended in the horizontal dimension 490 and 470, so that the hue values "wrap around" (from red 474 to violet 472, and from violet 486 to red 488) when the user moves the mouse or pointing device beyond the point corresponding to the extreme value of hue in either direction. Also, when in color adjust mode, the up and down arrow keys 464 may be used to increase and decrease the color saturation. In addition, alternate mappings between hue and brightness and the vertical and horizontal axes of the color grid may be effective, such as swapping or inverting the axes. Also, an alternate implementation may be provided in which color adjust mode involves clicking and holding down the mouse button or pointing device. Note that the special cursor symbol 460 need not be used, and if used, may either move or not during color adjust mode. Finally, color adjust mode may be exited by again clicking the mouse or pointing device (or by releasing the mouse button or pointing device in the alternate implementation involving clicking and holding).

FIG. 5A shows editing of the transparency of an object's media data in the playback display, according to one embodiment of the present invention. In FIG. 5A-1, the media data of two picture objects is seen in the playback display 506 as an upper picture 500 and a lower picture 502. The user first selects the upper picture 500 by clicking on it with the pointer 504, then presses the left arrow key 510 on the keypad to increase the transparency of the selected picture. The result is shown in FIG. 5A-2 in the playback display 506, where the upper picture 500 is now partially transparent, as can be seen from the overlap 508 between the two pictures 500 and 502. Similarly the user may use the right arrow key 512 to decrease the transparency, making the picture 500 more opaque.

FIG. 5B shows editing of the rotation of an object's media data in the playback display, according to one embodiment of the present invention. In FIG. 5B-1, the media data of a picture object is seen in the playback display 524 as a picture 520. First, the user selects the picture 520 by clicking on it with the pointer 522. Then, while holding the mouse button or other pointing device down, the user presses the right arrow key 530 on the keypad to rotate the picture 520 clockwise. The result is shown in FIG. 5B-2 in the playback display 524, where the picture 520 is now shown rotated. Similarly, the left arrow key 528 can be used to rotate the picture counter-clockwise. The position of the picture 520 may also be dragged using the pointer 522 at the same time it is being rotated by the keypad keys. In systems which support use of the left and right arrow keys for both rotation and transparency (the latter being seen in FIG. 5A), the pressing and holding of the mouse button or pointing device is used as the condition for assigning the keys to rotation. In addition, it should be noted that in the example of FIG. 5B the rotation anchor (the center point around which the rotation occurs) is a movable rotation anchor 526 which has been placed near the corner of the picture 520. This movable rotation anchor functionality is itself a separate feature of the invention which is independent from the keypad control functionality discussed above.

FIG. 5C shows stretching of an object's media data in the playback display, according to one embodiment of the present invention. In FIG. 5C-1, the media data of a picture object is seen in the playback display 546 as a picture 540, surrounded by a selection box 542 indicating that it has previously been selected by the user. This selection box has a drag handle 544 on each of its sides (which can alternately be placed at the corners of the selection box, in which case they may, depending on configuration, be locked to a fixed aspect ratio to provide size control). The user may click on a drag handle 544 and drag it away from the center of the picture, stretching the picture in the direction of the movement. The result is shown in FIG. 5C-2 in the playback display 546, where the picture 540 and selection box 542 appear elongated as a result of the movement of the drag handle 544. The user may also compress the picture by dragging a drag handle toward the center of the picture.

FIG. 5D shows cropping of an object's media data in the playback display, according to one embodiment of the present invention. In FIG. 5D-1, the media data of a picture object is seen in the playback display 566 as a picture 560, surrounded by a selection box 562 indicating that it has previously been selected by the user. This selection box has a corner drag handle 564 in each of its corners (which can alternately be placed at the sides of the selection box). The user may click on a corner drag handle 564 and drag it to change the cropping of the picture, i.e., the portion of it being "revealed" in the playback display. The result is shown in FIG. 5D-2 in the playback display 566, as the outer edges 568 of the picture 560 now appear cropped as a result of the movement of the drag handle 564. Greater or lesser portions of the picture may be revealed by dragging in this manner.

FIG. 6A shows editing of the shape and softness of an object's media data in the playback display using sliders, according to one embodiment of the present invention. In FIG. 6A-1, the media data of a picture object is seen in the playback display 604 as a picture 600. When the user clicks 602 on the picture 600, various sliders may appear depending on system configuration, as shown in FIGS. 6A-2 through 6A-4.

FIG. 6A-2 shows a system configured so that clicking on the picture 600 in the playback display 604 causes a shape slider 614 to appear. As the shape slider control is moved to the right with the pointer 618, the edges of the picture become increasingly rounded until they collapse into a diamond. The shape slider control left position 612 corresponds to the original rectangular shape of the picture 600. The middle position 616 corresponds to the oval shape indicated by the middle boundary 608, and the right position 620 corresponds to the diamond shape 610. Depending upon implementation, the extreme setting for the shape change, corresponding to the right position 620, may also be a shape other than a diamond, such as limiting it to just an oval, or going beyond a diamond to a "four point compass rose" shape, etc. In addition, shapes other than those shown in the example of FIG. 6B may be provided, such as other geometric shapes, arbitrary shapes, etc.

FIG. 6A-3 shows a system configured so that clicking on the picture 600 in the playback display 604 causes a softness slider 624 to appear. Moving the softness slider control 626 up makes the edges of the picture appear increasingly soft or "fuzzy;" i.e. the picture becomes increasingly transparent 622 away from the center and toward the edges (of course this depiction of fuzziness in the diagram is suggestive only, and the exact effect may vary according to implementation). The greater the slider setting, the greater the softness; i.e. the more extreme the "fuzziness" becomes. The minimum position 628 of slider 624 corresponds to the original "hard outline" of the picture; i.e. no softness.

FIG. 6A-4 shows a system configured so that clicking on the picture 600 in the playback display 604 causes both a shape slider 644 and a softness slider 636 to appear. In this configuration, the shape and softness effects may be combined, independently controllable via the shape and softness sliders according to the rules previously described. In the example shown, the shape slider control 646 is moved to the mid position, and the softness slider control 638 is also moved to the mid position, resulting in a "soft oval" effect 634.

FIG. 6B shows editing of the shape and softness of an object's media data in the playback display using dragging, according to one embodiment of the present invention. In FIG. 6B-1 the media data of a picture object is seen in the playback display 656 as a picture 652. The user first clicks the shape/softness command icon 650, then selects the picture by clicking on it with the pointer 654 (in an alternate implementation, the picture may be selected first and then the command icon; also, in yet another alternate implementation, both the command and the picture may be selected at once by clicking on the picture using an alternate form of click, such as by pressing the right-side mouse button, or by clicking with a modifier key such as "alt" or "ctrl" held down, etc).

FIG. 6B-2 shows that when the above selection has occurred, a shape/softness adjust mode is entered, as indicated by the special cursor symbol 664. The user may then move the mouse or other pointing device 688 in any of four directions to adjust the shape and softness of the picture. Left movement 685 or right movement 686 is used to adjust the shape toward a modified shape 682 (left) or original shape 690 (right), similar to the way shape is affected by the shape slider 614 in FIG. 6A (except that the direction is reversed). Up movement 684 or down movement 689 is used to adjust the softness toward the hardest edges 680 (up) or softest edges 698 (down), similar to the way softness is affected by the softness slider 624 in FIG. 6A (except that again the direction is reversed). In short, the four directions form a "shape/softness grid" 696 which controls the shape and softness of the object being affected. All of the changes happen in real time to the displayed media data 652 in the playback display 656, which in this example is exibiting a "soft oval" effect 660.

Beyond the basic functionality of the shape/softness adjust mode just discussed, a variety of variations or enhancements such as the following are possible. For one, alternate mappings between the shape and softness settings and the vertical and horizontal axes of the shape/softness grid 696 may be effective, such as swapping or inverting the axes. Also, shape/softness adjust mode may be provided as separate modes for shape adjust and softness adjust, where in each mode movement along a single axis controls the relevant parameter. In addition, shapes other than those shown in the example of FIG. 6B may be provided, such as other geometric shapes, arbitrary shapes, etc. Also, an alternate implementation may be provided in which shape/softness adjust mode (or just shape adjust mode, depending on implementation) involves clicking and holding down the mouse button or pointing device; this alternate implementation may also involve a "drag palette" that presents available shapes to the user, and which can be used to change the shape of an object by first selecting the object and then clicking and dragging across the drag palette to change the object's shape. Note that the special cursor symbol 664 need not be used, and if used, may either move or not during shape/softness adjust mode. Finally, shape/softness adjust mode may be exited by again clicking the mouse or pointing device (or by releasing the mouse button or pointing device in the alternate implementation involving clicking and holding).

TIME-BASED PLAYBACK BEHAVIOR—FIGS. 7A-H illustrate programming of time-based object playback behavior, whereby the appearance of an object's media data in the playback display is programmed to change automatically over time during playback. The behaviors shown in the examples of FIGS. 7A-H are: (1) "undulating" in FIG. 7A, (2) "bouncing" in FIG. 7B, (3) "color cycling" in FIG. 7C, (4) "entering" in FIG. 7D, (5) "exiting" in FIG. 7E, (6) "timing out" in FIG. 7F, (7) "effect box" in FIG. 7G, and (8) "randomized video end-looping" in FIG. 7H. Each of the programming functions shown in these figures, as well as each of the behaviors involved, is an independent feature of the invention that may or may not be included in any given system configuration.

The functionality illustrated in FIGS. 7A-H generally provides the advantage of allowing authors to create more dynamic and entertaining multimedia content with less effort. Moreover, the features of FIGS. 7A-H, when used in conjunction with each other and with other features of the invention such as editing display settings, functions of the sentence paradigm, networking, collaborative editing, subdisplays, etc., provide the further advantage of increased speed and efficiency in the creation of highly sophisticated multimedia content.

It should be noted that in FIGS. 7A-G, time-based playback behaviors are shown being applied to exemplary picture objects; depending on system configuration, each of these behaviors may be applied to any of the following: text, pictures, videos and sub-displays (sub-displays are detailed in connection with FIGS. 40 through 45C). Also, in each of the examples of FIGS. 7A-H, object selection occurs first followed by selection of the programming function; this may also be implemented in the reverse order, such that the programming function is selected first followed by selection of the object. In addition, the playback behaviors shown in FIGS. 7A-H may involve certain additional parameters, such as speed of change, degree of change, various other options, etc. In the examples shown, these additional parameters operate according to default settings built into the system. In an optional enhancement, the default settings for these additional parameters may be randomized somewhat to provide variety among behaviors. In another optional enhancement, the settings for these additional parameters may be made user adjustable through various user interface elements such as sliders, menus, buttons, palettes, checkboxes, etc.

Figure 7A:
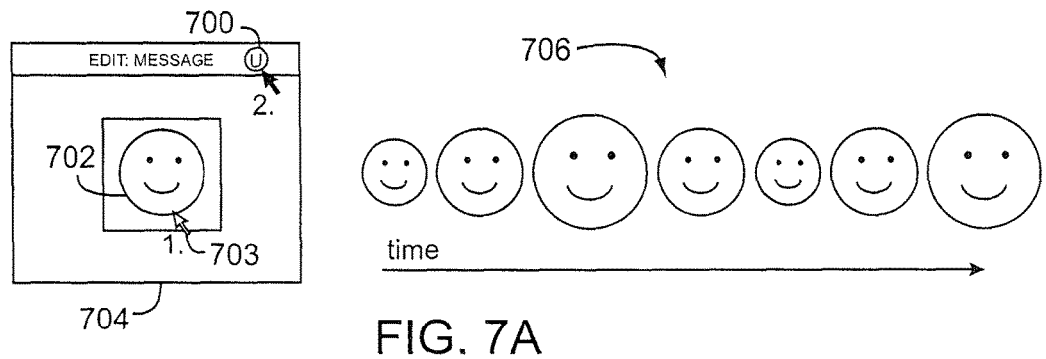
FIGS. 7A-H illustrate programming of time-based object playback behavior, according to embodiments of the present invention.

FIG. 7A shows the programming of "undulating," according to one embodiment of the present invention. In this example, the media data of a picture object is seen in the playback display 704 as a picture 702. The user clicks 703 on the picture, then clicks the undulate command icon 700, completing the programming of the behavior. Thereafter when the picture object is playing, the picture's behavior in time is depicted by the series of representations 706. This playback behavior consists of a pulsating effect, in which the size of the picture increases and decreases over time.

Figure 7B:
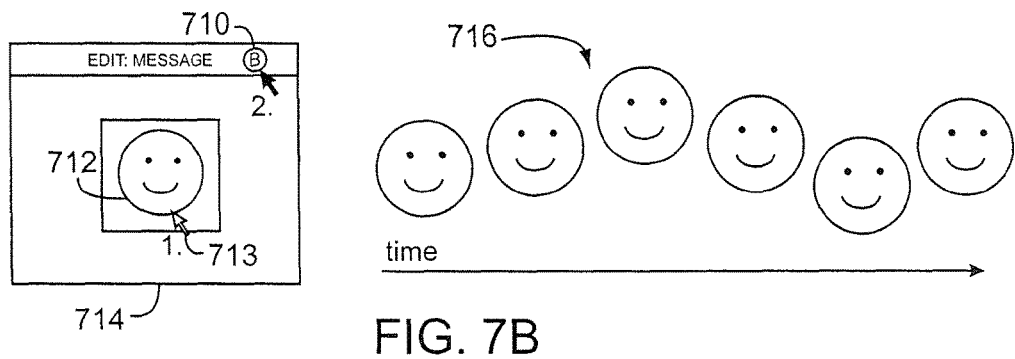

FIG. 7B shows the programming of "bouncing," according to one embodiment of the present invention. In this example, the media data of a picture object is seen in the playback display 714 as a picture 712. The user clicks 713 on the picture, then clicks the bounce command icon 710, completing the programming of the behavior. Thereafter when the picture object is playing, the picture's behavior in time is depicted by the series of representations 716. This playback behavior consists of a bouncing effect, in which the vertical position of the picture rises and falls over time (horizontal movement may also be incorporated for enhanced effect).

Figure 7C:
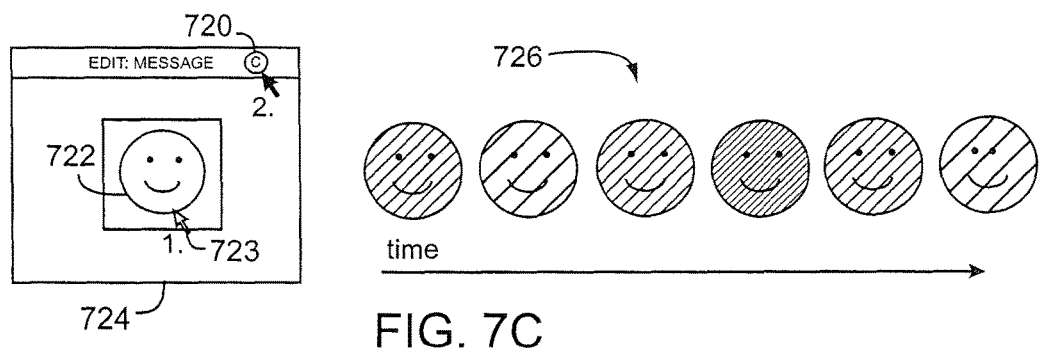

FIG. 7C shows the programming of "color cycling," according to one embodiment of the present invention. In this example, the media data of a picture object is seen in the playback display 724 as a picture 722. The user clicks 723 on the picture, then clicks the color cycle command icon 720, completing the programming of the behavior. Thereafter when the picture object is playing, the picture's behavior in time is depicted by the series of representations 726. This playback behavior consists of a color cycling effect, in which the color of the picture changes to different colors over time. Moreover, depending on system configuration, the programming function of FIG. 7C and its associated behavior can be applied to the background of the playback display as well (programmed by clicking on the background instead of the picture prior to clicking the command icon); in an optional enhancement, this color cycling of the playback display background can consist of multiple bands of color emanating from the center of the background.

Figure 7D:
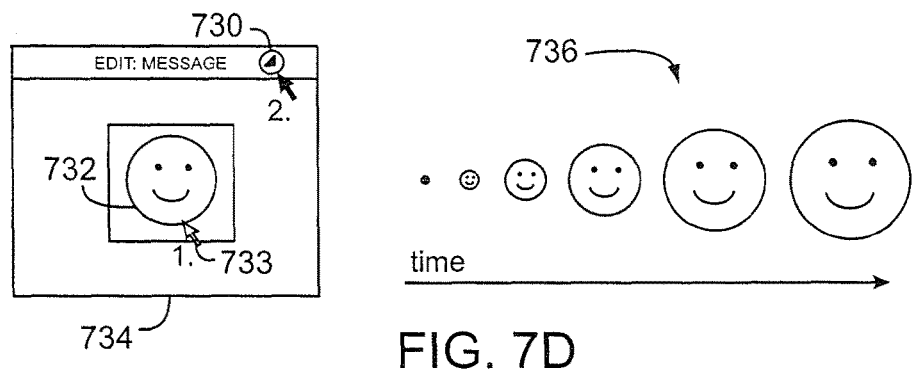

FIG. 7D shows the programming of an "entrance," in this case a "zoom-in" transition, according to one embodiment of the present invention. In this example, the media data of a picture object is seen in the playback display 734 as a picture 732. The user clicks 733 on the picture, then clicks on the entrance command icon 730, completing the programming of the behavior. Thereafter when the picture object starts playing, the picture's behavior in time is depicted by the series of representations 736. This playback behavior consists of an increase in size over time until the picture reaches full size, at which time the entrance is complete (note that various other entrance effects, such as fade-in, spin-in, slide-in, etc., may also be provided). In an optional enhancement, the entrance effect defaults to "on" for newly created and imported objects and has "fade-in" selected as the default entrance type (similar to the fade-out exit effect of FIG. 7E but in reverse).

Figure 7E:
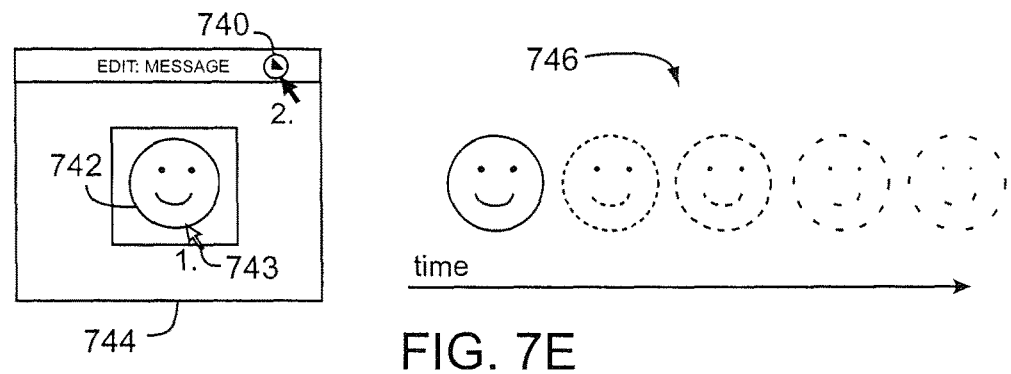

FIG. 7E shows the programming of an "exit," in this case a "fade-out" transition, according to one embodiment of the present invention. In this example, the media data of a picture object is seen in the playback display 744 as a picture 742. The user clicks 743 on the picture, then clicks on the exit command icon 740, completing the programming of the behavior. Thereafter when the picture object stops playing, the picture's behavior in time is depicted by the series of representations 746. This playback behavior consists of an increase in transparency over time until the picture becomes fully transparent, at which time the exit is complete (note that various other exit effects, such as zoom-out, spin-out, slide-out, etc., may also be provided). In an optional enhancement, the exit effect defaults to "on" for newly created and imported objects and has "fade out" selected as the default exit type.

Figure 7F:
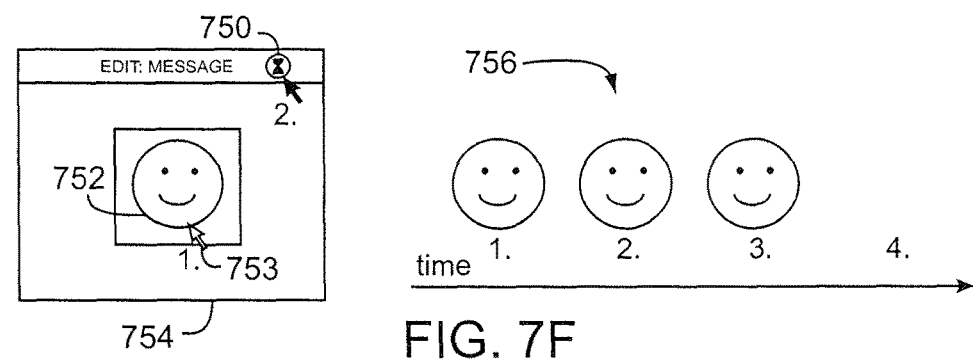

FIG. 7F shows the programming of an "object timeout," according to one embodiment of the present invention. In this example, the media data of a picture object is seen in the playback display 754 as a picture 752. The user clicks 753 on the picture, then clicks on the timeout command icon 750, completing the programming of the behavior. Thereafter when the picture object starts playing, the picture's behavior in time is depicted by the series of representations 756. This playback behavior consists of an automatic timeout, where after a period of time the picture stops playing.

Figure 7G:
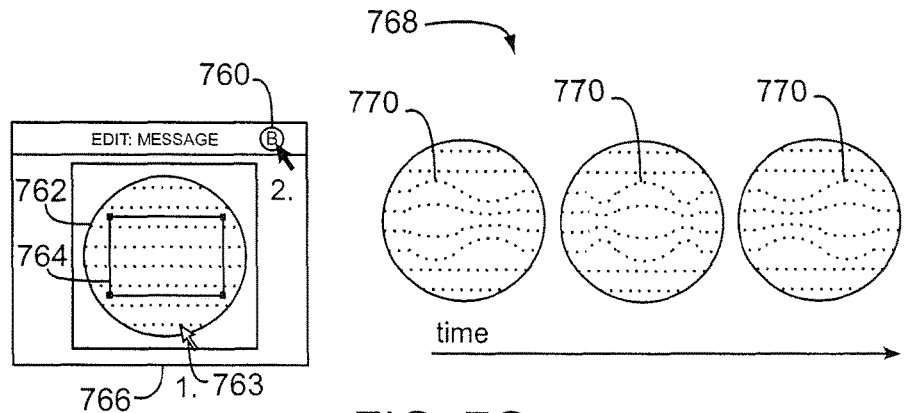

FIG. 7G shows the programming of an "effect box," in this case providing a "funhouse mirror" effect, according to one embodiment of the present invention. In this example, the media data of a picture object is seen in the playback display 766 as a picture 762 (the picture in this example is a circle with several straight, horizontal, dotted lines running across it; it is shown in its unaffected state in the playback display 766). The user clicks 763 on the picture, then clicks on the entrance command icon 760, which causes an effect box 764 to appear over the picture; the user may then adjust the placement and shape of the effect box (for example, by manipulating drag handles as was done with the select box 562 in FIG. 5D). Thereafter when the picture object starts playing, the picture's behavior in time is depicted by the series of representations 768. This playback behavior consists of a time-variant modification to the portion of the image corresponding to the effect box 764; in this example, a "funhouse mirror" effect causes a bulge 770 to move across the area in question over time (note that various other effect box effects, such as swirl effects, stretch effects, pixelization effects, color effects, etc., may also be provided). In a preferred enhancement, two or more effect boxes may be applied to a single picture simultaneously, and where there is overlap, the various processing effects for the overlapping boxes are cumulatively applied to the image in the area of overlap.

Figure 7H:
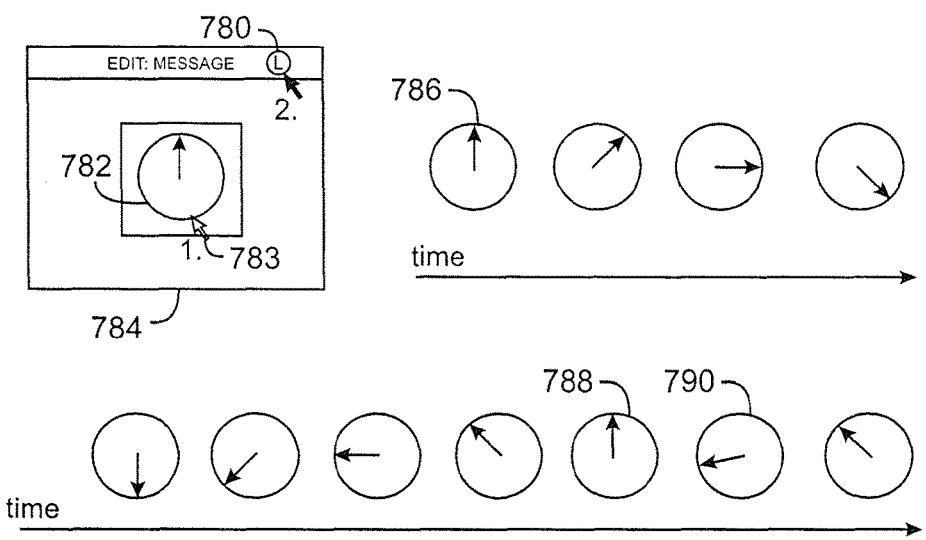

FIG. 7H shows the programming of "randomized video end-looping," according to one embodiment of the present invention. In this example, the media data of a video object is seen in the playback display 784 as a video 782. The user clicks 783 on the video, then clicks on the end-loop command icon 780, completing the programming of the behavior. Thereafter when the video object starts playing, the video's behavior in time is depicted by the series of representations 786-798. This playback behavior, shown in the present example using a video of a clock, is best understood in terms of the substantial value it can provide when used with a video of a "talking head."

By way of background, two common functions frequently provided with video playback in multimedia systems are "looping," in which a video continuously repeats by looping from the end back to the beginning, and "freeze frame," in which after playing through to the end the video holds on the last frame (both of which may be provided in the present invention via command icons such as those used in FIGS. 7A-H). Each of these common techniques is effective for various purposes; however, what both of these techniques fail to do effectively is simulate the effect of a person making a statement, or asking a question, and then waiting for a response. Using the former technique (looping), the statement or question would be repeated ad infinitum, and using the latter technique (freeze frame), the talking head simply goes still, which is better but still not satisfactory.

The "randomized video end-looping" feature of the present invention provides a far more effective solution for this type of situation. To use this feature, the user records a talking head statement or question on video, and after the talking is done, continues to record an extra few seconds of "presence" (eyes blinking, slight facial changes, etc.). When the video is started with end-looping enabled, it plays through to the end, and then loops just the final second or few seconds of the recording (the part with the presence). Each time it loops back, it loops back to a slightly different position (randomly selected in the preferred embodiment) in order to avoid a repetitive or mechanical feel. The result is a far more natural simulation of a person than is available with freeze frame, since the talking head does not just go still, but continues to provide a sense of human presence.

Returning to the series of representations in FIG. 7H, the video of the clock begins with the hand in the vertical position 786. As time progresses, the hand moves clockwise around the face of the clock until it reaches the vertical position once again in the final frame of the video 788. At this point the video loops back 790 to where it was a few seconds earlier, and then continues on again to the end 792. Once again it loops back 794, but this time to a slightly different position. After proceeding to the end 796 yet again, it loops back 798 to still another slightly different position, repeating this process ad infinitum until it is stopped. Depending on implementation, certain variations or enhancements to this end-looping function are possible, including: using a visual crossfade to mask the "splice" at the loop points, using one or more algorithms instead of or in addition to random variation to select the loop points, varying the end point of the loop to frames other than the last frame, using backwards playback in the looped section, etc.

STARTING AND STOPPING OF CONTAINER OBJECTS—FIGS. 8A-B illustrate "start propagation" and "stop propagation" whereby the starting and stopping of a container object is propagated to its contained objects. FIG. 8A shows the most basic form of start and stop propagation: the objects in a container start playing when the container is started, and they stop when the container is stopped. FIG. 8B shows two variations of this basic propagation: random start propagation and inverse stop propagation. With the former, when a container is started, a single object is selected randomly to play. With the latter, when the last object playing in a container stops playing, the container also stops playing (i.e., the "stop" propagates from a contained object to the enclosing container, the inverse of the normal direction). Each of these three functions, the basic propagation of FIG. 8A and the two variations shown in FIG. 8B, is an independent feature of the invention that may or may not be included in any given system configuration.

The functionality illustrated in FIGS. 8A-B generally provides the advantage of a clear and effective control structure for the playback of multimedia content. Also, the random start propagation feature of FIG. 8B provides the advantage of allowing authors to more easily create multimedia content that has greater variety and interest for viewers. In addition, the inverse stop propagation feature of FIG. 8B, when used in conjunction with navigation and/or sub-display navigation that supports automatic back navigation, provides the advantage of enabling more effective and intuitive use of back navigation as a presentation structuring device. Moreover, when the propagation functionality of FIGS. 8A-B is used in conjunction with other features of the invention, such as hierarchical nesting of containers, functions of the sentence paradigm, pointer objects, networking, collaborative editing, sub-displays, etc., further advantages are derived in terms of more efficient and effective control over distributed multimedia content.

In addition, a "start propagation exemption" feature, which is an optional enhancement to the basic start propagation of FIG. 8A and/or the random start propagation of FIG. 8B, may be provided as follows. In cases where programmed object behavior specifies that an object is to be started as a result of events or operations occurring in connection with another object (put more simply, when an object is programmed to be started by another object), the programming causes the first object to become exempt from start propagation. This exemption can also be extended to include any objects that are "grouped" with the exempted object ("grouping" in this context means that all the objects in a group start and stop playing together; FIG. 17 provides an example of a grouping function). The reason for this exemption is that if an object might be started at some point during presentation playback due to ongoing events occurring in that presentation, it should not be started automatically at the time the container which contains the presentation starts playing; that would defeat the purpose of the programming. This "start propagation exemption" feature allows authors to program object behavior faster and with less effort, and is illustrated in FIG. 19. Note that a variety of programming methods may be used to create the object behavior that causes the exemption, and no particular programming method is required or assumed.

FIG. 8A illustrates basic starting and stopping of a container object with start and stop propagation to contained objects, according to one embodiment of the present invention. FIG. 8A-1 shows a container object 800 that contains a text object 802, a picture object 804 and a text object 806. Initially none of these objects is playing. The playback display 810 is empty, and the container start toggle button 808 is turned off. In FIG. 8A-2, the user clicks on the container start toggle button 808 to turn it on, causing the container object 800 to start playing. The starting of the container propagates to its contained objects 802, 804 and 806, causing them to start as well, and now all four objects are playing, as indicated by the object play indicators 812. At the same time, the media data of the contained objects 802, 804 and 806 is now seen in the playback display 810 as the text 814, the picture 816 and the text 818, respectively. In FIG. 8A-3, the user again clicks the container start toggle button 808, this time turning it off. This causes the container object 800 to stop playing, and the stopping of the container propagates to its contained objects 802, 804 and 806, turning them off as well. The playback display 810 is now empty once again. Note that the use of a container start toggle button to start and stop container objects is merely one way to do so, and various other ways of doing so may also be effective for the purposes of start and stop propagation.

FIG. 8B illustrates two variations of start and stop propagation, random start propagation and inverse stop propagation, according to one embodiment of the present invention. FIG. 8B-1 shows a container object 850 containing a text object 852, a picture object 854 and a text object 856, none of which is playing. The playback display 864 is empty and the container start toggle button 860 is turned off. The user clicks on the random start enable button 862, enabling random start propagation for the container object 850 (this enabling is included merely to show that the feature is enabled, and is not essential to the operation of the feature itself). In FIG. 8B-2, the user clicks on the container start toggle button 860 to turn it on, causing the container object

850 to start playing. Because random start propagation is enabled, the starting of the container propagates to a randomly chosen contained object, in this case the right text object 856, whose media data is now seen in the playback display 864 as the text 868. The other contained objects 852 and 854 remain turned off. In FIG. 8B-3, inverse stop propagation is shown. The text object 856 which was previously playing in FIG. 8B-2 has now stopped playing (for example due to the timeout feature of FIG. 7F), and since there were no other objects playing in the container object 850 at the time, the container object 850 has stopped as well. The playback display 864 is again empty, and the container start toggle button 860 has turned off.

THE "SENTENCE" PARADIGM OF PROGRAMMING—FIGS. 9A through 27D illustrate programming of object behavior following a sentence paradigm. Each of the programming functions depicted in these figures, as well as each of the additional programming functions noted in the associated discussion, is a separate feature of the invention that may or may not be included in any given system configuration.

The programming functions of the sentence paradigm generally provide the advantage of faster, more intuitive programming of object behavior. In addition to being individually advantageous, the functions are also designed to complement one another, and as more of them are added, they become an increasingly powerful, yet still intuitive, programming language for specifying object behavior in multimedia presentations. For many purposes, a few of these functions can rival the capabilities of scripting for generating object behavior, but with far less effort and complexity. Moreover, the programming functions of the sentence paradigm, when used in conjunction with other features of the invention, such as editing display settings, time-based playback behavior, sub-displays, etc., enables the integration of fast content authoring with fast programming of object behavior, providing the further advantage of increased speed and efficiency in the creation of highly sophisticated multimedia content. In addition, the programming functions of the sentence paradigm, when used in conjunction with the networking and collaborative editing features of the invention, provide the advantage of intuitive and efficient control over the playback of media objects distributed over a network.

According to the sentence paradigm, object behavior is programmed by selecting two objects and an action, the action being either directional or non-directional. If the action is directional, the selected objects must be distinguished as to which is acting and which is being acted upon; if the action is non-directional, no such distinction need be made. For example, directional actions are actions such as "object A, when clicked, starts object B," while non-directional actions are actions such as "objects A and B play together." In addition, certain extensions to this general format may apply; for example, in some cases the two selected objects may be one and the same object, and in some cases the action may be multiple actions joined together to form a "compound sentence."

In the examples of FIGS. 9A through 27D, a consistent selection order is shown. First, an acting object is selected, then an action, then an object to be acted upon (the distinction between the objects being moot, of course, in the case of non-directional actions). In essence, the first object can be seen as the "subject" of the sentence, the action as the "verb," and the object to be acted upon as the "object" of the sentence. It should be noted, however, that in different embodiments of the invention, not unlike in different languages, the order of these sentence elements can vary. For example, the sentence programming paradigm can be implemented so that first the action is selected, then the acting object, and finally the object to be acted upon; or the object selection order could be reversed; or the two objects could be selected first followed by the action, etc. In fact, any method for effectively selecting the two objects and the action (or the multiple actions in the case of a "compound sentence") can be used to implement the sentence paradigm of programming.

FIGS. 9A through 27D illustrate the programming of various functions according to the sentence paradigm, as well as the operation of each function during presentation playback. The functions shown in these figures are:

FIG. 9A-B: "object A, when clicked, starts object B"
FIG. 9C-D: "object A, when clicked, starts object B" (alternate method)
FIG. 10A-B: "object A, upon timer expiration, starts object B"
FIG. 10C-D: "object A, upon timer expiration, starts object B" (alternate method)
FIG. 11A-B: "object A, when clicked, stops object B"
FIG. 12A-B: "object A, when clicked, stops itself"
FIG. 13A-B: "object A, upon stopping, starts object B"
FIG. 14A-B: "object A, when clicked, randomly starts object B"
FIG. 15A-B: "object A, upon starting, starts object B"
FIG. 15C-D: "object A, upon starting, stops object B"
FIG. 16A-B: "object A, during mouse-over, makes object B play"
FIG. 17A-B: "objects A and B play together"
FIG. 18A-B: "objects A and B play separately"
FIG. 18C-D "objects A and B, upon collision, start object C"
FIG. 19A-B: "container object A, upon starting, starts contained object B"
FIG. 19C-D "object A, upon sequence command, starts object B"
FIG. 19E-F "object A tweens to object B"
FIG. 20A-B: "object A, when clicked, stops itself and starts object B"
FIG. 21A-B: 2 function compound sentence: FIG. 12 and FIG. 9
FIG. 22A-B: 2 function compound sentence: FIG. 9 and new object
FIG. 23A-B: 3 function compound sentence: FIG. 12, FIG. 13 and duplicate
FIG. 24A-B command repeat function
FIG. 25A-B: "video object A, upon reaching cue point, starts object B"
FIG. 26A-B: "container object A, upon navigation into sub-display, starts contained object B"
FIG. 26C-D: "container object A, upon navigation back from sub-display, stops contained object B"
FIG. 26E-F "object A, when clicked, initiates container transition"
FIG. 26G-H "object A, when clicked, changes attribute of object B"
FIG. 27A-B "vector object A controls the position of object B"
FIG. 27C-D "vector object A controls the scale of vector object B"

Before proceeding with a detailed description of the above functions, the following points should be noted.

First, the object types shown throughout FIGS. 9A through 27D are representative only; other object types supported by the system (including container objects) may be used in place of the objects shown. The only exceptions to this occur in FIGS. 25A-B, 26A-D and 27A-D, in which the type for "object A" is specified as an inherent part of the function, and in FIGS. 26E-F and 27C-D, in which the type for "object B" is specified as an inherent part of the function.

Second, while each of the functions of the sentence paradigm may have its own separate command icon, this could become confusing if a large number of functions are provided. However in many cases a single command icon can be shared effectively by more than one function (for example, the functions of FIGS. 11 and 12). Consolidation of command icons in this manner is the preferred implementation. Due to size constraints in the diagrams, no attempt is made in FIGS. 9A through 27D to show different command icons for every function; rather, a few representative command icons are used throughout.

Figure 32A:
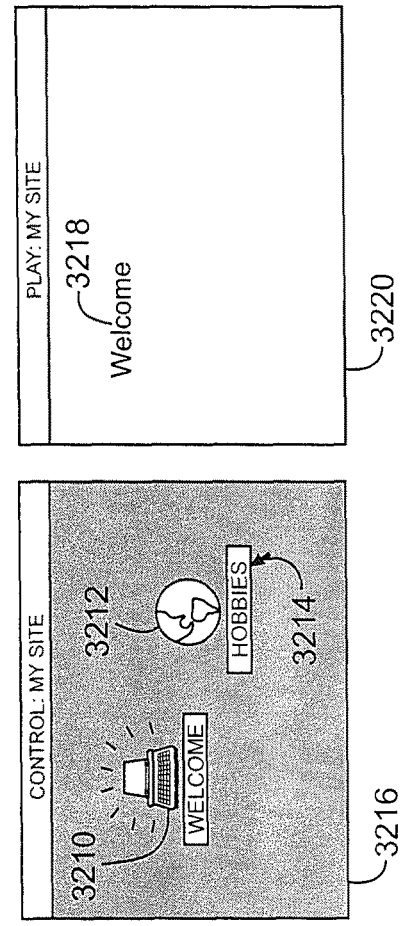
FIGS. 32A-B illustrate hierarchical structuring of presentation data by nesting containers within containers, according to embodiments of the present invention.
Figure 32B:
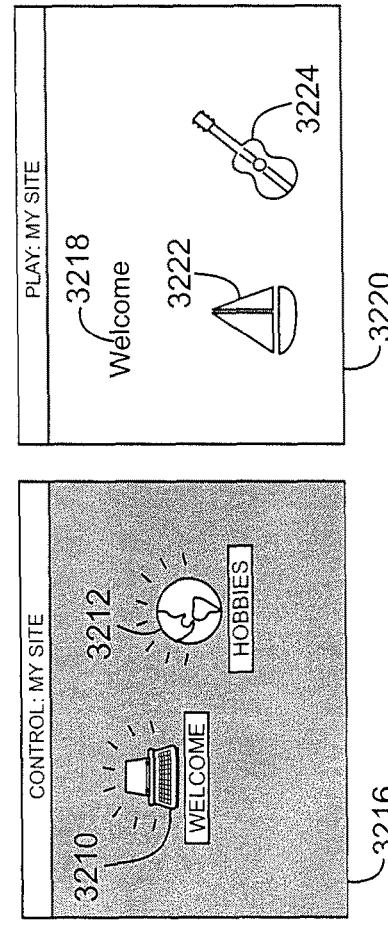
Figure 48:
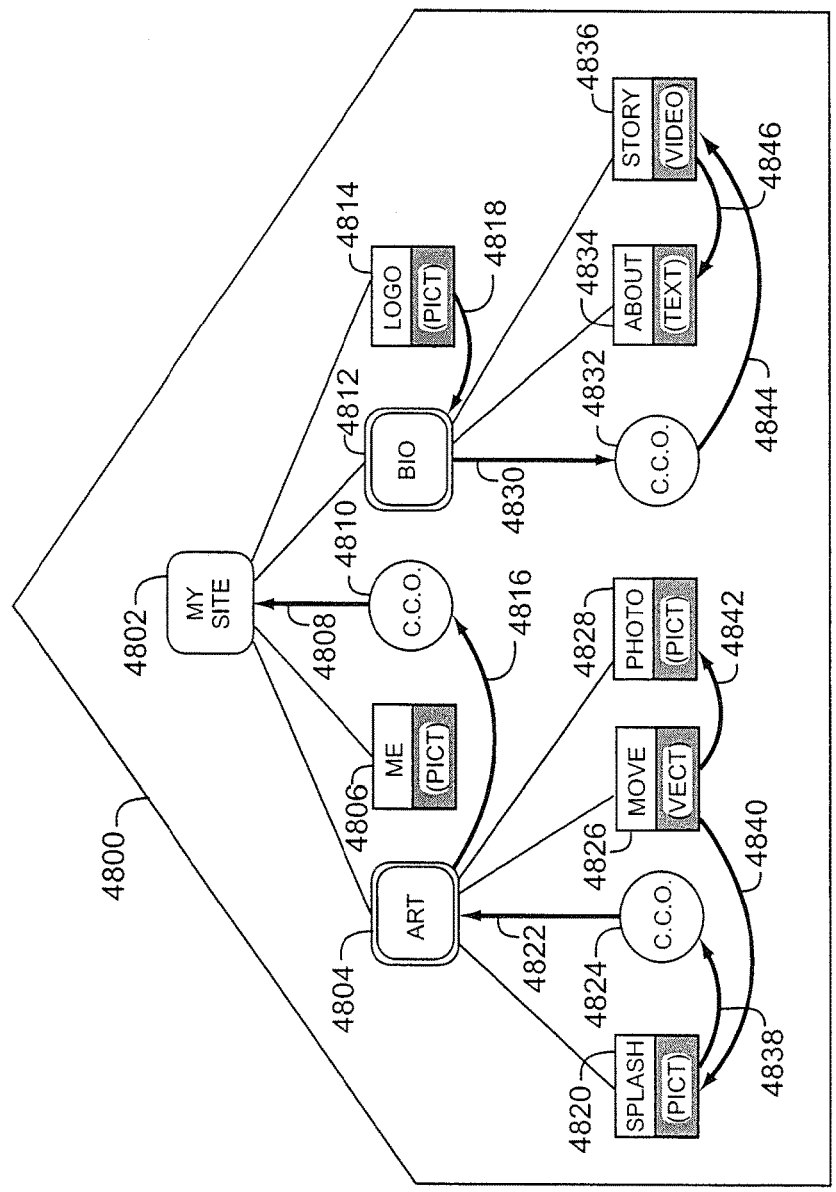
FIG. 48 illustrates a block diagram of an individual, exemplary hierarchical database of presentation data, according to embodiments of the present invention.

Third, when each of the functions of the sentence paradigm is programmed, it results in the creation of one or more "relations" between the objects in question. These relations are depicted in FIGS. 9A through 27D as curved lines with or without arrowheads, an arrowhead indicating which object is being acted upon in the case of a directional action. This depiction of relations is not intended to imply any particular mechanism or implementation by which the action of the function is accomplished, but is merely a visual representation in the diagrams indicating that the function has been programmed. Moreover, while most of the relations shown are between objects in the same container, relations may also occur between containers and their contained objects, FIG. 19 being one example. Furthermore, in system configurations which support hierarchical container nesting, as shown in FIGS. 32A-B, provisions may be included to allow relations to cross hierarchical boundaries generally; one approach for doing so is shown in FIG. 48.

Fourth, for each function of the sentence paradigm where the triggering event for the action of the function is "when clicked" (FIGS. 9, 11, 12, 14, 20 and 26E-H), there is a corresponding sibling function where the triggering event for the action of the function is "upon timer expiration" (the timer being a per object countdown timer that begins counting down when the object is started). An example of such sibling functions is seen in the functions of FIGS. 9 and 10, where everything is the same between the two functions except the event that triggers the action of the function (click vs. timer). For each of the other "when clicked" functions (FIGS. 11, 12, 14, 20 and 26E-H), the sibling function "upon timer expiration" has been omitted for space considerations, but is hereby included as part of the invention (each such function being a separate feature of the invention, and having the same considerations as its "when clicked" sibling). These "upon timer expiration" functions give authors great flexibility for arranging object playback in time, providing significant advantages over the timeline-based authoring paradigm of many existing systems.

Fifth, for each function of the sentence paradigm which includes both a triggering event and a triggered action (FIGS. 9-15, 18C-D, 19A-D, 20, 25 and 26), an alternate method for programming the function may be supported whereby the triggering event and the triggered action are selected independently (selection in either order may be supported depending on implementation). Examples of this alternate programming method are seen in the functions of FIGS. 9C-D and 10C-D, which illustrate alternate programming for the functions of FIGS. 9A-B and 10A-B, respectively. For the remaining functions of the sentence paradigm which are eligible for alternate programming (FIGS. 11-15, 18C-D, 19A-D, 20, 25 and 26), the versions of the functions using alternate programming have been omitted from the figures for space considerations, but are hereby included as part of the invention (each such function being a separate feature of the invention).

Sixth, also for space considerations, the examples of "compound sentence programming" shown in FIGS. 21, 22 and 23 have been limited to a representative subset of the useful function combinations. Other combinations may be supported as follows, each as an independent feature of the invention. With compound sentence programming, multiple functions are consolidated into a single "sentence" in order to streamline the authoring process for frequently used functions. Within the "subject-verb-object" framework of the sentence paradigm, compound sentences involve a "verb" which is actually two or three actions joined together by the user during the programming process. Three categories of actions may be joined together during compound sentence programming: (1) "stop actions" which include the functions of FIGS. 11 and 12 and their "timer expiration" siblings; (2) "start and associate actions" which include the start functions of FIGS. 9, 10 and 13 and the associate functions of FIGS. 17 and 18A-B; and (3) "object creation actions" which include the functions of FIGS. 2A through 3D and the "new pointer object" function of FIG. 34A.

When the user programs a "compound sentence," actions from the above categories are joined together according to one of three methods. The first method is to join a "stop action" with a "start action" whereby the "subject of the start action" does double duty as the "object of the stop action," as seen in FIGS. 21A-B; joining of other "stop actions" and "start actions" may also be supported, and the various combinations are hereby included as independent features of the invention. The second method is to join a "start or associate action" with an "object creation action" whereby the "object of the start or associate action" is created as a result of the sentence programming process, as seen in FIGS. 22A-B; joining of other "start or associate actions" and "object creation actions" may also be supported, and the various combinations are hereby included as independent features of the invention. The third method, a combination of the first two, is to join a "stop action," a "start action" and an "object creation action" whereby the "subject of the start action" does double duty as the "object of the stop action" and the "object of the start action" is created as a result of the sentence programming process, as seen in FIGS. 23A-B; joining of other "stop actions," "start-actions" and "object creation actions" may also be supported, and the various combinations are hereby included as independent features of the invention.

Moreover, each of the function combinations that can be programmed as a "compound sentence" may also be provided as a "consolidated" function. An example is seen in the function of FIGS. 20A-B, which is a single function corresponding to the "compound sentence" of FIGS. 21A-B. For each of the possible "compound sentence" function combinations discussed above, the corresponding "consolidated" function is hereby included as an independent feature of the invention.

Seventh, a number of the functions of the sentence paradigm may be used to create programmed object behavior that can cause the "start propagation exemption" discussed in connection with FIGS. 8A-B; in particular, this applies to any function whose action involves some form of "starts object B" (such as the functions of FIGS. 9, 10, 13, 14, 15A-B, 18C-D, 19, 20, 21, 22, 23, 25, and 26A-B). Briefly, this "start propagation exemption" feature provides that when an object is programmed to be started by another object, it becomes exempt from the start propagation of FIG.

8A in order to avoid defeating the purpose of the programming. This exemption can also be extended to include any objects that the exempted object has been "grouped" with (such as via the function of FIG. 17: "objects A and B play together"). FIG. 19A-B illustrates the "start propagation exemption" feature of the present invention, as well as a function ("container object A, upon starting, starts contained object B") which can be used to override the exemption for particular objects.

Eighth, the functions of FIGS. 27A-D depend upon support for "vector objects," which are described at length in connection with FIG. 28A. In addition to the two functions shown in FIGS. 27A-D, a number of other functions are listed below which may be used to program other specific mappings between vector objects and their targets. These functions may be divided into two groups as follows. The first group consists of functions for mapping vector object outputs to various display settings seen in FIGS. 4A through 6B; these mappings may be made individually and in combination, as indicated in the list. The second group consists of functions for mapping vector object outputs to various vector object parameters (again, individually and in combination); in these functions, the "vector object B" can be one and the same vector object as the "vector object A." The programming steps for the functions in each group are exemplified by the functions of FIGS. 27A-B and 27C-D, which are the first functions of the first and second groups, respectively; the programming for the other functions in each group is the same as in those examples.

used for selecting one or both of the objects being programmed, and some examples of this are seen in FIGS. 27A-D (these provisions can include using the "container control objects" of FIG. 29B for selecting container objects). A more detailed description of control display functionality is provided in connection with FIGS. 29A through 30B.

The functions of FIGS. 9A through 27D, which exemplify the sentence paradigm for programming object behavior, are now discussed in detail.

FIGS. 9A-B illustrate programming and operation for the function "object A, when clicked, starts object B," according to one embodiment of the present invention. FIG. 9A shows a container object 900 containing a text object 902 and a picture object 906; the media data of the contained objects 902 and 906 is seen in the playback display 914 as the text 910 and the picture 912, respectively. To program the function, the user first clicks on the text 910 corresponding to the text object 902, then clicks on the function command icon 908, then clicks on the picture 912 corresponding to the picture object 906. As a result of this programming process, a relation 904 forms between the two objects 902 and 906. FIG. 9B illustrates how the function programmed in FIG. 9A operates during presentation playback. Initially, in FIG. 9B-1, the text object 902 is playing and its media data is seen in the playback display 914 as the text 910. When the user clicks 916 on the text 910, then in FIG. 9B-2 the picture object 906 starts playing, as indicated by the play indicator 918, and its media data is now seen in the playback display 914 as the picture 912.

| Group One: | |
| --- | --- |
| "vector object A controls the position of object B" | 2 channels |
| "vector object A controls the x-position of object B" | 1 channel |
| "vector object A controls the y-position of object B" | 1 channel |
| "vector object A controls the size of object B" | 1 channel |
| "vector object A controls the position and size of object B" | 3 channels |
| "vector object A controls the rotation of object B" | 1 channel |
| "vector object A controls the position and rotation of object B" | 3 channels |
| "vector object A controls the position, size and rotation of object B" | 4 channels |
| "vector object A controls the color of object B" | 3 channels |
| "vector object A controls the hue and brightness of object B" | 2 channels |
| "vector object A controls the x-stretch of object B" | 1 channel |
| "vector object A controls the y-stretch of object B" | 1 channel |
| "vector object A controls the x-stretch and y-stretch of object B" | 2 channels |
| "vector object A controls the top/bottom/left/right cropping of object B" | 1-4 channels |
| "vector object A controls the shape of object B" | 1 channel |
| "vector object A controls the softness of object B" | 1 channel |
| "vector object A controls the shape and softness of object B" | 2 channels |
| Group Two: | |
| "vector object A controls the scale of vector object B" | 1 channel |
| "vector object A controls the speed of vector object B" | 1 channel |
| "vector object A controls the scale and speed of vector object B" | 2 channels |
| "vector object A controls the playback position of vector object B" | 1 channel |
| "vector object A controls the scale and playback pos. of vector object B" | 2 channels |

The above programming functions are hereby included as part of the invention, each as a separate feature that may or may not be included depending on system configuration.

Figures 1, 30B:
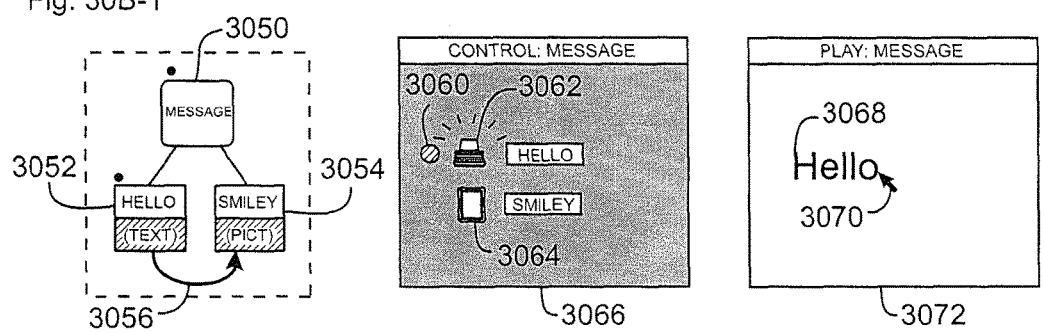
Figures 2, 30B:
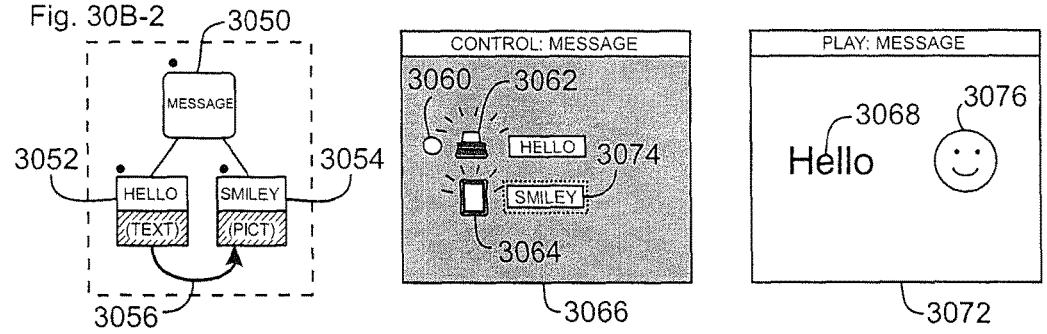

Finally, it should be noted that the sentence paradigm of the present invention does not require a control display, but in system configurations where control display functionality is supported, certain control display features associated with the sentence programming paradigm can be advantageous. For one, control displays can be used to provide visual representation of the relations formed by the programming process, as well as real-time indication of associated actions and events, as seen in FIGS. 30A-B. In addition, provisions may be made to allow object icons in control displays to be FIGS. 9C-D illustrate alternate programming for the function "object A, when clicked, starts object B," according to one embodiment of the present invention. FIG. 9C shows a container object 950 containing a text object 952 and a picture object 956; the media data of the contained objects 952 and 956 is seen in the playback display 964 as the text 960 and the picture 962, respectively. To program the function, the user first clicks on the text 960 corresponding to the text object 952, then clicks on the left command icon 957 corresponding to the triggering event (in this case "when clicked"), then clicks on the right command icon 958 corresponding to the triggered action (in this case "starts"), then clicks on the picture 962 corresponding to the picture object 956. As a result of this programming process, a relation 954 forms between the two objects 952 and 956. FIG. 9D illustrates how the function programmed in FIG. 9C operates during presentation playback (this operation is the same as that of FIG. 9B). Initially, in FIG. 9D-1, the text object 952 is playing and its media data is seen in the playback display 964 as the text 960. When the user clicks 966 on the text 960, then in FIG. 9D-2 the picture object 956 starts playing, as indicated by the play indicator 968, and its media data is now seen in the playback display 964 as the picture 962.

FIGS. 10A-B illustrate programming and operation for the function "object A, upon timer expiration, starts object B," according to one embodiment of the present invention. Recall that for this and other "upon timer expiration" functions there is a per object countdown timer that begins counting down when an object starts playing. The duration may be set to a default value, or in a preferred embodiment may be made user adjustable. This timer functionality, unlike the "object timeout" function of FIG. 7F, may be made to trigger a variety of outcomes depending on how it is programmed, and an example of such programming is shown in FIGS. 10A-B.

FIG. 10A shows a container object 1000 containing a text object 1002 and a picture object 1006; the media data of the contained objects 1002 and 1006 is seen in the playback display 1014 as the text 1010 and the picture 1012, respectively. To program the function, the user first clicks on the text 1010 corresponding to the text object 1002, then clicks on the function command icon 1008, then clicks on the picture 1012 corresponding to the picture object 1006. As a result of this programming process, a relation 1004 forms between the two objects 1002 and 1006. FIG. 10B illustrates how the function programmed in FIG. 10A operates during presentation playback. Initially, in FIG. 10B-1, the text object 1002 is playing and its media data is seen in the playback display 1014 as the text 1010. When the countdown timer for the text object 1002 expires, then in FIG. 10B-2 the picture object 1006 starts playing, as indicated by the play indicator 1016, and its media data is now seen in the playback display 1014 as the picture 1012. Additionally, an optional enhancement to the present function may be provided for cases where a single object is selected as both object A and B; in such cases, the timer begins counting down when the object stops playing, and upon timer expiration the object starts playing again.

FIGS. 10C-D illustrate alternate programming for the function "object A, upon timer expiration, starts object B," according to one embodiment of the present invention. FIG. 10C shows a container object 1050 containing a text object 1052 and a picture object 1056; the media data of the contained objects 1052 and 1056 is seen in the playback display 1064 as the text 1060 and the picture 1062, respectively. To program the function, the user first clicks on the text 1060 corresponding to the text object 1052, then clicks on the left command icon 1057 corresponding to the triggering event (in this case "upon timer expiration"), then clicks on the right command icon 1058 corresponding to the triggered action (in this case "starts"), then clicks on the picture 1062 corresponding to the picture object 1056. As a result of this programming process, a relation 1054 forms between the two objects 1052 and 1056. FIG. 10D illustrates how the function programmed in FIG. 10C operates during presentation playback (this operation is the same as that of FIG. 10B). Initially, in FIG. 10D-1 the text object 1052 is playing and its media data is seen in the playback display 1064 as the text 1060. When the countdown timer for the text object 1052 expires, then in FIG. 10D-2 the picture object 1056 starts playing, as indicated by the play indicator 1066, and its media data is now seen in the playback display 1064 as the picture 1062.

FIGS. 11A-B illustrate programming and operation for the function "object A, when clicked, stops object B," according to one embodiment of the present invention. FIG. 11A shows a container object 1100 containing a text object 1102 and a picture object 1106; the media data of the contained objects 1102 and 1106 is seen in the playback display 1114 as the text 1110 and the picture 1112, respectively. To program the function, the user first clicks on the text 1110 corresponding to the text object 1102, then clicks on the function command icon 1108, then clicks on the picture 1112 corresponding to the picture object 1106. As a result of this programming process, a relation 1104 forms between the two objects 1102 and 1106. FIG. 11B illustrates how the function programmed in FIG. 11A operates during presentation playback. Initially, in FIG. 11B-1, the text object 1102 and the picture object 1106 are both playing and their media data is seen in the playback display 1114 as the text 1110 and the picture 1112, respectively. When the user clicks 1116 on the text 1110, then in FIG. 11B-2 the picture object 1106 stops playing and its media data is no longer seen in the playback display 1114.

FIGS. 12A-B illustrate programming and operation for the function "object A, when clicked, stops itself," according to one embodiment of the present invention. FIG. 12A shows a container object 1200 containing a text object 1202 and a picture object 1206 (the latter being unnecessary for the present example); the media data of the contained objects 1202 and 1206 is seen in the playback display 1214 as the text 1210 and the picture 1212, respectively. To program the function, the user first clicks on the text 1210 corresponding to the text object 1202, then clicks on the function command icon 1208, then clicks again 1211 on the text 1210. As a result of this programming process, a relation 1204 forms between the text object 1202 and itself. FIG. 12B illustrates how the function programmed in FIG. 12A operates during presentation playback. Initially, in FIG. 12B-1, the text object 1202 is playing and its media data is seen in the playback display 1214 as the text 1210. When the user clicks 1216 on the text 1210, then in FIG. 12B-2 the text object 1202 stops playing and its media data is no longer seen in the playback display 1214.

FIGS. 13A-B illustrate programming and operation for the function "object A, upon stopping, starts object B," according to one embodiment of the present invention. FIG. 13A shows a container object 1300 containing a text object 1302 and a picture object 1306; the media data of the contained objects 1302 and 1306 is seen in the playback display 1314 as the text 1310 and the picture 1312, respectively. To program the function, the user first clicks on the text 1310 corresponding to the text object 1302, then clicks on the function command icon 1308, then clicks on the picture 1312 corresponding to the picture object 1306. As a result of this programming process, a relation 1304 forms between the two objects 1302 and 1306. FIG. 13B illustrates how the function programmed in FIG. 13A operates during presentation playback. Initially, in FIG. 13B-1, the text object 1302 is playing and its media data is seen in the playback display 1314 as the text 1310. When the text object 1302 stops playing (for example due to the timeout feature of FIG. 7F), then in FIG. 13B-2 the picture object 1306 starts playing, and its media data is now seen in the playback display 1314 as the picture 1312.

FIGS. 14A-B illustrate programming and operation for the function "object A, when clicked, randomly starts object B," according to one embodiment of the present invention. Since this function randomly starts one "object B" from among several which have been programmed, more than one instance of the function is required to demonstrate its operation; in this example, the function is programmed twice by the user. FIG. 14A shows a container object 1400 containing a text object 1402, a text object 1404 and a picture object 1406; the media data of the contained objects 1402, 1404 and 1406 is seen in the playback display 1420 as the text 1414, the text 1416 and the picture 1418, respectively. To program the first instance of the function, the user first clicks on the text 1414 corresponding to the text object 1402, then clicks on the function command icon 1412, then clicks on the text 1416 corresponding to the text object 1404; as a result of this programming process, a relation 1408 forms between the two objects 1402 and 1404. To program the second instance, the user first clicks on the text 1414, then clicks on the function command icon 1412, then clicks on the picture 1418 corresponding to the picture object 1406; as a result of this programming process, a second relation 1410 forms between the second two objects 1402 and 1406.

FIG. 14B illustrates how the function programmed in FIG. 14A operates during presentation playback. Initially, in FIG. 14B-1, the text object 1402 is playing and its media data is seen in the playback display 1420 as the text 1414. When the user clicks 1422 on the text 1414, one of the two "target objects" related to the text object 1402 via the programming of FIG. 14A (1408, 1410) is randomly selected to be started, and in FIG. 14B-2, the chosen object 1404 starts playing and its media data is now seen in the playback display 1420 as the text 1416. Of course to address more than two target objects, more instances of the function may be programmed (in which case, as in the present example, only one target object will be selected); in an optional enhancement, the present function may distinguish between objects according to object type, and select one object per object type from among the target objects.

FIGS. 15A-B illustrate programming and operation for the function "object A, upon starting, starts object B," according to one embodiment of the present invention. FIG. 15A shows a container object 1500 containing a text object 1502, a text object 1504 and a picture object 1506; the media data of the contained objects 1502, 1504 and 1506 is seen in the playback display 1520 as the text 1514, the text 1516 and the picture 1518, respectively. To help illustrate the present function, a previously programmed relation is already in place: the objects 1502 and 1504 have been programmed with the function of FIGS. 9A-B ("object A, when clicked, starts object B") shown by the relation 1508. This previous programming is not part of the present function, but is merely provided to exemplify the starting of objects that can occur during presentation playback. To program the present function, the user first clicks on the text 1516 corresponding to the text object 1504, then clicks on the function command icon 1512, then clicks on the picture 1518 corresponding to the picture object 1506. As a result of this programming process, a relation 1510 forms between the two objects 1504 and 1506.

FIG. 15B illustrates how the function programmed in FIG. 15A operates during presentation playback. Initially, in FIG. 15B-1, the text object 1502 is playing and its media data is seen in the playback display 1520 as the text 1514. When the user clicks 1522 on the text 1514, then in FIG. 15B-2 the other text object 1504 starts playing due to the previously programmed relation 1508, and its media data is now seen in the playback display 1520 as the text 1516. At the same time, due to the operation of the present function, the starting of the text object 1504 causes the picture object 1506 to start playing as well, and its media data is also now seen in the playback display 1520 as the picture 1518.

FIGS. 15C-D illustrate programming and operation for the function "object A, upon starting, stops object B," according to one embodiment of the present invention. FIG. 15C shows a container object 1550 containing a text object 1552, a text object 1554 and a picture object 1556; the media data of the contained objects 1552, 1554 and 1556 is seen in the playback display 1570 as the text 1564, the text 1566 and the picture 1568, respectively. To help illustrate the present function, a previously programmed relation is already in place: the objects 1552 and 1554 have been programmed with the function of FIGS. 9A-B ("object A, when clicked, starts object B") shown by the relation 1558. This previous programming is not part of the present function, but is merely provided to exemplify the starting of objects that can occur during presentation playback. To program the present function, the user first clicks on the text 1566 corresponding to the text object 1554, then clicks on the function command icon 1562, then clicks on the picture 1568 corresponding to the picture object 1556. As a result of this programming process, a relation 1560 forms between the two objects 1554 and 1556.

FIG. 15D illustrates how the function programmed in FIG. 15C operates during presentation playback. Initially, in FIG. 15D-1, the text object 1552 and the picture object 1556 are playing, and their media data is seen in the playback display 1570 as the text 1564 and the picture 1568, respectively. When the user clicks 1572 on the text 1564, then in FIG. 15D-2 the other text object 1554 starts playing due to the previously programmed relation 1558, and its media data is now seen in the playback display 1570 as the text 1566. At the same time, due to the operation of the present function, the starting of the text object 1554 causes the picture object 1556 to stop playing, and its media data is no longer seen in the playback display 1570.

FIGS. 16A-B illustrate programming and operation for the function "object A, during mouse-over, makes object B play," according to one embodiment of the present invention. FIG. 16A shows a container object 1600 containing a text object 1602 and a picture object 1606; the media data of the contained objects 1602 and 1606 is seen in the playback display 1614 as the text 1610 and the picture 1612, respectively. To program the function, the user first clicks on the text 1610 corresponding to the text object 1602, then clicks on the function command icon 1608, then clicks on the picture 1612 corresponding to the picture object 1606. As a result of this programming process, a relation 1604 forms between the two objects 1602 and 1606.

FIG. 16B illustrates how the function programmed in FIG. 16A operates during presentation playback. Initially, in FIG. 16B-1, the text object 1602 is playing and its media data is seen in the playback display 1614 as the text 1610; the pointer 1616 is in the lower part of the playback display, away from the text 1610. In FIG. 16B-2, when the user moves the pointer 1616 over the text 1610, the picture object 1606 starts playing, and its media data is now seen in the playback display 1614 as the picture 1612; unless otherwise stopped, the picture object 1606 continues playing as long as the pointer 1616 remains over the text 1610. In FIG. 16B-3, when the user moves the pointer 1616 so that it is no longer over the text 1610, the picture object 1606 stops playing and its media data is no longer seen in the playback display 1614.

FIGS. 17A-B illustrate programming and operation for the function "objects A and B play together," according to one embodiment of the present invention. This function is used to group objects together so that they always start and stop at the same time. It is non-directional, meaning that the starting or stopping of any object in a group causes all the objects in that group to start or stop. It is also transitive, meaning that if "objects A and B play together" and "objects B and C play together," then effectively "objects A and C play together."

FIG. 17A illustrates programming for the function "objects A and B play together." The figure shows a container object 1700 containing a left text object 1702, a left picture object 1704, a right picture object 1706 and a right text object 1708; the media data of the contained objects 1702, 1704, 1706 and 1708 is seen in the playback display 1726 as the left text 1718, the left picture 1722, the right picture 1724 and the right text 1720, respectively. To help illustrate the present function, some previously programmed relations are already in place: the objects 1702 and 1704 have been programmed with the function of FIGS. 9A-B ("object A, when clicked, starts object B"), as shown by the relation 1710; the other two objects 1706 and 1708 have been programmed with the function of FIG. 11 ("object A, when clicked, stops object B"), as shown by the relation 1714. This previous programming is not part of the present function, but is merely provided to exemplify the starting and stopping of objects that can occur during presentation playback. To program the present function, the user first clicks on the left picture 1722 corresponding to the left picture object 1704, then clicks on the function command icon 1716, then clicks on the right picture 1724 corresponding to the right picture object 1706. As a result of this programming process, a relation 1712 forms between the two objects 1704 and 1706; the absence of an arrowhead on the relation 1712 indicates that the relation is non-directional.

FIG. 17B illustrates how the function programmed in FIG. 17A operates during presentation playback. Initially, in FIG. 17B-1, the left text object 1702 and the right text object 1708 are playing, and their media data is seen in the playback display 1726 as the left text 1718 and the right text 1720, respectively. When the user clicks 1728 on the left text 1718, then in FIG. 17B-2 the left picture object 1704 starts playing due to the previously programmed relation 1710, and its media data is now seen in the playback display 1726 as the left picture 1722. At the same time, due to the operation of the present function, the starting of the left picture object 1704 causes the right picture object 1706 to start playing as well, and its media data is now also seen in the playback display 1726 as the right picture 1724. At some point thereafter, when the user clicks 1730 on the right text 1720, then in FIG. 17B-3 the right picture object 1706 stops playing due to the previously programmed relation 1714, and its media data is no longer seen in the playback display 1726. At the same time, due to the operation of the present function, the stopping of the right picture object 1706 causes the left picture object 1704 to stop as well, and its content is also no longer seen in the playback display 1726.

Figure 18A:
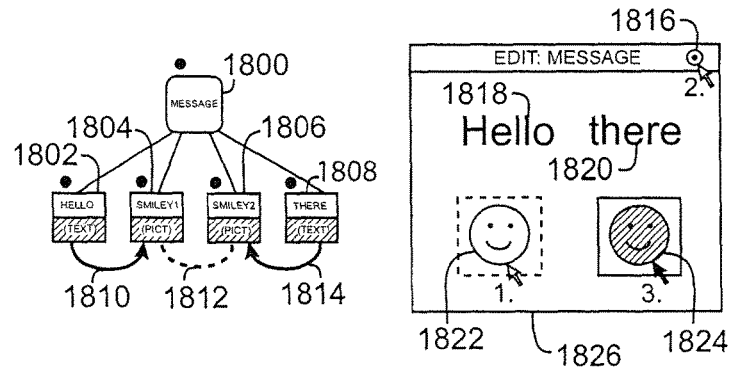
Figure 18B:
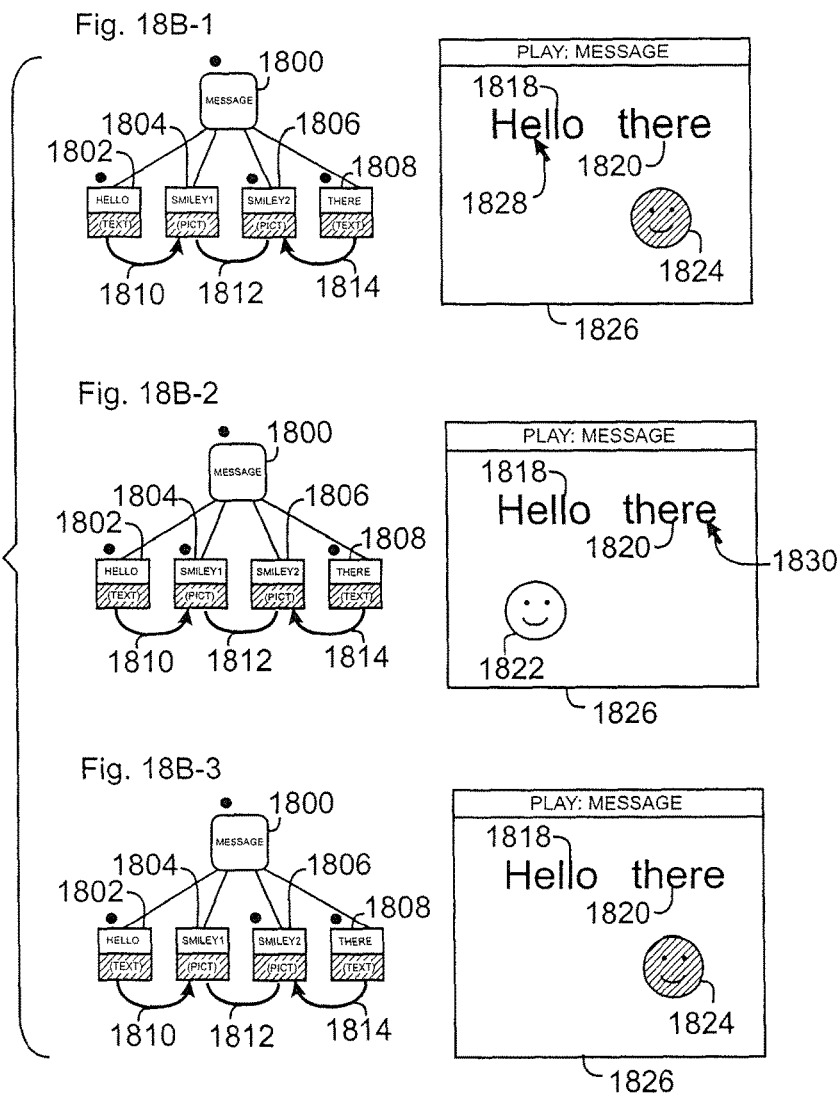

FIGS. 18A-B illustrate programming and operation for the function "objects A and B play separately," according to one embodiment of the present invention. This function is used to group objects together so that they become "mutually exclusive," i.e., so that no two objects in a group ever play at the same time. It is non-directional, meaning that the starting of any object in a group causes all the other objects in that group to stop. It is also transitive, meaning that if "objects A and B play separately" and "objects B and C play separately," then effectively "objects A and C play separately."

FIG. 18A illustrates programming for the function "objects A and B play separately." The figure shows a container object 1800 containing a left text object 1802, a left picture object 1804, a right picture object 1806 and a right text object 1808; the media data of the contained objects 1802, 1804, 1806 and 1808 is seen in the playback display 1826 as the left text 1818, the left picture 1822, the right picture 1824 and the right text 1820, respectively. To help illustrate the present function, some previously programmed relations are already in place: the objects 1802 and 1804 have been programmed with the function of FIGS. 9A-B ("object A, when clicked, starts object B"), as shown by the relation 1810; the other two objects 1806 and 1808 have also been programmed with the function of FIGS. 9A-B, as shown by the relation 1814. This previous programming is not part of the present function, but is merely provided to exemplify the starting of objects that can occur during presentation playback. To program the present function, the user first clicks on the left picture 1822 corresponding to the left picture object 1804, then clicks on the function command icon 1816, then clicks on the right picture 1824 corresponding to the right picture object 1806. As a result of this programming process, a relation 1812 forms between the two objects 1804 and 1806; the absence of an arrowhead on the relation 1812 indicates that the relation is non-directional.

FIG. 18B illustrates how the function programmed in FIG. 18A operates during presentation playback. Initially, in FIG. 18B-1, the left text object 1802, the right picture object 1806 and the right text object 1808 are playing, and their media data is seen in the playback display 1826 as the left text 1818, the right picture 1824 and the right text 1820, respectively. When the user clicks 1828 on the left text 1818, then in FIG. 18B-2 the left picture object 1804 starts playing due to the previously programmed relation 1810, and its media data is now seen in the playback display 1826 as the left picture 1822. At the same time, due to the operation of the present function, the starting of the left picture object 1804 causes the right picture object 1806 to stop playing, and its media data is now no longer seen in the playback display 1826. At some point thereafter, when the user clicks 1830 on the right text 1820, then in FIG. 18B-3 the right picture object 1806 starts playing due to the previously programmed relation 1814, and its media data is now seen in the playback display 1826 as the right picture 1824. At the same time, due to the operation of the present function, the starting of the right picture object 1806 causes the left picture object 1804 to stop playing, and its media data is no longer seen in the playback display 1826.

Figure 18C:
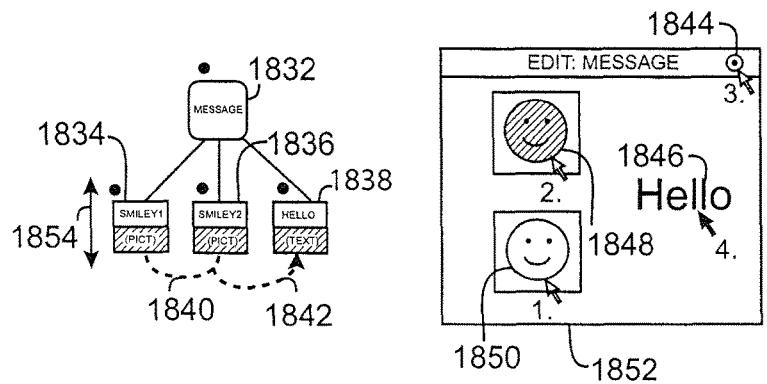
Figure 18D:
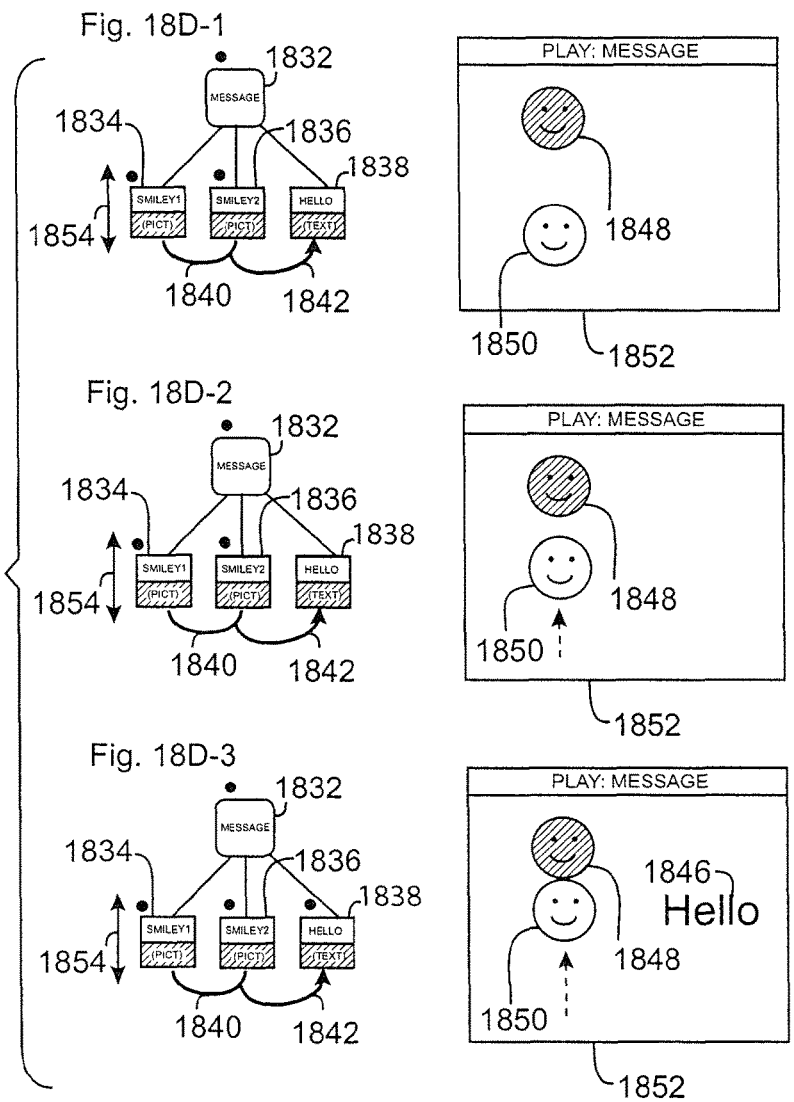

FIGS. 18C-D illustrate programming and operation for the function "objects A and B, upon collision, start object C," according to one embodiment of the present invention. This function is used to provide "hit detection," a feature often seen in video games and other interactive content, in which the onscreen "collision" of two or more objects produces a resulting action. In the example of FIGS. 18C-D, the resulting action is the starting of a third object (object C). In an alternate version of the function (omitted from the figures for space considerations), the resulting action is the stopping rather than the starting of the third object; this alternate version is hereby included as a separate feature of the invention.

FIG. 18C illustrates programming for the function "objects A and B, upon collision, start object C." The figure shows a container object 1832 containing a first picture object 1834, a second picture object 1836 and a text object 1838; the media data of the contained objects 1834, 1836 and 1838 is seen in the playback display 1852 as the lower picture 1850, the upper picture 1848 and the text 1846, respectively. To help illustrate the present function, the first picture object 1834 has some previously programmed time-based object playback behavior 1854 already in place. The time-based playback behavior 1854 represents the "bouncing" effect seen in FIG. 7B, in which the vertical position of an object rises and falls over time. This previous programming is not part of the present function, but is merely provided to exemplify a change in the state of the media data occurring during presentation playback; other forms of media data state change may also be used in conjunction with the present function, such as the tweening functionality of FIGS. 28B and 28D, the starting and stopping of objects, etc.

To program the present function, the user first selects both the lower picture 1850 corresponding to the first picture object 1834 and the upper picture 1848 corresponding to the second picture object 1836 by shift-clicking on them in succession, then clicks on the function command icon 1844, then clicks on the text 1846 corresponding to the text object 1838. As a result of this programming process, a relation 1840 forms between the first picture object 1834 and the second picture object 1836; this relation signifies that the onscreen "collision" of the corresponding media data (1850 and 1848) is the trigger condition for the function, and the absence of an arrowhead on the relation 1840 indicates that the relation is non-directional. Also as a result of the above programming process, a directional relation 1842 forms between the non-directional relation 1840 and the text object 1838; this directional relation signifies that the resulting action of the trigger condition signified by the non-directional relation 1840 is the starting of the text object 1838. Depending on system configuration, certain variations of the above programming may be supported. In one variation, the selecting of the two pictures (1850 and 1848) may be accomplished by other forms of selection rather than shift-clicking on them, such as dragging an outline box around them. In another variation, a separate function command icon is provided which is clicked between (non-shift) clicks on the two pictures (1850 and 1848) to create the non-directional relation 1840. These variations are hereby included as part of the invention, each as a separate feature that may or may not be included depending on system configuration.

FIG. 18D illustrates how the function programmed in FIG. 18C operates during presentation playback. Initially, in FIG. 18D-1, the first picture object 1834 and the second picture object 1836 are playing, and their media data is seen in the playback display 1852 as the lower picture 1850 and the upper picture 1848, respectively. FIG. 18D-2 shows the situation a moment later, in which the previously programmed time-based playback behavior 1854 is changing the vertical position of the lower picture 1850, which is now rising up but has not yet come into contact with the upper picture 1848. Finally, in FIG. 18D-3, the vertical position of the lower picture 1850 has risen high enough so that it touches the upper picture 1848, and due to the operation of the present function, the text object 1838 starts playing and its media data 1846 is now seen in the playback display 1852.

FIGS. 19A-B illustrate programming and operation for the function "container object A, upon starting, starts contained object B," according to one embodiment of the present invention. This example also illustrates the "start propagation exemption" feature discussed in connection with FIGS. 8A-B. Briefly, this feature provides that when an object is programmed to be started by another object, it becomes exempt from the start propagation of FIG. 8A in order to avoid defeating the purpose of the programming. The present example demonstrates both this exemption functionality, and how the exemption can be overridden for particular objects by the present function.

FIG. 19A illustrates programming for the function "container object A, upon starting, starts contained object B." The figure shows a container object 1900 containing a left text object 1904, a left picture object 1906, a right picture object 1908 and a right text object 1910; the media data of the contained objects 1904, 1906, 1908 and 1910 is seen in the playback display 1932 as the left text 1924, the left picture 1928, the right picture 1930 and the right text 1926, respectively. To help illustrate the present function, some previously programmed relations are already in place: the four contained objects 1904, 1906, 1908 and 1910 have been programmed in a "circle" using the function of FIGS. 10A-B ("object A, upon timer expiration, starts object B") as shown by: the relation 1912 between the two left objects 1904 and 1906; the relation 1914 between the two middle objects 1906 and 1908; the relation 1916 between the two right objects 1908 and 1910; and the relation 1918 between the rightmost and leftmost objects 1910 and 1904. This previous programming is not part of the present function, but is merely provided to exemplify a certain problem situation: a number of objects are programmed to start one another, yet the "start propagation exemption" discussed above prevents any of the objects from initially being started to get the process going. One solution for this type of situation is to use the present function to start one of the objects. To program the present function, the user first clicks on the playback display background 1922 corresponding to the container object 1900, then clicks on the function command icon 1920, then clicks on the right picture 1930 corresponding to the right picture object 1908. As a result of this programming process, a relation 1902 forms between the container object 1900 and the right picture object 1908.

FIG. 19B illustrates how the function programmed in FIG. 19A operates during presentation playback, and also illustrates the "start propagation exemption" discussed above. Initially, in FIG. 19B-1, the container object 1900 and its contained objects 1904, 1906, 1908 and 1910 are not playing; the playback display 1932 is empty, and the container start toggle button 1934 (similar to button 808 in FIG. 8A) is turned off. In FIG. 19B-2, the user clicks on the container start toggle button 1934 to make the container object 1900 start playing. Based on the start propagation feature of FIG. 8A, one might expect all the contained objects to start playing; however in this example, the "start propagation exemption" discussed above blocks that propagation for any object programmed to be started by another object (which in this case is all four contained objects due to the previously programmed relations 1912, 1914, 1916 and 1918). Because of this start propagation exemption, three of the contained objects (1904, 1906, 1910) remain turned off. However due to the operation of the present function, the right picture object 1908 starts playing, and its media data is now seen in the playback display 1932 as the right picture 1930 (and now that this first object is playing, the other objects will start playing in sequence according to the previous programming).

FIGS. 19C-D illustrate programming and operation for the function "object A, upon sequence command, starts object B," according to one embodiment of the present invention. A sequence command is a user-initiated command signifying that the presentation playback should go to the next state within a series of specified states; a common usage is seen in the sequencing of slides and slide elements in a typical business slideshow. Depending on system configuration, support for sequence commands can be accomplished using a variety of implementations, such as a command icon (as seen in FIG. 19D), one or more keys on a computer keyboard, a handheld remote device, etc. It should be noted that the programming for the present function is performed twice in FIG. 19C; the first time is from a container to a contained object, and the second time is from one contained object to another. This tandem programming is not inherent to the function, but is rather provided to illustrate both varieties of the function; each of the two varieties shown in FIG. 19C is a complete instance of the present function and a separate feature of the invention.

FIG. 19C shows a container object 1936 containing a text object 1940 and a picture object 1944; the media data of the contained objects 1940 and 1944 is seen in the playback display 1954 as the text 1948 and the picture 1950, respectively. To program the first instance of the present function, the user first clicks on the background 1952 of the playback display 1954 which corresponds to the container object 1936 (depending on system configuration, other mechanisms for indicating the container object may be supported), then clicks on the function command icon 1946, then clicks on the text 1948 corresponding to the text object 1940. As a result of this programming process, a relation 1938 forms between the container object 1936 and the text object 1940. To program the second instance of the present function, the user first clicks on the text 1948 corresponding to the text object 1940 (depending on system configuration, this step may be omitted when chaining multiple instances of the present function), then clicks on the function command icon 1946, then clicks on the picture 1950 corresponding to the picture object 1944. As a result of this programming process, a relation 1942 forms between the text object 1940 and the picture object 1944.

FIG. 19D illustrates how the two instances of the function programmed in FIG. 19C operate during presentation playback. Initially, in FIG. 19D-1, neither the text object 1940 nor the picture object 1944 is playing, as indicated by the empty playback display 1954. When the user initiates a sequence command by clicking on the sequence command icon 1956, then in FIG. 19D-2 the text object 1940 starts playing due to the operation of the first instance of the present function, and its media data is now seen in the playback display 1954 as the text 1948. When the user again initiates a sequence command by clicking on the sequence command icon 1956, then in FIG. 19D-3 the picture object 1944 starts playing due to the operation of the second instance of the present function, and its media data is now seen in the playback display 1954 as the picture 1950.

FIGS. 19E-F illustrate programming and operation for the function "object A tweens to object B," according to one embodiment of the present invention. The tweening behavior shown in this example is a process by which display settings (and other characteristics depending on system configuration) of a stopping object are gradually transitioned to those of a starting object; the tweening functionality of the present invention is detailed in connection with FIGS. 28B-D. In the present example, the focus is on the programming by which the tweening behavior is established (rather than on the implementation by which the tweening behavior is accomplished); the programming shown in the present example can be used to create various forms of tweening behavior (depending on system configuration), such as those discussed in connection with FIGS. 28B-D.

FIG. 19E shows a container object 1960 containing a left text object 1964 and a right text object 1970; the media data of the contained objects 1964 and 1970 is seen in the playback display 1978 as the left text 1972 and the right text 1976, respectively. To program the present function, the user first clicks on the left text 1972 corresponding to the left text object 1964, then clicks on the function command icon 1974, then clicks on the right text 1976 corresponding to the right text object 1970. As a result of this programming process, a tween indicator 1962 and two relations 1966 and 1968 form between the two objects 1964 and 1970 (the two relations 1966 and 1968 are similar to those seen in FIG. 28D; briefly, they specify that upon expiration of a timer, the left object 1964 stops and the right object 1970 starts).

FIG. 19F illustrates how the function programmed in FIG. 19E operates during presentation playback. Initially, in FIG. 19F-1, the left text object 1964 is playing and its media data is seen in the playback display 1978 as the text 1972. FIG. 19F-2 shows the situation some period of time later, after the programmed behavior (1962, 1966, 1968) has initiated a tweening process (which is now partially complete). The two text objects 1964 and 1970 are in a state of tweening from one to the other, as indicated by the partially active state of their play indicators 1982 and 1984. The text 1980 seen in the playback display 1978 is a product of this tweening process, and is at a mid-point in terms of position and size between the text of FIG. 19F-1 (the starting point) and the final text that will be displayed when the tweening is finished. In FIG. 19F-3, the tweening process has finished; the left text object 1964 has now stopped, and the right text object 1970 is playing and its media data is seen in the playback display 1978 as the text 1976.

FIGS. 20A-B illustrate programming and operation for the function "object A, when clicked, stops itself and starts object B," according to one embodiment of the present invention. This function is an example of a "consolidated" function: its operation is the same as that of the two-function "compound sentence" seen in FIGS. 21A-B. Depending on system configuration, other "consolidated" functions may be provided as discussed earlier.

FIG. 20A illustrates programming for the function "object A, when clicked, stops itself and starts object B." The figure shows a container object 2000 containing a text object 2002 and a picture object 2008; the media data of the contained objects 2002 and 2008 is seen in the playback display 2016 as the text 2012 and the picture 2014, respectively. To program the function, the user first clicks on the text 2012 corresponding to the text object 2002, then clicks on the function command icon 2010, then clicks on the picture 2014 corresponding to the picture object 2008. As a result of this programming process, a relation 2004 forms between the text object 2002 and itself, and another relation 2006 forms between the text object 2002 and the picture object 2008.

FIG. 20B illustrates how the function programmed in FIG. 20A operates during presentation playback. Initially, in FIG. 20B-1, the text object 2002 is playing and its media data is seen in the playback display 2016 as the text 2012. When the user clicks 2018 on the text 2012, then in FIG. 20B-2 the text object 2002 stops playing (and its media data is no longer seen in the playback display 2016), and the picture object 2008 starts playing (and its media data is now seen in the playback display 2016 as the picture 2014).

FIGS. 21A-B illustrate programming and operation for a two-function "compound sentence" consisting of a first function "object A, when clicked, stops itself" and a second function "object A, when clicked, starts object B," according to one embodiment of the present invention. An overall explanation of compound sentence programming was provided earlier; for the compound sentence of the present example, a "stop action" (as seen in FIG. 12) and a "start action" (as seen in FIGS. 9A-B) are joined together by the user during the programming process so that the "subject of the start action" does double duty as the "object of the stop action."

FIG. 21A illustrates programming for the compound sentence of the present example. The figure shows a container object 2100 containing a text object 2102 and a picture object 2108; the media data of the contained objects 2102 and 2108 is seen in the playback display 2116 as the text 2112 and the picture 2114, respectively. To program the function, the user first clicks on the text 2112 corresponding to the text object 2102, then clicks on the left function command icon 2110 (the "stop action"), then clicks on the right function command icon 2111 (the "start action"), then clicks on the picture 2114 corresponding to the picture object 2108. As a result of this programming process, a relation 2104 forms between the text object 2102 and itself, and another relation 2106 forms between the text object 2102 and the picture object 2108.

FIG. 21B illustrates how the compound sentence programmed in FIG. 21A operates during presentation playback. Initially, in FIG. 21B-1, the text object 2102 is playing and its media data is seen in the playback display 2116 as the text 2112. When the user clicks 2118 on the text 2112, then in FIG. 21B-2 the text object 2102 stops playing (and its media data is no longer seen in the playback display 2116), and the picture object 2108 starts playing (and its media data is now seen in the playback display 2116 as the picture 2114).

FIGS. 22A-B illustrate programming and operation for a two-function "compound sentence" consisting of a first function "object A, when clicked, starts object B" and a second function which is a "new picture" function, according to one embodiment of the present invention. An overall explanation of compound sentence programming was provided earlier; for the compound sentence of the present example, a "start action" (as seen in FIGS. 9A-B) and an "object creation action" (as seen in FIG. 2B: "new picture") are joined together by the user during the programming process so that the "object of the start action" is created as a result of the programming process.

FIG. 22A illustrates programming for the compound sentence of the present example. The figure shows a container object 2200 which initially contains just a text object 2202; the media data of this text object 2202 is seen in the playback display 2218 as the text 2212. To program the function, the user first clicks on the text 2212 corresponding to the text object 2202, then clicks on the left function command icon 2208 (the "start action"), then clicks on the right function command icon 2210 (the "object creation action"), then clicks on a desired spot 2216 in the playback display 2218 causing a new picture 2214 to appear there (in this case an empty rectangle). As a result of this programming process, a new picture object 2206 corresponding to the new picture 2214 is created in the container object 2200, and a relation 2204 forms between the text object 2202 and the new picture object 2206.

FIG. 22B illustrates how the compound sentence programmed in FIG. 22A operates during presentation playback. Initially, in FIG. 22B-1, the text object 2202 is playing and its media data is seen in the playback display 2218 as the text 2212. When the user clicks 2220 on the text 2212, then in FIG. 22B-2 the picture object 2206 starts playing and its media data is now seen in the playback display 2218 as the picture 2214.

FIGS. 23A-B illustrate programming and operation for a three-function "compound sentence" consisting of a first function "object A, when clicked, stops itself," a second function "object A, upon stopping, starts object B" and a third function which is a "duplicate" function, according to one embodiment of the present invention. An overall explanation of compound sentence programming was provided earlier; for the compound sentence of the present example, a "stop action" (as seen in FIG. 12), a "start action" (as seen in FIG. 13) and an "object creation action" (similar to the "duplicate" function of FIG. 2D except that it takes place within a single playback display) are joined together by the user during the programming process so that the "subject of the start action" does double duty as the "object of the stop action" and the "object of the start action" is created as a result of the programming process.

FIG. 23A illustrates programming for the compound sentence of the present example. The figure shows a container object 2300 which initially contains just a left text object 2302; the media data of this text object 2302 is seen in the playback display 2322 as the left text 2316. To program the function, the user first clicks on the left text 2316 corresponding to the left text object 2302, then clicks on the left function command icon 2310 (the "stop action"), then clicks on the middle function command icon 2312 (the "start action"), then clicks on the right function command icon 2314 (the "object creation action"), then clicks on a desired spot 2320 in the playback display 2322 causing new text 2318 (a copy of the left text 2316) to appear there. As a result of this programming process, a new text object 2308 corresponding to the new text 2318 is created in the container object 2300, a first relation 2304 forms between the left text object 2302 and itself, and another relation 2306 forms between the left text object 2302 and the new text object 2308.

FIG. 23B illustrates how the compound sentence programmed in FIG. 23A operates during presentation playback. Initially, in FIG. 23B-1, the left text object 2302 is playing and its media data is seen in the playback display 2322 as the left text 2316. When the user clicks 2324 on the left text 2316, then in FIG. 23B-2 the left text object 2302 stops playing (and its media data is no longer seen in the playback display 2322), and the new text object 2308 starts playing (and its media data is now seen in the playback display 2322 as the new text 2318).

Figure 24A:
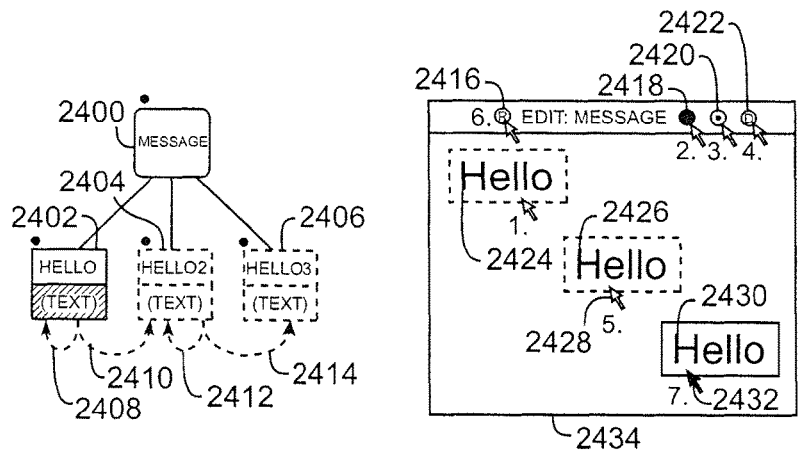
Figure 24B:
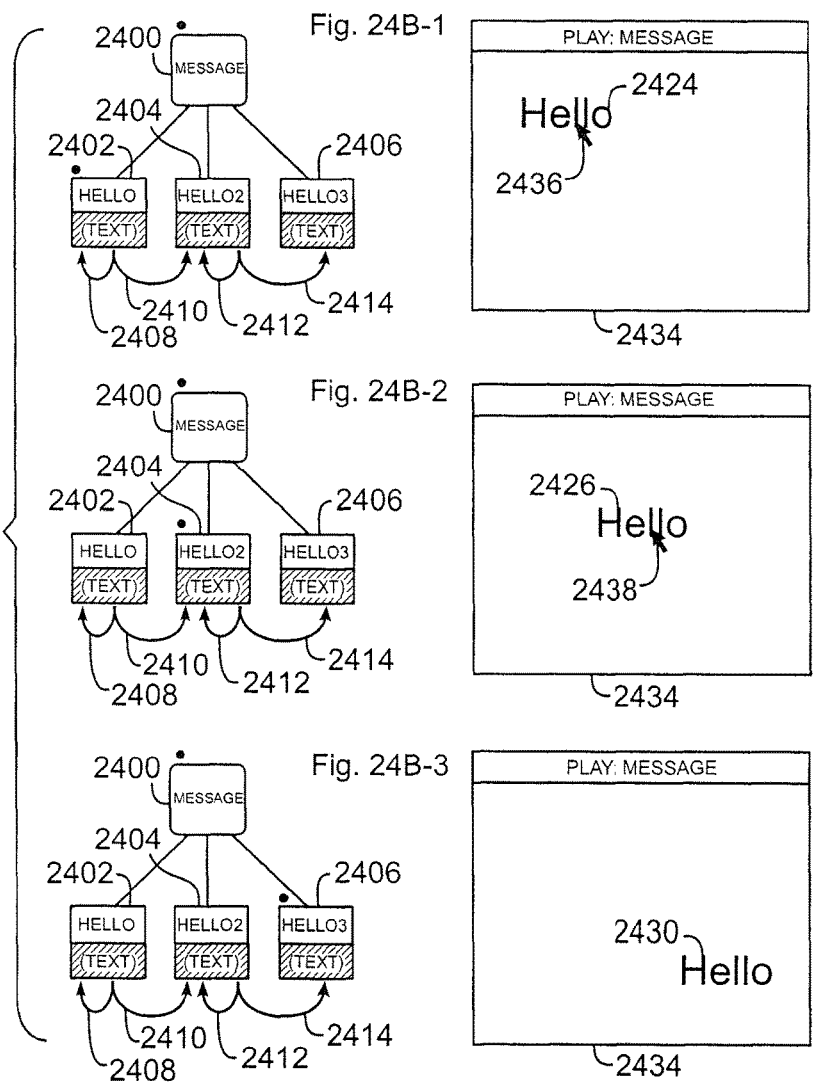

FIGS. 24A-B illustrate programming and operation of the "command repeat" function, according to one embodiment of the present invention. The command repeat function is an efficient way to repeat whatever programming function was most recently executed; it reduces programming overhead for frequently used functions, providing more streamlined authoring and increased authoring speed. When the command repeat function is triggered by the user, the previously executed function is repeated, except for the final selection of either an object or a display background location (as per the specific previous function involved); once the user makes the final selection, the repeated function is complete. The functions which can be repeated by the command repeat function include any of the functions of the sentence paradigm (including compound sentences and consolidated functions). When a function is repeated via the command repeat function, the "object B" of the previous execution becomes the "object A" of the repeated execution; this is seen in the following example, in which the three-function compound sentence just shown in FIGS. 23A-B is repeated via the command repeat function (note that this example involves the most complex programming function seen so far; of course other less complex functions can also be repeated in a similar fashion). In the following example, the command repeat function is triggered by selecting a command icon; depending on implementation, the command repeat function may also be triggered in other ways, such as by pressing a key on the keypad (for example the "ctrl" key), etc.

FIG. 24A illustrates the programming previously seen in FIG. 23A, and subsequently, the use of the command repeat function to produce another instance of that programming. Recall from the above discussion of FIG. 23A that the compound sentence shown in that example consists of a first function "object A, when clicked, stops itself," a second function "object A, upon stopping, starts object B" and a third function "duplicate," which are joined together by the user during the programming process so that the "subject of the start action" does double duty as the "object of the stop action" and the "object of the start action" is created as a result of the programming process. The present example begins with the same programming process.

FIG. 24A shows a container object 2400 which initially contains just a left text object 2402; the media data of this text object 2402 is seen in the playback display 2434 as the left text 2424. To program the function which will subsequently become the "previous" function for the command repeat function, the user first clicks on the left text 2424 corresponding to the left text object 2402, then clicks on the left function command icon 2418 (the "stop action"), then clicks on the middle function command icon 2420 (the "start action"), then clicks on the right function command icon 2422 (the "object creation action"), then clicks on a desired spot 2428 in the playback display 2434 causing new text 2426 (a copy of the left text 2424) to appear there. As a result of this programming process, a new text object 2404 corresponding to the new text 2426 is created in the container object 2400, a first relation 2408 forms between the left text object 2402 and itself, and a second relation 2410 forms between the left text object 2402 and the new text object 2404.

Next, to repeat the above programming using the command repeat function, the user first clicks on the command repeat icon 2416, then clicks on a desired spot 2432 in the playback display 2434 causing a second piece of new text 2430 (a copy of the earlier new text 2426) to appear there. As a result of this use of the command repeat function, a second new text object 2406 corresponding to the second new text 2430 is created in the container object 2400, a first relation 2412 forms between the earlier new text object 2404 and itself, and a second relation 2414 forms between the earlier new text object 2404 and the second new text object 2406.

FIG. 24B illustrates how the two instances of the compound sentence which were programmed in FIG. 24A operate during presentation playback. Initially, in FIG. 24B-1, the left text object 2402 is playing and its media data is seen in the playback display 2434 as the left text 2424. When the user clicks 2436 on the left text 2424, then in FIG. 24B-2 the left text object 2402 stops playing (and its media data is no longer seen in the playback display 2434), and the middle text object 2404 that was the first object created in FIG. 24A starts playing (and its media data is now seen in the playback display 2434 as the middle text 2426). At some point thereafter, when the user clicks 2438 on the middle text 2426, then in FIG. 24B-3 the middle text object 2404 stops playing (and its media data is no longer seen in the playback display 2434), and the right text object 2406 that was the second object created in FIG. 24A starts playing (and its media data is now seen in the playback display 2434 as the right text 2430).

FIGS. 25A-B illustrate programming and operation for the function "video object A, upon reaching cue point, starts object B," according to one embodiment of the present invention. This function is similar to the function of FIGS. 10A-B ("object A, upon timer expiration, starts object B"), except that the action of the function, instead of being triggered when a countdown timer expires, is triggered when video playback for the video object A reaches the same point it was at when the present function was programmed (the "cue point").

Also, depending on system configuration, two alternate versions of the function of FIGS. 25A-B may be provided for either or both of sound objects and vector objects: "sound object A, upon reaching cue point, starts object B" and "vector object A, upon reaching cue point, starts object B" (vector objects are detailed in connection with FIG. 28A). Like the video version of the present example, each of these two alternate versions of the function is an independent feature of the invention that may or may not be included in any given system configuration. The only significant difference between the video version shown in the present example and the versions for sound objects and vector objects is that in the versions for sound objects and vector objects, the selection of "object A" is not accomplished by clicking on media data seen in the playback display (since sound objects and vector objects do not have media data that is seen in the playback display); rather, the selection of "object A" is accomplished by selecting a representation of the desired sound object or vector object, such as by clicking on an object icon in a control display, etc.

Moreover, depending on system configuration, three more functions may be provided which are similar to the function of FIGS. 25A-B and its sound object and vector object variations: (1) "video object A, upon reaching cue point, stops object B," (2) "sound object A, upon reaching cue point, stops object B," and (3) "vector object A, upon reaching cue point, stops object B." Each of these functions is an independent feature of the invention that may or may not be included in any given system configuration. The programming for each of these functions is the same as the programming for its corresponding "starts object B" function; the operation of each of these functions differs from its corresponding "starts object B" function in that the action of the function is to stop rather than start "object B" when playback for "object A" reaches the specified cue point.

FIG. 25A illustrates programming for the function "video object A, upon reaching cue point, starts object B." FIG. 25A-1 shows a container object 2500 containing a video object 2502 and a picture object 2504; the media data of the video object 2502 is seen playing in the playback display 2510 as the video 2506, and the media data of the picture object 2504 is seen as the picture 2508. FIG. 25A-2 shows the same set of objects a moment later, and the video 2506 playing in the playback display 2510 is now further along in its playback (as seen by the waving hand 2507). At this moment, having decided that an appropriate "cue point" has been reached, the user pauses the video by clicking on the edit mode command icon 2512 (similar to icon 130 in FIG. 1B). Of course this is just one possible way for the user to select a "cue point," and depending on system configuration, other approaches may be used, such as controlling video playback using tape-recorder-style "transport controls" (play, pause, etc.), setting the playback position by dragging a "position slider," adjusting the position by pressing "nudge buttons," etc. With the video now paused at the desired "cue point," the user programs the present function as follows. In FIG. 25A-3, the user first clicks on the video 2506 corresponding to the video object 2502, then clicks on the function command icon 2516, then clicks on the picture 2508 corresponding to the picture object 2504. As a result of this programming process, a relation 2514 forms between the two objects 2502 and 2504.

FIG. 25B illustrates how the function programmed in FIG. 25A operates during presentation playback. Initially, in FIG. 25B-1, the video object 2502 is playing and its media data is seen playing in the playback display 2510 as the video 2506. In FIG. 25B-2, at the moment when the video 2506 reaches its previously selected "cue point" as shown by the waving hand 2507, the picture object 2504 starts playing and its media data is now seen in the playback display 2510 as the picture 2508.

Figure 26C:
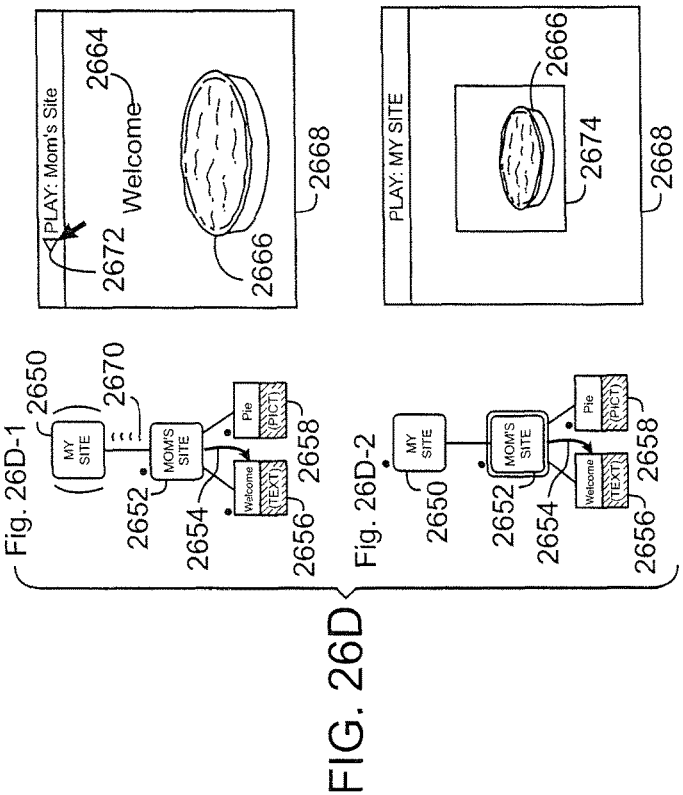
Figure 26D:
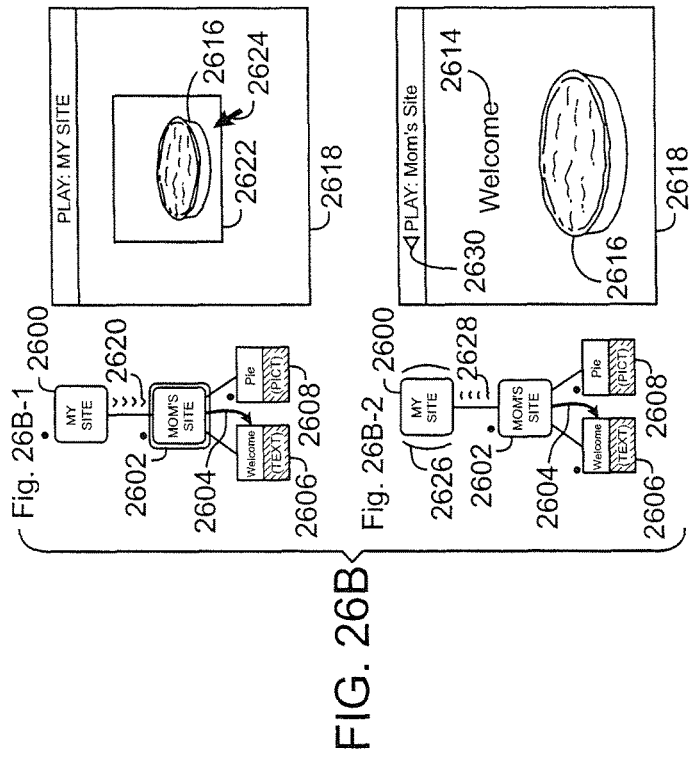
Figure 26A:
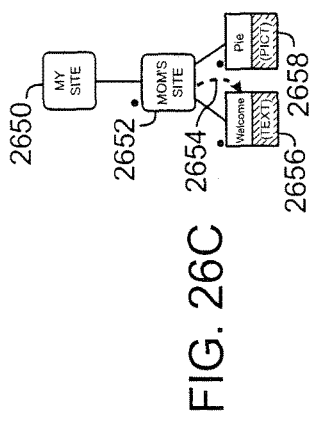
Figure 26B:
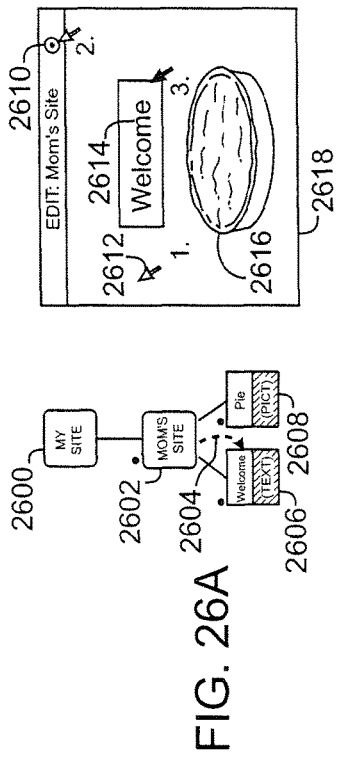

FIGS. 26A-B illustrate programming and operation for the function "container object A, upon navigation into sub-display, starts contained object B," according to one embodiment of the present invention. This function depends upon three additional features of the invention: (1) hierarchically nested container objects, detailed in connection with FIGS. 32A-B; (2) user navigation through the hierarchical presentation data, detailed in connection with FIGS. 38A-B; and (3) sub-display functionality, detailed in connection with FIGS. 40 through 45C. Briefly, the sub-display functionality of the present invention involves an association between container objects and nested sub-displays in the playback display, whereby media data of objects contained in a container object is displayed within the sub-display associated with the container object. This sub-display functionality may be used in conjunction with the navigation functionality of the invention so that users can "navigate" into and back from these sub-displays. Using the present function, a specific object can be programmed so that it starts playing when the user navigates into the sub-display associated with the object's containing container.

FIG. 26A illustrates programming for the function "container object A, upon navigation into sub-display, starts contained object B." The figure shows an upper container object 2600 containing a nested container object 2602 which in turn contains a text object 2606 and a picture object 2608. The playback display 2618 is presenting the contents of the nested container object 2602 to the user for editing, and the media data of its contained objects 2606 and 2608 is seen in the playback display 2618 as the text 2614 and the picture 2616, respectively. To program the function, the user first clicks on the background 2612 of the playback display 2618 corresponding to the nested container object 2602, then clicks on the function command icon 2610, then clicks on the text 2614 corresponding to the text object 2606. As a result of this programming process, a relation 2604 forms between the nested container object 2602 and the text object 2606.

FIG. 26B illustrates how the function programmed in FIG. 26A operates during presentation playback. Initially, in FIG. 26B-1, the upper container object 2600 is playing and within it the nested container object 2602 is playing and is associated (as indicated by its double outline) with a sub-display 2622 seen within the playback display 2618. Within the nested container object 2602 in turn, the picture object 2608 is playing and its media data is seen in the playback display 2618 as the picture 2616 displayed within the sub-display 2622. At some point the user double-clicks 2624 on the sub-display 2622, initiating navigation 2620 (navigation using sub-displays is discussed in detail in connection with FIGS. 40 through 45C). As a result of the navigation, in FIG. 26B-2 the upper container object 2600 stops playing and becomes dormant 2626 pending "back navigation" (2628, 2630), and the nested container object 2602 begins playing without an associated sub-display (as indicated by its now single outline). At the same time, due to the operation of the present function, the text object 2606 starts playing and its media data is now seen in the playback display 2618 as the text 2614. The picture object 2608 continues to play, and its media data is seen in the playback display 2618 as the picture 2616, now no longer in a sub-display due to the navigation.

FIGS. 26C-D illustrate programming and operation for the function "container object A, upon navigation back from sub-display, stops contained object B," according to one embodiment of the present invention. This function depends upon the same three additional features of the invention as the function of FIGS. 26A-B, above. Using the present function, a specific object can be programmed so that it stops playing when the user navigates back from the sub-display associated with the object's containing container.

FIG. 26C illustrates programming for the function "container object A, upon navigation back from sub-display, starts contained object B." The figure shows an upper container object 2650 containing a nested container object 2652 which in turn contains a text object 2656 and a picture object 2658. The playback display 2668 is presenting the contents of the nested container object 2652 to the user for editing; the media data of its contained objects 2656 and 2658 is seen in the playback display 2668 as the text 2664 and the picture 2666, respectively. To program the function, the user first clicks on the background 2662 of the playback display 2668 corresponding to the nested container object 2652, then clicks on the function command icon 2660, then clicks on the text 2664 corresponding to the text object 2656. As a result of this programming process, a relation 2654 forms between the nested container object 2652 and the text object 2656.

FIG. 26D illustrates how the function programmed in FIG. 26C operates during presentation playback. Initially, in FIG. 26D-1, the situation is similar to the situation of FIG. 26B-2: the upper container object 2650 is dormant pending "back navigation," the nested container object 2652 is playing without an associated sub-display, and its contained objects 2656 and 2658 are playing and their media data is seen in the playback display 2668 as the text 2664 and the picture 2666, respectively. At some point the user clicks the "back" button 2672, initiating back navigation 2670. As a result of the back navigation, in FIG. 26D-2 the upper container object 2650 starts playing and the nested container object 2652 begins playing with an associated sub-display (as indicated by its double outline). At the same time, due to the operation of the present function, the text object 2656 stops playing and its media data is no longer seen in the playback display 2668. The picture object 2658 continues to play, and its media data is seen in the playback display 2668 as the picture 2666, now shown within the sub-display 2674 associated with the nested container object 2652.

FIGS. 26E-F illustrate programming and operation for the function "object A, when clicked, initiates container transition," according to one embodiment of the present invention. The container transition provided by this function has four different forms, any or all of which may be supported depending on system configuration. In the first form (shown in the present example), the container transition provides a progression through a sequence of containers, such as might be provided in a slideshow. The second form is similar to the first except that the directionality of the progression is reversed from "next container" to "previous container." In the third form, the container transition provides sub-display navigation (the programming for this form differs slightly from the others in that the last step is the clicking of a sub-display rather than the clicking of a command icon); sub-display navigation is detailed in connection with FIGS. 43-45. In the fourth form, the container transition provides back navigation; back navigation is detailed in connection with FIGS. 38-39 and 43-45.

FIG. 26E illustrates programming for the function "object A, when clicked, initiates container transition." The figure shows a container object 2676 which contains a left container object 2680 and a right container object 2682. The left container object 2680 contains a text object 2686, and the right container object 2682 contains a picture object 2688. The left and right containers 2680 and 2682 are configured in a sequence, as shown by the sequence indicator 2678. The left container object 2680 and its contained text object 2686 are playing, and the latter's media data is seen in the playback display 2696 as the text 2694. To program the function, the user first clicks on the text 2694 corresponding to the text object 2686, then clicks on the function command icon 2690, then clicks on the sequence command icon 2692. As a result of this programming process, a relation 2684 forms between the text object 2686 and its container 2680.

FIG. 26F illustrates how the function programmed in FIG. 26E operates during presentation playback. Initially, in FIG. 26F-1, the left container 2680 and its contained object 2686 are playing, and the latter's media data is seen in the playback display 2696 as the text 2694. When the user clicks 2698 on the text 2694, then in FIG. 26F-2 the left container 2680 and its contained text object 2686 stop playing, and the right container 2682 and its contained picture object 2688 start playing; the media data of the picture object 2688 is seen in the playback display 2696 as the picture 2699.

FIGS. 26G-H illustrate programming and operation for the function "object A, when clicked, changes attribute of object B," according to one embodiment of the present invention. In this example, the attribute being changed (enabled in this case) is time-based playback behavior that results in a "bouncing" effect such as that seen in FIG. 7B, in which the vertical position of an object rises and falls over time. The use of this specific attribute is not an inherent part of the present function, but is merely intended to exemplify a change in the state of an object attribute during presentation playback; depending on system configuration, the changing of other object attributes (including disabling them and setting them to particular values) may be supported.

FIG. 26G shows a container object 2601 containing a text object 2603 and a picture object 2607; the media data of the contained objects 2603 and 2607 is seen in the playback display 2617 as the text 2611 and the picture 2615, respectively. The picture object 2607 has previously been programmed with time-based playback behavior 2609. To program the present function, the user first clicks on the text 2611 corresponding to the text object 2603, then clicks on the function command icon 2613, then clicks on the picture 2615 corresponding to the picture object 2607. As a result of this programming process, a relation 2605 forms between the two objects 2603 and 2607.

FIG. 26H illustrates how the function programmed in FIG. 26G operates during presentation playback. Initially, in FIG. 26H-1, the text object 2603 and the picture object 2607 are playing and their media data is seen in the playback display 2617 as the text 2611 and the picture 2615. The picture object 2607 is not currently exhibiting the previously programmed time-based playback behavior, as shown by the dotted line representing the behavior 2609. When the user clicks 2619 on the text 2611, then in FIG. 26H-2 the time-based playback behavior has become enabled, as indicated by the solid line representing the behavior 2609 and by the now higher vertical position of the picture 2615 in the playback display 2617.

Figure 27A:
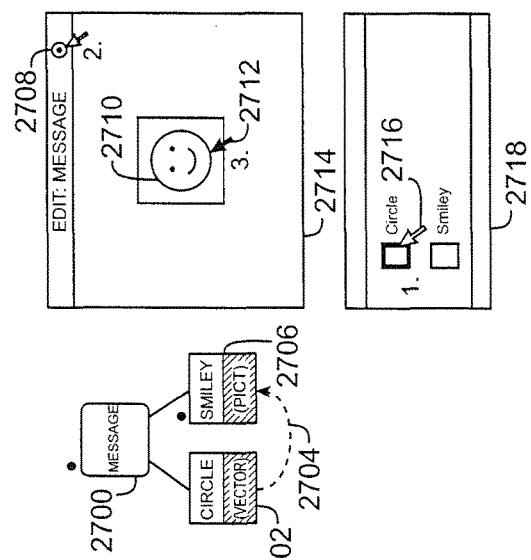
Figure 27B:
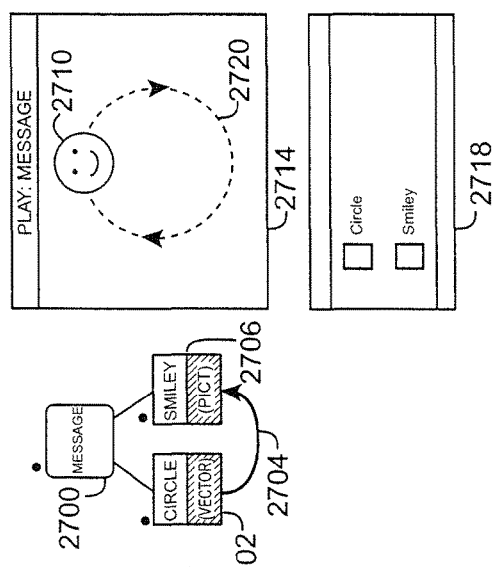

FIGS. 27A-B illustrate programming and operation for the function "vector object A controls the position of object B," according to one embodiment of the present invention. This function depends upon support for vector objects, which are described at length in connection with FIG. 28A. In FIGS. 27A-B, the exemplary vector object shown does not have media data that can be seen (and selected) in the playback display, and therefore a control display is provided for the part of the programming process where the vector object is selected; control displays are not required however, and depending on implementation, other approaches may be effective for selecting vector objects.

FIG. 27A illustrates programming for the function "vector object A controls the position of object B." The figure shows a container object 2700 containing a vector object 2702 and a picture object 2706; the media data of the picture object 2706 is seen in the playback display 2714 as the picture 2710. Below the playback display is a control display 2718 presenting the container object 2700 and its contents (control displays are discussed at length in connection with FIGS. 29A through 30B). To program the function, the user first clicks on the vector object icon 2716 (which represents the vector object 2702), then clicks on the function command icon 2708, then clicks 2712 on the picture 2710 corresponding to the picture object 2706. As a result of this programming process, a relation 2704 forms between the two objects 2702 and 2706.

FIG. 27B illustrates how the function programmed in FIG. 27A operates during presentation playback. The vector object 2702 and the picture object 2706 are playing, and the media data of the picture object 2706 is seen in the playback display 2714 as the picture 2710. Due to the operation of the vector object, which produces (in this case) two channels of time-varying output which have been mapped via the present function to control the x-position and y-position of the picture object 2706, the picture 2710 displayed in the playback display 2714 moves in a circular motion 2720; this motion either stops after once around the circle, or, if the vector object has been set to "loop," the motion continues until either or both objects are stopped.

Figure 27C:
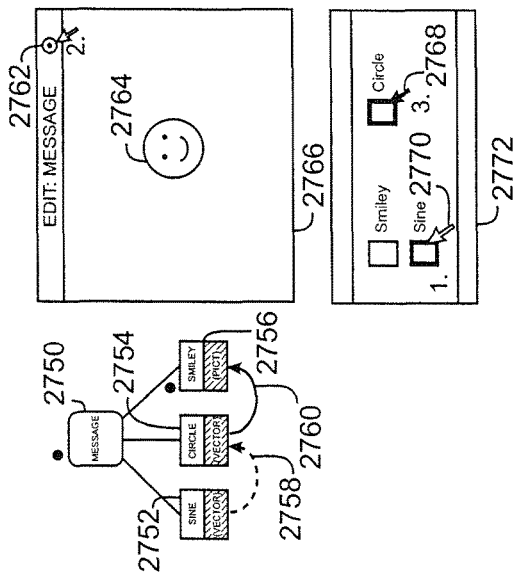
Figure 27D:
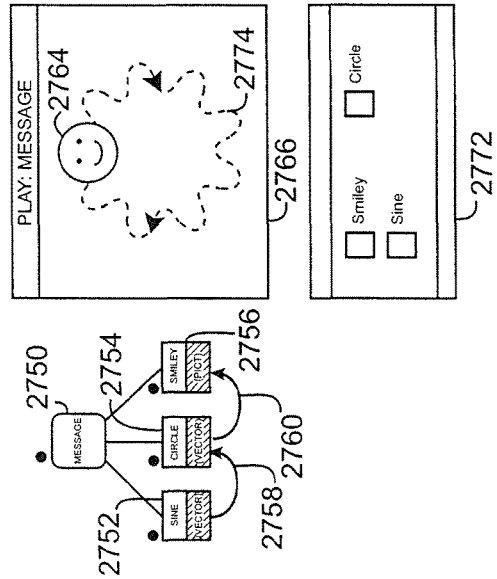

FIGS. 27C-D illustrate programming and operation for the function "vector object A controls the scale of vector object B," according to one embodiment of the present invention. Like the previous example of FIGS. 27A-B, this function depends upon support for vector objects, and the related considerations in this case are the same as in that previous example.

FIG. 27C illustrates programming for the function "vector object A controls the scale of vector object B." The figure shows a container object 2750 containing a left vector object 2752, a right vector object 2754 and a picture object 2756; the media data of the picture object 2756 is seen in the playback display 2766 as the picture 2764. Below the playback display is a control display 2772 presenting the container object 2750 and its contents. To help illustrate the present function, a previously programmed relation is already in place: the right vector object 2754 and the picture object 2756 have been programmed with the function of FIGS. 27A-B ("vector object A controls the position of object B"), as shown by the relation 2760. This previous programming is not part of the present function, but is merely provided as a reference for the operation of the objects involved; in this example, without the present function, presentation playback of the right vector object and picture object would produce the same results seen in FIG. 27B. To program the present function, the user first clicks 2770 on the left vector object icon (which represents the left vector object 2752), then clicks on the function command icon 2762, then clicks 2768 on the right vector object icon corresponding to the right vector object 2754. As a result of this programming process, a relation 2758 forms between the two vector objects 2752 and 2754.

FIG. 27D illustrates how the function programmed in FIG. 27C operates during presentation playback. All of the objects are playing, and the media data of the picture object 2756 is seen in the playback display 2766 as the picture 2764. Due to the operation of the right vector object, which produces (as in FIG. 27B) two channels of time-varying output which have been mapped via the previous programming 2760 to the x-position and y-position of the picture object 2756, the picture 2764 displayed in the playback display 2766 moves in a circular motion. However, unlike in FIG. 27B, the left vector object 2752 produces one channel of time-varying output which has been mapped via the present function to control the "scale" of the right vector object 2754; this scale setting determines the overall scale of the vector object output. In the present example, the left vector object 2752 contains a looping sine wave function that produces a repeated raising and lowering of the vector object output; when mapped to the scale of the right vector object 2754, this sine wave function affects the degree of "displacement" that the picture 2764 exhibits as compared to its original position shown in FIG. 27C. The result is that the overall motion produced by the right vector object 2754 is circular as before, but due to the operation of the left vector object 2752, the picture 2764 follows a "winding" path 2774 around the overall circle.

DYNAMIC PARAMETER MODIFICATION—FIGS. 28A-D illustrate dynamic modification of object parameters using "vector objects" and "tweening." Vector objects, shown in FIG. 28A, are a special object type that generates one or more time-variant data sources, such as dynamic gestures, which can be routed to one or more target objects to cause their display settings (or other parameters) to vary over time. Tweening, shown in FIGS. 28B-D, is programmed object behavior in which one or more objects is stopping, and one or more corresponding objects is starting, and the display settings for the one or more stopping objects gradually transition to the display settings for the one or more starting objects, resulting in a dynamic and smooth transition. Vector objects and tweening are each independent features of the invention that may or may not be included in any given system configuration.

The functionality illustrated in FIGS. 28A-D generally provides the advantage of enabling authors to create more lively and entertaining multimedia content with less effort. Vector objects, being independent objects whose dynamic control data can be triggered at will, routed to different target objects (including other vector objects), combined, processed, etc., provide more flexible and powerful dynamic control than is typically available without the complexities of scripting. Tweening, which is provided as time-based processing independent of whether or not the tweening objects are arranged within a timeline, provides the advantage of greater ease and flexibility for creating smooth and fluid transitions within presentations. Moreover, both vector objects and tweening, when used in conjunction with other features of the invention, such as editing display settings, time-based playback behavior, functions of the sentence paradigm, sub-displays, etc., result in still further advantages in terms of allowing authors to create more dynamic and sophisticated multimedia content with less effort.

Before describing the vector object example shown in FIG. 28A, some general points about vector objects in the present invention should be noted, all of which depend on system configuration. First, the number of "channels" of dynamic control data provided in vector objects may vary. Second, the methods used for creating dynamic control data in vector objects may vary, and can include "gesture recording" by the user, drawing of function curves on a graph, various algorithms, etc. Third, the methods used for establishing the routing of dynamic control data from vector objects to target objects may vary, and can include programming functions of the sentence paradigm such as those discussed in connection with FIGS. 27A-D, as well as various other programming methods. Fourth, the various target object types and target parameters which are controllable by vector objects may vary; target object types can include text, pictures, videos, containers with sub-display enabled and vector objects, and target parameters can include any of the display settings of FIGS. 4A-6B (position, size, color, transparency, rotation, stretch, cropping, shape and softness) as well as the vector object parameters noted below. Fifth, provisions may be made within vector objects and/or within target objects and/or via independent intermediate objects for processing and/or managing dynamic control data, such as scaling it, offsetting it, inverting it, changing its speed, making it loop, etc. Finally, various vector object parameters such as speed, scale, playback position, etc., may themselves be made the target of dynamic data from another or the same vector object, producing complex dynamic results.

FIG. 28A illustrates the operation of an exemplary vector object, according to one embodiment of the present invention. FIG. 28A-1 shows a container object 2800 containing a picture object 2802, a vector object 2804 and a text object 2806. The media data of the picture object 2802 is seen in the playback display 2816 as the picture 2812, and the media data of the text object 2806 is seen as the text 2814. Two dynamic data outputs from the vector object 2804 have previously been programmed as shown by the left relation 2808 routed to the picture object 2802 to control its vertical position, and the right relation 2810 routed to the text object 2806 to control its vertical stretch. In this example, both dynamic data outputs 2808 and 2810 share a common "channel" of dynamic control data from the vector object 2804, shown to the left in the vector output graph 2818 as a function of time (in this case an upward sloping linear function 2820). Time indicator 2822, called "now," corresponds to the current moment in time as seen in the playback display 2816. As time passes, the dynamic data output from the vector object 2804 increases in value, causing the displayed media data of the picture object 2802 and the text object 2806 to change continuously.

The results of this change can be seen in FIG. 28A-2. The time indicator 2822 now indicates that the dynamic data output of the vector object 2804 has reached its maximum value 2826. In the playback display 2816, the picture 2812 corresponding to the picture object 2802 is now at a higher vertical position than it was initially 2824, and the text 2814 corresponding to the text object 2806 is now stretched in the vertical dimension. Other examples of the operation of vector objects may be found in FIGS. 27A-D and the accompanying text.

Before describing the examples of tweening shown in FIGS. 28B-D, some general points about the tweening functionality of the present invention should be noted. First, any programmed object behavior that results in simultaneous stopping of one or more objects and starting of one or more other objects can provide an appropriate context for tweening. Second, while such programmed behavior is a requirement, there is no requirement as to the manner in which the behavior is programmed or implemented. Third, depending on system configuration, a variety of methods may be used for enabling tweening between particular objects, such as automatically enabling it when certain programming procedures are used, making it a per object option under user control, etc. Fourth, depending on system configuration, the various object display settings affected by tweening can include any or all of the display settings of FIGS. 4A through 6B (position, size, color, transparency, rotation, stretch, cropping, shape and softness). Fifth, depending on system configuration, the time duration for a tweening process may be determined in various ways, such as by default values, randomized default values, user-specified values, various algorithms, etc. Sixth, depending on system configuration, multiple tweening processes may be chained together to produce a sequence of tweening processes, and such a sequence may be configured to include pauses and branches. Finally, depending on system configuration, tweening for two objects with visually different media data may be supported by various kinds of media transitions, such as gradually "fading out" the displayed content of the stopping object and "fading in" the displayed content of the starting object during the tweening process, "morphing" between two different images by stretching their bitmap data, etc.

In addition, it should be noted that in FIGS. 28B-D, the stopping and starting of objects is exemplified using either various relations (FIGS. 28B and 28D) or a sequence command (FIG. 28C). However the use of any particular functionality to exemplify the stopping of one object and the starting of another is for illustration purposes only, and is not inherent to the tweening process being shown. Depending on system configuration, various implementations may be used for the stopping and starting of the objects. Such implementations can include stopping and starting based on the relative placement of the objects within a timeline, stopping and starting based on the expiration of a timer associated with one of the objects, stopping and starting based on the user clicking in the playback display, stopping and starting based on user settings or default settings, etc. Finally, it should be noted that in cases where multiple objects are contained within containers which are transitioning via a tweening process (as seen in FIG. 28D), the correlation of objects between the two containers to determine which objects in the stopping container transition to which objects in the starting container can be accomplished using various implementations (depending on system configuration), such as automatic detection of similar media data, indication by the user, etc.

FIG. 28B illustrates the operation of a tweening process, according to one embodiment of the present invention. The figure shows a tweening process occurring for two objects, in which one object transitions to another; the stopping of one object and the starting of another is exemplified using two relations which are similar to those in FIG. 20 ("object A, when clicked, stops itself and starts object B").

FIG. 28B-1 shows a container object 2850 containing a left text object 2852 and a right text object 2856 which have previously been programmed with tweening behavior as shown by the tweening indicator 2854 and the two relations 2858 and 2860. Initially, the left text object 2852 is playing and its media data is seen in the playback display 2866 as the text 2864. When the user clicks 2862 on the text 2864, the previously programmed behavior causes a tweening process to begin in which the left text object 2852 transitions to the right text object 2856. In FIG. 28B-2, the partially complete tweening process is shown. The two text objects 2852 and 2856 are in a state of tweening from one to the other, as indicated by the partially active state of their play indicators 2868 and 2870. The text 2872 seen in the playback display 2866 is a product of this tweening process, and is at a mid-point in terms of position and size between the text of FIG. 28B-1 (the starting point) and the final text that will be displayed when the tweening is finished. In FIG. 28B-3, the tweening process has finished; the left text object 2852 has now stopped, and the right text object 2856 is playing and its media data is seen in the playback display 2866 as the text 2874.

FIG. 28C illustrates the operation of a container tweening process, according to one embodiment of the present invention. The figure shows a tweening process occurring for containers configured in a sequence (such as might be used to provide a slideshow), in which an object in one container transitions to an object in another container; the stopping of one container and the starting of another is exemplified using a sequence command such as that seen in FIG. 19D.

FIG. 28C-1 shows a container object 2880 which contains a left container object 2884 and a right container object 2886. The left container object 2884 contains a left picture object 2888, and the right container object 2886 contains a right picture object 2892. The left and right containers 2884 and 2886 have previously been programmed with tweening behavior as shown by the tweening indicator 2882 and the sequence indicator 2890. Initially, the left container object 2884 and its contained picture object 2888 are playing, and the latter's media data is seen in the playback display 2898 as the picture 2894. When the user initiates a sequence command by clicking on the sequence command icon 2896, the previously programmed behavior causes a tweening process to begin in which the left container 2884 containing the left picture object 2888 transitions to the right container 2886 containing the right picture object 2892.

In FIG. 28C-2, the partially complete tweening process is shown; the two containers 2884 and 2886 and their respective contained picture objects 2888 and 2892 are in a state of tweening from one to another. The picture 2801 seen in the playback display 2898 is a product of this tweening process, and is at a mid-point in terms of position, size and shading between the picture of FIG. 28C-1 (the starting point) and the final picture that will be displayed when the tweening is finished. In FIG. 28C-3, the tweening process has finished; the left container 2884 and its contained picture object 2888 have now stopped, and the right container 2886 and its contained picture object 2892 are playing, with the latter's media data seen in the playback display 2898 as the picture 2803.

FIG. 28D illustrates the operation of a sub-display tweening process, according to one embodiment of the present invention. The figure shows a tweening process occurring for containers configured as sub-displays, in which two objects in one container transition to two corresponding objects in another container; the stopping of one container and the starting of another is exemplified using two relations which are generally similar to those seen in FIG. 20, but are in fact those of its timer-based sibling function ("object A, upon timer expiration, stops itself and starts object B"). The sub-display functionality in the present example is used to accomplish "grouping" of objects such as that seen in many popular graphics programs (further discussion of sub-display functionality is provided in connection with FIGS. 40 through 45C). The present example also shows rotation functionality such as that seen in FIG. 5B, in which media data is rotated around a movable rotation anchor as part of the tweening process (providing the advantage of simulated limb movement). It should be noted that both the movement of the sub-display across the screen and the inclusion of rotation are exemplary only; neither is inherently necessary for the tweening process. In addition, depending on system configuration, the sub-display tweening functionality of the present example can be provided across multiple nesting levels whereby the contained objects which are transitioning to one another can themselves be containers containing contained objects transitioning to one another, etc., to produce more complex animations (for example, limbs with multiple joints); further discussion of the nested sub-display functionality of the invention is provided in connection with FIG. 41.

FIG. 28D-1 shows a container object 2811 which contains a left container object 2815 configured as a sub-display, and a right container object 2817 also configured as a sub-display. The left container object 2815 contains two picture objects 2823 and 2825, and the right container object 2817 contains two picture objects 2827 and 2829. The left and right containers 2815 and 2817 have previously been programmed with tweening behavior as shown by the tweening indicator 2813 and the two relations 2819 and 2821. Initially, the left container object 2815 and its contained picture objects 2823 and 2825 are playing, and the media data of the contained objects is seen in the playback display 2837 as the two pictures 2831 and 2833, respectively, which appear embedded within a sub-display 2851 corresponding to the left container 2815. The rotation anchor 2835 for the smaller picture 2833 has been positioned near the "elbow" position.

FIG. 28D-2 shows the situation some period of time later, after the previously programmed behavior has initiated a tweening process (which is now partially complete). The two containers 2815 and 2817 and their respective contained picture objects (2823/2825, and 2827/2829) are in a state of tweening from one to another. The sub-display 2853 seen in the playback display 2837 is a product of this tweening process, and is at a mid-point in terms of position between the starting sub-display of FIG. 28D-1 and the final sub-display that will be shown when the tweening is finished. The two pictures 2839 and 2841 seen in the playback display 2837 are also a product of this tweening process; in particular, the smaller picture 2841 has rotated around the rotation anchor 2843 and is at a mid-point between its starting rotation in FIG. 28D-1 and its final rotation that will be shown when the tweening is finished. In FIG. 28D-3, the tweening process has finished; the left container 2815 and its contained objects 2823 and 2825 have now stopped, and the right container 2817 and its contained objects 2827 and 2829 are playing. The media data of the now-playing contained objects 2827 and 2829 is seen in the playback display 2837 as the two pictures 2845 and 2849, respectively, which appear embedded within the sub-display 2855 corresponding to the right container 2817.

THE CONTROL DISPLAY—FIGS. 29A through 30B illustrate characteristics and uses of control displays in the present invention. In FIG. 29A, a control display provides user control over the starting and stopping of individual objects, and also provides visual indication of the status of object playback. In FIG. 29B, a control display presents an icon for a special "container control object" associated with a corresponding container object. In FIG. 30A, a control display provides visual representation for relations and actions among objects using a "map view." In FIG. 30B, a control display provides visual representation for relations and actions among objects using a "list view." Each of these functions and capabilities of the control display is an independent feature of the invention that may or may not be included in any given system configuration. Moreover, control displays overall are optional in the present invention and may be omitted altogether.

Throughout the present specification, control displays are depicted using either of two visual forms: (1) a map view in which object icons are arranged on a background, and (2) a list view in which object names are arranged in one or more lists. Unless specifically noted otherwise, either form of control display (map or list view), as well as various other visual arrangements for presenting the required elements, may be used effectively.

The functionality illustrated in FIGS. 29A through 30B generally provides the advantage of more control and clarity in the management and development of multimedia content, with additional advantages as follows. The playback control presented in FIG. 29A provides the advantage of greater efficiency for controlling which objects are playing. The indication of object playback status in FIG. 29A provides the advantage of clearer and more immediate indication of object playback status. The container control object presented in FIG. 29B provides more integrated and intuitive control over container object playback. The visual representations of relations and actions among objects in FIGS. 30A and 30B provide a clearer and more understandable way to represent complex object behavior (such as might be programmed using functions of the sentence paradigm). Moreover, when control displays are used to access external data (such as data in an HFS) and make it persistent within the context of presentation authoring, further advantages are derived in terms of streamlining the content creation process and improving authoring efficiency.

Before describing the control display functionality shown in FIG. 29A, the following points relating to the functionality seen in that figure should be noted. First, in FIG. 29A and throughout this specification, the starting and stopping of objects using a control display is accomplished by clicking on the name portion of the object icon, which toggles playback for the object on or off; other approaches may also be effective depending on implementation, such as clicking on the body of the icon, or on associated buttons, etc. Second, in FIG. 29A and throughout this specification, indication of object playback status is represented as an illuminated "halo" around the object icon; other approaches may also be effective depending on system implementation, such as making the object name bold, highlighting the name or icon in other ways, etc. Finally, in an optional enhancement to the above playback indication feature, the intensity of the "halo" or other playback indicator may be modulated to correspond with different levels of object playback, for example by fading the intensity of the halo up or down during entrances and exits (such as those shown in FIGS. 7D and 7E), etc.

FIG. 29A illustrates a control display providing user control over the starting and stopping of individual objects, and also providing visual indication of the status of object playback, according to one embodiment of the present invention. FIG. 29A-1 shows a container object 2900 containing a text object 2902 and a picture object 2904. The dotted outline 2901 around the object representation to the left is used in this and other diagrams to indicate which objects are being presented in the control display. In the control display 2914, the text icon 2908 represents the text object 2902 and the picture icon 2910 represents the picture object 2904. The user has previously clicked 2912 on the text icon 2908 to start the text object 2902, and the playback indicator 2906 around the text icon 2908 indicates that the text object 2902 is playing; the media data of the text object 2902 is seen in the playback display 2918 as the text 2916. In FIG. 29A-2, the user has clicked 2922 on the picture icon 2910 which represents the picture object 2904, causing that object to start playing as well, as seen by the playback indicator 2920; the media data of the picture object 2904 is now seen in the playback display 2918 as the picture 2924. Finally, in FIG. 29A-3, the user has clicked 2926 on the text icon 2908 which represents the text object 2902, causing that object to stop playing, and its media data is no longer seen in the playback display 2918.

FIG. 29B illustrates a control display which is presenting an icon representing a container control object associated with a corresponding container object, according to one embodiment of the present invention. In the present invention, container control objects (CCOs) are an optional object type that can be used to provide various useful capabilities associated with container objects; in system configurations which support CCOs, each container object contains a single CCO with which it is associated. The specific CCO capability shown in FIG. 29B is the ability for the user to start and stop the container object associated with a CCO by clicking on the icon for the CCO. The figure shows a container object 2950 containing a text object 2952, a container control object 2954, and a picture object 2956. In the control display 2966, the user has clicked 2962 on the CCO icon 2960 (which represents the container control object 2954) causing its associated container object 2950 to start playing. Due to the start propagation of FIG. 8A, the objects contained in the container object 2950 have also started playing, and the media data of the text object 2952 and the picture object 2956 are seen in the playback display 2972 as the text 2968 and the picture 2970, respectively.

Before describing the control display functionality shown in FIGS. 30A-B, the following points relating to the functionality seen in that figure should be noted. First, the control displays in FIGS. 30A-B provide visual representation for relations and actions between objects, and these relations and actions exist and occur as a result of programmed object behavior, such as behavior programmed using the sentence paradigm of FIGS. 9A through 27D. While this display functionality of FIGS. 30A-B is highly effective when used in conjunction with the sentence paradigm, neither that nor any other specific programming method is critical to the functionality of the control display being shown. Second, visual representation of relations between objects (seen in FIGS. 30A-1 and 30B-1) may be provided as its own feature without any visual representation of actions between objects (seen in FIGS. 30A-2 and 30B-2). Finally, the specific visual form of the representation of relations and actions depicted in these figures is just one approach for representing the relevant information, and various other visual forms may also be effective depending on implementation.

FIG. 30A illustrates a control display that provides visual representation for relations and actions among objects using a map view, according to one embodiment of the present invention. FIG. 30A-1 shows a container object 3000 containing a text object 3002 and a picture object 3004. The two contained objects 3002 and 3004 have previously been programmed with object behavior, shown by the relation 3006, such as that of FIGS. 9A-B ("object A, when clicked, starts object B"). Initially, the text object 3002 is playing and its media data is seen in the playback display 3022 as the text 3018. In the control display 3016, two object icons are shown: the text icon 3008 represents the text object 3002, and the picture icon 3010 represents the picture object 3004. To indicate the programmed behavior, the text icon 3008 and the picture icon 3010 are connected by a "string" 3012 that represents the relation 3006. An optional "bead" 3014 located along the string 3012 indicates the nature of the programmed behavior by providing visual indication on the "surface" of the bead (such as color coding and/or a graphical image). In cases where an object has a relation to itself, the bead may be placed on or near the object icon (and there is no string, since there is only one icon); also, depending on implementation, more than one of these beads may be located along a single string in order to depict multiple relations between two objects.

When the user clicks 3020 on the text 3018 corresponding to the text object 3002, the previously programmed behavior shown by the relation 3006 causes the picture object 3004 to start playing, as shown in FIG. 30A-2, and its media data is now seen in the playback display 3022 as the picture 3024. At the same time in the control display 3016, to indicate the execution of the programmed behavior, the string 3012 representing the relation 3006 begins oscillating back and forth as if it had been plucked, and the bead 3014 "lights up;" after a period of time, both the string and the bead return to their previous condition.

FIG. 30B illustrates a control display that provides visual representation for relations and actions among objects using a list view, according to one embodiment of the present invention. FIG. 30B-1 shows a container object 3050 containing a text object 3052 and a picture object 3054. The two contained objects 3052 and 3054 have previously been programmed with object behavior, shown by the relation 3056, such as that of FIGS. 9A-B ("object A, when clicked, starts object B"). Initially, the text object 3052 is playing and its media data is seen in the playback display 3072 as the text 3068. In the control display 3066, two object icons are arranged vertically in a list view: the text icon 3062 represents the text object 3052, and the picture icon 3064 represents the picture object 3054. A "bead" 3060 located next to the text icon 3062 indicates that the text object 3052 is the "acting object" in some type of programmed object behavior; the nature of that behavior is indicated visually on the "surface" of the bead (such as color coding and/or a graphical image). In cases where a relation is non-directional (as explained in the discussion of the sentence paradigm), beads are placed next to the icons for both objects involved (not just next to the icon for the acting object as in the present example); also, depending on implementation, more than one of these beads may be located next to a single icon in order to depict multiple relations associated with that object.

When the user clicks 3070 on the text 3068 corresponding to the text object 3052, the previously programmed behavior shown by the relation 3056 causes the picture object 3054 to start playing, as shown in FIG. 30B-2, and its media data is now seen in the playback display 3072 as the picture 3076. At the same time in the control display 3066, to indicate the execution of the behavior, the bead 3060 "lights up" and the name 3074 of the icon 3064 representing the object being acted upon (in this case the picture object 3054) becomes highlighted; after a period of time, both the bead and the name return to their previous condition.

Figure 31A:
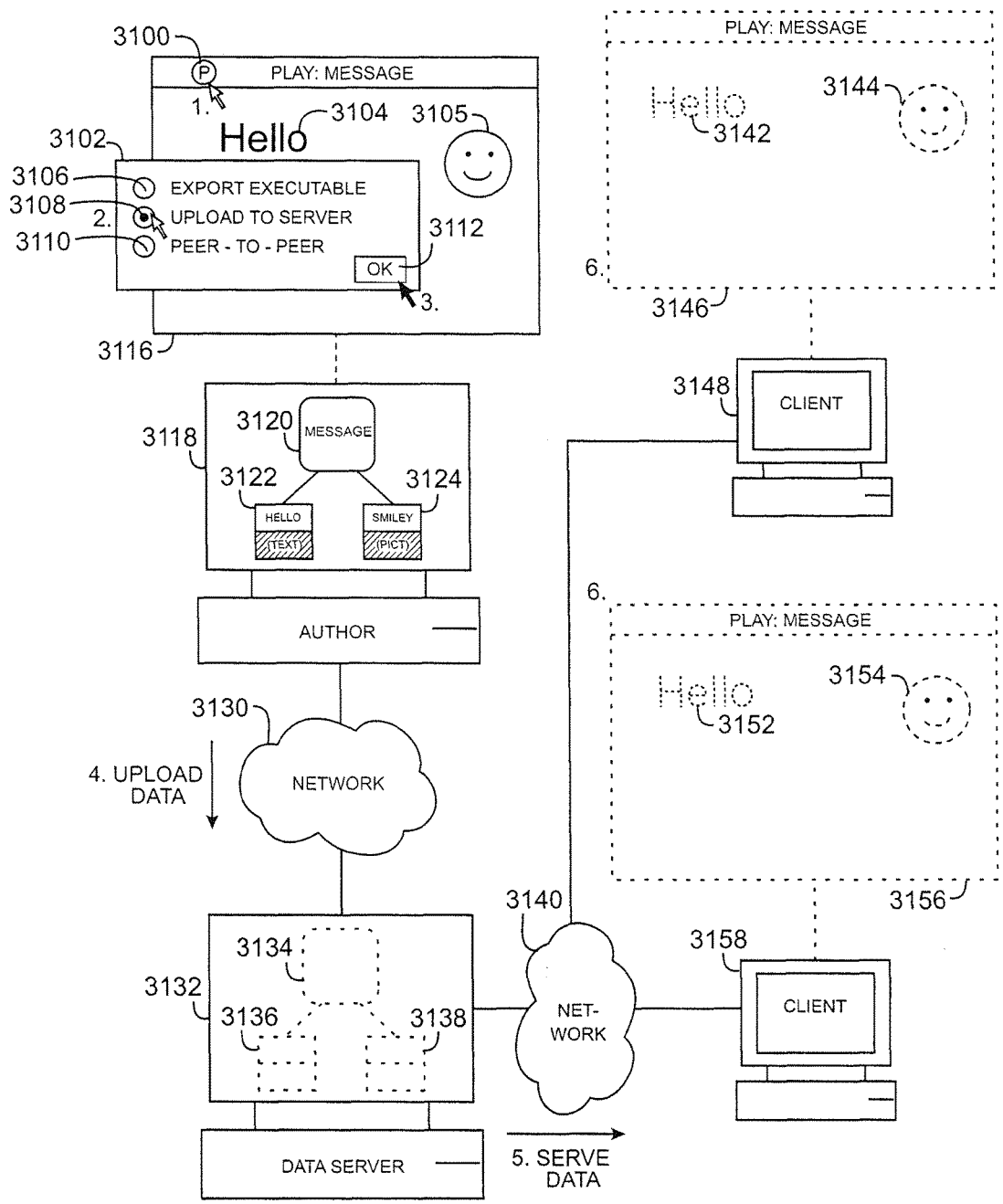
FIGS. 31A-B illustrate publishing and editing of presentation data over a network, according to embodiments of the present invention.
Figure 31B:
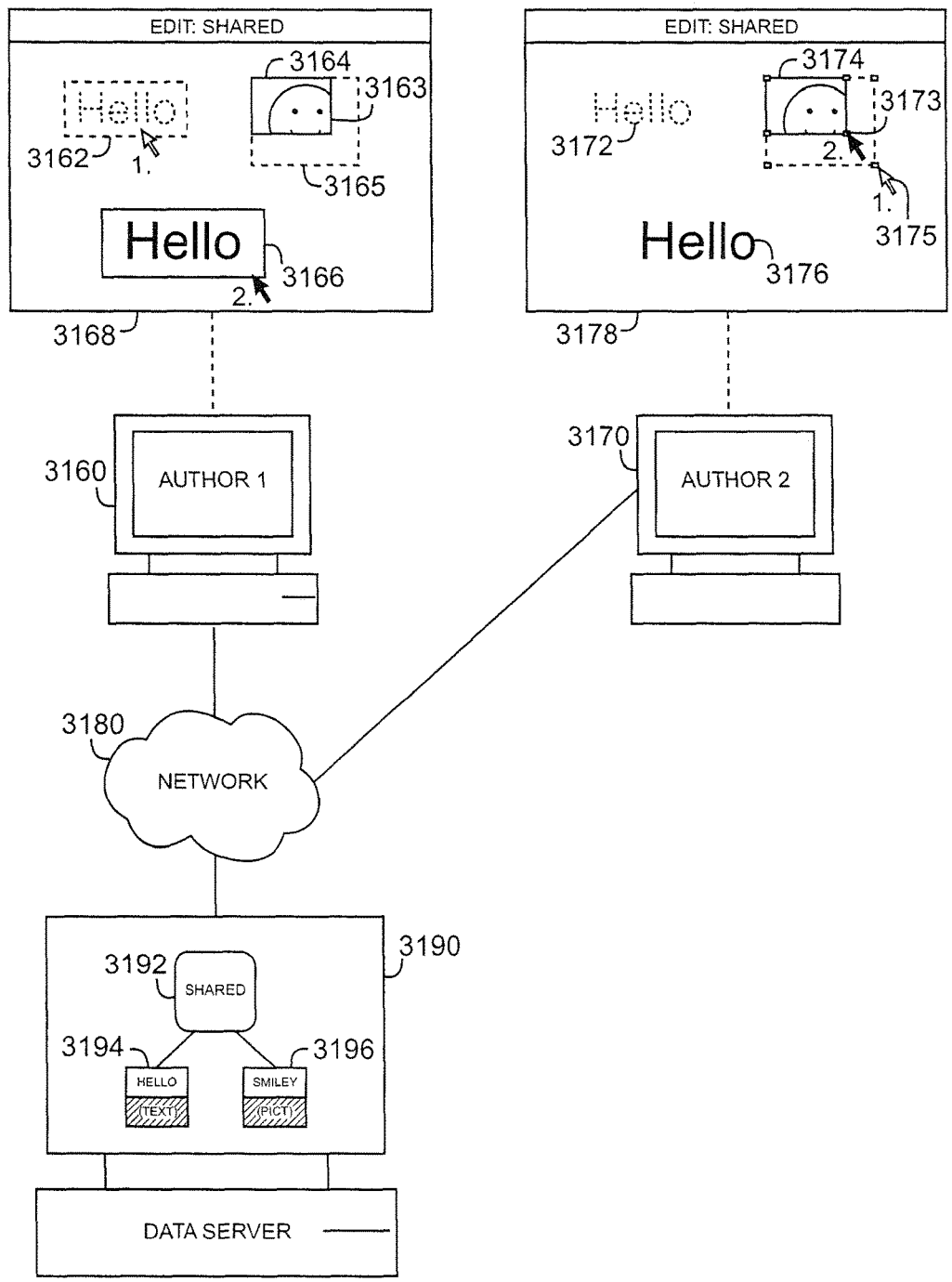

PUBLISHING AND EDITING OVER A NETWORK—FIGS. 31A-B illustrate publishing and editing of presentation data over a network. FIG. 31A shows two features: built-in publishing of presentation data over a network, and presentation playback over a network. FIG. 31B also shows two features: editing of presentation data over a network, and collaborative editing of presentation data over a network. Each of the features shown in these two figures is an independent feature of the invention that may or may not be included in any given system configuration. In addition, the present invention may be configured to provide capabilities for exporting a presentation as an executable or other playable file, which may then be sent as an email enclosure or transferred in some other fashion (such as via an instant messaging system, etc.).

The networking functionality illustrated in FIGS. 31A-B generally provides the advantage of enabling users to distribute and share multimedia content with minimal effort. In addition, the collaborative editing feature of FIG. 31B provides the advantage of allowing users to interact with immediacy and flexibility. Moreover, when the networking features of FIGS. 31A-B are used with the invention's sophisticated authoring features, such as creating objects, editing display settings, time-based playback behavior, start propagation, functions of the sentence paradigm, dynamic parameter modification, control displays, etc., the result is a powerful blend of authoring power and connectivity not found among existing systems. In addition, the above networking functionality may be used in conjunction with various other features of the invention, such as exploration, pointer objects, integration with HFS data, navigation, sub-displays, etc., yielding additional advantages in terms of the clarity and understandability with which distributed multimedia content may be interconnected and accessed.

It should be noted that the networking features presented in FIGS. 31A-B represent a high level view of the networking functionality of the present invention; various other features presented elsewhere in this specification can be used to realize particular purposes and/or structures within the overall framework of network-based operations shown here in FIGS. 31A-B. Several features discussed throughout this specification may be used to such effect, and in some cases these are signified by the inclusion of a network "cloud" in one or more diagrams for the feature in question.

Figure 49:
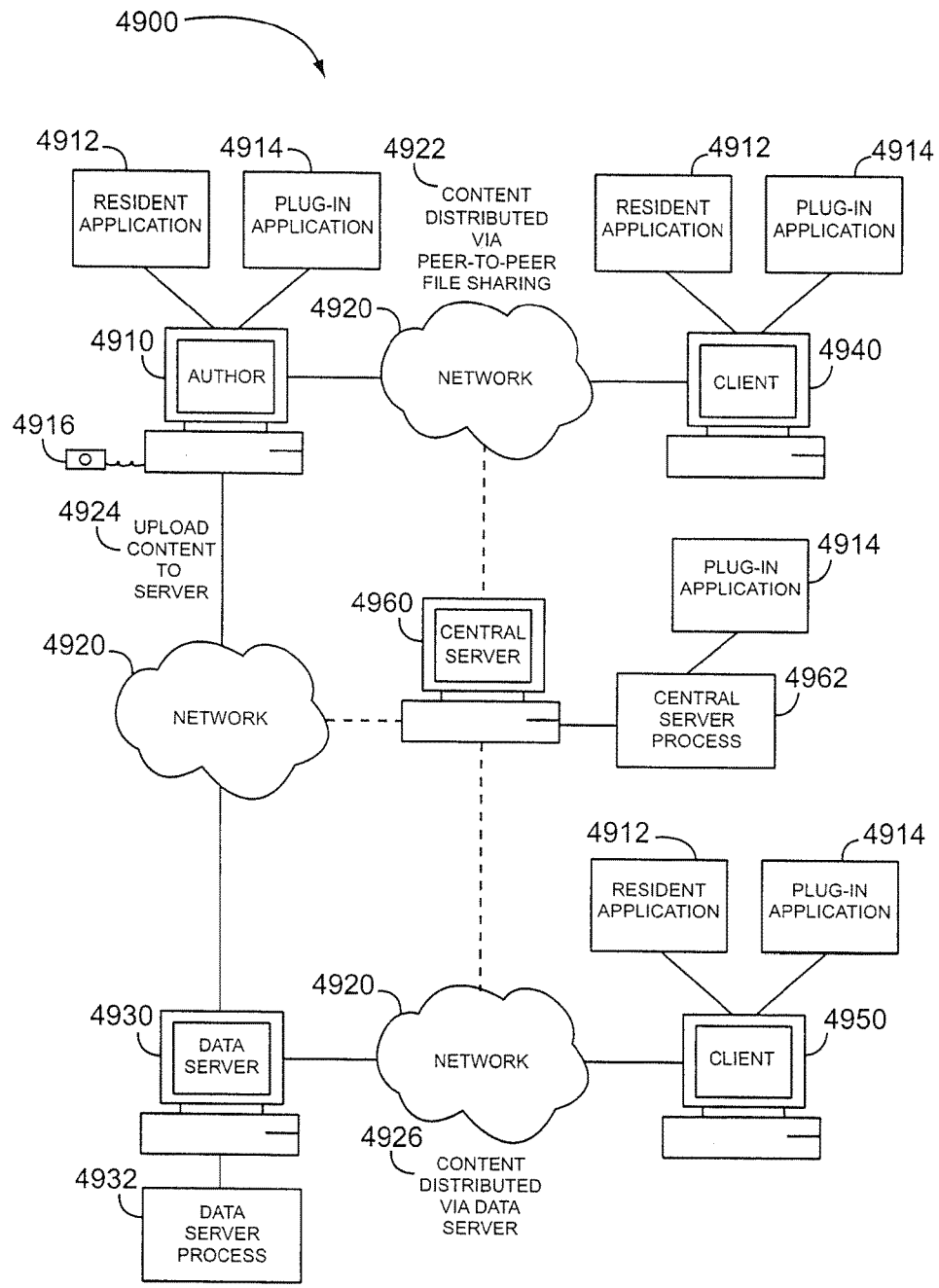
FIG. 49 illustrates a block diagram of a computer system, either network or standalone, that implements embodiments of the present invention.

Before describing the network-based operations of FIGS. 31A-B, a brief overview of networking in general may be helpful. There are two different types of networking in common use today. The first is traditional client-server networking, in which a network server hosts data for one or more users (as shown in FIGS. 31A-B). The second type of networking is peer-to-peer networking, in which data is hosted directly from a user's computer without the use of a central network server as intermediary (as shown in FIG. 49). The present invention may be configured to support either, both, or a hybrid of these two types of networking (and may also be configured as a server-based system, or as a standalone system without networking). A more detailed discussion of the various network-related configurations of the present invention is provided in connection with FIG. 49.

FIG. 31A shows two features, built-in publishing over a network and presentation playback over a network, according to one embodiment of the present invention. In this example, an author has created a presentation on the author computer 3118 consisting of a container object 3120 containing a text object 3122 and a picture object 3124; the media data for the contained objects 3122 and 3124 is seen in the playback display 3116 as the text 3104 and the picture 3105.

In an example of built-in publishing over a network, the author clicks the publish command icon 3100 which causes the publish dialog 3102 to appear (this command icon 3100 and publish dialog 3102 are not critical to the functionality being discussed here, and other approaches for providing similar functionality may be used). The publish dialog 3102 presents various options including: the top option 3106 to export the presentation as an executable file, the bottom option 3110 to publish in a peer-to-peer fashion, and the middle option 3108 (which the author selects) to publish via a server. The author then executes the middle option 3108 by clicking the OK button 3112, causing the presentation data to be uploaded to the server 3132 over the network 3130; this results in a copy of the presentation being stored on the server, consisting of the container object 3134 containing the text object 3136 and the picture object 3138.

In an example of presentation playback over a network, the uploaded presentation (3134, 3136, 3138) is then viewed on two client computers 3148 and 3158. The client computers may download the whole presentation over the network 3140, or may download portions of the presentation as needed. The playback displays 3146 and 3156 on the client computers show client views of the presentation, with the text 3142 and 3152 corresponding to the text object 3136, and the pictures 3144 and 3154 corresponding to the picture object 3138.

FIG. 31B shows two features, editing of presentation data over a network and collaborative editing of presentation data over a network, according to one embodiment of the present invention. In this example, a data server 3190 is storing a presentation consisting of a container object 3192 containing a text object 3194 and a picture object 3196. The presentation on the data server 3190 is being accessed over a network 3180 by two author computers 3160 and 3170. Each of the two author computers is playing the presentation over the network as the client computers did in the example of FIG. 31A. Initially, the media data for the text object 3194 and the picture object 3196 are seen in the playback displays 3168 and 3178 of the client computers as the text (3162, 3172) and the picture (3164, 3174), respectively.

In an example of presentation editing over a network, the author using the left computer 3160 drags and re-sizes the text in the playback display 3168 from its small size and upper-left position 3162 to a larger size and more centered position 3166. This editing operation is conveyed over the network 3180 to the data server 3190, updating the display settings for the text object 3194. Extending this example so that the editing becomes collaborative, this change to the text object 3194 is read on the right author computer 3170, resulting in a change to the text in the right playback display 3178 from its old size and position 3172 to the new size and position 3176; depending on network performance, this change can happen smoothly while the left author is editing so as to appear to the right author as though it were being done locally.

In another example of collaborative presentation editing over a network, the right author changes the cropping of the picture 3174 from its original cropping 3175 to a new cropping 3173. This editing operation is conveyed over the network 3180 to the data server 3190, updating the display settings for the picture object 3196. This change to the picture object 3196 is read on the left author computer 3160, resulting in a change to the picture 3164 in the left playback display 3168 from its old cropping 3165 to the new cropping 3163; once again depending on network performance, this change can happen smoothly while the right author is editing so as to appear to the left author as though it were being done locally.

HIERARCHICAL STRUCTURING OF PRESENTATION DATA—FIGS. 32A-B illustrate hierarchically nested container objects forming a hierarchical object space. FIG. 32A shows a container object nested within an enclosing container object. In FIG. 32B, the nested container object is shown playing, and the media data of its contained objects is displayed in the same playback display as the media data of objects contained by its enclosing container. Each of these capabilities, the hierarchical nesting of container objects in FIG. 32A, and the playback operation shown in FIG. 32B, is a separate feature of the invention that may or may not be included in any given system configuration (the latter, of course, depending on the former). Moreover, when hierarchical nesting of container objects is used in conjunction with other features of the invention (such as navigation, sub-displays, etc.), the playback operation may be different than that shown in FIG. 32B.

The functionality illustrated in FIGS. 32A-B generally provides the advantage of more modular and intuitive organization of multimedia content; in addition, when used with multimedia content distributed over a network, it helps authors visualize and digest the organizational scheme more easily. Moreover, the full power of hierarchical container nesting in the present invention becomes manifest when used in conjunction with other features of the invention, such as exploration, pointer objects, integration of HFS data, navigation, sub-displays, etc.; the advantages produced in each case are discussed in connection with the feature in question.

Before describing FIGS. 32A-B, it should be noted that the presence and use of control displays in these figures is illustrative only; control displays are not in fact required for the features being presented in these diagrams.

FIG. 32A illustrates a container object nested within an enclosing container object, constituting a hierarchical object space, according to one embodiment of the present invention. The figure shows a container object 3200 containing a text object 3202 and a nested container object 3204 which in turn contains two picture objects 3206 and 3208. In the control display 3216, the text icon 3210 represents the text object 3202 and the container icon 3212 represents the nested container object 3204. The text object 3202 is playing and its media data is seen in the playback display 3220 as the text 3218. In the control display 3216, the user clicks 3214 on the container icon 3212 to start the container object 3204.

FIG. 32B illustrates the playback operation of a hierarchically nested container object, according to one embodiment of the present invention. The figure shows the objects of FIG. 32A after the user has started the nested container object. The nested container object 3204 has started playing, and due to the start propagation of FIG. 8A, its contained objects 3206 and 3208 have also started playing. The media data of the two objects 3206 and 3208 is now seen in the playback display 3220 as the pictures 3222 and 3224, respectively, playing alongside the text 3218 corresponding to the text object 3202.

Figures 33A, 33B:
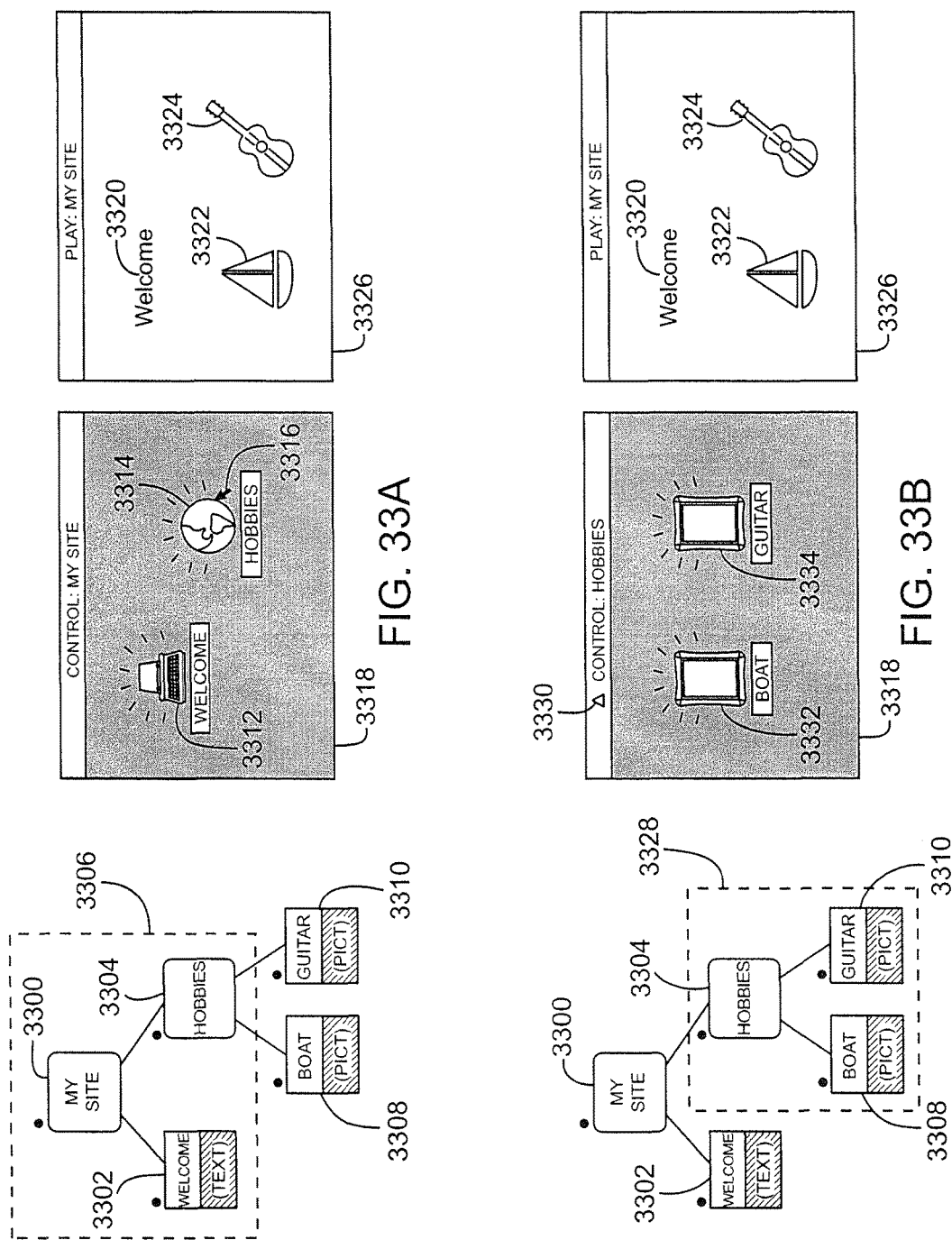
FIGS. 33A-B illustrate user "exploration" of hierarchical presentation data using a control display, according to embodiments of the present invention.

USER EXPLORATION OF PRESENTATION DATA—FIGS. 33A-B illustrate user "exploration" of the hierarchical object space using a control display. This capability involves changing which container is presented in a control display by "exploring" up or down through the hierarchical object space. In an optional enhancement shown in FIGS. 45A-C, the change up or down may be emphasized by a visual "zooming" effect. User exploration of presentation data depends on hierarchical nesting of container objects, and is a separate feature of the invention that may or may not be included in any given system configuration.

The functionality illustrated in FIGS. 33A-B generally provides the advantage of enabling more efficient authoring by providing clear and efficient access to hierarchically structured presentation data. Moreover, when used with a control display that presents the contents of an HFS, the exploration feature provides the further advantage of more flexible and efficient access to external data. In addition, when user exploration is combined with other features of the invention, such as other control display features, object creation, pointer objects, integration of HFS data, navigation, sub-displays, etc., further advantages in terms of authoring efficiency and clarity of structure are achieved.

FIGS. 33A-B illustrate user exploration of hierarchically structured presentation data using a control display, according to one embodiment of the present invention. FIG. 33A shows a container object 3300 containing a text object 3302 and a nested container object 3304 which in turn contains two picture objects 3308 and 3310. All of the objects are playing (which is not critical to this example), and the media data of the media objects 3302, 3308 and 3310 is seen in the playback display 3326 as the text 3320, the left picture 3322 and the right picture 3324, respectively. The control display 3318 is presenting the upper container object 3300 and its contents, as indicated by the dotted outline 3306 around those objects. In the control display 3318, the user double-clicks 3316 on the container icon 3314 (which represents the nested container object 3304) to explore the data contained in it. This action (the specific form of which, a double-click, is not critical to the present functionality) causes a transition in the control display, the result of which is shown in FIG. 33B.

In FIG. 33B, the control display 3318 is now presenting the nested container object 3304 and its contents, as indicated by the dotted outline 3328 around those objects. Two object icons 3332 and 3334 representing the two contained objects 3308 and 3310, respectively, are now shown in the control display 3318. At the top of the control display 3318, an "up" button 3330 has appeared, giving the user a convenient way to return back up to the previous level in the hierarchy that was shown in FIG. 33A. In this manner, the user can traverse an entire hierarchical object space and can view the contents of any containers within in it.

Figure 34A:
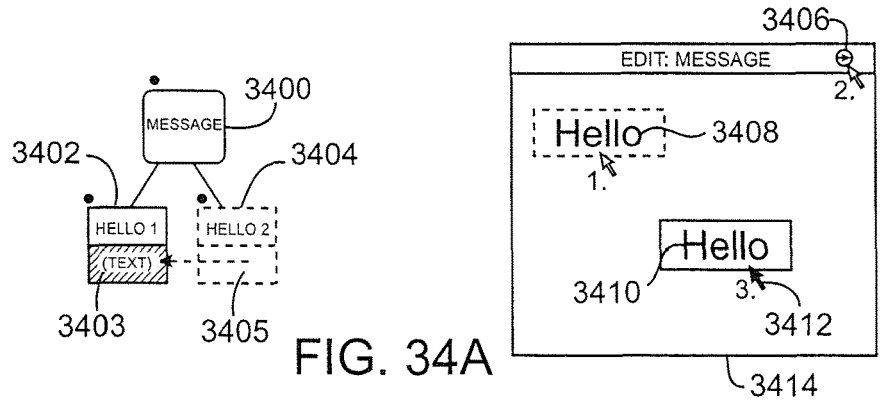
Figure 34B:
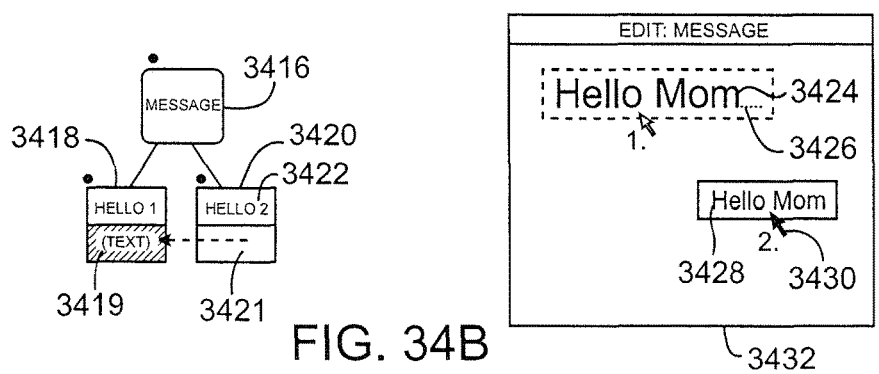
Figure 34C:
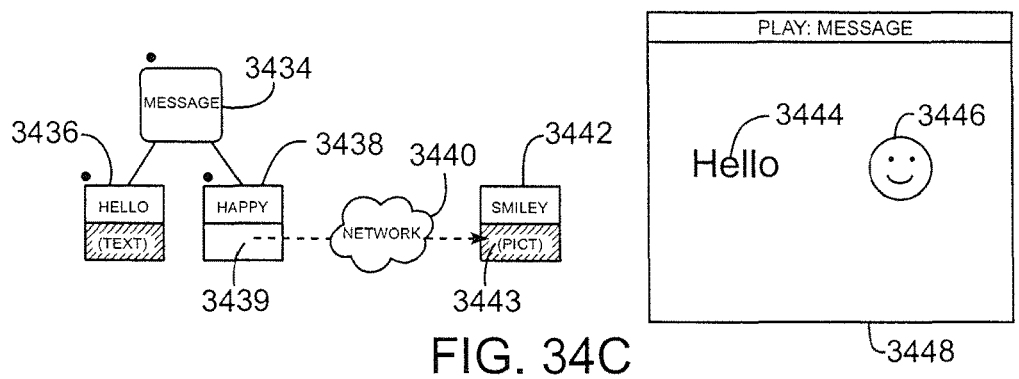
Figure 34D:
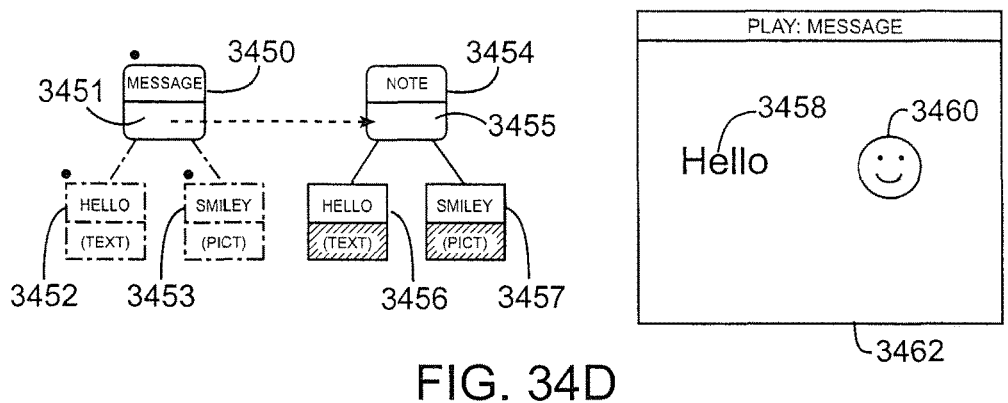

POINTER OBJECTS—FIGS. 34A-F illustrate characteristics and uses of "pointer objects," as well as one method for creating pointer objects. A pointer object is an object which references another object, called a "base object," for some of its data. FIG. 34A illustrates one method for creating pointer objects. FIG. 34B illustrates the basic functionality of pointer objects in terms of the relationship between a pointer object and its base object. FIG. 34C illustrates a pointer object used in conjunction with networking functionality whereby the base object is referenced over a network. FIG. 34D illustrates a "container pointer object," which is a container object that references a "base container object" for its contained objects. FIG. 34E illustrates a container pointer object used in conjunction with networking functionality whereby the base container object is referenced over a network. FIGS. 34E-F also illustrate a networked container pointer object used in conjunction with the user exploration feature of FIGS. 33A-B. Among these figures, the basic pointer object functionality of FIG. 34B and the container pointer object functionality of FIG. 34D are each independent features of the invention that may or may not be included in any given system configuration; the pointer object creation method of FIG. 34A and the networked pointer objects of FIGS. 34C and 34E are separate features that depend on the functionality of FIGS. 34B and/or 34D (and on networking functionality in the case of FIGS. 34C and 34E).

The functionality illustrated in FIGS. 34A-F generally provides the advantage of a clearer and more intuitive framework for interlinking multimedia content, including content distributed over a network, and enables a variety of efficiencies in the areas of content authoring and use of system resources (such as storage and bandwidth). Moreover, the above pointer object functionality can be used in conjunction with any of the other features of the invention, such as all of the various authoring features, publishing and collaborative editing, hierarchical data, exploration, navigation, sub-displays, etc., in each case providing further advantages in terms of making it easier to access, manage and/or develop distributed multimedia content.

FIG. 34A illustrates a method for creating pointer objects, according to one embodiment of the present invention. The figure shows a container object 3400 which initially contains just a text object 3402; the media data of this text object 3402 is seen in the playback display 3414 as the text 3408. To create a new pointer object, the user first clicks on the text 3408 corresponding to the text object 3402, then clicks on the "new pointer object" command icon 3406, then clicks on a desired spot 3412 in the playback display, causing new text 3410 to appear there. As is shown on the left in FIG. 34A, a new pointer object 3404 is created in the container object 3400, the new pointer object referencing the media data 3403 of the text object 3402 (its base object) for its own media data 3405, which is seen in the playback display 3414 as the new text 3410.

FIG. 34B illustrates the basic functionality of pointer objects in terms of the relationship between a pointer object and its base object, according to one embodiment of the present invention. The figure shows a container object 3416 containing a text object 3418 and a pointer object 3420 (the latter referencing the text object 3418 as its base object). The media data 3419 of the text object 3418 is seen in the playback display 3432 as the upper text 3424, and the media data 3421 of the pointer object 3420 (which refers to the media data 3419 of its base object) is seen in the playback display 3432 as the lower text 3428. Initially, the displayed text for both objects looks the same as in the playback display 3414 of FIG. 34A. To illustrate the relationship between the pointer object and its base object, the user performs two edit operations in the playback display 3432 of FIG. 34B. First, the user performs a text edit operation 3426 on the upper text 3424, typing the word "Mom" at the end of the original text "Hello;" since this edit operation changes the media data 3419 of the text object 3418 (which is the base object of the pointer object 3420), the newly added word "Mom" is also seen at the end of the lower text 3428 corresponding to the pointer object 3420. Second, the user selects 3430 the lower text 3428 and performs a re-size operation using keypad keys (as seen in FIG. 4B) to make the lower text smaller; since the affected display setting is part of the object data 3422 which does not reference the base object, the change has no effect on the base object 3418, whose displayed media data 3424 stays the same size.

FIG. 34C illustrates a pointer object used in conjunction with networking functionality whereby the base object is referenced over a network, according to one embodiment of the present invention. The figure shows a container object 3434 containing a text object 3436 and a pointer object 3438, the latter of which references a picture object 3442 as its base object. The media data of the text object 3436 is seen in the playback display 3448 as the text 3444, and the media data 3439 of the pointer object 3438 (which refers to the media data 3443 of its base object 3442 over a network 3440) is seen in the playback display 3448 as the picture 3446. This example, in which both local media data 3444 and networked media data 3446 are playing alongside each other in the same playback display, illustrates one way in which networked pointer objects may be used; other examples are provided elsewhere in this specification.

FIG. 34D illustrates a container pointer object, which is a container object that references a base container object for its contained objects, according to one embodiment of the present invention. The figure shows a container pointer object 3450 referencing a container object 3454 as its base container object. Both containers 3450 and 3454 are depicted with a separate lower portion 3451 and 3455 corresponding to the listing or directory of the container's contained objects; this depiction is merely a visual convention used to clarify certain concepts in the diagrams, and is not to be understood as defining or limiting the implementation of the relevant functionality.

In the example of FIG. 34D, the contents listing 3451 of the container pointer object 3450 references the contents listing 3455 of its base container object 3454 for its contained objects, in this case a text object 3452 corresponding to the text object 3456 in the base container object, and a picture object 3453 corresponding to the picture object 3457 in the base container object. These two objects 3452 and 3453 in the container pointer object are depicted in a special outline format to indicate that they are not instances of actual stored objects, but are rather "mirages" of objects that "seem to be there" due to the operation of the container pointer object 3450. Nevertheless, despite their mirage status, the two objects 3452 and 3453 are playing and their media data is seen in the playback display 3462 as the text 3458 and the picture 3460, respectively.

FIG. 34E illustrates a container pointer object used in conjunction with networking functionality whereby the base container object is referenced over a network, according to one embodiment of the present invention. The figure shows an upper container object 3464 containing a nested container object 3466 which in turn contains a text object 3472; the text object 3472 is playing and its media data is seen in the playback display 3494 as the text 3490. The upper container object 3464 also contains a container pointer object 3468 which references a container object 3478 as its base container object. The contents listing 3469 of the container pointer object 3468 references the contents listing 3479 of its base container object 3478 over a network 3476 for its contained objects, in this case a picture object 3474 corresponding to the picture object 3480 contained in the base container object. As in the previous example of FIG. 34D, the picture object 3474 in the container pointer object is depicted in a special outline format to indicate that it is a mirage resulting from the operation of the container pointer object 3468. Nevertheless, despite its mirage status, the picture object 3474 is playing and its media data is seen in the playback display 3494 as the picture 3492 (alongside the text 3490 corresponding to the text object 3472). For the purposes of the "networked container pointer object" functionality being presented here, the objects not directly involved (3464, 3466, 3472) and the control display 3488 are not essential, but are provided merely to show one possible context in which the functionality may exist.

In addition, FIGS. 34E-F show a networked container pointer object being used in conjunction with the user exploration feature of FIGS. 33A-B, according to one embodiment of the present invention. In FIG. 34E, which illustrates a networked container pointer object as discussed above, the control display 3488 is presenting the upper container object 3464 and its contents, as indicated by the dotted outline 3470 around those objects. In the control display 3488, the user double-clicks 3486 on the right container icon 3484 (which represents the pointer container object 3468) to explore the data contained in it. This action causes a transition in the control display, the result of which is shown in FIG. 34F. In FIG. 34F, the control display 3488 is now presenting the container pointer object 3468 and its contents, as indicated by the dotted outline 3495 around those objects. A picture icon 3496 representing the mirage picture object 3474 is now shown in the control display 3488.

INTEGRATING HFS DATA WITH PRESENTATION DATA—FIGS. 35A through 37C illustrate two ways of integrating data from a hierarchical file system (HFS) with presentation data, one by extending a presentation object space of containers and objects into an HFS object space of folders and files, and vice versa. FIGS. 35A-B show an extension from presentation space into HFS space using a special "folder pointer object;" this HFS extension is illustrated using the previously discussed exploration feature of the invention. FIG. 36 shows an HFS extension used in conjunction with the previously discussed pointer object feature of the invention. FIGS. 37A-C show exporting of presentation data to a file in HFS space that results in an extension from HFS space to presentation space; this extension from HFS space to presentation space is illustrated using the previously discussed exploration feature of the invention. These extensions from presentation space into HFS space and vice versa, as well as the specialized pointer object functionality of FIG. 36 and the export functionality of FIG. 37A, are each independent features of the invention that may or may not be included in any given system configuration.

Figure 47:
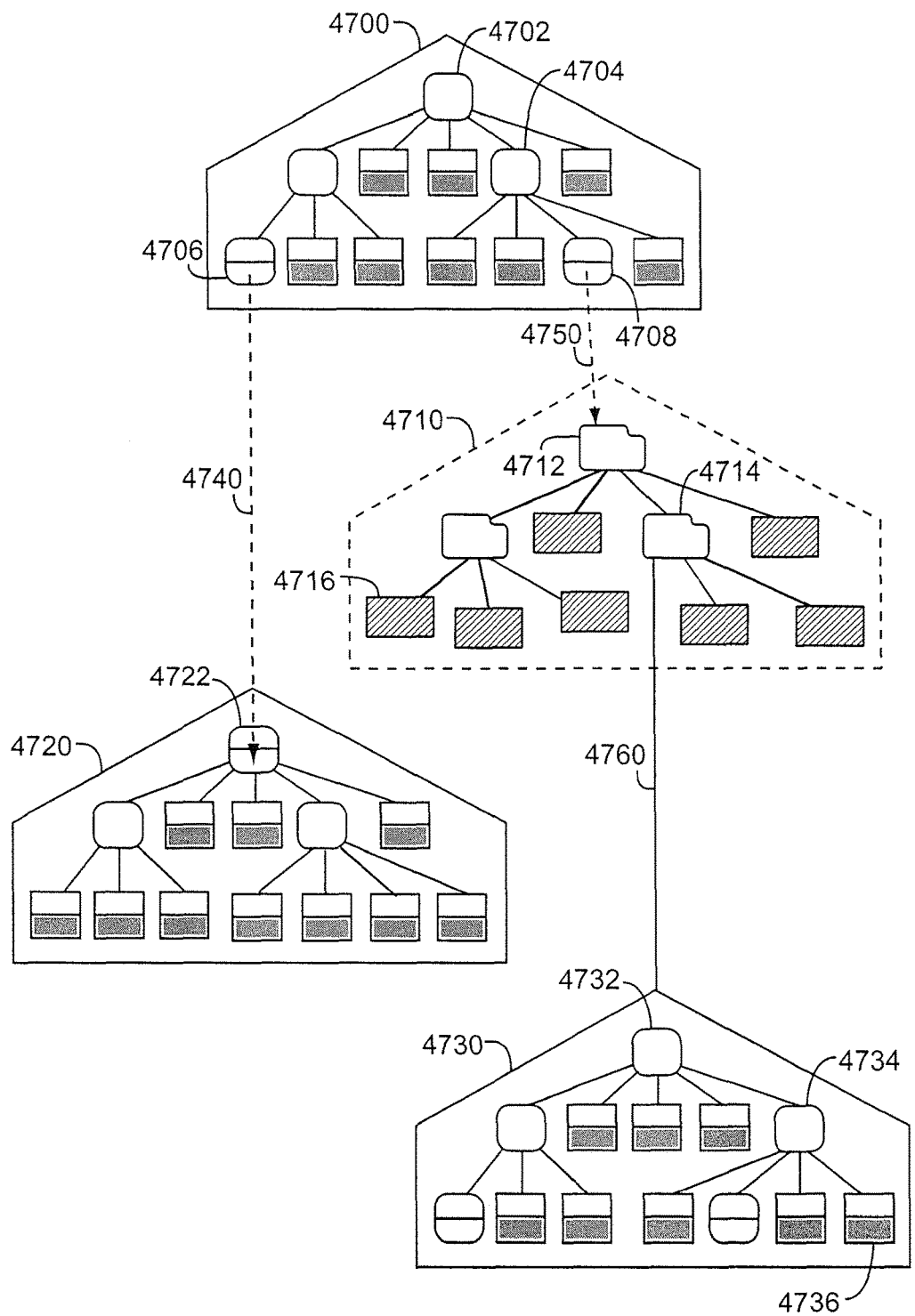
FIG. 47 illustrates an exemplary data linking scenario, in which hierarchical databases and an HFS are linked together to form a virtual hierarchy, according to embodiments of the present invention.

The functionality illustrated in FIGS. 35A through 37C generally provides the advantage of better integration between presentation data and HFS data, resulting in more seamless access for exploring and playing content stored "outside" the system. Moreover, the two types of extension, from HFS space to presentation space and vice versa, while fundamentally independent from one another, are also complementary and when used together provide new capabilities for interconnecting content; an example scenario in which they are both used is shown in FIG. 47. Also, when the functionality of FIGS. 35A through 37C is used in conjunction with other features of the invention, such as networking, publishing and collaborative editing, pointer objects, control display features, etc., further advantages are derived in terms of greater continuity and simplicity in the integration and management of multimedia content from a variety of different sources.

Before describing FIGS. 35A through 37C, it should be noted that the presence and use of control displays in these figures is illustrative only; control displays are not required for the features being presented in these diagrams. Moreover, the specific user steps shown in FIGS. 36 and 37A for (respectively) creating a pointer object and exporting presentation data, while streamlined and efficient, represent only one possible method for providing the functionality shown; other methods may also be effective depending on system implementation. Finally, in FIGS. 35A through 37C, various objects not critical to the functionality being presented have been included in order to provide context for the features being shown.

FIGS. 35A-B illustrate an extension from presentation space into HFS space using a special "folder pointer object," according to one embodiment of the present invention. FIG. 35A shows an upper container object 3500 containing a nested container object 3502 which in turn contains a text object 3512 whose media data is seen in the playback display 3528 as the text 3526. The upper container object 3500 also contains a "folder pointer object" 3504. A folder pointer object is similar to a "container pointer object" such as that in FIG. 34D, except that the listing of contained objects for the folder pointer object, rather than referencing a "base container object," instead references a folder stored in an HFS (such as a folder in Windows® or the MacOS®). In the present example, the contents listing 3510 of the folder pointer object 3504 references the contents listing of a folder called "Desktop" 3508 for its contained objects, in this case a picture object 3514 corresponding to a picture file 3516. As in earlier cases, the picture object 3514 is depicted in a special outline format to indicate that it is a mirage that seems to be there due to the operation of the folder pointer object 3504. The folder pointer object 3504 and its contents comprise an HFS extension to the presentation object space.

The HFS extension to the object space can be explored using the exploration feature of the control display seen in FIGS. 33A-B. In the present example of FIG. 35A, the control display 3524 is presenting the upper container object 3500 and its contents, as indicated by the dotted outline 3506 around those objects. In the control display 3524, the user double-clicks 3522 on the folder pointer icon 3520 (which represents the folder pointer object 3504) to explore it. This action causes a transition in the control display, the result of which is shown in FIG. 35B. Now the control display 3524 is presenting the folder pointer object 3504 and its contents, as indicated by the dotted outline 3530 around those objects. A picture icon 3532 representing the picture object 3514 is now shown in the control display 3524. The user clicks 3534 on the picture icon 3532 to start the picture object 3514, whose media data is now seen in the playback display 3528 as the picture 3536 playing alongside the text 3526. Since the picture object 3514 is a mirage (in this case of the picture file 3516), its media data is obtained from the picture file 3516 stored in the HFS folder 3508. Note that if there were one or more nested folders in the HFS folder 3508, corresponding icons would be presented in the control display 3524, and these folders could be further explored by the user via the exploration feature of the control display.

Before describing the functionality shown in FIG. 36, some general observations about that functionality are provided as follows. The figure involves an HFS extension used in conjunction with the pointer object functionality of FIG. 34B. In the example of FIG. 36, the user creates a new pointer object by specifying a "mirage" object in an HFS extension as the base object. However when the new pointer object is created, its base object is not set to the specified mirage object, but to the actual file in the HFS corresponding to the mirage object. Of note here is not only the fact that the pointer object has an HFS file as its base object (the basic functionality), but also the fact that when the pointer object is created, the mirage object specified by the user as the base object is "bypassed" in favor of the HFS file to make the pointer object more robust (a preferred enhancement).

FIG. 36 illustrates an HFS extension used in conjunction with the pointer object feature of FIG. 34B, according to one embodiment of the present invention. The figure shows an upper container object 3600 containing a nested container object 3602, which in turn contains a text object 3610 whose media data is seen in the playback display 3636 as the text 3630. The upper container object 3600 also contains a folder pointer object 3604 whose contents listing 3608 references an HFS folder 3606 for its contained items, which in this case is a mirage picture object 3616 corresponding to the HFS picture file 3620. The control display 3626 is presenting the folder pointer object 3604 and its contents, as indicated by the dotted outline 3618.

To create a new pointer object, the user first clicks on the picture icon 3624 (which represents the mirage picture object 3616), then clicks on the "new pointer object" command icon 3628, then clicks on a desired spot 3634 in the playback display 3636 (which is presenting the contents of the nested container object 3602 to the user for editing). As a result of these actions, a picture 3632 appears in the playback display 3636. As is shown to the left in FIG. 36, a new pointer object 3612 is created in the nested container object 3602, the new pointer object referencing the HFS picture file 3620 as the source for its media data 3614 which is seen in the playback display 3636 as the picture 3632. Note that the pointer object 3612, because it refers to the HFS picture file 3620 instead of the mirage object 3616 as its base object, does not require the ongoing existence of the folder pointer object 3604 in order to function properly.

FIG. 37A illustrates exporting of presentation data to a file in HFS space, resulting in an extension from HFS space to presentation space, according to one embodiment of the present invention. The figure shows an upper container object 3700 containing a nested container object 3702 which in turn contains a text object 3704 and a picture object 3706. The nested container object 3702 and its two contained objects are playing, and the media data of the contained objects 3704 and 3706 is seen in the playback display 3742 as the text 3738 and the picture 3740, respectively. The upper container object 3700 also contains a folder pointer object 3708 whose contents listing 3710 references an HFS folder 3720 (which is initially empty) for its contained items. The control display 3734 presents the folder pointer object 3708 and its (initially empty) contents, as indicated by the dotted outline 3718.

To export the presentation data playing in the playback display 3742, the user first clicks on the export command icon 3736, then clicks on a desired spot 3732 in the control display 3734, causing a container icon 3730 to appear there. As is shown in the representation to the left in FIG. 37A, a new data file 3722 containing the exported presentation data is created in the HFS folder 3720, the new data file comprising a container object 3724 containing a text object 3726 and a picture object 3728. At the same time, a corresponding "mirage" of this new data file appears within the folder pointer object 3708, this mirage consisting of a container object 3712 containing a text object 3714 and a picture object 3716 (each corresponding to its respective object in the data file 3722). The control display 3734 presenting the contents of the folder pointer object 3708 now shows a container icon 3730 representing the mirage container object 3712. This mirage container object and its contained mirage objects can be played, explored, etc., thereby providing an extension from HFS object space (that of the folder pointer object 3708) into presentation object space (that of the mirage objects 3712, 3714 and 3716).

FIGS. 37B-C illustrate user exploration of the extension from HFS space to presentation space just created in FIG. 37A, using the exploration feature of FIGS. 33A-B. In addition, FIG. 37B illustrates an optional enhancement to the export functionality of FIG. 37A, which is that when presentation data is exported to a file in an HFS, playback for the original presentation data is stopped and playback for the "mirage" of the exported data is started. To illustrate this enhancement, the same objects shown in FIG. 37A are now shown in FIG. 37B immediately after the export operation. The figure shows the original objects from FIG. 37A, as well as the new data file 3722 (which includes the container object 3724 and its two contained objects 3726 and 3728) and its corresponding mirage objects 3712, 3714 and 3716. However unlike in FIG. 37A, in FIG. 37B the nested container object 3702 and its contained objects (the source data for the export operation) are no longer playing, and instead the mirage objects 3712, 3714 and 3716 are playing, and the media data of the contained mirage objects 3714 and 3716 is seen in the playback display 3742 as the text 3746 and the picture 3748, respectively.

To illustrate user exploration of the extension from HFS space to presentation space, in FIG. 37B the control display 3734 presents the folder pointer object 3708 and its contents, as indicated by the dotted outline 3718. To initiate exploration of the presentation space contained within the folder pointer object 3708, the user double-clicks 3744 on the container icon 3730 (which represents the mirage container object 3712). This action causes a transition in the control display, the result of which is shown in FIG. 37C. In FIG. 37C, the control display 3734 is presenting the mirage container object 3712 and its contents, as indicated by the dotted outline 3750 around those objects. The text icon 3752 in the control display 3734 represents the text object 3714, and the picture icon 3754 represents the picture object 3716.

Figure 38A:
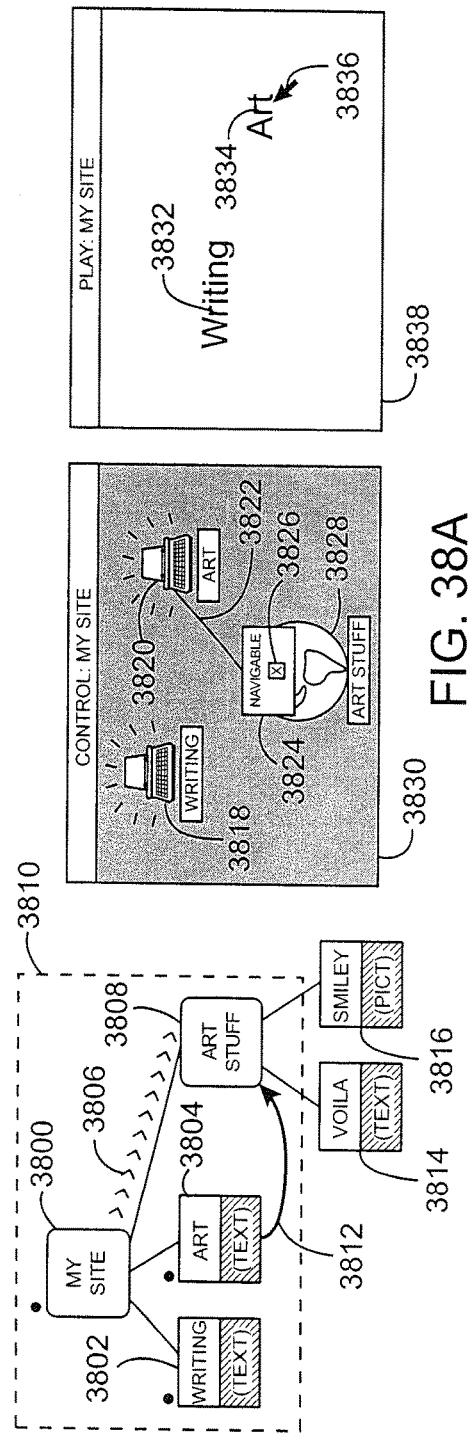

USER NAVIGATION THROUGH PRESENTATION DATA—FIGS. 38A through 39B illustrate user "navigation" through the hierarchical object space. FIGS. 38A-B illustrate basic navigation, wherein a "navigable" container object nested within an enclosing container object "takes over" the playback display from its enclosing container. This basic navigation of FIGS. 38A-B is an independent feature of the invention that may or may not be included in any given system configuration. Moreover, an optional enhancement to this basic navigation may be provided, also seen in FIGS. 39A-B, wherein a control display performs "synchronized exploration" to follow the navigation. In FIGS. 39A-B, basic navigation is shown in conjunction with a "networked container pointer object" such as that seen in FIG. 34E.

The functionality illustrated in FIGS. 38A through 39B generally provides the advantage of enabling, in a clean and clear manner, user navigation from a containing container to one of its contained containers, which results in a hierarchical navigation model that represents a more intuitive and understandable way to present interlinked multimedia content. Moreover, when navigation functionality is used in conjunction with other features of the invention, such as pointer objects, networking, publishing and collaborative editing, sub-displays, exploration using control displays, etc., further advantages are derived in terms of a more unified and simplified approach for accessing and interacting with multimedia content, including content distributed over a network.

Before describing FIGS. 38A through 39B, some general points should be noted. First, the presence and use of control displays in these figures is illustrative only; control displays are not required for the features being presented in these diagrams (the one exception being the above-mentioned "synchronized exploration" feature). Second, in the examples of FIGS. 38A through 39B, the triggering event that initiates user navigation is the starting of a "navigable" container object; while this is the currently preferred method for triggering navigation, other methods of triggering navigation may also be effective depending on implementation. Third, in the examples of FIGS. 38A through 39B and in later examples involving sub-displays, navigation results in previously playing objects becoming dormant pending "back navigation," which may be implemented in a variety of ways such as with greater or lesser amounts of information maintained about dormant objects, etc.; in addition, in an optional enhancement applicable to both navigation and sub-display navigation, when all of the objects playing in the playback display have stopped playing, pending back navigation is triggered automatically. Finally, previously programmed object behavior shown in these examples is merely provided to exemplify the starting of objects that can occur during presentation playback, and neither the specific behavior nor any particular manner for programming it is critical to the navigation functionality being presented.

Figure 38B:
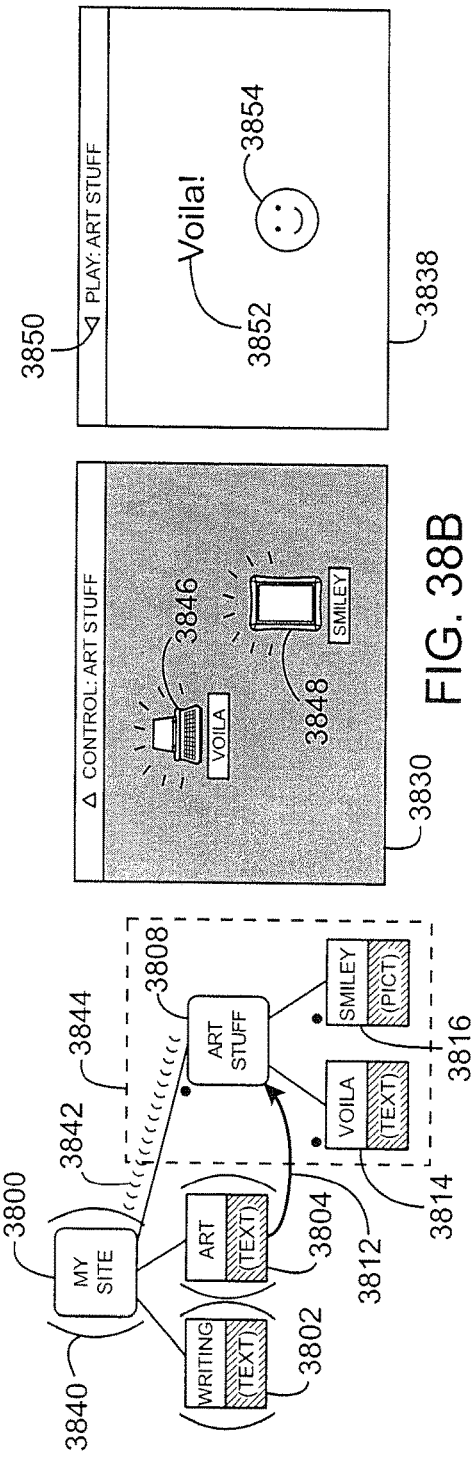

FIGS. 38A-B illustrate basic user navigation of presentation data, wherein a "navigable" container object nested within an enclosing container object "takes over" the playback display from its enclosing container, according to one embodiment of the present invention. FIG. 38A shows an upper container object 3800 containing a left text object 3802, a right text object 3804 and a nested container object 3808 which in turn contains a text object 3814 and a picture object 3816. The media data of the left and right text objects 3802 and 3804 is seen in the playback display 3838 as the left text 3832 and the right text 3834, respectively. In addition, the right text object 3804 and the nested container object 3808 have previously been programmed with object behavior, shown by the relation 3812, such as that of FIGS. 9A-B ("object A, when clicked, starts object B"). The control display 3830 is presenting the upper container object 3800 and its contents, as indicated by the dotted outline 3810. In the control display 3830, the two text icons 3818 and 3820 represent the left and right text objects 3802 and 3804, respectively. The string 3822 represents the relation 3812, and the container icon 3828 represents the nested container object 3808 and is presenting an editing panel 3824 indicating that the container is "navigable" 3826 (this property of "navigability" is the ability for a container object to be the destination of user navigation; it may either be implemented as an inherent property of some or all containers, or as a switchable property, the latter case involving various possible switching mechanisms such as editing panels, checkboxes, menus, command icons, etc.).

To initiate navigation, the user clicks 3836 on the right text 3834 in the playback display 3838, causing the nested container object 3808 to start playing due to the previously programmed object behavior shown by the relation 3812. The starting of the nested container object 3808 initiates navigation 3806, and the results of the navigation are shown in FIG. 38B. In FIG. 38B, the upper container object 3800 and its contained objects 3802 and 3804 have stopped playing and are now dormant 3840 pending "back navigation" 3842 (in a preferred enhancement, the playback state of the dormant objects is maintained while they are dormant so that when corresponding back navigation occurs the preempted presentation data is restored to its pre-navigation condition). The nested container object 3808 and its contained objects have started playing, and the media data of the contained objects 3814 and 3816 is now seen in the playback display 3838 as the text 3852 and the picture 3854, respectively. The "back" button 3850 in the playback display 3838 permits navigation back to the previous container 3800, as shown by the "back navigation" lines 3842 to the left. FIG. 38B also illustrates the "synchronized exploration" feature involving the control display. As a result of the navigation, the control display 3830 now presents the nested container object 3808 and its contents, as indicated by the dotted outline 3844. In the control display, the text icon 3846 represents the text object 3814 and the picture icon 3848 represents the picture object 3816.

FIGS. 39A-B illustrate user navigation of presentation data distributed over a network, according to one embodiment of the present invention. This example involves a "networked container pointer object" such as that seen in FIG. 34E. FIG. 39A shows an upper container object 3900 containing a left text object 3902, a right text object 3904 and a container pointer object 3908 whose contents listing 3909 references the contents listing 3922 of its base container object 3920 (accessed over a network 3918) for its contained objects, in this case two mirage objects 3914 and 3916 corresponding to the two objects 3924 and 3926 contained in the base container object. The media data for the left and right text objects 3902 and 3904 is seen in the playback display 3948 as the left text 3942 and the right text 3944, respectively. In addition, the right text object 3904 and the container pointer object 3908 have previously been programmed with object behavior, shown by the relation 3912, such as that of FIGS. 9A-B ("object A, when clicked, starts object B"). The control display 3940 is presenting the upper container object 3900 and its contents, as indicated by the dotted outline 3910. In the control display 3940, the two text icons 3928 and 3930 represent the left and right text objects 3902 and 3904, respectively. The string 3932 represents the relation 3912, and the container icon 3938 (which represents the container pointer object 3908) is presenting an editing panel 3934 indicating that the container pointer object 3908 is "navigable" 3936.

When the user clicks 3946 on the right text 3944 in the playback display 3948, the container pointer object 3908 starts playing due to the previously programmed object behavior shown by the relation 3912. The starting of the container pointer object 3908 initiates navigation 3906, and the results of the navigation are shown in FIG. 39B. In FIG. 39B, the upper container object 3900 and its contained objects 3902 and 3904 have stopped playing and are now dormant 3950 pending "back navigation" 3952. The container pointer object 3908 and its contained mirage objects have started playing, and the media data of the contained mirage objects 3914 and 3916 is now seen in the playback display 3948 as the text 3962 and the picture 3964, respectively. The "back" button 3960 in the playback display 3948 permits navigation back to the previous container 3900, as shown by the "back navigation" lines 3952 to the left. FIG. 39B also illustrates the "synchronized exploration" feature involving the control display. As a result of the navigation, the control display 3940 now presents the container pointer object 3908 and its contents, as indicated by the dotted outline 3954. In the control display, the text icon 3956 represents the mirage text object 3914 and the picture icon 3958 represents the mirage picture object 3916.

Figure 41:
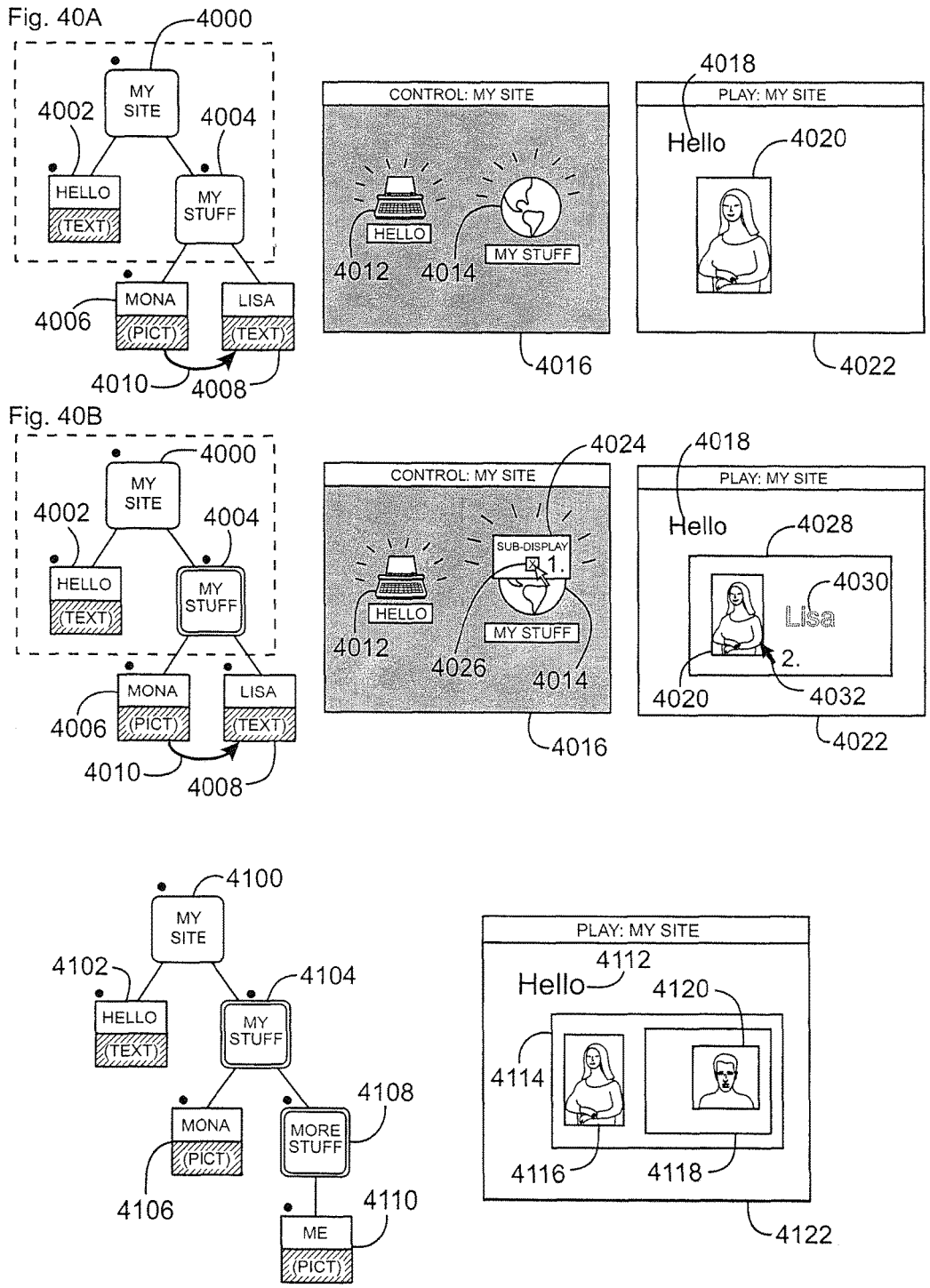
Figure 45A:
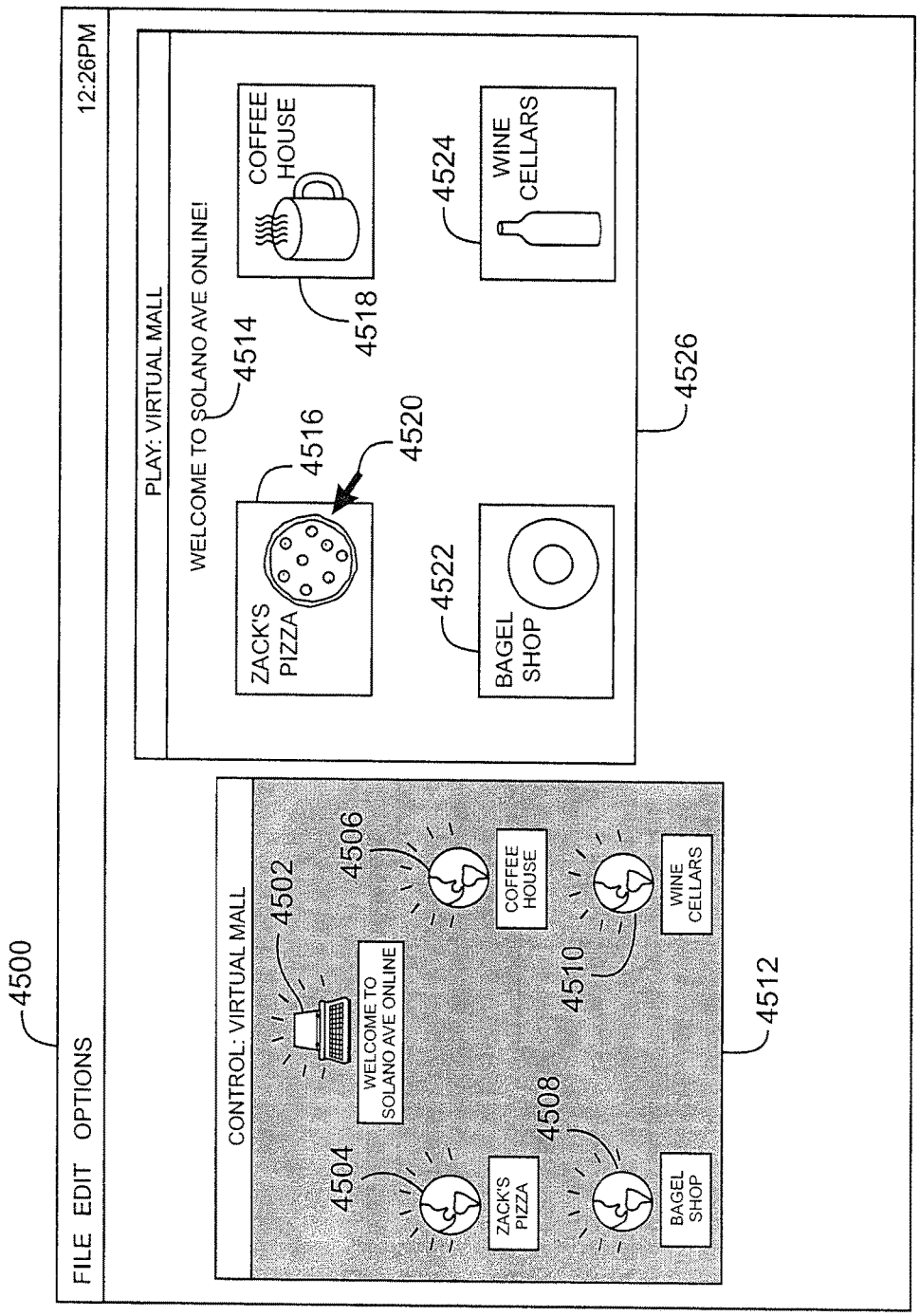
Figure 45B:
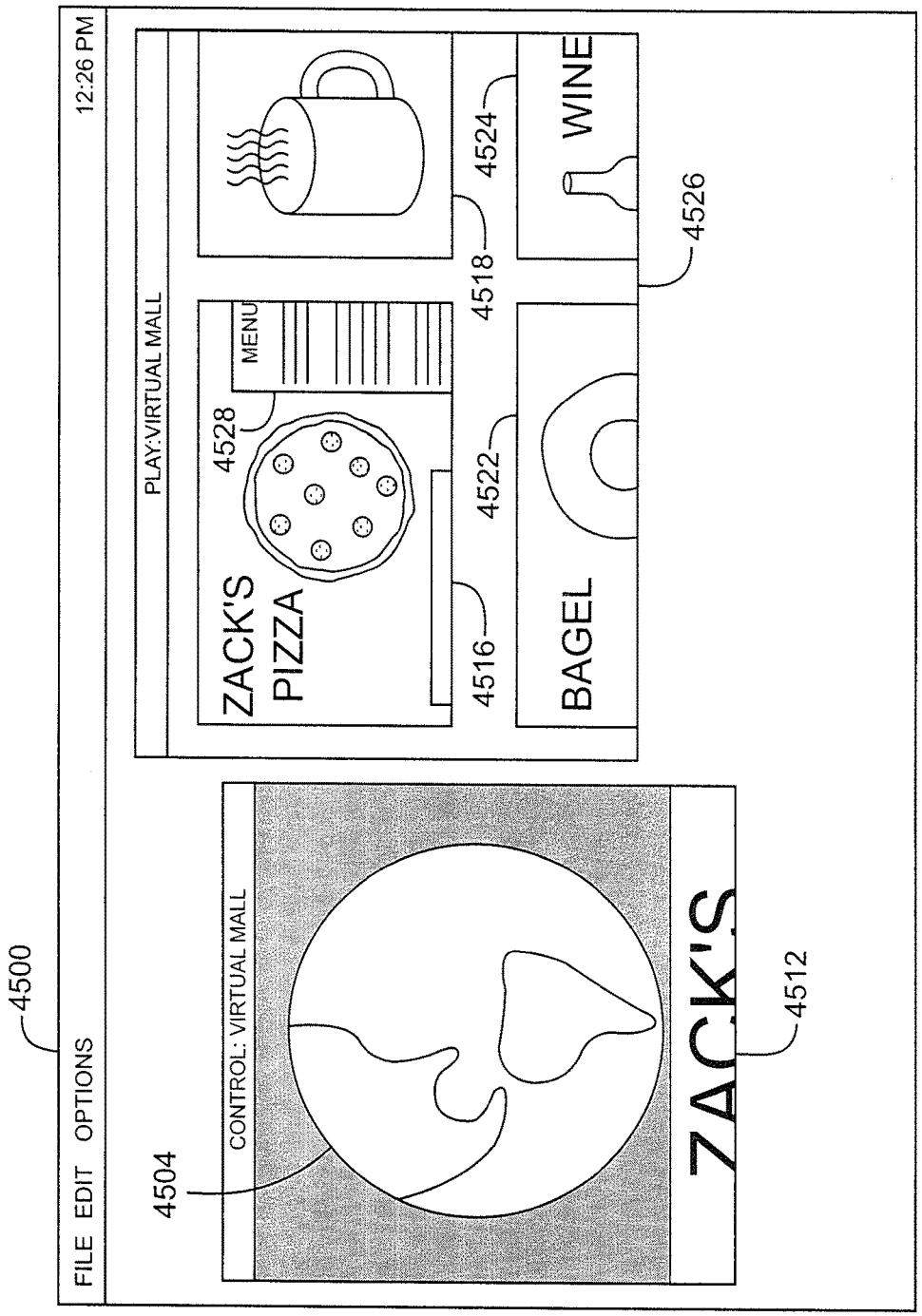
Figure 45C:
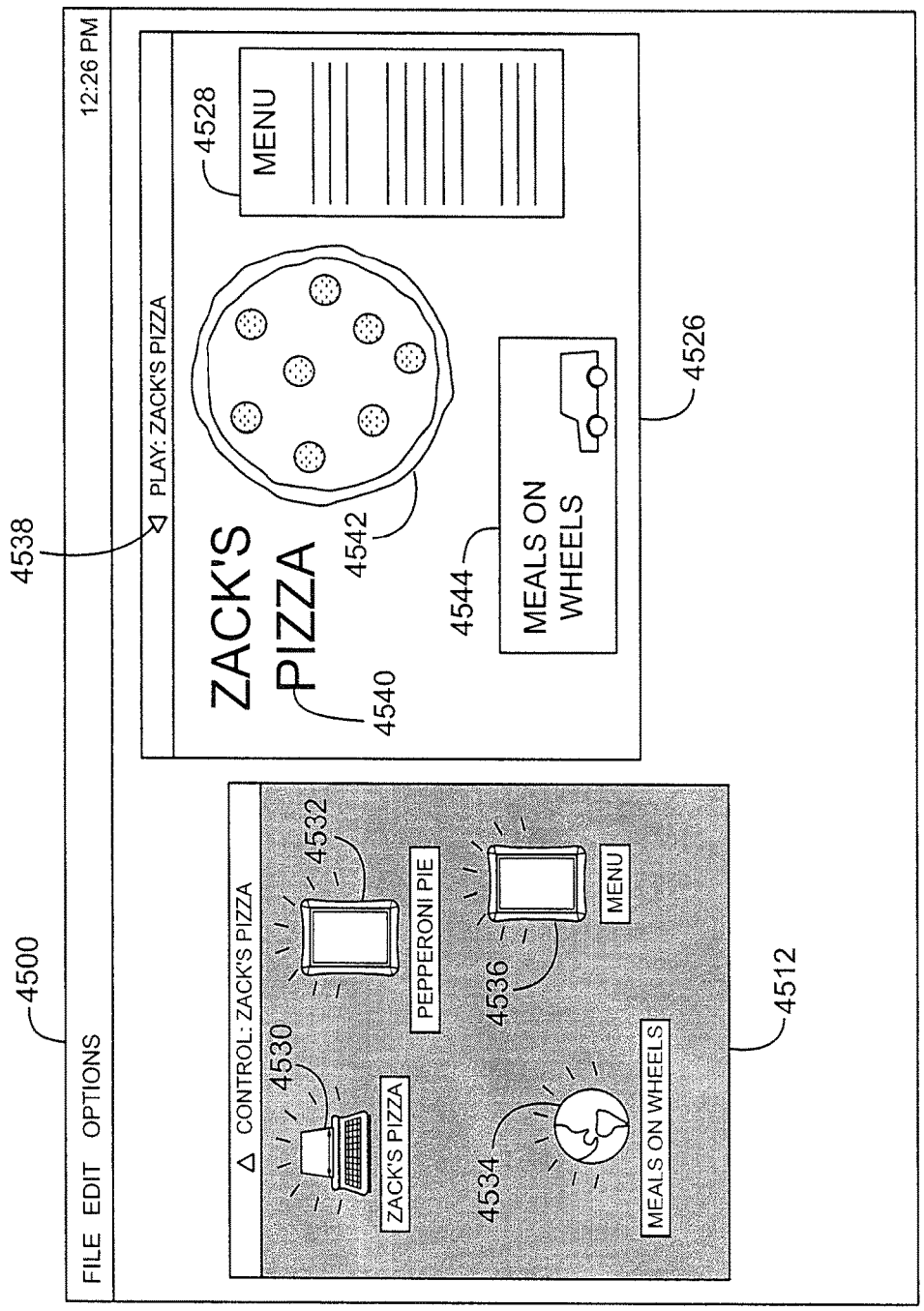

NESTED SUB-DISPLAYS—FIGS. 40 through 45C illustrate characteristics and uses of nested sub-displays in the present invention. FIG. 40 shows the basic operation of nested sub-displays, as well as two enhancements to the basic operation: the ability to turn sub-display functionality on and off for a given container object, and the ability for the user to interact with a presentation displayed within a sub-display. FIG. 41 shows a third enhancement to the basic sub-display functionality: the ability to nest a sub-display within an enclosing sub-display. FIGS. 42 through 44B show sub-display functionality used in conjunction with other features of the invention, including: container pointer objects in FIG. 42, navigation in FIG. 43, and navigation over a network in FIGS. 44A-B (along with synchronized exploration). FIGS. 45A-C show a fourth sub-display enhancement, a "zoom effect" during sub-display navigation, as well as a "zoom effect" enhancement for the exploration functionality of FIGS. 33A-B. Each of these sub-display capabilities (the basic operation and the four enhancements), as well as the "zoom" enhancement for user exploration, is a separate feature of the invention that may or may not be included in any given system configuration (the four sub-display enhancements, of course, requiring basic sub-display functionality).

The functionality illustrated in FIGS. 40 through 45C generally provides the advantage of enabling, in a clean and clear manner, the creation of multi-level multimedia content involving sub-displays, which supports the objective of creating more pleasing and interesting multimedia content with less effort. Moreover, when sub-display functionality is used in conjunction with navigation and/or networked navigation as shown in FIGS. 43A through 45C, further advantages are derived for both authors and end users via a more intuitive and comfortable model for interconnecting and navigating through multimedia content. In addition, when sub-display functionality is used in conjunction with other features of the invention, such as editing display settings, time-based playback behavior, functions of the sentence paradigm, etc., additional advantages are derived in terms of enabling users to create even more sophisticated and entertaining multimedia content with minimal effort.

Before describing FIGS. 40 through 45C, some general points should be noted. First, the presence and use of control displays in these figures is illustrative only; control displays are not required for the features being presented (the one exception being the "zoom" enhancement to user exploration shown in FIGS. 45A-C). Second, in FIGS. 40 through 45C, the association between sub-displays and container objects is the currently preferred method for implementing sub-display functionality; other methods may also be effective depending on system implementation, however the preferred method provides advantages both in terms of authoring and in terms of how sub-display functionality can be used with other features of the invention. Third, depending on system configuration, various display settings and editing functions such as those seen in FIGS. 4A through 6B, as well as time-based processing such as that seen in FIGS. 7A-G, may be applied to sub-displays. Fourth, the specific user actions shown in FIG. 40 to enable sub-display functionality and in FIGS. 43, 44 and 45 to trigger sub-display navigation are exemplary only; other methods may also be effective depending upon implementation. Finally, the previously programmed object behavior shown in FIG. 40 is provided merely to illustrate the general capability of user interaction with a presentation nested in a sub-display; the specific behavior in this case is just one example of interactive presentation behavior, and many other types of behavior may also be supported depending on system configuration.

FIGS. 40A-B illustrate the basic operation of nested sub-displays, as well as the ability to turn sub-display functionality on and off and the ability to interact with a presentation in a sub-display, according to one embodiment of the present invention. FIG. 40A shows an upper container object 4000 containing an upper text object 4002 and a nested container object 4004 which in turn contains a picture object 4006 and a lower text object 4008. All the objects except the lower text object 4008 are playing, and the media data of the upper text object 4002 and the picture object 4006 is seen in the playback display 4022 as the text 4018 and the picture 4020, respectively. In addition, the picture object 4006 and the lower text object 4008 have previously been programmed with object behavior, shown by the relation 4010, such as that of FIGS. 9A-B ("object A, when clicked, starts object B"). The control display 4016 is presenting the upper container object 4000 and its contents, which includes the text icon 4012 representing the upper text object 4002 and the container icon 4014 representing the nested container object 4004. This initial situation does not involve any new functionality beyond what has already been shown in previous figures.

In FIG. 40B, the container icon 4014 representing the nested container object 4004 now presents an editing panel 4024 to the user for editing. The user clicks 4026 in the editing panel, causing sub-display functionality to become enabled for the nested container object 4004 as indicated by its double outline (sub-display functionality for container objects may either be implemented as an inherent property of some or all containers, or as a switchable property, the latter case involving various possible switching mechanisms such as editing panels, checkboxes, menus, command icons, etc.). At the same time, the media data for the picture object 4006, seen in the playback display 4022 as the picture 4020, now appears embedded within a sub-display 4028 corresponding to the nested container object 4004. Finally, the user clicks 4032 on the picture 4020, and as a result of the previously programmed behavior shown by the relation 4010, the lower text object 4008 starts playing and its media data is now seen in the playback display 4022 as the text 4030, also embedded within the sub-display 4028.

FIG. 41 illustrates the ability to nest a sub-display within an enclosing sub-display, according to one embodiment of the present invention. The figure shows an upper container object 4100 containing a text object 4102 and a middle container object 4104 which in turn contains an upper picture object 4106 and a lower container object 4108, the latter of which in turn contains a lower picture object 4110. All of the objects are playing, and the middle and lower container objects 4104 and 4108 are associated with sub-displays, as indicated by their double outlines. In the playback display 4122, the media data of the text object 4102 is seen as the text 4112. The media data of the upper picture object 4106 is seen as the left picture 4116 embedded within the outer sub-display 4114 (which corresponds to the middle container object 4104). The media data of the lower picture object 4110 is seen as the right picture 4120 embedded within the inner sub-display 4118 (which corresponds to the lower container object 4108). The inner sub-display 4118 is itself embedded within the outer sub-display 4114, along with the left picture 4116, since both of their corresponding objects are contained by the middle container object 4104. Depending on implementation, this capability to nest sub-displays within sub-displays may be extended to additional nesting levels, such as a third level, fourth level, etc.

FIG. 42 illustrates sub-display functionality used in conjunction with the "container pointer object" functionality of FIG. 34D, according to one embodiment of the present invention. This example illustrates the application of various display settings to sub-displays, and highlights how the various sub-display settings for a container pointer object are independent from those of its base container object (similarly, the time-based behaviors of FIGS. 7A-G may also be applied to sub-displays). The figure shows an upper container object 4200 containing a text object 4202, a container pointer object 4204 and a nested container object 4206. The contents listing 4208 of the container pointer object 4204 references the contents listing 4210 of its base container object 4206 for its contained objects, in this case a mirage picture object 4212 corresponding to the picture object 4214. All the objects are playing, and the container pointer object 4204 and the nested container object 4206 are both associated with sub-displays, as indicated by their double outlines. In the playback display 4228, the media data of the text object 4202 is seen as the text 4216, the media data of the mirage picture object 4212 is seen as the left picture 4220 within the left sub-display 4218 (the latter of which corresponds to the container pointer object 4204), and the media data of the picture object 4214 is seen as the right picture 4222 within the right sub-display 4224 (the latter of which corresponds to the nested container object 4206).

Of interest in this example is the fact that the sub-displays 4218 and 4224, despite the pointer-base relationship of their corresponding container objects 4204 and 4206, have display settings that are independent from one another. Not only are the sub-displays located at different positions within the playback display 4228, but they are sized differently as seen by the different sizes of the pictures 4220 and 4222, and have different cropping as seen by the different relative positions of the pictures within their respective sub-displays. This independence is further illustrated by the fact that the user is adjusting 4226 the cropping of the left sub-display 4218, while the cropping of the right sub-display 4224 remains unchanged.

As seen in the present example, the independence between the display settings for the sub-display of a pointer container object and that of its base container object is analogous to the independence between the display settings for the media data of a pointer object and that of its base object (as seen in FIG. 34B). Moreover, the independence of the present example includes the actual enabling of sub-display functionality as well, i.e., the base container object need not have sub-display enabled in order for the container pointer object to do so. In addition, sub-display independence such as that seen in FIG. 42 also applies to multiple container pointer objects which reference a single container object. In such cases, since the sub-display settings for the various container pointer objects are independent from the base object, they are also, by logical extension, independent from one another. This is an especially powerful capability of the present invention, in that it allows a single presentation to be embedded as a sub-display within a variety of other presentations, each instance having its own custom display settings determining how the embedded presentation appears.

FIG. 43 illustrates sub-display functionality used in conjunction with the user navigation functionality of FIGS. 38A-B, according to one embodiment of the present invention. FIG. 43A shows an upper container object 4300 containing a text object 4302 and a nested container object 4306 which in turn contains a picture object 4308. The nested container object 4306 is "navigable," and it is associated with a sub-display as indicated by its double outline. All the objects are playing, and in the playback display 4318 the media data of the text object 4302 is seen as the text 4310, and the media data of the picture object 4308 is seen as the picture 4314 embedded within the sub-display 4312 (the latter of which corresponds to the nested container object 4306).

To initiate navigation "into" the sub-display, the user double-clicks 4316 on the sub-display 4312 which triggers navigation 4304, the results of which are shown in FIG. 43B (the double-clicking in this and the following examples is only one possible approach for triggering sub-display navigation, and other approaches may be effective depending on implementation, such as single-clicking on a sub-display, using buttons, icons, menus or other user interface elements, using keypad keys, etc.). In FIG. 43B, the upper container object 4300 and its contained object 4302 have stopped playing and are now dormant 4320 pending "back navigation" 4322. The nested container object 4306 is no longer associated with a sub-display, as indicated by its single outline, and the media data of its contained object 4308, seen in the playback display 4318 as the picture 4314, is now no longer embedded within a sub-display. The "back" button 4324 in the playback display 4318 permits navigation back to the previous container 4300, as shown by the "back navigation" lines 4322 to the left; clicking on the "back" button results in a restoration of the previous condition seen in FIG. 43A.

FIGS. 44A-B illustrate the use of a sub-display to navigate presentation data distributed over a network, according to one embodiment of the present invention. This example, like the navigation example of FIGS. 39A-B, involves the use of a "networked container pointer object" such as that seen in FIG. 34E. This example also includes a control display performing "synchronized exploration" (such as that of FIGS. 38A-B) in conjunction with the sub-display navigation.

FIG. 44A shows an upper container object 4400 containing a left text object 4402, a left picture object 4404 and a container pointer object 4410 whose contents listing 4412 references the contents listing 4422 of its base container object 4420 over a network 4418 for its contained objects, in this case two mirage objects 4414 and 4416 which correspond (respectively) to the two objects 4424 and 4426 contained in the base container object. The container pointer object 4410 is "navigable," and it is associated with a sub-display as indicated by its double outline. All the objects (except the base container object 4420 and its contained objects) are playing, and in the playback display 4454, the upper text 4442 corresponds to the left text object 4402, the upper picture 4444 corresponds to the left picture object 4404, and the sub-display 4452 corresponds to the container pointer object 4410. Within the sub-display 4452, the text 4446 and the picture 4448 correspond to the mirage objects 4414 and 4416, respectively. The control display 4440 is presenting the upper container object 4400 and its contents, as indicated by the dotted outline 4408. In the control display 4440, the text icon 4428 and the picture icon 4430 represent the left text object 4402 and left picture object 4404, respectively. The container icon 4434, which represents the container pointer object 4410, is presenting an editing panel 4432 indicating that the container pointer object 4410 is both "navigable" 4436 and is associated 4438 with a sub-display.

To initiate navigation "into" the sub-display, the user double-clicks 4450 on the sub-display 4452 which triggers navigation 4406, the results of which are shown in FIG. 44B. In FIG. 44B, the upper container object 4400 and its contained objects 4402 and 4404 have stopped playing and are now dormant 4456 pending "back navigation" 4458. The container pointer object 4410 is no longer associated with a sub-display, as indicated by its single outline, and the media data of its contained mirage objects 4414 and 4416, seen in the playback display 4454 as (respectively) the text 4446 and the picture 4448, is now no longer embedded within a sub-display. The "back" button 4466 in the playback display 4454 permits navigation back to the previous container 4400, as shown by the "back navigation" lines 4458 to the left; clicking on the "back" button results in a restoration of the previous condition seen in FIG. 44A. FIG. 44B also illustrates the "synchronized exploration" feature involving the control display. As a result of the navigation process, the control display 4440 now presents the container pointer object 4410 and its contents, as indicated by the dotted outline 4460. In the control display, the text icon 4462 represents the mirage text object 4414, and the picture icon 4464 represents the mirage picture object 4416.

FIGS. 45A-C illustrate user navigation into a sub-display with a "zoom effect" enhancement to emphasize the transition into the sub-display, according to one embodiment of the present invention. This example also demonstrates the use of sub-display cropping to cause presentation content to be "revealed" as a result of navigating into a sub-display. This example also includes a control display performing "synchronized exploration," which is used to illustrate a "zoom effect" enhancement for the exploration functionality of FIGS. 33A-B.

FIG. 45A shows an exemplary display screen 4500 such as might be found on a personal computer or other computing device, within which is shown a control display 4512 and a playback display 4526. Of course this specific display representation is just one possible implementation, and is not to be understood as limiting or restricting the manner in which control displays and/or playback displays can be presented to users of the system. Within the control display 4512 a text icon 4502 is shown, as well as four container icons 4504, 4506, 4508 and 4510 which represent four "navigable" container objects associated with sub-displays. For the purposes of this example, which involves four small business "sites" embedded as sub-displays within a "virtual mall," the four containers represented by the four container icons are "networked container pointer objects" that each reference a different small business site stored on a different computer. However the functionality being presented in this example does not depend on this characterization, and other characterizations may equally apply. All the objects are playing as seen in the playback display 4526: the text 4514 corresponds to the text icon 4502, and the sub-displays 4516, 4518, 4522 and 4524 correspond to the container icons 4504, 4506, 4508 and 4510, respectively. Each sub-display further contains various displayed items such as might be appropriate for the various small business sites being presented.

To initiate navigation, the user double-clicks 4520 on a selected sub-display 4516, and a "zooming" navigation transition begins. FIG. 45B shows a "snapshot" of this transition midway through the process. The playback display 4526 has "zoomed in" toward the selected sub-display 4516, which is now seen at a larger size within the playback display. At the same time, only partial views of the other sub-displays 4518, 4522 and 4524 are seen because the zoom effect is moving them out of the visible portion of the display. Moreover, we are beginning to see more information in the selected sub-display 4516 as it "unfurls" to show a partial view of a picture 4528 which was previously hidden due to the cropping of the sub-display. Meanwhile, the control display 4512 has been performing "synchronized exploration" with a "zoom effect" enhancement, and has zoomed in to a very close view of the container icon 4504 which corresponds to the selected sub-display 4516.

FIG. 45C shows the end results of the navigation process seen in FIGS. 45A and 45B. In the playback display 4526, the text 4540 and the upper left picture 4542, both of which were previously seen in the selected sub-display 4516 of FIGS. 45A and 45B, are now no longer embedded in a sub-display. Moreover, the presentation has now fully "unfurled" to reveal a new picture 4528 and a new sub-display 4544 which were previously hidden by the cropping of the sub-display. The "back" button 4538 in the playback display 4526 permits navigation back to the previous condition seen in FIG. 45A (for which a "reverse zoom effect" may be provided). The control display 4512 has now completed its "synchronized exploration" transition, and is presenting four icons 4530, 4532, 4534 and 4536 corresponding to the text 4540, the upper left picture 4542, the new sub-display 4544 and the new picture 4528, respectively. Note that the container object represented by the container icon 4534 may itself be a navigable container object, possibly located on yet another computer, allowing further sub-display navigation into that container and to containers contained within it, etc.

In FIGS. 43A through 45C, various examples of sub-display navigation have been presented. This functionality can be used in a variety of ways, and one of its most effective uses is to navigate extended hierarchies of presentation data (a few of examples of which are shown in the next section). Applied in this way, sub-display navigation provides users of the system with a vastly improved "surfing" experience compared to what is available using traditional Web browsers.

Example Scenarios

Figure 46:
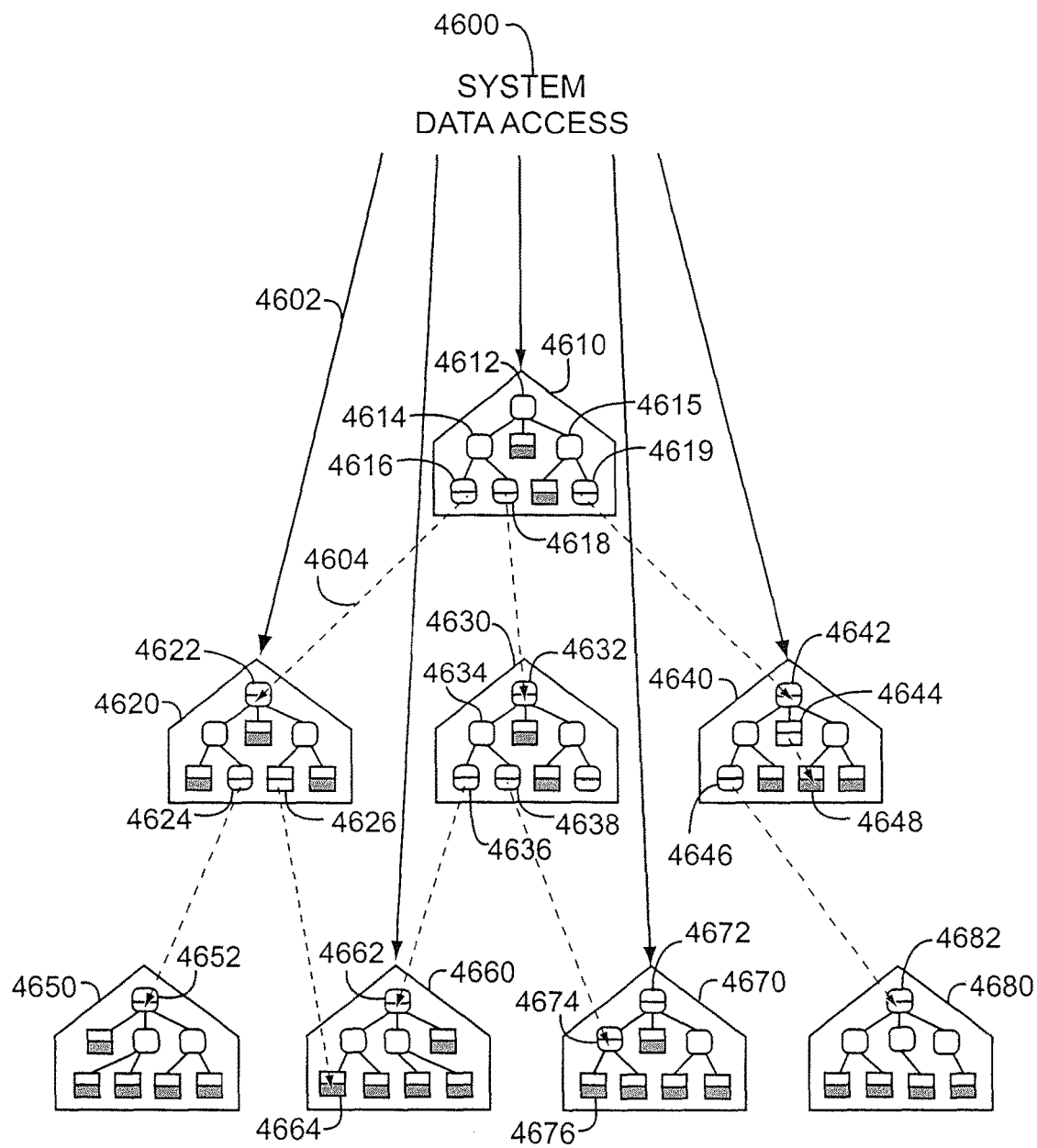
FIG. 46 illustrates an exemplary data linking scenario, in which hierarchical databases of presentation data are linked together to form a virtual hierarchy, according to embodiments of the present invention.

FIGS. 46 through 48 illustrate example scenarios showing various hierarchies of presentation data that might be created by users of the system. These examples show how features discussed in the above functional overview can be used to create deep, interconnected "webs" of multimedia content which can be explored, navigated and further developed by users of the system. Of course the presentation data in these scenarios is exemplary only, and many other different forms of presentation data may be created using embodiments of the present invention.

FIG. 46 illustrates an overview of an exemplary data linking scenario, showing hierarchical databases of presentation data linked together and forming a virtual hierarchy. FIG. 47 illustrates a block diagram of another exemplary data linking scenario, in this case showing hierarchical databases and an HFS linked together and forming a virtual hierarchy that includes two transitions: one from presentation object space to HFS object space, and vice versa. FIG. 48 illustrates a block diagram of an individual, exemplary hierarchical database of presentation data that includes programmed behavior represented as relations between objects, container control objects for propagating relations across hierarchical boundaries, and various other features of the invention. In these examples of FIGS. 46 through 48, the databases may be database files, or may be some other form of collected presentation data.

In addition to showing example presentation data, FIGS. 46 and 47 also illustrate "path resolution" functionality, which is a separate feature of the invention that may or may not be included in any given system configuration. Path resolution is the presently preferred method for making interconnected presentation data appear as a virtual hierarchy (as seen in the examples of FIGS. 46 and 47); it provides the advantage of enabling virtual hierarchies in a clear and efficient manner. Because this feature is more of an underlying system operation than a user-oriented function, and because it is best illustrated using large amounts of data, it is presented here rather than in the previous Functional Overview section. Path resolution is described below in the discussion of FIGS. 46 and 47, but briefly, it can be summarized as follows. All the objects in a virtual hierarchy, regardless of their physical location, are identified using a "root path" oriented from the top of the hierarchy; then, whenever data for a particular object needs to be accessed, the root path for that object is converted to a "physical path" by performing a path resolution process, in which each "jump" in the virtual hierarchy is "resolved out" from the root path one jump at a time from top to bottom; once the entire path has been resolved in this way, the data for the object is accessed from its physical location using the fully resolved physical path.

FIG. 46 illustrates an overview of an exemplary data linking scenario, showing hierarchical databases of presentation data linked together and forming a virtual hierarchy, according to one embodiment of the present invention. This figure also includes three examples of path resolution used in connection with the virtual hierarchy. The figure shows eight databases of presentation data 4610, 4620, 4630, 4640, 4650, 4660, 4670 and 4680, each containing various types of objects. These databases may be located on a local storage system with respect to the present invention, or across a network on one or more remote computers, or on some combination of the above. A data access capability 4600 included in embodiments of the invention can access data from each of the databases, as indicated by the data access lines 4602 (which are shown going to only some of the databases to avoid visual clutter). From the user perspective, the various links among the database objects (indicated by the link lines 4604) result in the different databases being presented to the user as a single virtual hierarchy "rooted" at the container object 4612 in the top database 4610.

In the example of FIG. 46, the various links among the database objects are accomplished using pointer objects such as those seen in FIGS. 34A-E. A number of the links shown involve container pointer objects, and these include the container pointer object 4616 referencing a base container object 4622, as well as various other container pointer objects 4618, 4619, 4624, 4636, 4638 and 4646 referencing various other base container objects 4632, 4642, 4652, 4662, 4674 and 4682, respectively. In addition, two of the links shown involve non-container objects, and these include a pointer object 4626 referencing a base object 4664, and another pointer object 4644 referencing a base object 4648. Of course the particular links shown in FIG. 46 are exemplary only, and many other forms of virtual hierarchies may be created depending on the specific links chosen.

To demonstrate how path resolution can be used in connection with the virtual hierarchy, three examples of path resolution are described. Each of these examples shows a different version of path resolution, each of which may be provided with or without other versions of path resolution depending on implementation. Moreover, it is the general logic of the path resolution process in each case that defines the functionality involved, and not the specific form of the paths being manipulated. The first example involves a case where the contents listing for the container pointer object 4616 has been requested, and the contents listing for its base container object 4622 is provided instead; this is the basic building block of the extended virtual hierarchy shown in FIG. 46. The second example involves a case where the media data of the picture object 4676 has been requested; the deep location of this object is used to illustrate multi-step path resolution. The final example involves a case where the display settings for the pointer object 4644 have been requested; in this example, the independence between the display settings of the pointer object and those of its base object is achieved by not executing the last step of the path resolution process.

In the first example of path resolution, the contents listing for the container pointer object 4616 in the top database 4610 has been requested. In this example, the container pointer object 4616 is identified by the root path "4610//4612/4614/4616," where the first entry in the path identifies the top database in the hierarchy (called the "root database"), the last entry identifies the object in question, and the intervening entries identify any intervening container objects (starting with the top container object in the root database). The process of path resolution begins with an evaluation of whether or not the first object 4612 in the path is a pointer object. Since it is not, the evaluation moves on to the next object 4614, which is also not a pointer object. The evaluation then moves on to the next object 4616, and since that object is a pointer object, the path up to that point is replaced with the path of that object's base object: "4620//4622" (specified in reference to the database 4620 that contains the base object). Since there are no further objects in the path, the path resolution is now complete. The contents listing for the container pointer object 4616 is accessed using the fully resolved path "4620//4622," and the listing returned is that of the base container object 4622 read from the database 4620 that contains the base container object.

In the second example of path resolution, the media data for the picture object 4676 located at the bottom of the hierarchy has been requested. In this example, the picture object 4676 is identified by the root path "4610//4612/4614/4618/4634/4638/4676," where once again the first entry in the path identifies the root database, the last entry identifies the object in question, and the intervening entries identify intervening container objects. Once again, the process of path resolution begins with an evaluation of whether or not the first object 4612 in the path is a pointer object. Since it is not, the evaluation moves on to the next object 4614, also not a pointer object, and then on to the next object 4618. Since that object is a pointer object, the path up to that point is replaced with the path of its base object: "4630//4632," resulting in a new path "4630//4632/4634/4638/4676." The evaluation then continues with the first object 4632 in the new path, which is not a pointer object, then the next object 4634, also not a pointer object, and then the next object 4638. Since that object is a pointer object, the path up to that point is replaced with the path of its base object: "4670//4672/4674" (note that in this case the base object is not the top object in its database, and therefore its path involves an intervening object). The new path is now "4670//4672/4674/4676," and the evaluation then continues all the way to the end of the path with no further resolutions since there are no further pointer objects. With path resolution complete, the media data for the picture object 4676 is read from its database 4670 using the fully resolved path.

In the third example of path resolution, the display settings for a pointer object 4644 have been requested. This example shows how the independence of display settings between a pointer object and its base object can be achieved by not executing the last step of the path resolution process. In this example, the pointer object 4644 is identified by the root path "4610//4612/4615/4619/4644," where once again the first entry in the path identifies the root database, the last entry identifies the object in question, and the intervening entries identify intervening container objects. As before, the process of path resolution begins with an evaluation of whether or not the first object 4612 in the path is a pointer object. Since it is not, the evaluation moves on to the next object 4615, also not a pointer object, and then on to the next object 4619. Since that object is a pointer object, the path up to that point is replaced with the path of its base object, "4640//4642," resulting in a new path "4640//4642/4644." The evaluation then continues with the first object 4642 in the new path, which is not a pointer object, and then on to the next object 4644. Even though that object 4644 is a pointer object, it is the last object in the path and it is the display settings of that object that are being requested. As a result, the path is not replaced with the path of the base object 4648 (as it would be if the media data were being requested), but rather the display settings for the pointer object 4644 are read from its database 4640 using the almost fully resolved path.

FIG. 47 illustrates a block diagram of a second exemplary data linking scenario, in this case showing three hierarchical databases of presentation data and a section of a hierarchical file system (HFS) linked together and forming a virtual hierarchy, according to one embodiment of the present invention. This example includes both types of transitions between presentation space and HFS space discussed in connection with FIGS. 35A through 37B, as well as corresponding path resolution functionality for each type of transition.

FIG. 47 shows three databases of presentation data 4700, 4720 and 4730, each containing various types of objects. The figure also shows a section 4710 of an HFS, such as might be provided by the operating system on a typical computer. The HFS 4710 includes a number of folders (4712, 4714, etc.) and files (4716, etc.) organized in a hierarchical arrangement whereby folders contain files and/ or nested folders (as is typical in an HFS). All of the various databases and HFS objects of FIG. 47 may be located on a local storage system with respect to the present invention, or across a network on one or more remote computers, or on some combination of the above. A data access capability included in embodiments the present invention (not shown, but similar to that of FIG. 46) can access data from each of the databases and HFS objects. From the user perspective, various links among the data in FIG. 47 (indicated by the link lines 4740 and 4750) and the containment of the database 4730 within the HFS folder 4714 (indicated by the containment line 4760) result in the databases and HFS objects being presented to the user as a single virtual hierarchy "rooted" at the top container object 4702 in the root database 4700.

In the example of FIG. 47, one of the links shown is accomplished using a container pointer object such as that seen in FIG. 34D, specifically, the container pointer object 4706 in the root database 4700 referencing the base container object 4722 in the database 4720. The other links involve transitions between presentation object space and HFS object space as discussed in connection with FIGS. 35A through 37B. In particular, a folder pointer object 4708 in the root database 4700 references an HFS folder 4712 in the HFS to create a transition from the presentation object space of the root database to the HFS object space of the HFS 4710. Also, the folder 4714 in the HFS contains a database file 4730 to create a transition from the HFS object space of the HFS 4710 to the presentation object space of the contained database 4730. Of course the particular links shown in FIG. 47 are exemplary only, and many other forms of virtual hierarchies may be created depending on the specific links chosen.

To demonstrate how path resolution can be used in connection with transitions between presentation object space and HFS object space, a single example of path resolution that involves both types of transitions is described. Although both transition types are shown in a single example, the path resolution procedures used for each of the two transition types are nonetheless independent versions of path resolution, each of which may be provided with or without other versions of path resolution depending on implementation. Moreover, it is the general logic of the path resolution process in each case that defines the functionality involved, and not the specific form of the paths being manipulated. In the following example, the media data of the picture object 4736 at the bottom of the hierarchy has been requested; in order to access the required data, a transition from presentation space to HFS space is performed first, followed by a transition from HFS space to presentation space.

In an example demonstrating the two versions of path resolution just discussed, the media data for the picture object 4736 in the database 4730 has been requested. In this example, the picture object 4736 is identified by the root path "4700//4702/4704/4708/4714/4730/4734/4736, where once again the first entry in the path identifies a database, the last entry identifies the object in question, and the intervening entries identify intervening container objects (or in HFS space, intervening folders and/or database files). As before, the process of path resolution begins with an evaluation of whether or not the first object 4702 in the path is a pointer object. Since it is not, the evaluation moves on to the next object 4704, also not a pointer object, and then on to the next object 4708. Since that object is a pointer object, specifically a folder pointer object, the path up to that point is replaced with the path of its base folder: "4710//4712," resulting in a new path "4710//4712/4714/4730/4734/4736." This represents a transition from presentation object space to HFS object space.

The new path, unlike the other paths seen so far, is "rooted" in HFS space rather than presentation space, meaning that the first entry in the path identifies an HFS rather than a database. Path resolution continues in a similar manner as before, except that instead of each entry being evaluated as to whether or not it is a pointer object, each entry is evaluated as to whether or not it is a database file. So the evaluation continues with the first object 4712 in the new path, which is not a database file, then the next object 4714, also not a database file, and then the next object 4730. Since that object is a database file, the path up to that point is replaced with the path of the top object in the database file, "4730//4732," resulting in a new path of 4730//4732/4734/ 4736. This change represents a transition from HFS object space to presentation object space. Now back in presentation space, the evaluation continues, once again checking for pointer objects all the way to the end of the path. Since there are no further pointer objects, path resolution is now complete and the media data for the picture object 4736 is read from its database 4730 using the fully resolved path.

FIG. 48 illustrates a block diagram of an individual, exemplary hierarchical database of presentation data, according to one embodiment of the present invention. This example includes a variety of features discussed throughout this specification, including various object types such as video objects and container control objects, programmed object behavior represented as relations between objects, dynamic parameter modification using vector objects, and container objects associated with sub-displays. In addition, FIG. 48 illustrates one new feature of the invention, which is the use of container control objects (discussed in connection with FIG. 29B) for "bussing" relations across hierarchical boundaries. This feature is an independent feature of the invention that may or may not be included in any given system configuration; it provides the advantage of a clearer and more understandable structure for propagating object behavior throughout a hierarchically arranged multimedia presentation.

FIG. 48 shows a hierarchical database 4800 with an upper container object 4802 at the top level of its internal hierarchy. The upper container object 4802 contains a left nested container object 4804, a left picture object 4806, a container control object 4810, a right nested container object 4812 and a right picture object 4814. The left nested container object 4804 in turn contains a left picture object 4820, a container control object 4824, a vector object 4826 and a right picture object 4828. The right nested container object 4812 in turn contains a container control object 4832, a text object 4834 and a video object 4836. Both nested container objects 4804 and 4812 are associated with sub-displays, as indicated by their double outlines; as a result, the media data of their contained objects will be seen in corresponding sub-displays in the playback display.

The presentation data in FIG. 48 involves dynamic and interactive content; the following verbal description is provided to depict how the resulting multimedia presentation appears when played. When the upper container object 4802 is started, the start propagation of FIG. 8A causes all of its contained objects to start playing, and the media data for the two picture objects 4806 and 4814 appears in the playback display as pictures. At the same time, sub-displays associated with the nested container objects 4804 and 4812 also appear in the playback display. In the case of the left container object 4804, the start propagation of FIG. 8A causes all of its contained objects to start playing as well, and the media data of its contained picture objects 4820 and 4828 is seen embedded within its corresponding sub-display. At the same time, the vector object 4826 starts playing, and via the programmed behavior shown by the relations 4840 and 4842, performs some entertaining manipulation to the display settings of the two picture objects 4820 and 4828, such as changing the vertical stretch of the former and the horizontal stretch of the latter in a repeating dynamic pattern.

Meanwhile, even though the right container object 4812 has started playing and its sub-display is seen in the playback display, the sub-display is empty. The reason is that in the case of the right container object 4812, the start propagation of FIG. 8A is blocked by the "start propagation exemption" discussed in connection with that figure. Recall that this exemption causes start propagation to be blocked for objects that might be started by programmed behavior. The programmed behavior in this case is shown by the two lower right relations 4844 and 4846, and will be explained shortly.

First we examine the behavior shown by the upper right relation 4818, which is similar to that of FIGS. 9A-B ("object A, when clicked, starts object B"). However in this case, "object B" is not the container object 4812. This is because the container object 4812 "busses" 4830 the relation to its container control object 4832 (crossing a hierarchical boundary). The container control object 4832 in turn busses the relation 4844 to the video object 4836. Thus, the video object 4836 is actually the "object B" for the upper right relation 4818. Therefore, when the user clicks in the playback display on the picture corresponding to the picture object 4814, the video object 4836 starts playing within the sub-display corresponding to the container object 4812. And at a certain programmed "cue point" during the playback of the video object 4836, it causes the text object 4834 to also start playing within the same sub-display, via programmed behavior 4846 such as that seen in FIGS. 25A-B ("video object A, upon reaching cue point, starts object B").

Turning now to the left side of FIG. 48, the media data of the two picture objects 4820 and 4828 is still seen in the sub-display corresponding to the container object 4804, and is still changing dynamically due to the manipulations of the vector object 4826. As shown by the relation 4838, the left picture object 4820 has been programmed with behavior such as that seen in FIGS. 11A-B ("object A, when clicked, stops object B"). In this case once again, though, "object B" is not the container control object 4824. Rather, the container control object 4824 busses 4822 the relation to its associated container object 4804, which in turn busses 4816 the relation to the upper container control object 4810, which in turn busses 4808 the relation to the upper container object 4802. Thus, the upper container object 4802, two hierarchical levels away, is actually the "object B" for the relation 4838. As a result of all this bussing, when the user clicks in the playback display on the picture corresponding to the left picture object 4820, the entire presentation stops playing!

As seen in the examples of FIGS. 46 through 48, the networking and pointer object features of the invention allow distributed and disparate data to be interlinked and presented as a well-organized hierarchy. In addition, the programming and editing features of the invention allow authors to instill the content in the hierarchy with dynamic activity and visual appeal. Moreover, as seen earlier, the exploration, navigation and sub-display features of the invention allow these hierarchies to be easily traversed, presenting users with a fluid, coherent "surfing" experience. And finally, the collaborative editing features of the invention allow distributed content to be developed on an ongoing basis by a multiplicity of users. All of this is to say that the various features of the invention, while independent from one another and possessing their own individual advantages, are also highly complementary, and when provided together, their combined strength can alleviate the burden of multiple incompatible tools, and provide a unified approach to authoring, distribution and viewing of multimedia content within a system appropriate for users of all skill levels.

Hardware Overview

FIG. 49 illustrates how the present invention may be implemented on one or more computers executing software instructions. Operation of the system may be either standalone or networked, and three different network embodiments are shown. Regardless of whether operation is standalone or networked, the steps of accessing, downloading, and manipulating the data, as well as other aspects of the invention, are implemented by a central processing unit (CPU) in a computer executing sequences of instructions stored in a memory. The memory may be a random access memory (RAM), read-only memory (ROM), a persistent store, such as a mass storage device, or any combination of these devices. Execution of the sequences of instructions causes the CPU to perform steps according to embodiments of the present invention.

The instructions may be loaded into the memory of the computer from a storage device, or from one or more other computer systems over a network connection. For example, a server computer may transmit a sequence of instructions to a client computer in response to a message transmitted to the server over a network by the client. The client may store the instructions for later execution, or it may execute the instructions as they arrive over the network connection. In some cases, the downloaded instructions may be directly supported by the CPU; in other cases, the instructions may be executed by an interpreter that interprets the instructions. In other embodiments, hardwired circuitry may be used in place of, or in combination with, software instructions to implement the present invention. Thus, the present invention is not limited to any specific combination of hardware circuitry and software, nor to any particular source for the instructions executed by the computer running the software.

FIG. 49 illustrates a computer system 4900 that implements embodiments of the present invention, both standalone and networked. Ignoring for a moment the network system elements of FIG. 49, the standalone embodiment of the present invention is illustrated by the resident application 4912 and by the plug-in application 4914, shown hosted in the author computer 4910. Typically, a single computer would host either the resident or plug-in version of the application, although both may be hosted in the same computer. A detailed description of an implementation for the resident application 4912 and plug-in application 4914 is provided in the System Architecture section of this specification.

In the network embodiments of FIG. 49, the network can be the Internet, a Wide Area Network (WAN), a Local Area Network (LAN), a Virtual Private Network (VPN), or any other network or combination of networks that can effectively transfer the required data. With current technologies, a modem, a CATV (cable television) bi-directional network, ISDN (Integrated Services Digital Network), DSL (Digital Subscriber Line), xDSL high-speed network or wireless network are examples of appropriate network infrastructures, though they are not intended to be exclusive as to the types of networks capable of practicing the present invention. It should be noted that the network embodiments of the present invention may include a larger number of interconnected author, client and server computers than shown in FIG. 49.

In FIG. 49, three network embodiments of the present invention are shown. In the first, content is distributed over a network using a network data server. In the second, content is distributed over a network using peer-to-peer filesharing. In the third, the invention runs in a central server under the control of a remote user, who performs user actions and receives program output over a network. These three embodiments are not mutually exclusive and may be used in combination with each other. Moreover, they are not intended to restrict the invention to just these embodiments, or imply that other network embodiments cannot be used to practice the invention. Each of these network embodiments is now discussed in turn.

In the first network embodiment of FIG. 49, a network data server is used to provide content distribution. In this embodiment, a network data server computer 4930 is coupled, directly or indirectly, to one or more author computers 4910 and to one or more client computers 4950 through a network 4920. The data server 4930 executes a data server process 4932 to provide file access to author and client computers coupled to the network 4920. Content is uploaded 4924 from the author computer 4910 to the data server 4930 using a file transfer protocol. Once present on the server, the content can be accessed 4926 from a client computer 4950 using a file access protocol. Other client computers (not shown) may access the network 4920 as well. The server process 4932 and its associated protocols may be standard, such as a Web server using FTP and http, or they may be implemented as proprietary or dedicated programs or protocols that communicate over a public or private computer network.

In the second network embodiment of FIG. 49, peer-to-peer filesharing is used to provide content distribution. In this embodiment, the author computer 4910 runs a filesharing process (which may, depending on implementation, be included within the resident application 4912 or plug-in application 4914) that simulates the data server process 4932 of the data server 4930. The author computer 4910 is coupled, directly or indirectly, to one or more client computers 4940 through a network 4920. In order to distribute content in this embodiment, the author computer 4910 logs the relevant data with its filesharing process, thereby making it accessible to other computers. This filesharing process may either be "pure" peer-to-peer, in which case there is no central server involved, or it may be "assisted" peer-to-peer, in which case the central server 4960, running a central server process 4962, may be used to facilitate author-client transactions (such as to provide the author's network address to the client, or to cache frequently accessed data, etc.). Once the data is made accessible, it may be accessed 4922 by the client computer 4940 using a file access protocol. As with the above server embodiment, the file access protocol can either be standard, such as http, or proprietary.

In the third network embodiment of FIG. 49, the invention runs in a central server under the control of a remote user, who performs user actions and receives program output over a network. In this embodiment, the plug-in application 4914 is hosted by the central server process 4962 running in the central server 4960. The central server 4960 is coupled, directly or indirectly, to one or more author computers 4910 and to one or more client computers 4950 through a network 4920. In this scenario, operations of the invention take place in the plug-in application 4914 in the central server 4960. This allows the resident application 4912 or plug-in application 4914 in the author and/or client computers to be a "dumb terminal" with minimal functionality (such as sending user actions over the network to the central server 4960 in the form of keystrokes and/or movements of a pointing device, and receiving program output over the network from the central server in a the form of a video or audio-visual feed or some other format).

As can be appreciated by those of ordinary skill in the art, the representative computers of FIG. 49 can be implemented as any standard computer that includes a CPU coupled through a bus to various other devices. These devices can include random access memory (RAM), read only memory (ROM) and various other types of storage devices (such as magnetic disks, tape drives, optical compact disks, and/or any other cards or devices for storing data and instructions). The computer also typically includes input/output devices, such as a display device, a keyboard, a mouse or other pointing device, and a network interface device, along with other similar devices or interfaces. It may also include a "web cam" or other image capturing device 4916 which captures images and makes them available to applications running in the computer. It may also include an audio playback system, which in most cases would consist of digital-to-analog audio converters and an amplifier and speakers (provided in a variety of physical configurations). Any of the computers in FIG. 49 can be implemented in the form of a personal computer, a laptop computer, a mainframe computer, other types of workstation computers, a set top box, a gaming device, a PDA or other handheld device, or any other computing device of comparable capabilities.

The presently preferred embodiment of the invention was produced using Microsoft Visual C++ Version 6.0 running in a Windows 98 desktop computer.

System Architecture

A system which provides authoring and playback of multimedia content according to embodiments of the present invention is now described. The system can be implemented as a "resident application" for installation on a computer or as a "plug-in application" associated with a host application. In the presently preferred embodiments, the creation and playback of content occurs in the context of a personal computer which may or may not be connected to a network, as discussed above. At the same time, however, the scope of the invention is not limited to just these implementations.

The system described in the following discussion operates within the field of multimedia authoring and playback; however another field relevant to an understanding of the system is the field of interactive entertainment, i.e., computer and video games. With games, the fluidity of the user experience is paramount. To produce a highly dynamic and responsive user experience, computer game developers typically develop system elements such as highly efficient playback engines and flexible object models that can effectively handle the constant starting and stopping of objects that occurs in a game. Some aspects of the present system have been inspired by a similar design approach. This use of a game-inspired design approach for a multimedia authoring and playback system is one of the underlying factors that distinguishes the present system from more traditional multimedia tools, such as those discussed earlier in the background section.

In the following discussion, various system functions are described so that increasing levels of complexity and sophistication are revealed over the course of the discussion. Where appropriate, this increasing functional complexity is delineated in ways which correlate to features discussed earlier in the Functional Overview. In many cases, however, for the sake of clarity, certain system functions are described as generalized implementations that encompass multiple features at once. In cases where such generalized implementations are presented, it is the above Functional Overview, and not the generalized implementation, that defines and delineates the features of the invention and any dependencies between them.

Furthermore, the structural and functional divisions of the software system explained below are intended to describe only the currently preferred implementation for the invention. The functionality of the invention may also be organized and arranged using many other system architectures, such as those in which similar functionality is redistributed among different system components, implemented in different ways, etc. Moreover, depending on which features of the invention are included within a particular system configuration, elements of the system described below may be simplified or omitted altogether. Therefore, no limitation to the present invention should be construed from the design of the software system comprising its currently preferred implementation, which is detailed as follows.

Figure 50:
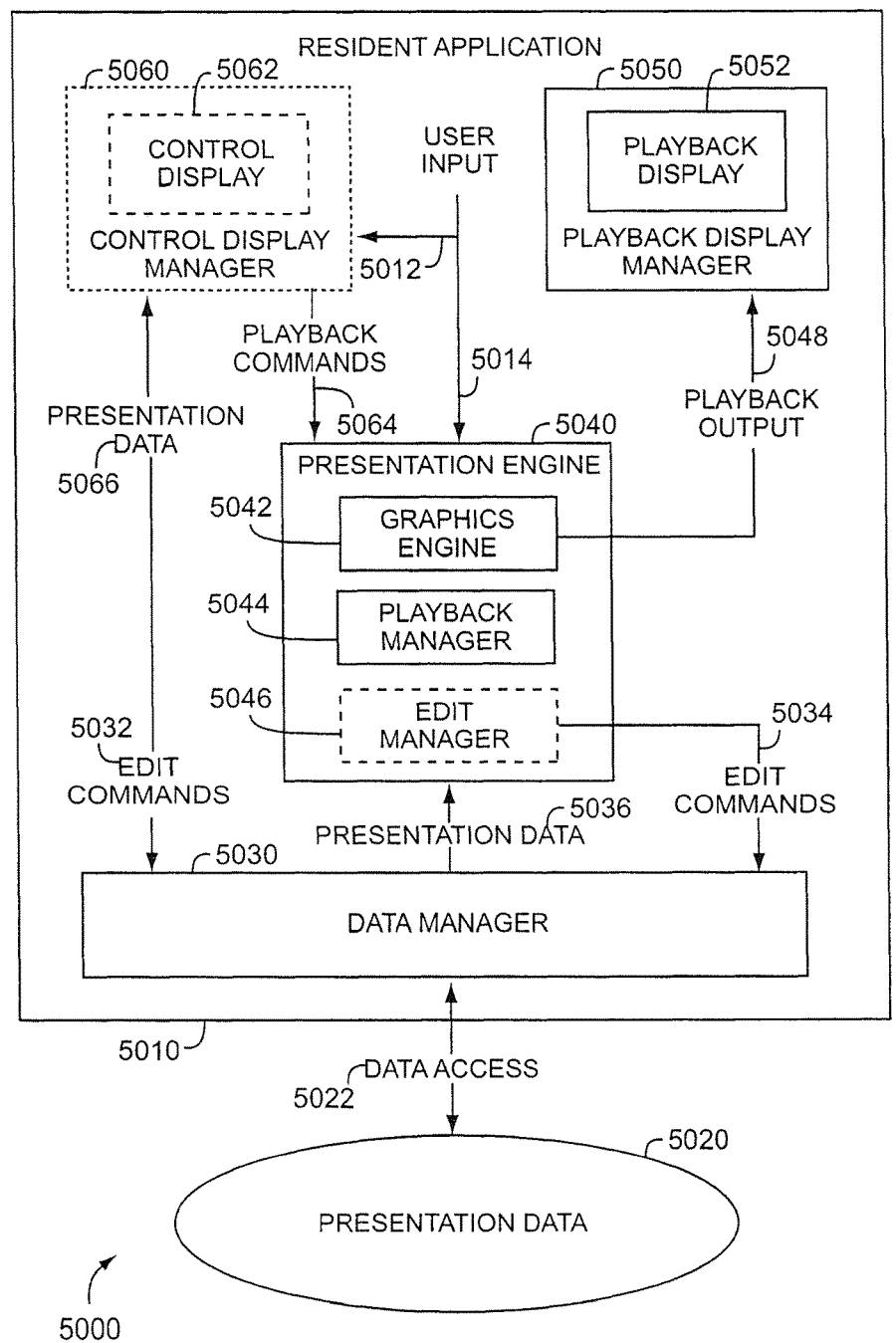
FIG. 50 illustrates a block diagram of a system for authoring and playing back multimedia content, implemented as an installed software application, according to an embodiment of the present invention.

An overall multimedia authoring and playback system, shown implemented as a "resident application" that can be installed in a computer, is illustrated by block diagram in FIG. 50. As seen in the embodiment of FIG. 50, the authoring and playback system 5000 is comprised of a block of application elements 5010, as well as presentation data 5020. The presentation data 5020 consists of multimedia content which can be authored and played by users of the system. In the preferred configuration of FIG. 50, the presentation data 5020 is accessed by a "data manager" 5030 within the block of application elements 5010, as illustrated by arrow 5022. The main role of this data manager 5030 is to make presentation data available to other system components for reading and writing (which can involve various functions for managing and manipulating data, detailed in connection with FIGS. 80 through 85).

In addition to the data manager 5030, the block of application elements 5010 of FIG. 50 shows a "presentation engine" 5040, a "playback display manager" 5050 and a "control display manager" 5060. The presentation engine 5040 is a mechanism, program or process which "presents" multimedia content by initiating and managing "playback processes" that output media data to one or more playback displays; in addition, an optional sub-block 5046 may provide various editing functions for authoring presentation data. The playback display manager 5050 is a system component that manages one or more playback displays 5052, each of which is a representation, such as a window in a graphical user interface ("GUI"), that displays visual content. The control display manager 5060 is an optional system component that manages one or more control displays 5062, each of which is a GUI window, panel or other user interface device used to view, manage and/or edit presentation data.

In FIG. 50, the two functional blocks shown in dotted outline, the control display manager 5060 and the edit manager 5046, are optional blocks associated with certain categories of functionality provided by the system. With both blocks absent, the system is a "player application" that plays presentation data but does not provide editing. With the edit manager 5046 present, the system can include editing functionality involving playback displays, such as any of the editing features seen in the Functional Overview which do not require a control display (the majority). With the control display manager 5060 present, the system can include any of the features involving control displays found in the Functional Overview. With both blocks 5060 and 5046 present, the system can include any of the features and functions seen in the Functional Overview.

In addition to the application elements shown in FIG. 50 (the data manager 5030, the presentation engine 5040, the playback display manager 5050 and the control display manager 5060), the system also includes a number of typical functions and services found in many software applications. These include: (1) a "main loop" which drives the operation of the system, (2) provisions for receiving and routing user input, (3) window, menu and toolbar services, (4) memory allocation and deallocation services, (5) file access and network services, (6) audio output services, and (7) standard user interface services (buttons, checkboxes, radio buttons, text entry boxes, number boxes, dialog boxes, etc.). Because these functions and services are found in most software applications, they are not discussed in great detail, but are described in overview as follows.

A "main loop" drives the basic operation of the system, providing two main functions. The first is to acquire user input from the local operating system and route it to the appropriate system components. The second is to issue an "update" function call to the system components on a periodic basis (in this case once per "frame," i.e., once each time through the main loop). This update call enables the system components to perform repetitive or time-based operations, and an overall "system time" is made available so that this processing can be correlated to the passage of time.

User input is received by the main loop and routed to the presentation engine 5040, as shown by the arrow 5014, and may also be routed to the control display manager 5060 if one is present, as shown by the arrow 5012. User input is defined in more detail later in this specification, but for the purposes of this high level view it includes user actions such as movements and clicks of a mouse or other pointing device, keystrokes on a keypad, etc. In the presently preferred implementation, user input is routed as discussed above to either the presentation engine or control display manager depending on whether the "top" window in the GUI (i.e., the most recently used window) is a playback display or control display (respectively). In the case of the top window being a playback display, the playback display manager 5050 is queried for the "presentation ID" of its top window, and that information is included with the user input when it is routed to the presentation engine 5040. In either case, when the user input involves a pointing device, the screen coordinates of the pointer are converted to the coordinate system of the top window before being passed to the appropriate system component.

The system also provides various basic support services such as those found in many application programs. These include windowing, menuing, toolbar and user interface services, which are common in GUI-based systems. This functionality allows the various system components to create and manage GUI display fields and to add menu entries and/or toolbar icons to the GUI (as seen throughout the Functional Overview). User selection from a menu or toolbar results in the execution of a corresponding function call in the appropriate system component. In particular, certain editing capabilities in the presentation engine 5040 and control display manager 5060 make use of these menuing and toolbar capabilities. The system also provides typical low-level services in the form of an "OS layer," which interfaces to the local operating system and encapsulates operating-system-specific details, revealing just the required functionality in a simplified function interface (which facilitates porting of the system to other platforms). The functionality provided by this OS layer includes various services such as memory services, file services, network services, audio services, etc.

By following the flow of control through FIG. 50, it can be seen how the various system components interrelate and communicate in the currently preferred embodiment of the invention. We begin with the data manager 5030. The data manager enables other system components to read and write presentation data 5020, and provides various capabilities for managing and manipulating presentation data. In the preferred embodiment of the invention, the data manager makes presentation data accessible to other system components in the form of a hierarchical data tree of one or more levels. The other system components can access the data tree by requesting listings for container objects from data manager 5030, starting at the top level of the tree and going down the branches of the tree as needed. This data tree can include various types of object data supported by the system, and the data manager 5030 provides data reading and writing functions which can be used by the other system components to access or change particular data for specified objects.

One system component which accesses presentation data in this way is the control display manager 5060. In the preferred system of FIG. 50, the control display manager creates and manages one or more control displays 5062, each of which presents to the user a listing and other information for objects contained by a given container object. For each container object being presented in a control display, the control display manager, via presentation data access 5066, acquires a contents listing from the data manager 5030, whereupon it can present the listing to the user in the form of a "map view" or "list-view" display. Using control displays, the user can perform data management operations on containers and their contained objects, and these are illustrated by edit commands 5032 going into the data manager 5030. Furthermore, the control display manager 5060 can display object data to the user in the form of editing screens, popup panels, etc., and these can also result in accessing of presentation data 5066 and issuing of edit commands 5032.

By interacting with a control display via user input 5012, the user can explore and edit presentation data provided by the data manager 5030, and can also start and stop playback for one or more objects found within the presentation data. In order to accomplish the latter, the control display manager 5060 issues playback commands 5064 to the presentation engine 5040. These playback commands 5064 can also include status checking functions for monitoring the playback operations occurring in the presentation engine 5040, so that control displays can indicate the playback status of displayed objects to the user.

When a command to start a particular object is issued to the presentation engine 5040 (such as when a user clicks on an object name within a control display), the presentation engine 5040 routes the start command to its internal component 5044, the "playback manager," which in turn initiates one or more playback processes in response. When starting playback processes, the playback manager 5044 accesses presentation data 5020 via the data manager 5030, as shown by the arrow 5036, and issues commands to the "graphics engine" 5042 causing that module to incorporate media data for the newly started objects into its playback output 5048. This playback output 5048 is routed to the playback display manager 5050, which accepts a bitmap from the graphics engine once per frame and presents it in a playback display 5052 for the user to view.

Once object playback has started in this way, the user can interact with the playback output being presented in the playback display, as indicated by user input 5014 going into the presentation engine 5040. This user input 5014 is routed to the playback manager 5044, where it may be used to trigger "playback behavior" as discussed later in this specification. Additionally, in embodiments where there is both a play mode and an edit mode and the user has entered edit mode, the user input 5014 is instead routed to the edit manager 5046 in the presentation engine 5040. In edit mode, the user can perform various editing functions which cause the edit manager 5046 to send edit commands 5034 to the data manager 5030, resulting in modifications to the presentation data 5020. At the same time, the edit manager 5046 may issue refresh commands to the playback manager 5044 so that edits being performed by the user are reflected in the playback output 5048 presented in the playback display 5052.

In addition to the interactions between the various system components shown in FIG. 50, certain additional component interactions can occur for various purposes as noted in the following discussion. Many of these interactions involve particular features, and in some cases they are provided to optimize the effectiveness of the user interface. While the interactions illustrated in FIG. 50 provide a good overview of the roles and relationships among the components of the system, the interactions shown are not intended to be exclusive as to the types of interactions which are possible among the various system components.

Figure 51:
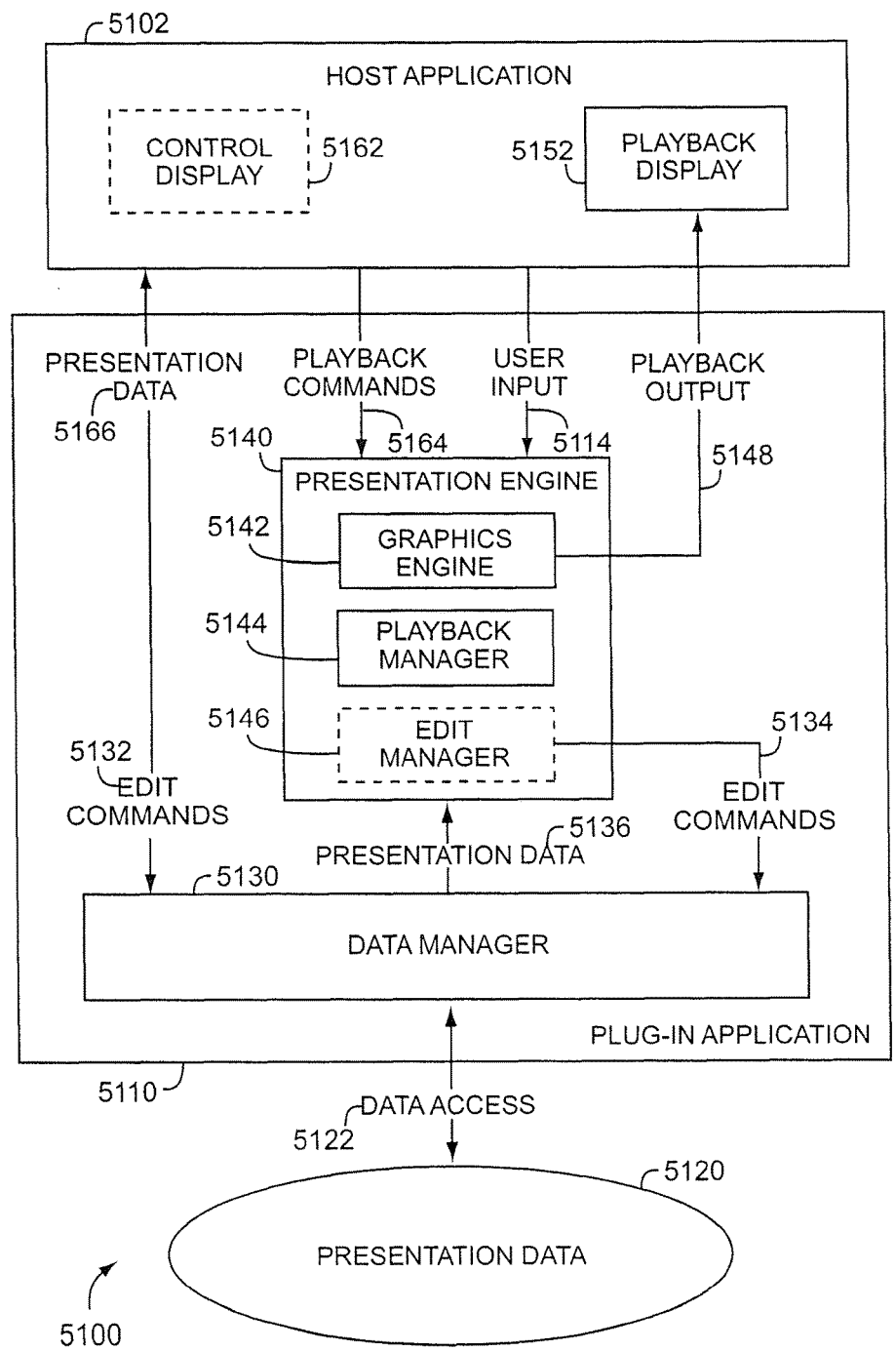
FIG. 51 illustrates a block diagram of a system for authoring and playing back multimedia content, implemented as a software plug-in associated with a host application, according to an embodiment of the present invention.

Turning now to a second system configuration, an overall multimedia authoring and playback system, shown implemented as a "plug-in application" associated with a host application, is illustrated by block diagram in FIG. 51. As seen in the embodiment of FIG. 51, the authoring and playback system 5100 is generally comprised of a different arrangement of many of the same components seen in the system of FIG. 50. The system of FIG. 51 is comprised of a host application 5102, a block of plug-in elements 5110, and presentation data 5120. As with the system of FIG. 50, the presentation data 5120 consists of multimedia content which can be authored and played by users of the system. In the preferred configuration of FIG. 51, the presentation data 5120 is accessed by a data manager 5130 within the block of plug-in elements 5110, as illustrated by the arrow 5122. The main role of this data manager 5130, like the earlier data manager of FIG. 50, is to make presentation data available to other system components for reading and writing (and as in the earlier case, this can involve various capabilities for managing and manipulating data).

Regarding the host application 5102 in the system of FIG. 51, various types of host applications may be able to provide the necessary hosting functionality, and these can include Web browsers, instant messaging programs, media integration platforms, server processes running on servers, etc. The host application is responsible for the manner and context in which the functionality of the present invention is presented to the user. For example, a community website which offers chat rooms or other forms of communication for its members might include options within its control interface for accessing displays and functionality associated with the present invention. Or alternatively, functionality of the present invention may be provided within the context of, or in association with, an instant messaging program. Or, the present invention may be configured as a "player" plug-in for a Web browser, either with or without editing features available. Overall, these host applications can include various types of display and interface functionality depending on the purposes at hand. In many cases this can involve functionality similar to that provided by the playback display manager 5050 and control display manager 5060 of FIG. 50, as indicated within the host application 5102 by the playback display 5152 and the control display 5162 (the latter being in dotted outline, as in the earlier figure, to indicate its optional nature).

In general, the flow of control in the system of FIG. 51, as well as the capabilities and interrelationships of the various system components, is the same as in the system of FIG. 50, as can be seen by the similarity of the two figures. In FIG. 51, the data manager 5130 provides other system components with access to presentation data in a similar fashion as the data manager of FIG. 50. As seen by the arrows in FIG. 51, the data manager 5130 can receive edit commands 5132 from the host application 5102, and edit commands 5134 from an edit manager sub-block 5146 within the presentation engine 5140. The data manager 5130 can also provide presentation data to both the host application, as shown by the arrow 5166, and to the presentation engine 5140, as shown by the arrow 5136.

Also within the block of plug-in elements 5110, the presentation engine 5140 manages playback processes and generates playback output, and generally performs the same functions as the presentation engine in FIG. 50. Like the earlier presentation engine, the plug-in presentation engine 5140 includes three sub-components: a graphics engine 5142, a playback manager 5144 and an optional edit manager 5146, which perform the same functions as their resident application counterparts. The plug-in presentation engine 5140 can also receive user input 5114 and playback commands 5164 from the host application 5102, and can provide playback output 5148 to the host application for presentation in one or more playback displays.

As with the system of FIG. 50, in FIG. 51 the two blocks shown in dotted outline, the control display 5162 and the edit manager 5146, are optional blocks associated with certain categories of functionality provided by the system. The considerations for these optional blocks in this case are the same those discussed earlier in connection with the resident application program.

Now that the overall flow of control has been described for two configurations (resident application and plug-in application) of a software system that provides the currently preferred embodiment of the invention, a more detailed description of this preferred system is provided. The discussion begins with an explanation of some general concepts involving presentation data and system configuration. Next, a description of the system initialization procedure is provided. Finally, detailed descriptions for each of the main functional components of the system are presented. Occasionally throughout the following discussion, functionality is described specifically for the system of FIG. 50; in such cases, similar functionality may be provided for the system of FIG. 51 (allowing for certain differences based on host involvement, etc.). We begin with an explanation of some general concepts involving presentation data and system configuration, including an explanation of the preferred structure for the presentation data, how that structure may be adapted to handle various user scenarios, and how the concept of a "presentation" may vary according to system configuration.

In the currently preferred embodiment of the system, the presentation data (5020, 5120) is comprised of one or more databases of presentation data. An appropriate format for databases is detailed later in this specification, but in brief, the currently preferred format involves a hierarchically structured database with one container object at its top internal level that either directly or through container nesting contains the rest of the objects in the database. Each object in the database includes three forks of data: "properties data," "setup data" and "content data." The properties data for each object consists of data that specifies general object characteristics, such as object type, icon position, etc. The setup data for each object consists of data that specifies certain type-specific object characteristics, such as display settings for visual objects, etc. The content data for each object consists of either media data, such as text data, image data, video data, etc., or other kinds of content data appropriate for the different object types supported by the system. The specific data comprising the above "object model" is shown in FIG. 85, which is detailed later in this specification.

At initialization time, a "root database" is specified to the data manager (5030, 5130). The top container object in this root database is the "root object" for the system. This root object acts as an entry point through which the rest of the presentation data can be accessed. Throughout the system (except for the internal operations of the data manager), all objects located within the presentation data are identified using "root path" text strings, in which the first entry in the root path is the root object, the last entry in the root path identifies the object in question, and the intervening entries identify any intervening container objects. These root paths in the preferred system are equivalent to the root paths discussed earlier in the Example Scenarios section, except that in the preferred system it is assumed that the database for a root path is the root database specified at initialization time, and therefore the root database is not specified explicitly within each root path. Upon receiving a request or command with one of these root paths, the data manager performs "path resolution" on the root path to convert it into a "physical path." In a physical path, the database is specified explicitly (and when pointer objects are involved, as in the examples of FIGS. 46 and 47, the database may or may not be the root database). It is the physical path which is used by the data manager when it acts upon the request or command by accessing (5022, 5122) presentation data via the system file services.

After initialization, the data manager makes the path string of the root object available to other system components, and these other components can use it to query the data manager for a listing of the objects contained by the root object. While container nesting is not a requirement of the system, in embodiments where it is supported, further container listings can be queried for container objects nested within the root object, and so on. These container listings, provided by the data manager for the root object and any nested container objects beneath it, define the form of the presentation data as a hierarchical tree of one or more levels. As will become apparent later in this specification, in some configurations of the system this relatively straightforward "data tree" can hide significant complexity associated with creating and interconnecting multimedia content across a network. The data manager encapsulates this complexity away from the other system components, and therefore away from the user, which helps achieve improved clarity of structure and ease of use, both of which are advantages of the present invention.

To understand the role of the root object, and how it's role may vary in different configurations of the system, it is important to understand that the system can also be implemented with multiple root objects instead of just one. In such an embodiment, these multiple root objects might, for example, represent different "presentations" that a user is playing, and there would likely be provisions for the user to select among them, start and stop them, etc. In the presently preferred embodiment of the system, there is just one root object at a time, i.e., only one entry point into the presentation data. This approach minimizes system complexity, and at the same time provides a versatile solution for some common user scenarios. Several such scenarios are described below, and in each case the approach of having just one root object can be successfully adapted to handle the situation. Of course, multiple root objects may also be effective for handling these or other scenarios, and the preferred system, whether using single or multiple root objects, may be implemented in a variety of configurations to handle different cases. The scenarios which follow are not intended to limit the scope of the invention, but are provided mainly to illustrate some of the ways in which the preferred system, and in particular embodiments using a single root object, can be applied and adapted.

In a first scenario, the user is interested in launching the system in order to view a particular presentation (such as, for example, after receiving a message sent from a friend via email in the form of an executable file, or sent in the form of a playable presentation associated with an instant messaging session). For such cases, a minimum system configuration may be provided in which the root database is passed as a "launch parameter" during system initialization, and the root object (which contains the presentation) is automatically started so that the presentation starts playing immediately.

In a second scenario, the user is interested in maintaining a "home" data tree where multiple presentations can be managed and arranged in hierarchically nested containers. For this type of scenario, a root database is maintained in an ongoing fashion as a "workspace" file (for example, there might be one such root database per registered user of the system, so that every user has their own "home" tree). The root object at the top level acts as the entry point into this data tree, and the tree extends out hierarchically from there. In this scenario, the root object is not started during initialization, but rather a control display is opened which displays the contents of the root object to the user. Various folder pointer objects (such as seen in FIGS. 35A through 37C) may be included in the data tree, and these may reference folders in the HFS of the host computer whose contents can thereby be presented in control displays (making it possible for the user to perform operations involving HFS objects, such as playing, importing, exporting, etc.).

In a third scenario, the user is once again interested in managing multiple presentations, but rather than including all the presentations within a single workspace file, presentations are stored as individual database files in the HFS of the host computer. Once again, a root database is maintained in an ongoing fashion, but in this case it does double duty. One function of the root database is as a "scratchpad" file for the user to develop new presentations. At initialization time, a control display for the root object of this database is opened, providing a scratchpad in which the user may develop content. The other function of the root database is to make the HFS of the host computer accessible to the user. To this end, the top level root object contains a folder pointer object (as seen in FIGS. 35A through 37C) whose base folder is the local "Desktop" folder of the host computer; this folder pointer object is a "hidden" object, meaning that its icon is not displayed in the above scratchpad display for the root object. At initialization time, a second control display is opened for this hidden folder pointer object. The user develops content within the context of the root object scratchpad, and then uses this "Desktop" control display to export the content to an HFS database file via an export operation such as that seen in FIG. 37A. The user may also use this "Desktop" control display to explore the HFS, start and stop existing presentations stored in the HFS, perform import operations, etc.

It should be noted that in the above scenarios, relatively minor changes to system operations can result in distinctly different types of user applications. These scenarios represent only a few examples of the types of situations that may be served by configurations of the preferred system. In fact, a variety of system configurations can be imagined, ranging from a minimum feature set to a complete feature set, to suit the needs of users in various scenarios.

With such varied configurations possible, the concept of what constitutes a "presentation" may vary somewhat in different configurations of the system. To help explain what a "presentation" is in the preferred system, we first note briefly what the traditional concept of a presentation is in typical multimedia tools and systems. In typical tools and systems, a presentation is generally defined by the data format in which presentation data is organized, typically involving file formats, other data storage constructs and the like. For example, when creating a Web page using a typical site editing tool, there is an HTML file which contains the current "presentation," and while that file may include links to other HTML files or references to external pictures or other media data, the file itself defines the scope of the presentation (i.e., one Web page). In the preferred system, this file-oriented concept of what a presentation is may apply to certain configurations of the system, for example, those in which a database file containing presentation data constitutes one presentation. However in other configurations, especially those involving pointer objects, navigation, sub-displays, etc., a less rigid sense of what constitutes a presentation is more appropriate, since a single database may contain what are in practice multiple presentations, and conversely, data from several databases may be presented in one playback display as a single presentation.

To accommodate these various concepts of what a "presentation" is in the preferred system, the system defines a presentation in terms which are relatively flexible, allowing the system to support various configurations with minimal alteration. In the preferred system, each "presentation" is essentially the set of playing objects assigned to a given playback display, which share a common "presentation ID" associated with that playback display. Whenever an object is started, it is assigned to a presentation, meaning that its newly started playback process in the presentation engine (5040, 5140) is associated with an existing presentation ID. In addition, each presentation is associated with a "master object," and it is this object which is started or stopped when the presentation is started or stopped. With this model for defining what a presentation is, a variety of configurations for the system can be supported with minimal effort, ranging from the traditional concept of "one database per presentation," to a more expansive concept that involves accessing content from multiple databases over a network and displaying the content in hierarchically nested sub-displays within a single playback display.

It should be noted that in the presently preferred system, there are currently no provisions for creating additional playback displays other than the first one created during initialization (although a variety of such mechanisms can easily be imagined). Therefore, while the system is architected to support multiple presentations playing in multiple playback displays, in various places in the discussion certain details of managing this multiplicity are omitted for the sake of clarity. Whenever such omissions occur, the functionality for performing equivalent tasks in a system with multiple playback displays can be inferred directly from the functionality described.

Figure 52:
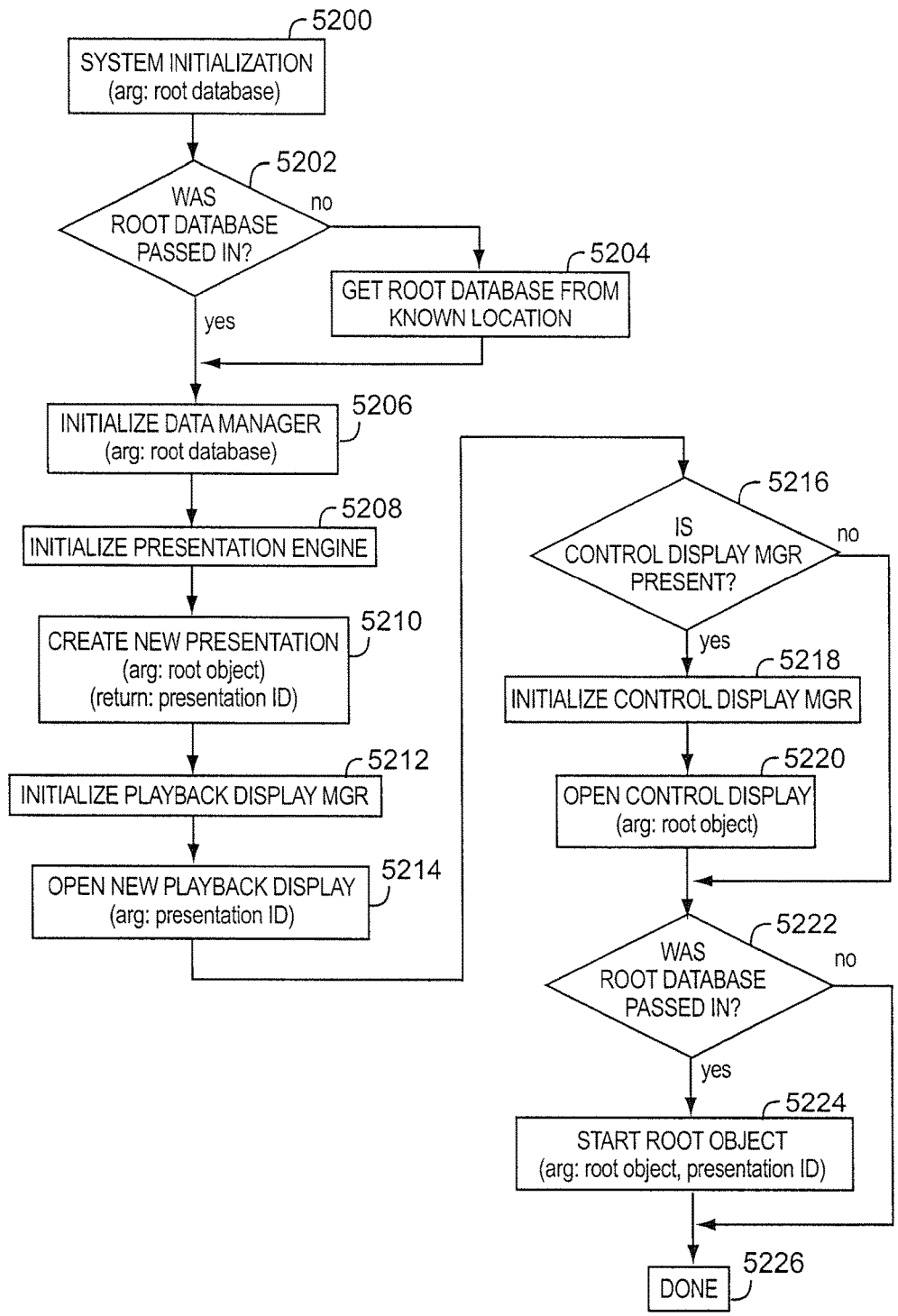
FIG. 52 illustrates a software flow diagram of the system initialization procedure, according to an embodiment of the present invention.

FIG. 52 shows an illustrated flow diagram of the initialization procedure for the presently preferred system; this initialization procedure is appropriate for most of the system configurations discussed above. Step 5200 is triggered when the user launches the system. A root database may or may not be passed in as a launch parameter, depending on the manner of the launch: if the user launches the application by selecting a particular database, that database will be passed in as the root database; if the user launches the application directly, no root database will be passed in. In step 5202, the root database argument is checked, and if no root database was passed in, then in step 5204 the system locates the root database by looking in a known storage location. In either case, step 5206 occurs next, in which the system initializes the data manager (5030, 5130) by passing it the location of the root database in the form of a Universal Resource Locator (URL), such as a file path or network address.

Next, in step 5208, the system initializes the presentation engine (5040, 5140). In the following step 5210, it calls the presentation engine to create a new presentation, specifying the top object of the root database (the root object) as the master object for the presentation; a presentation ID for the newly created presentation is returned. Next, in step 5212, the playback display manager 5050 is initialized. Next, in step 5214, a new playback display is opened, and it is assigned the presentation ID received in step 5210.

In step 5216, the presence or absence of the control display manager 5060 (an optional system component) is checked. If one is present, it is initialized in step 5218 and in step 5220 a control display showing the contents of the root object is opened. Next, in step 5222, the evaluation of step 5202 is repeated. If the root database was passed in as a launch parameter, then in step 5224 the root object in that database is started by issuing a playback command to the presentation engine, with the presentation ID from step 5210 and the root object passed as arguments. Step 5226, which follows, signifies that system initialization is complete.

A detailed description of each of the main functional components of the system is now provided. The discussion begins with the playback display manager 5050 of FIG. 50, which is the simplest component in the system. Next, the control display manager 5060 of FIG. 50 is described. The discussion then proceeds with a description of the presentation engine (5040, 5140) of FIGS. 50 and 51. Finally, the data manager component (5030, 5130) of FIGS. 50 and 51 is described.

The playback display manager 5050, shown in the upper right of FIG. 50, provides playback display functionality for presenting playback output to users of the system. In the preferred system, the playback display manager 5050 is a software module which can receive function calls for such functions as initialization, termination, and the opening and closing of playback displays. In response to these function calls, the playback display manager issues standard windowing calls to the system windowing services to create and manage the playback displays being presented. The playback display manager also has an update function, called once per frame, which acquires 5048 a bitmap from the presentation engine 5040 for each playback display currently open, and transfers it to the system windowing services for display.

Before discussing the details of the preferred embodiment of the playback display manager 5050, some alternate embodiments of playback display functionality are worth noting. For example, instead of presenting playback output using windows or displays in a GUI, the playback display manager 5050 might, in some system configurations, present playback output using various other output devices, such as: video output hardware connected to a video monitor or television set, a network connection that accepts visual or audio-visual output, other software applications, etc. Moreover, in the plug-in system configuration of FIG. 51, the host application that accepts playback output from the presentation engine 5140 may also use a variety of output destinations for presenting playback output to users, and these can involve various hardware, software and network scenarios such as the above. Any or all of these alternate embodiments, as well as any other suitable means, may be used to implement playback display functionality in the present invention.

Returning now to the presently preferred embodiment of playback display functionality, the playback display manager 5050 is a software module which receives playback output 5048 and presents it to users via one or more playback displays 5052. The playback display manager provides functions for opening and closing playback displays; in the preferred system these functions are called once each, during system initialization and termination, respectively, to open and close the playback display presented to the user. While open, the playback display presents playback output associated with a particular presentation ID. When the function for opening a playback display is called by the initialization routine, it is passed a presentation ID as an argument to specify which playback output is intended for that playback display. This presentation ID is used in the update function once each frame when the playback display manager acquires 5048 a new bitmap from the presentation engine 5040.

Figure 53:
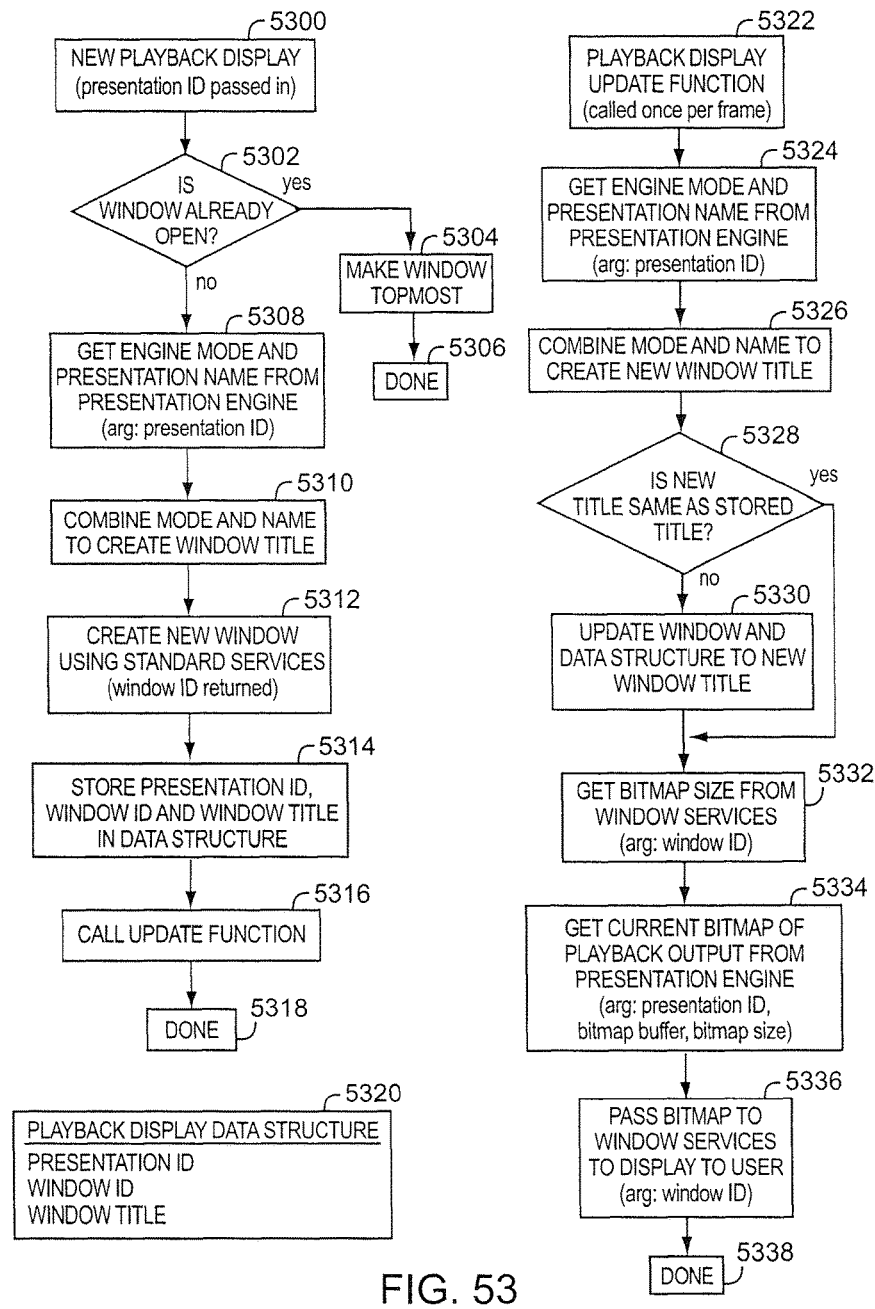
FIG. 53 illustrates software flow diagrams showing procedures of the playback display manager of the system of FIG. 50, according to an embodiment of the present invention.

The left side of FIG. 53 shows a flow diagram of the function for opening a new playback display, as implemented within the playback display manager 5050 of FIG. 50. The function begins at step 5300, when it is called by the system initialization function of FIG. 52 with a presentation ID passed as an argument. In step 5302, the presentation ID from the previous step is compared against those of any already open playback displays, and if a match is found, the function makes that window the top window 5304 and exits 5306. Otherwise, in step 5308, the engine mode (edit or play) and the presentation name (typically that of the current master object for the presentation) are acquired from the presentation engine 5040 based on the presentation ID from step 5300. Next, in step 5310, the mode and name from the previous step are combined to create the window title (this provision for a window title, as in the Functional Overview, is optional). Next, in step 5312, a new window with the window title of the last step is created by calling the system window services, and a window ID is returned. Next, in step 5314, the presentation ID, window ID and window title of the previous steps are stored in the playback display data structure 5320. Next, the update function is called 5316 to fill the window with its initial content, after which the function exits 5318.

The right side of FIG. 53 shows a flow diagram of the playback display update function, as implemented within the playback display manager 5050 of FIG. 50. The function begins at step 5322 when it receives its periodic call from the main loop. In step 5324, the engine mode and presentation name are acquired from the presentation engine 5040 (as was done in step 5308, but this time based on the presentation ID stored in the data structure 5320). Next, in step 5326, the mode and name are combined to create the window title (which, as before, is optional). Next, in step 5328, the window title from the previous step is compared with the window title stored in the data structure 5320, and if they are not the same, then in step 5330 the playback display (via the window services) and the data structure 5320 are updated accordingly. Next, in step 5332, the size of the bitmap needed to fill the content area of the playback display (excluding window title, borders, etc.) is acquired from the window services using the window ID stored in the data structure 5320. Next, in step 5334, a bitmap is acquired from the presentation engine 5040 by passing it the presentation ID stored in the data structure 5320, a bitmap buffer, and the bitmap size from the previous step. Next in step 5336, the bitmap acquired in the previous step is passed to the system window services along with the window ID stored in the data structure 5320, causing the bitmap to be displayed in the playback display. With that, the update function is done 5338.

In addition to the above functions for opening and updating playback displays, the playback display manager 5050 also includes typical functions for closing playback displays, and for initialization and termination, as well as a query function that allows other system components to query the presentation ID of the top playback display. This latter function is part of the additional component interactions mentioned above, and is called by the main loop when routing user input and by the control display manager 5060 when starting an object. In the preferred system, since there is only one playback display, the presentation ID is simply returned from the data structure 5320. If there were multiple playback displays, the playback display manager 5050 would maintain a separate instance of the data structure 5320 for each playback display, and would return the presentation ID from the instance of the data structure that corresponds to the most recently active playback display.

We now turn to a discussion of the control display manager 5060, shown in the upper left of FIG. 50. The control display manager provides one or more control displays in which the objects contained in a particular container object are displayed either as icons arranged on a background (map view) or as names in a list (list view). Depending on which features are implemented in the system as a whole, control displays can provide various capabilities for users to view and interact with presentation data, and these can include: (1) starting and stopping of objects as seen in FIGS. 29A-B, (2) visual indication of object playback status using intensity-modulated halos as seen in FIG. 29A, (3) visual representation for relations and actions among objects as seen in FIGS. 30A-B, (4) exploration of hierarchically arranged presentation data as seen in FIGS. 33A-B, (5) synchronized exploration of presentation data as seen in FIGS. 38A-B, and (6) exploration with zooming enhancement as seen in FIGS. 45A-C. Each of the above capabilities may be provided in either map view or list view.

In addition to the above functionality, control displays may also be configured to provide various other useful functions that might be typical for such displays. This can include functions for managing and organizing presentation data (such as dragging icons to move or copy objects, etc.), as well as functions for editing media data in one or more "editing screens" (such as a text editor or picture editor). Moreover, the control display manager provides two functions which are part of the additional component interactions mentioned earlier. The first is a query function which allows other system components to query the most recently selected object in a control display; this query function allows the presentation engine 5040, in its handling of user commands, to support object selection via a control display. The second is a function which allows other system components to initiate control display exploration by causing the top control display to "explore" to a specified container; this function is called by the presentation engine 5040 during user navigation, which causes the top control display to perform synchronized exploration as cited above.

As mentioned earlier, the control display manager 5060 is an optional system component, in that many of the features of the present invention can be successfully implemented without this component in the system. In the following discussion, which describes the currently preferred implementation of the control display manager, the full set of control display functionality is described. It should be understood that not all of the functions discussed are essential to the invention, nor even essential to the successful implementation of other control display features. Depending on system configuration, various portions of the full functionality described below may be omitted.

In the preferred embodiment shown in FIG. 50, the control display manager 5060 is a software module which can receive function calls for such functions as initialization, termination, the opening and closing of control displays, and user input handling. The control display manager 5060 uses the system window services to create control displays, and has an update function called once per frame in which it renders a bitmap for each open control display and transfers the bitmap to the system window services for display. This update function monitors and indicates the playback status of displayed objects, and is responsible for creating a "zooming" effect to visually enhance hierarchical transitions occurring during user exploration.

Figure 54:
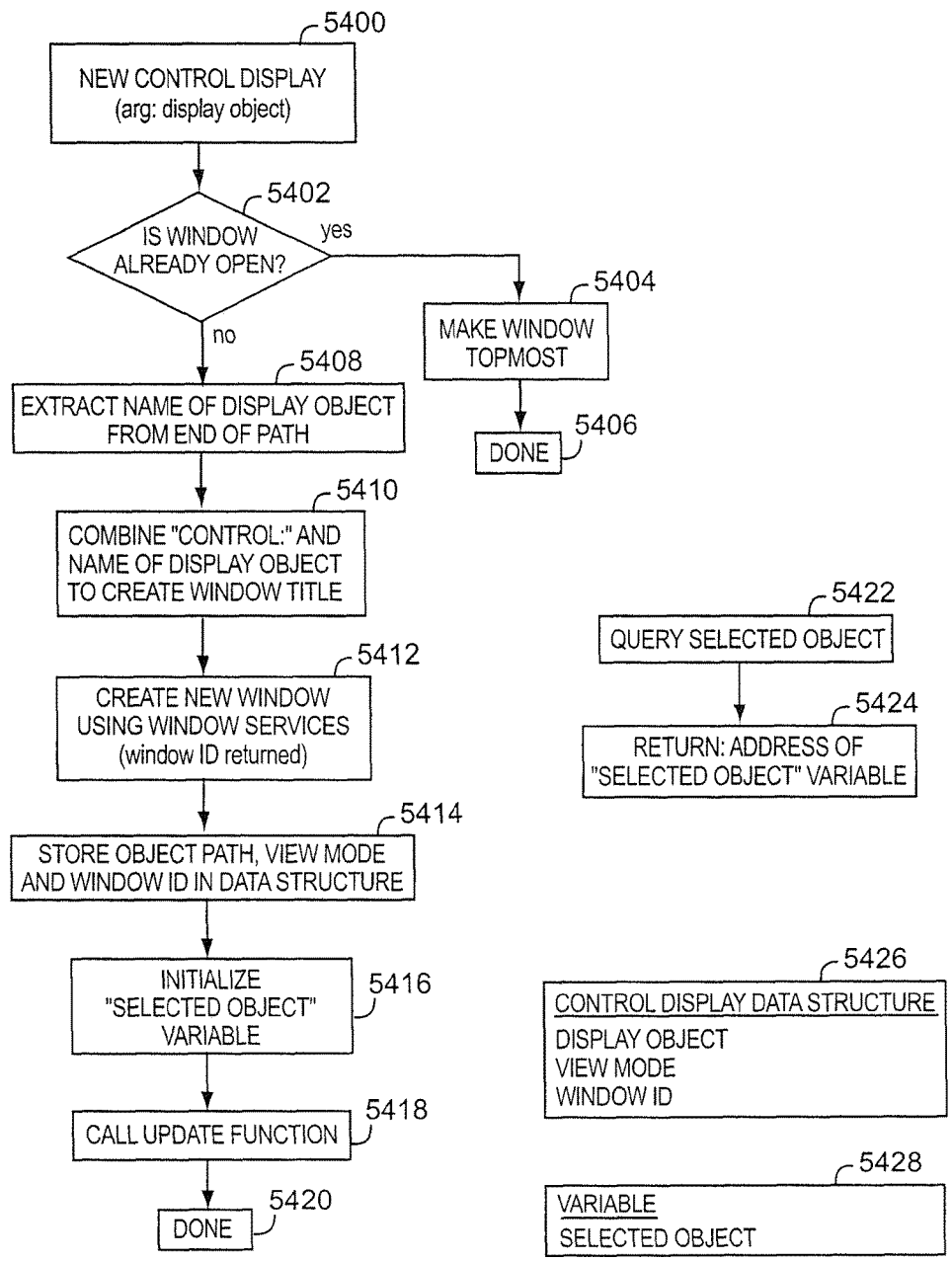
FIGS. 54-55 illustrate software flow diagrams showing procedures of the control display manager of the system of FIG. 50, according to an embodiment of the present invention.

The left side of FIG. 54 shows a flow diagram of the function for opening a new control display, as implemented within the control display manager 5060 of FIG. 50. The function begins at step 5400, when it is called by the system initialization function of FIG. 52 with the path of a "display object" passed as an argument. In step 5402, the display object from the previous step is compared against those of any already open control displays, and if a match is found, the function makes that window the top window 5404 and exits 5406. Otherwise, in step 5408, the name of the display object is extracted from the last segment of the path from step 5400, and in step 5410, a window title is created by combining the text string "Control:" with the name extracted in the previous step. Next, in step 5412, a new window with the window title of the previous step is created by calling the system window services, and a window ID is returned. Next, in step 5414, the display object and window ID of the above steps, as well as a view mode that defaults to map view (which can later be switched by the user), are stored in a new instance of the control display data structure 5426 (a separate instance of which is created and maintained for each new control display). Next, in step 5416, the "selected object" variable 5428 is initialized to null. Next, in step 5418, the update function is called to initially render the window contents, and then the function exits 5420.

On the right side of FIG. 54 is a query function, discussed above, which allows other system components to query the control display manager for the object most recently selected in a control display. The function begins at step 5422, when it is called by the presentation engine 5040. The operation of the function consists of a single step 5424, which is to return the address of the "selected object" variable 5428 (a character array containing the path string of the most recently selected object; this path string is updated every time a user selects an object icon in a control display).

Figure 55:
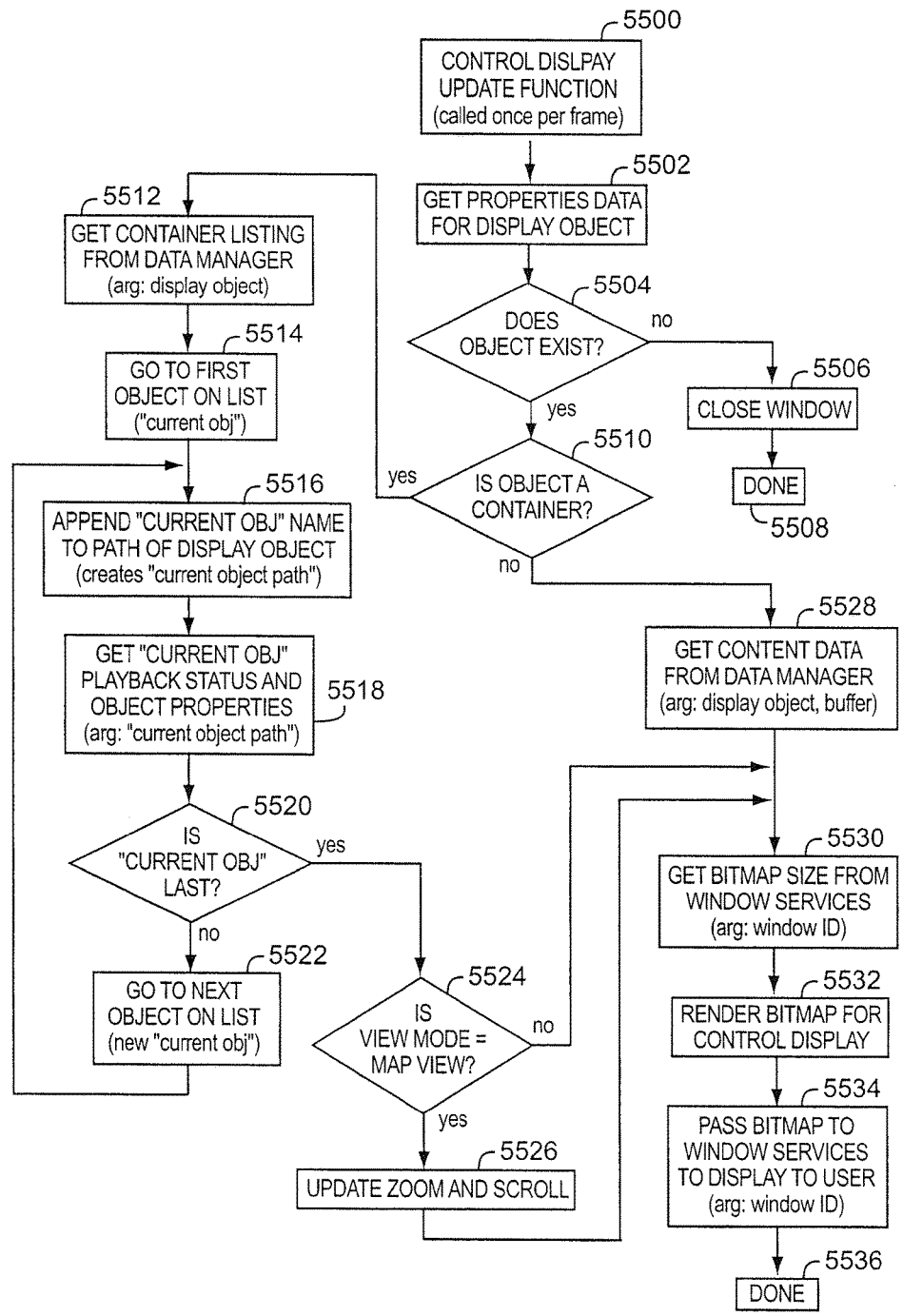

FIG. 55 shows a flow diagram of the control display update function, as implemented within the control display manager 5060 of FIG. 50. The function begins at step 5500, when it receives its periodic call from the main loop. For every control display currently open (i.e., for every instance of the control display data structure 5426 of FIG. 54), the update function performs its update procedures as follows. In step 5502 it queries the data manager 5030 for the properties data of the display object specified in the control display data structure 5426. Next, in step 5504, it checks to see if the query of the previous step was successful, and if not, then in step 5506 the control display window is closed and the function returns with an error code 5508. Otherwise, if the properties data query of step 5502 was successful, then in step 5510 the properties data is examined to determine whether or not the display object is a container object.

If the display object is a container object, then in step 5512 the data manager is queried for the list of objects contained within the display object. Next, a loop goes through the list of contained objects, starting at the first object 5514, which becomes the "current object." At the top of the loop 5516, a "current object path" string is created by appending the name of the current object to the display object path stored in the control display data structure 5426. Next, in step 5518, using the current object path from the previous step, the presentation engine 5040 and data manager 5030 are queried for the playback status and object properties (respectively) of the current object; the returned information is stored for later use in the rendering portion of this function. Next, in step 5520, a check is performed to determine whether the end of the list has been reached, and if it has not been reached, then in step 5522 the current object is set to the next object on the list, and the operation of the function proceeds to the top of the loop 5516 for another iteration.

When the end of the list is reached in step 5520, then in step 5524 the view mode previously stored in the control display data structure 5426 is checked. If the view mode is list view, then operation of the function continues at step 5530. Otherwise, if the view mode is map view, then in step 5526 the zoom and scroll settings of the control display are updated to provide zooming into and out of icons during user exploration. To create a zoom effect, new zoom and scroll settings are calculated based on the current "zoom state" (none, zoom-in, zoom-out) and the elapsed time since the most recent exploration action; these new settings are applied to the control display using standard scaling and scrolling functions. Next, the operation of the function continues at step 5530.

Returning to step 5510, if the properties data examined in that step specifies that the display object is not a container object, then in step 5528 the data manager is queried for the content data of the display object, which is stored for later use in the rendering portion of this function. In step 5530, the bitmap size for the content portion of the control display window (excluding window title, borders, etc.) is acquired from the system window services using the window ID stored in the control display data structure 5426. In step 5532, a bitmap of the appropriate size is rendered (as discussed in the following paragraphs). Once the bitmap is rendered, in step 5534 the bitmap is passed to the system window services for display, and the function is done 5536.

Regarding the rendering functionality of step 5532, above, in the case of display objects which are not containers, each object type has its own standard type of editing screen which is rendered: a text object has a text editor, a picture object has a picture editor, etc. One somewhat less standard type of editor which may be rendered is the editing screen for vector objects; a vector object is a timeline with changing numbers, and the currently preferred editing screen for this type of object is similar to editing screens used for MIDI continuous controller data in typical MIDI sequencer programs. In any event, for non-container objects, the rendering step of the control display update function uses the display object's type (acquired as part of the properties data in step 5502) and its content data (acquired in step 5528) to render an appropriate editing screen that displays the object's content data and allows users to modify the data.

In cases where the rendering functionality of step 5532 is rendering a display object which is a container object, then what it renders is the set of objects contained in that container object. Either a map view or a list view is used, depending on the view mode stored in the control display data structure 5426. Both views are similar to typical views provided by standard windowing operating systems, such as Windows® or MacOS®, and the rendering functionality in the present invention is implemented using many of the same techniques found in those systems. There are, however, some significant differences from those standard systems that arise out of various control display features mentioned above, including visual indication of object playback status and visual representation for relations and actions among objects. These features are handled in the rendering step of the control display update function as discussed in the following paragraphs.

One area where the control display rendering functionality differs from that of standard windowing operating systems is in the visual indication of object playback status, as seen in FIG. 29A. Unlike in standard windowing operating systems, in the present invention objects may play, and the control display manager 5060 of the preferred system provides visual indication as to the current status of playback for each object in a control display. To do this it makes use of the playback status information that was stored for each object in step 5518 of the update function of FIG. 55. Using this information, the rendering functionality of the control display manager draws a "halo" behind the icon of every object that is playing. This halo is created by first placing a filled white circle behind the icon, and then applying an alpha (opacity) map to the circle whereby the alpha decreases further from the center of the circle, producing a highlight glow behind the icon.

In the most preferred embodiment, not only is this playback status indicated as on or off, but the level of playback activity is indicated as well by varying the brightness of the halo. To accomplish this, the playback status acquired in step 5518 includes not only a flag specifying if the object is playing, but also a percentage between 0 and 100 that characterizes the degree of "activity" of the object (such as might vary during entrances, exits, etc.). Then, when the halo is drawn, its overall alpha is scaled by this activity level to provide the desired effect. Of course it should be noted that highlighted halos are merely one possible way to provide indication of object playback status, and many other approaches may be effective depending on system implementation (such as, for example, making icon names bold for objects that are playing, etc.).

Another area where the control display rendering functionality differs from that of standard windowing operating systems is in the visual representation of relations and actions among objects, as seen in FIGS. 30A-B. This functionality operates differently depending on whether the control display is in map view or list view. Each of these is now discussed in turn.

In map view, as seen in FIG. 30A, relations between objects are displayed as lines between icons. To accomplish this, the control display manager acquires from the presentation engine 5040 a listing of the relations among the objects whose icons it is showing, to determine which pairs of icons should have lines drawn between them (only one line is drawn per icon pair). In addition, the control display manager also acquires from the presentation engine information regarding the nature of the relations between any two objects, including an "activity level" for each such relation (more detail on how this is accomplished is provided in the discussion of the presentation engine).

Using the above information, the rendering functionality of the control display manager draws not only lines between icons, but also, for each relation existing between two objects, places along the line between their icons an informative colored "bead" which symbolizes the programming function used to create the relation in question (in the case of an object with a relation to itself, the bead is drawn on top of the object icon). This representation of relations between objects makes it easier for users to visualize the structure of programmed object behavior. Moreover, based on the returned activity level for each relation, when a relation has recently been triggered, the control display manager "lights up" the bead (by placing a brighter version of the bead on top of the original and adjusting the opacity of the brighter version), and also "wiggles" the corresponding line between the two icons (by swapping in alternate curved versions of the line every frame). These indications of relation-based activity between objects allow users to follow programmed object behavior as it unfolds during presentation playback.

In list view, as seen in FIG. 30B, relations between objects are displayed using only the beads discussed in the previous paragraph, since lines between icons would not be appropriate. As above, the control display manager acquires information from the presentation engine 5040, in this case provided as a listing of relations (and their activity levels) for each individual object in a given container. More detail on how this is accomplished is provided in the discussion of the presentation engine, but in brief, each relation which is "directional" (as explained in the discussion of the sentence programming paradigm of FIGS. 9A through 27D) is listed only for the acting object, while each relation which is "non-directional" is listed for both objects. In addition, for each relation associated with a given object, a listing of "partner objects" connected to that relation may be acquired from the presentation engine.

Using the above information, the control display manager draws beads for each object next to that object's entry in the list view display. Also, as above, when a relation has been recently active, the control display manager "lights up" the corresponding bead or beads, and in the case of a directional relation where only one bead is displayed next to the acting object, the list entry of the object being acted upon is highlighted as well. Moreover, in order for users to be able to manually determine which object or objects a given bead is associated with (other than the object it is drawn next to), user input handling is provided as follows. When the user clicks and holds on a bead in list view, if it is a directional bead, the bead is lit up (as above) and the list entry of the object being acted upon is highlighted; if it is a non-directional bead, it and all the beads related to it are lit up (including beads related through the transitive principle, as discussed earlier in connection with the sentence programming paradigm).

In addition to the functions detailed above for creating and updating control displays, the control display manager 5060 also includes provisions for handling user input as follows. If a control display is presenting an editing screen for the content data of a non-container object, the user input handling functionality is similar to that offered in many popular programs for editing text, pictures, video, etc. Otherwise, if a control display shows the contents of a container object, then as with the rendering functionality discussed above, much of the user input handling is similar to that found in standard windowing operating systems such as Windows® or MacOS® (especially the more common functions such as dragging, selecting, exploring, data management, etc.). There are, however, some significant differences from these standard windowing operating systems that arise out of various control display features mentioned above, such as the starting and stopping of objects. Moreover, some of the more traditional functions, such as exploring, data management, etc., involve certain preferred choices that deserve mention. These noteworthy aspects of user input handling in the control display manager 5060 are described as follows.

One area where user input handling in control displays differs from that of standard windowing operating systems is the starting and stopping of objects. In the present invention, when the user clicks on the name of an object, either in icon view or list view, the object is started if it is not already playing, and stopped if it is already playing. This toggling of playback is accomplished via playback commands 5064 issued to the presentation engine 5040 by the control display manager 5060. When the control display manager issues one of these playback commands to the presentation engine, in addition to passing as an argument the path of the object being started or stopped, it also queries the presentation ID of the top playback display from the playback display manager 5050 and passes that as well.

Regarding control display user input handling functions which are found in standard windowing operating systems, but still involve certain noteworthy aspects, the exploration of hierarchically structured presentation data in the preferred system involves certain aspects worthy of mention. In the control display of the preferred system, double-clicking on a container object causes the control display to switch to a view of the contents of that object, and this switch is emphasized by "zooming in" to the double-clicked container object as discussed above. Double-clicking on a media object causes the control display to switch over to an editing screen for media objects of that type (also with zooming). After having explored an object as above, pressing the "escape" key or selecting an "up" button in the GUI causes the display to switch from its current container or editing screen (also with zooming) to a view for the enclosing container object (in which the object previously being "explored" is now one of the contained items). With the exception of the zooming, which involves setting a variable to notify the rendering functionality that a zoom is in progress, all of the input handling for these operations is provided using typical input handling functionality as found in standard windowing operating systems.

Finally, two further non-standard pieces of functionality associated with control display user input handling are noteworthy. The first is that whenever the users clicks on an object in a control display, or on the background of a control display, the control display manager 5060 notifies the presentation engine 5040 by calling (respectively) the "cmd object click" and "cmd background click" functions of the edit manager 5046. This notification, which is part of the additional component interactions mentioned earlier, allows object selection and background selection in control displays to be integrated into the editing functions provided by the edit manager. The second is that whenever the user drags a control display icon from a control display to a playback display (as shown in FIG. 3B), the control display manager calls the "handle edit command" function of the edit manager (specifying "duplicate" as the command) and then calls the "cmd background click" function (specifying the playback display location), resulting in a copy of the selected data being incorporated into the current presentation.

Figure 56:
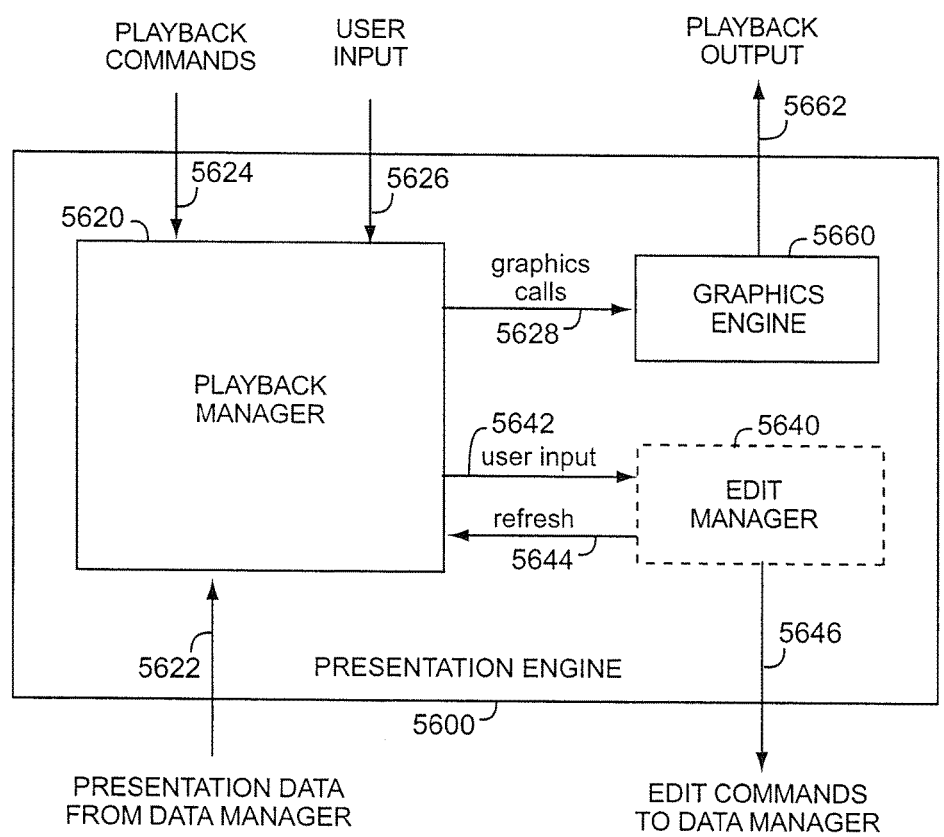
FIG. 56 illustrates a block diagram of the presentation engine component of the systems of FIGS. 50 and 51, according to an embodiment of the present invention.

We now turn to a discussion of the presentation engine (5040, 5140) of FIGS. 50 and 51. FIG. 56 shows a block diagram 5600 of the currently preferred embodiment of the presentation engine. Within the presentation engine 5600, the playback manager 5620 provides playback of objects by managing playback processes. This playback manager, in response to playback commands 5624 and user input 5626, accesses 5622 presentation data from the data manager (5030, 5130) and issues graphics calls 5628 to the graphics engine 5660. The graphics engine 5660 provides playback output 5662 to one or more playback displays in the form of bitmaps acquired once per frame. In the present system, user editing of presentation data takes place within an "edit mode," during which the playback manager 5620, after receiving user input 5626, routes it 5642 to the edit manager 5640 (an optional system element that may be omitted in configurations where user editing of presentation data is not supported). The edit manager 5640 responds to the user input 5642 by modifying presentation data via edit commands 5646 issued to the data manager, and also provides refresh calls 5644 to the playback manager to keep playback processes and playback output up to date as objects are being edited. More detailed descriptions of each of these sub-blocks of the presentation engine (playback manager 5620, edit manager 5640 and graphics engine 5660) are provided as follows, beginning with the playback manager.

Figure 57:
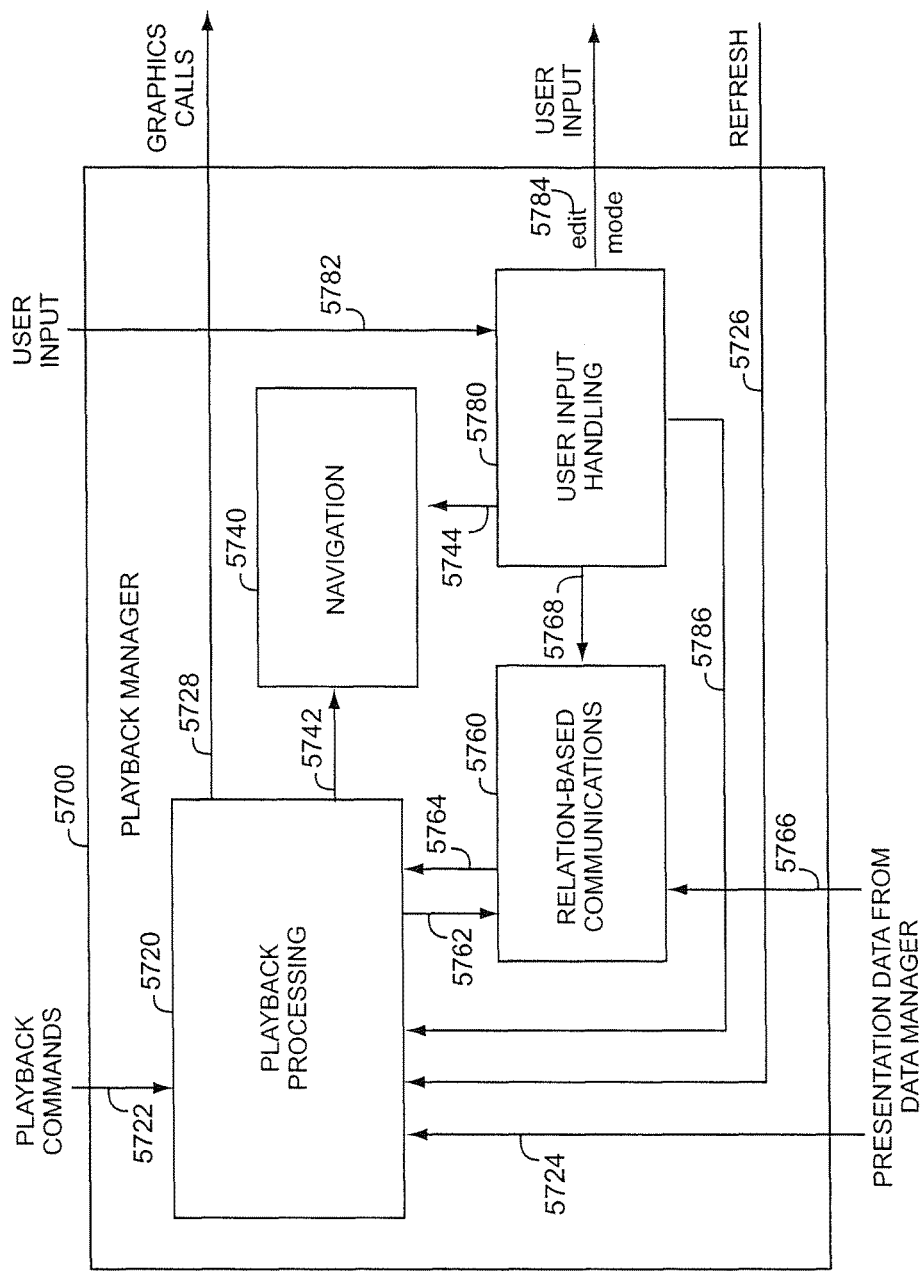
FIGS. 57-58 illustrate block diagrams of the playback manager component of the presentation engine of FIG. 56, according to an embodiment of the present invention.

FIG. 57 shows a block diagram of the internal structure of the playback manager of FIG. 56. The diagram shows that the functionality of the playback manager may be further divided into sub-blocks, each providing a different type of functionality. Depending on system configuration, one or more of these sub-blocks may be omitted if the functionality provided is not needed. Following the flow of control through the playback manager 5700 of FIG. 57, we begin with the user input handling block 5780, which interprets incoming user input 5782 and in response issues commands to any of the other functional blocks. For example, if the incoming user input consists of a command to start playback for a particular presentation, such as by clicking on the command icon 808 of FIG. 8A, the user input handling block 5780 issues a playback command 5786 to the playback processing block 5720 indicating that a playback process for the appropriate container object should be started. The playback processing block 5720, which can also respond to playback commands 5722 from outside the playback manager (such as might come from the control display manager as discussed earlier), is responsible for managing the playback processes that comprise object playback. More detail on these playback processes is provided shortly, but in general, starting a playback process involves reading presentation data 5724 from the data manager (5030, 5130) and issuing graphics calls 5728 to the graphics engine.

Once playback processing is underway within the playback processing block 5720 of FIG. 57, various operations and events occurring in the playback processing can involve programmed object behavior based on "low-level relations." In the preferred system, low-level relations are a specific form of data used to implement the various programmed relations seen throughout the Functional Overview; the nature and operation of these low-level relations is detailed at length later in this discussion. Whenever such an operation or event involving these low-level relations occurs, the playback processing block 5720 issues a function call 5762 to the relation-based communications block 5760. This relation-based communications block 5760 may also receive function calls 5768 from the user input handling block 5780 in response to user actions occurring in the playback display. The operation of this relation-based communications block 5760 is detailed in FIG. 67, but briefly, upon receiving a function call from one of the above sources, it acquires 5766 a listing of relevant low-level relations from the data manager, determines what if any action needs to be taken, and if appropriate, issues one or more function calls 5764 to the playback processing block 5720 to start or stop objects or read object parameters.

Also seen within the playback manager 5700 of FIG. 57 is a fourth functional block, the navigation block 5740, which provides user navigation functionality (as seen in FIGS. 38A-B and in other figures where navigation is combined with other features). This navigation block 5740 receives a function call 5742 from the playback processing block 5720 whenever a navigable container object that is not associated with a sub-display is started (which is one of the triggers for navigation in the present system), and also receives a function call 5744 from the user input handling block 5780 whenever the user double-clicks on a sub-display associated with a navigable container object, or clicks on the "back navigation" button in the GUI (which are two other triggers for navigation in the present system). In response to these function calls, the navigation block 5740 executes the required navigation as detailed in FIGS. 69 and 70. Finally, FIG. 57 shows that when the system is in edit mode, the user input handling block 5780 receives incoming user input 5782 and routes it 5784 to the edit manager 5640 of FIG. 56, which in turn may issue refresh calls 5726 to the playback processing block 5720.

Figure 58:
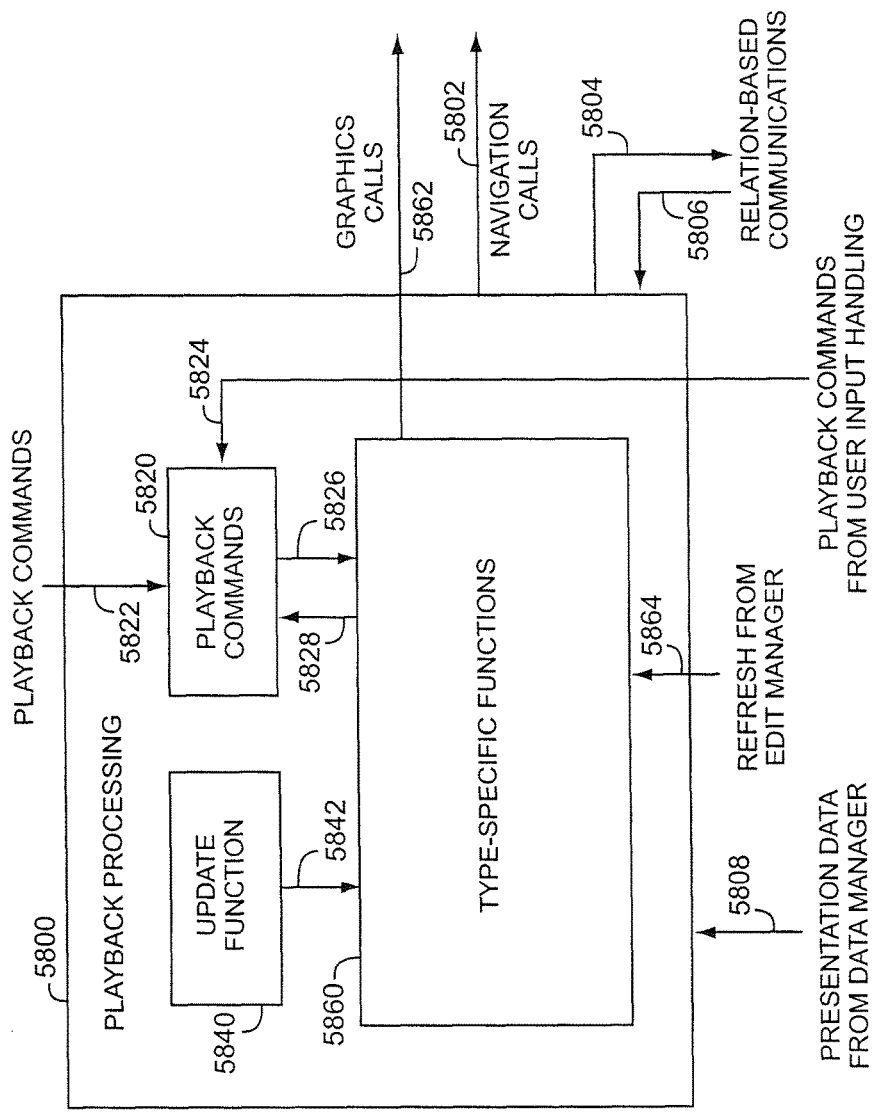

Turning now to FIG. 58, we see the internal structure of the playback processing block of FIG. 57. As seen in FIG. 58, the playback processing block 5800 consists of three sub-blocks as follows. The playback commands block 5820 receives playback commands 5822 and 5824, which can include commands for creating new presentations, commands for starting and stopping objects, as well as various query functions that allow other modules to acquire information such as the playback status for a particular object, the activity level for a particular object, etc. A second sub-block, the update function block 5840, is called by the main loop once per frame and performs periodic and time-based processing for object playback. In some configurations, this update function block 5840 may also make navigation calls 5802 to the navigation block 5740 of FIG. 57 (such as to trigger "back navigation" when the current presentation has stopped playing).

A third sub-block in FIG. 58, the type-specific functions block 5860, provides functionality for those aspects of object playback which differ according to object type. This type-specific functions block 5860 contains a sub-module for each object type supported by the system. Both the playback commands block 5820 and the update function block 5840, when performing operations on particular objects, issue subroutine calls 5826 and 5842 (respectively) to the appropriate one of these sub-modules whenever type-specific handling is required. For example, when a picture object is started, it is the picture-specific sub-module that actually issues graphics calls 5862 to the graphics engine to display the image data for the object being started. Likewise, it is the container-specific sub-module that issues a navigation call 5802 whenever a navigable container object that is not associated with a sub-display is started. Also, during edit mode, it is these type-specific sub-modules which receive refresh calls 5864 from the edit manager to keep playback processing in accord with user editing. Moreover in some cases, these type-specific sub-modules may make function calls 5828 to the playback commands block 5820, for example, when the starting of a container object is propagated to its contained items (as seen in FIG. 8A). Finally, any of the three sub-blocks 5820, 5840 and 5860 within the overall playback processing block 5800 may access 5808 presentation data as needed from the data manager (5030, 5130), and blocks 5820 and 5860 may also send 5804 and/or receive 5806 function calls to and from the relation-based communications block 5760 of FIG. 57.

Figure 59:
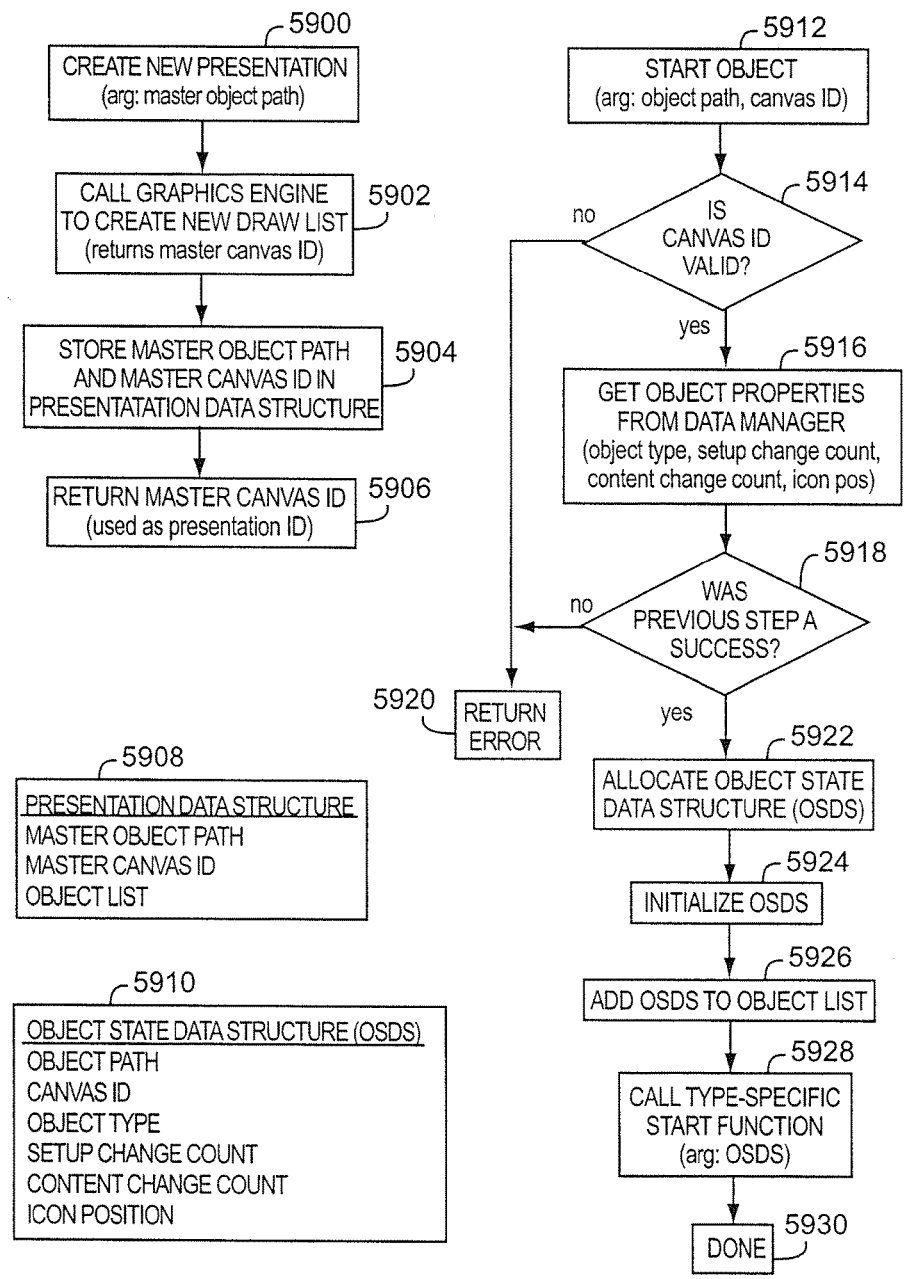
FIGS. 59-70 illustrate software flow diagrams showing procedures of the playback manager component of the presentation engine of FIG. 56, according to an embodiment of the present invention.

Turning now to FIG. 59, the left side of the figure shows a flow diagram of the function for creating a new presentation, as implemented within the playback commands block 5820 of FIG. 58. The function begins at step 5900 when it is called by the initialization procedure of FIG. 52, with the path of a "master object" passed as an argument. In step 5902, a function call is issued to the graphics engine to create a new "draw list." In the present embodiment, a draw list is a data structure in the graphics engine that includes a unique "canvas ID," a list of graphical items and their display settings, and various global settings that affect the way the draw list is rendered (such as background color, zoom setting, scroll settings, etc.). When the call to the graphics engine in step 5902 returns, it returns the canvas ID of the newly created draw list structure; this canvas ID becomes the "master canvas ID" for the presentation being created. Next, in step 5904, the master object path from step 5900 and the master canvas ID from step 5902 are stored in a presentation data structure 5908 (a separate instance of this data structure is created for each new presentation). Finally, in step 5906, the master canvas ID from step 5902 is returned to the caller, so that it may be used as a presentation ID to identify the newly created presentation in subsequent calls to the presentation engine.

The right side of FIG. 59 shows a flow diagram of the function for starting an object, as implemented within the playback commands block 5820 of FIG. 58. The function begins at step 5912 when it is called, with an object path and canvas ID as arguments, from one of the following functional blocks: the type-specific functions block 5860 of FIG. 58; the user input handling block 5780 of FIG. 57; the relation-based communications block 5760 of FIG. 57; or the control display manager 5060 of FIG. 50. In step 5914, a check is made to see if the canvas ID from step 5912 is valid; if it is not recognized as a canvas ID which is currently in use, then the function returns with an error 5920. Otherwise, in step 5916, the data manager is queried using the object path from step 5912 to acquire various object properties (object type, setup change count, content change count and icon position, the last of which is used only for error checking and not for display). Next, in step 5918, the return code from the previous step is checked, and if it is a failure code, the object may no longer exist or may be inaccessible, and the function returns with an error 5920.

Otherwise, in step 5922, an object state data structure 5910 (OSDS) is allocated using the system memory services. Next, in step 5924, the fields of the OSDS 5910 are initialized using the object path and canvas ID from step 5912, and the object properties from step 5916. Next, in step 5926, the OSDS is added to the object list in the presentation data structure 5908. Next, in step 5928, a function call is issued to the object start function within the appropriate type-specific sub-module in the type-specific functions block 5860 of FIG. 58, with the OSDS from the previous steps passed as an argument. Once step 5928 has returned, the function is complete 5930.

In addition to the two functions just described (create new presentation and start object), the playback commands block 5820 of FIG. 58 also includes the following functions. A "stop object" function is provided to stop playback for a specified object; this stop function receives an object path as an argument, then it finds the OSDS for the specified object and calls the appropriate type-specific stop function with the OSDS as an argument. A status checking function is also provided for querying the playback status of a specified object; this status checking function receives an object path as an argument, and it determines whether or not an active OSDS for the specified object is included in a presentation object list, returning the result as true or false. The above status checking function also returns a value specifying the object's activity level on a continuous scale, such as a percent from 0 to 100; this value is derived from certain variables involved with entrance and exit processing which are detailed later in connection with the type-specific functions block 5860.

Figure 60:
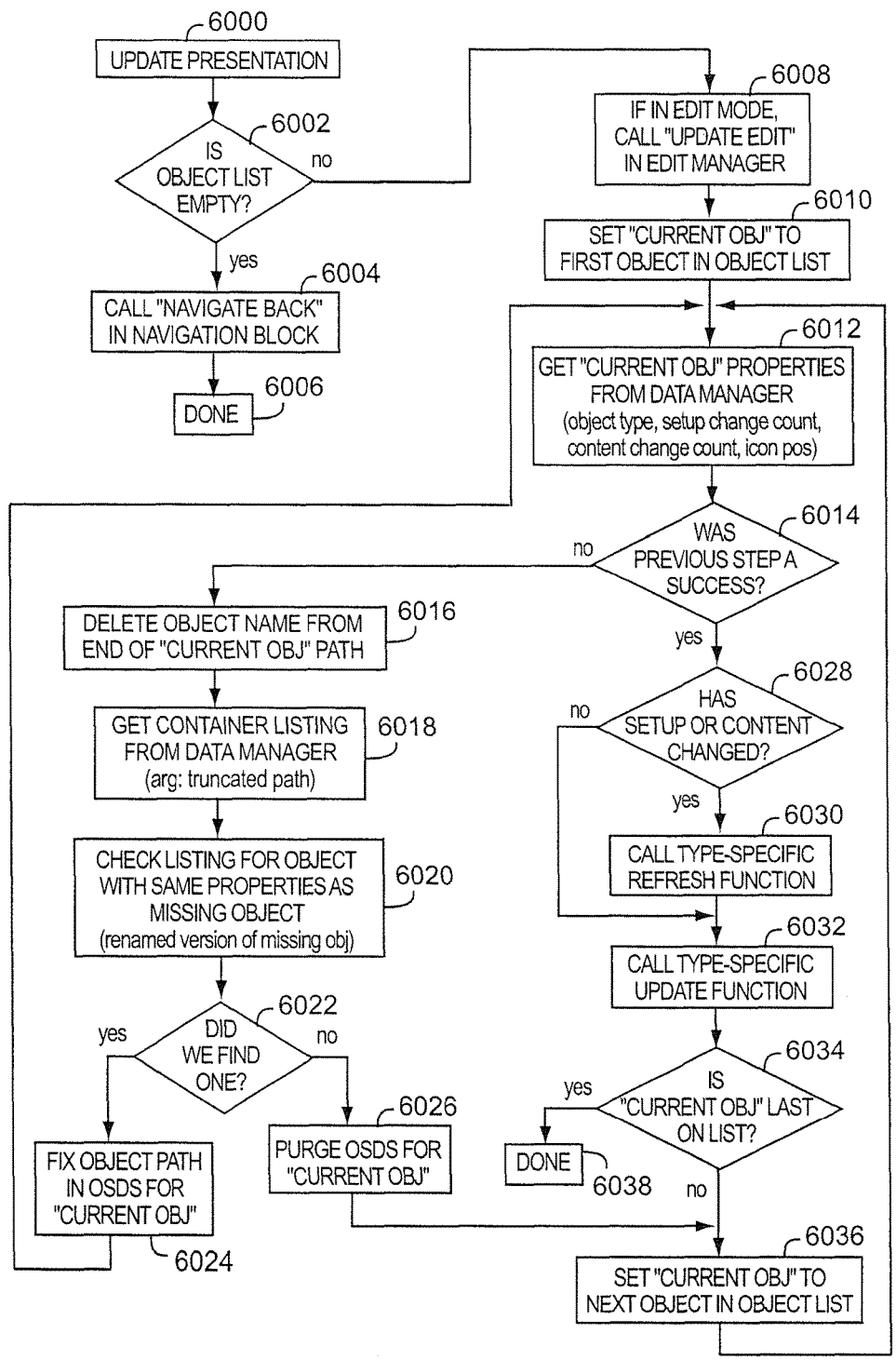

FIG. 60 shows a flow diagram for the presentation update function, as implemented within the update function block 5840 of FIG. 58. The function begins at step 6000 when it receives its periodic call from the main loop. For every instance of the presentation data structure 5908 of FIG. 59, the update function performs its update procedures as follows. In step 6002, it checks whether the object list in the presentation data structure 5908 is empty. If the list is empty, then in step 6004 a function call is issued to the "navigate back" function in the navigation block 5740 of FIG. 57, which performs back navigation if it is pending. After that, the function is done 6006. Otherwise, if the object list evaluated in step 6002 is not empty, then in step 6008 the mode of the system is checked, and if the system is in edit mode, a function call is issued to the "update edit" function in the edit manager block 5640 of FIG. 56, which performs any required edit processing. Next, in step 6010, a "current object" variable is initialized to the object path from the first OSDS 5910 in the object list of the presentation data structure 5908. In step 6012, the data manager is queried using this current object path from the previous step, and various object properties are returned (object type, setup change count, content change count, icon position). Next, in step 6014, the return code from the previous step is checked, and if it is a failure code, then the object may be unavailable or it may have been renamed since the previous call to this function.

To determine whether the current object is really gone or just renamed, in step 6016 a temporary path string is created specifying the container object that contains the current object; this temporary path string is created by copying the current object path into the temporary path string and deleting the last segment from it (the current object's name). In step 6018, using this container path, the data manager is queried for a listing of the objects in the same container as the current object. In step 6020, the properties data for each object in this listing is acquired from the data manager and examined. In step 6022, if any object in the listing is found to have the same properties data as the presently unavailable current object, it is assumed that the object with the same properties is in fact the current object, and the current object has merely been renamed by the user since the last call to this function. In this case, in step 6024, the path of the newly found object (which is the correct path for the current object) is written into the object path of the OSDS 5910 for the current object, and operation continues at step 6012. Otherwise, if no object is found with the same properties as the current object, it is assumed that the current object is gone or unavailable, and in step 6026 the OSDS 5910 for the current object is purged from the object list of the presentation data structure 5908, and operation continues at step 6036.

Returning to step 6014, if the check determines that step 6012 was successful, then in step 6028 the setup change count and content change count acquired in step 6012 are compared against those stored inside the OSDS 5910 for the current object. If there is a discrepancy between either the two setup change counts or the two content change counts, that means that the setup data and/or content data of the current object has changed since the last update and needs to be refreshed. This is accomplished by calling the appropriate type-specific refresh function in step 6030, which is skipped if there has been no change to the setup or content. Next, in step 6032, the update function in the appropriate type-specific sub-module is called to perform any time-based processing needed for the current object. Next, in step 6034, if the OSDS for the current object is the last OSDS in the object list of the presentation data structure 5908, then the update function is done 6038. Otherwise, in step 6036, the current object is set to the next object in the object list, and another iteration of the loop begins at step 6012.

We now turn to a discussion of the functionality found in the type-specific functions block 5860 of FIG. 58. Depending on system configuration, different object types may be supported by the system, and for each object type supported, the type-specific functions block 5860 includes a type-specific sub-module that provides a set of functions for performing operations which vary according to object type. The function set provided by each type-specific sub-module includes: start function, stop function, update function, refresh function, communication response function and communication query function. These six functions, which are implemented uniquely for each object type, are referred to as type-specific functions (TSFs).

In the currently preferred embodiment of the system, the following object types are supported: picture objects, text objects, video objects, sound objects, vector objects, script objects, container objects and container control objects. These eight object types, times six functions each, yields a total of forty-eight individual TSFs. Rather than illustrating all forty-eight of these TSFs, various representative TSFs are shown in the flow diagrams of FIGS. 61 through 66, and special considerations for the remaining TSFs are noted as appropriate in the accompanying text.

Before proceeding with the discussion of the TSFs, some general points should be noted. First, a special object type supported by the present system is the container control object (CCO), which is used to provide various useful capabilities associated with container objects; in the present system, each container object contains a single CCO. Second, some or all of the CCO functionality described in the following discussion may, in an alternate implementation, be included within the type-specific sub-module for container objects (this is especially likely in system configurations where CCOs are not supported). Third, throughout the type-specific functionality described in the following discussion, various operations are performed which involve the relation-based communications block 5760 of FIG. 57; to help clarify the overall logic behind these operations, an overview of the relation-based communications functionality of the preferred system is now provided.

In the preferred system, a real-time method of object communications is provided to implement the various forms of programmed object behavior that were represented in the Functional Overview as relations (the curved lines between objects). Two types of communications are provided for this purpose. The first type is when a trigger "event" causes one or more "actions" to be executed in response; this type of communication is used to implement the behavior discussed in connection with FIGS. 9A through 26D. The second type is when an information "sink" queries data from one or more information "sources;" this type of communication is used to implement the behavior discussed in connection with FIGS. 27A-D and 28A (involving vector objects). In the first case, that of an "event-action" relation, the trigger event might be the starting or stopping of an object, expiration of an object timer, etc., and the triggered action is typically the starting or stopping of another (or the same) object. In the second case, that of a "sink-source" relation, the information sink is typically an update process which needs to update a display setting or other object parameter, and the information source is typically a readable value in another (or the same) object. In either case, the initiating operation (the event or sink) occurs within the type-specific functions block 5860, and results in the issuing of a function call to the relation-based communications block 5760 of FIG. 57 to trigger the action or read the data.

As implemented in the preferred system, the above object communication model is based on "low-level relations." A low-level relation is a piece of data which relates two objects (which can be one and the same object) that are directly contained within a container, by specifying each object name of the two objects and the name and type of a relational capability for each object (capability types include: event, action, sink and source). Essentially, each low-level relation signifies a relationship between two objects according to a specified capability for each object; a low-level relation can be thought of as connecting two capabilities to form an "event-action" or "sink-source" pair. The data manager system component (5030, 5130) makes available a listing of the low-level relations for the objects contained in a given container object, as well as a listing of any partner objects for a given object and capability.

One main advantage of these low-level relations is that they provide a convenient way to implement the various forms of programmed object behavior discussed in connection with FIGS. 9A through 27D and FIG. 28A. Throughout the Functional Overview, this behavior is represented by relations, which are shown as curved lines between objects. For the remainder of this specification, a distinction is made between these relations of the Functional Overview, which are hereinafter referred to as "high-level relations," and the low-level relations just described. The essence of the distinction is that high-level relations define behavior without regard for how that behavior is implemented, whereas low-level relations are associated with a specific mechanism for implementing the behavior. Throughout the remainder of the specification, whenever relations or relation-based communications are mentioned, unless otherwise noted it is low-level relations and their associated communication operations which are being described.

In the preferred system, each high-level relation is implemented using one or more low-level relations. Most high-level relations can be implemented as a single low-level relation, but in some cases, a single high-level relation may require up to four low-level relations. For example, the function of FIG. 17, "objects A and B play together," is implemented as a combination of four low-level relations: (1) object A "starting" event=>object B "start" action; (2) object A "stopping" event=>object B "stop" action; (3) object B "starting" event=>object A "start" action; and (4) object B "stopping" event=>object A "stop" action. Note that in this example, a set of four low-level relations consisting of eight object names and eight capability names and types is equivalent to one high-level relation specifying a particular relationship between two objects.

In the preferred system, whenever the user executes one of the programming commands discussed in connection with FIGS. 9A through 27D, the edit manager 5640 of FIG. 56 handles the command by translating from the high-level relation specified by the command into one or more low-level relations, which it creates via the data manager. The exact translation between high-level relations and low-level relations is detailed in connection with the edit manager 5640. In addition, in the same way that the data manager provides listings of low-level relations and associated information, the relation-based communications block 5760 of FIG. 57 provides listings and associated information for high-level relations, which it derives by accessing low-level relations from the data manager and performing a translation similar to that of the edit manager but in reverse.

Figure 61:
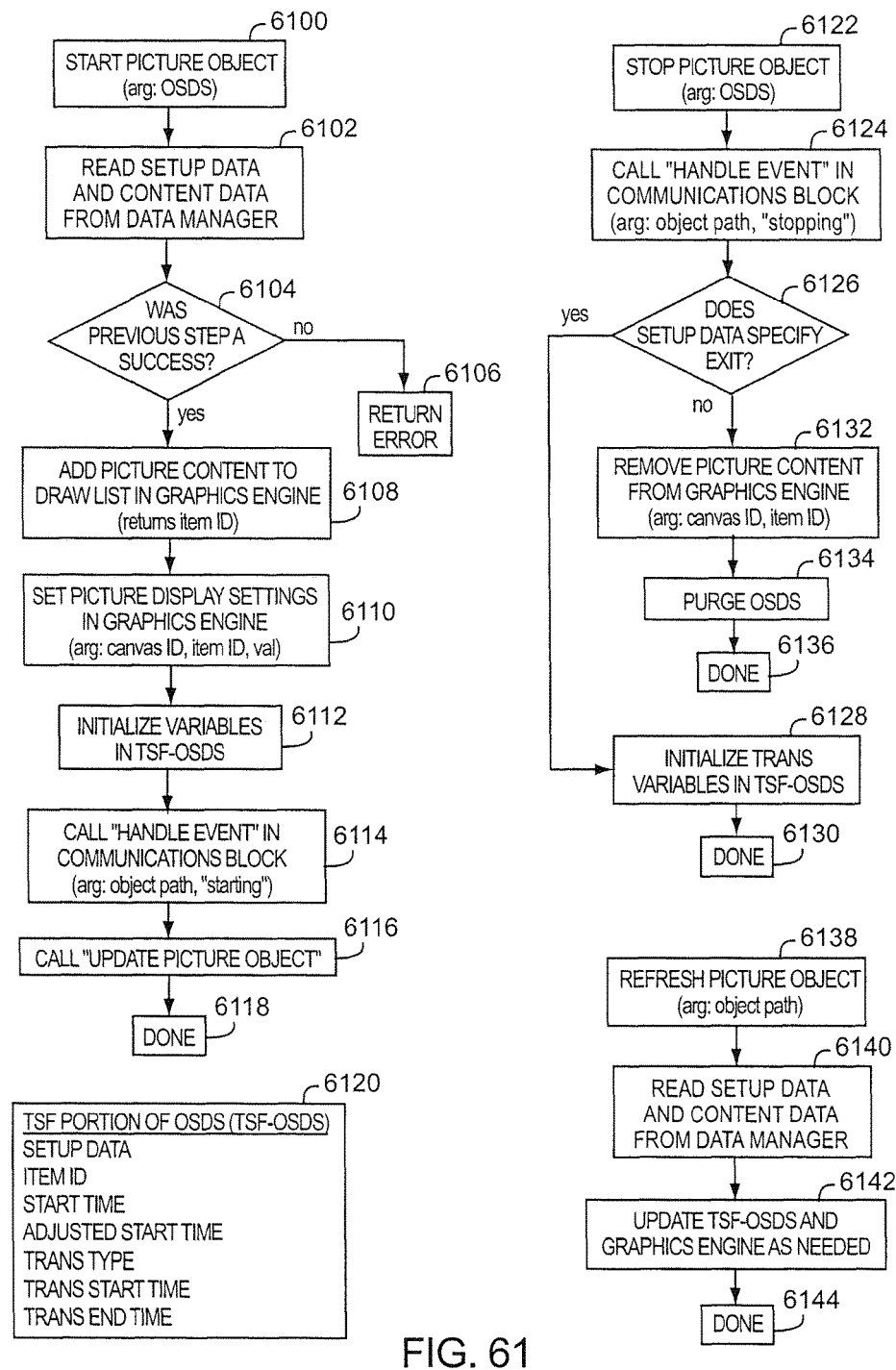
Figure 62:
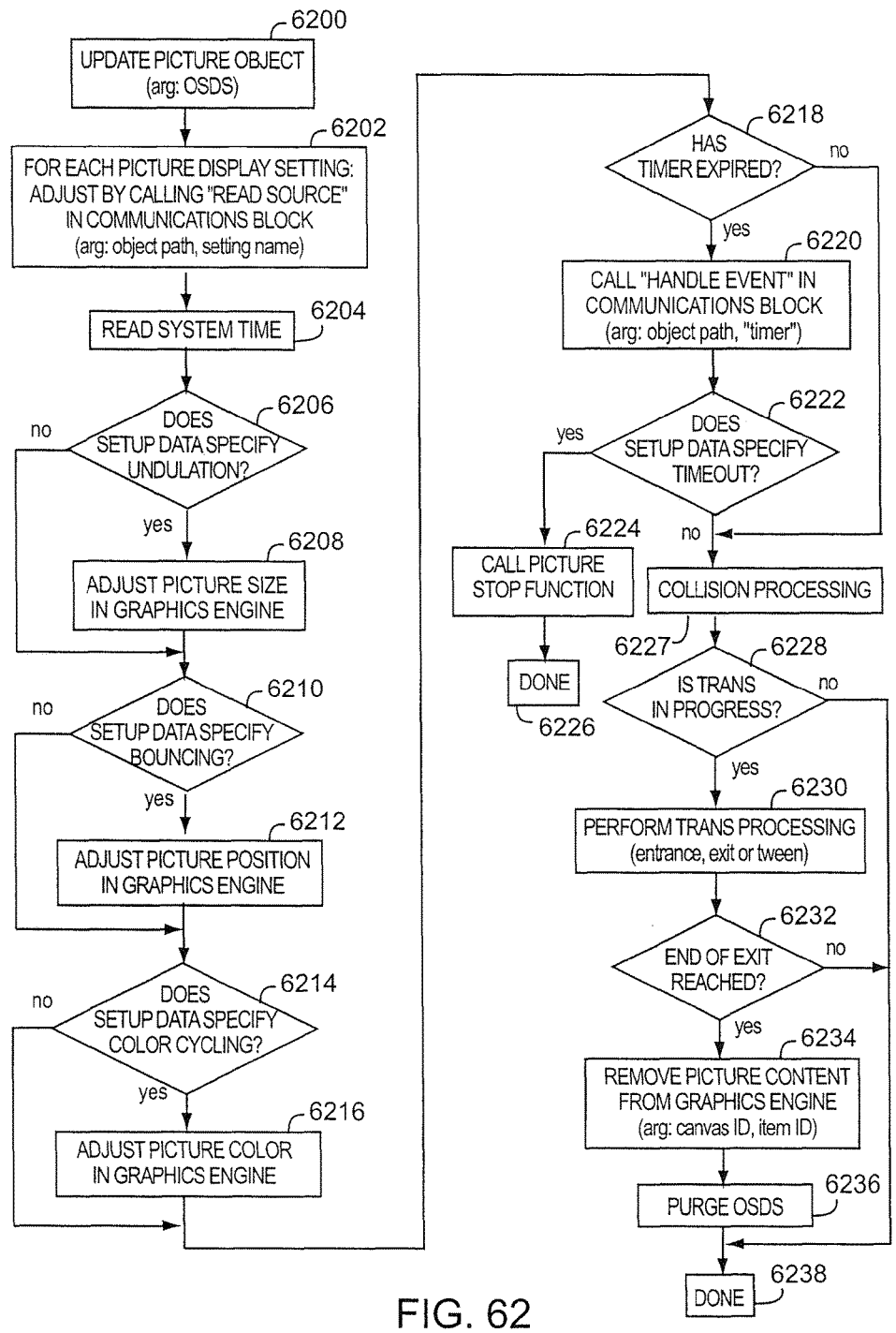
Figure 63:
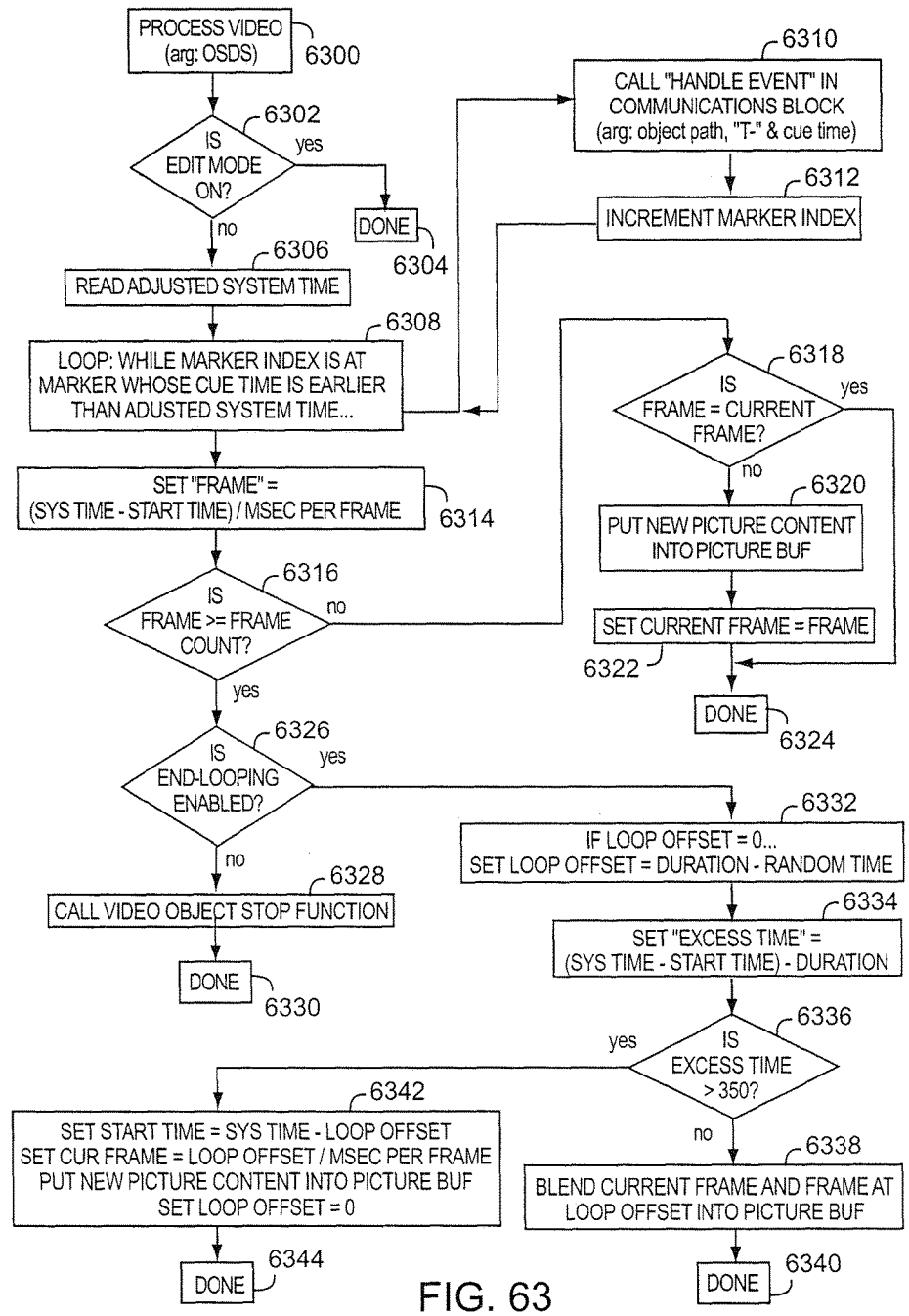
Figure 64:
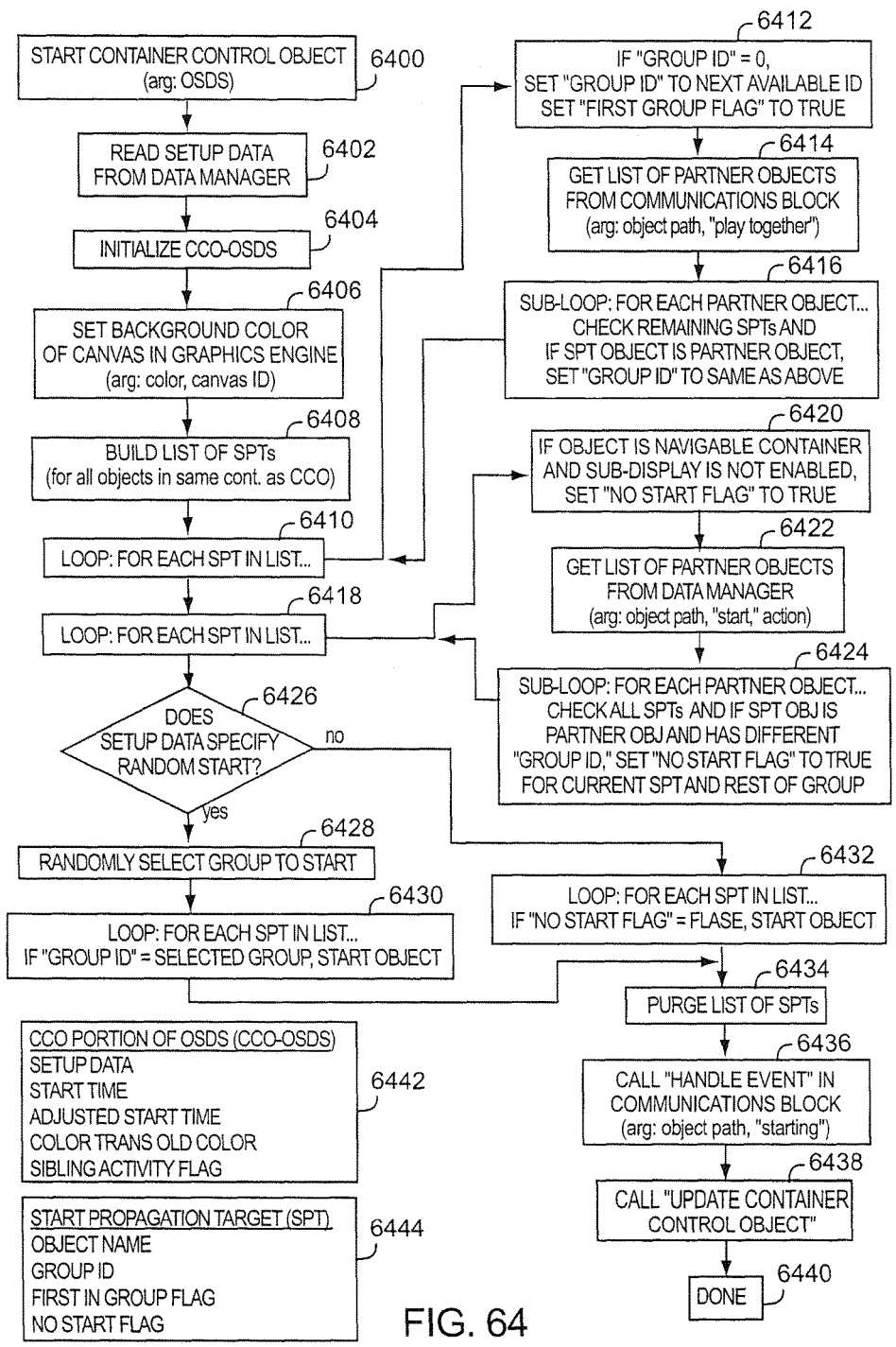
Figure 65:
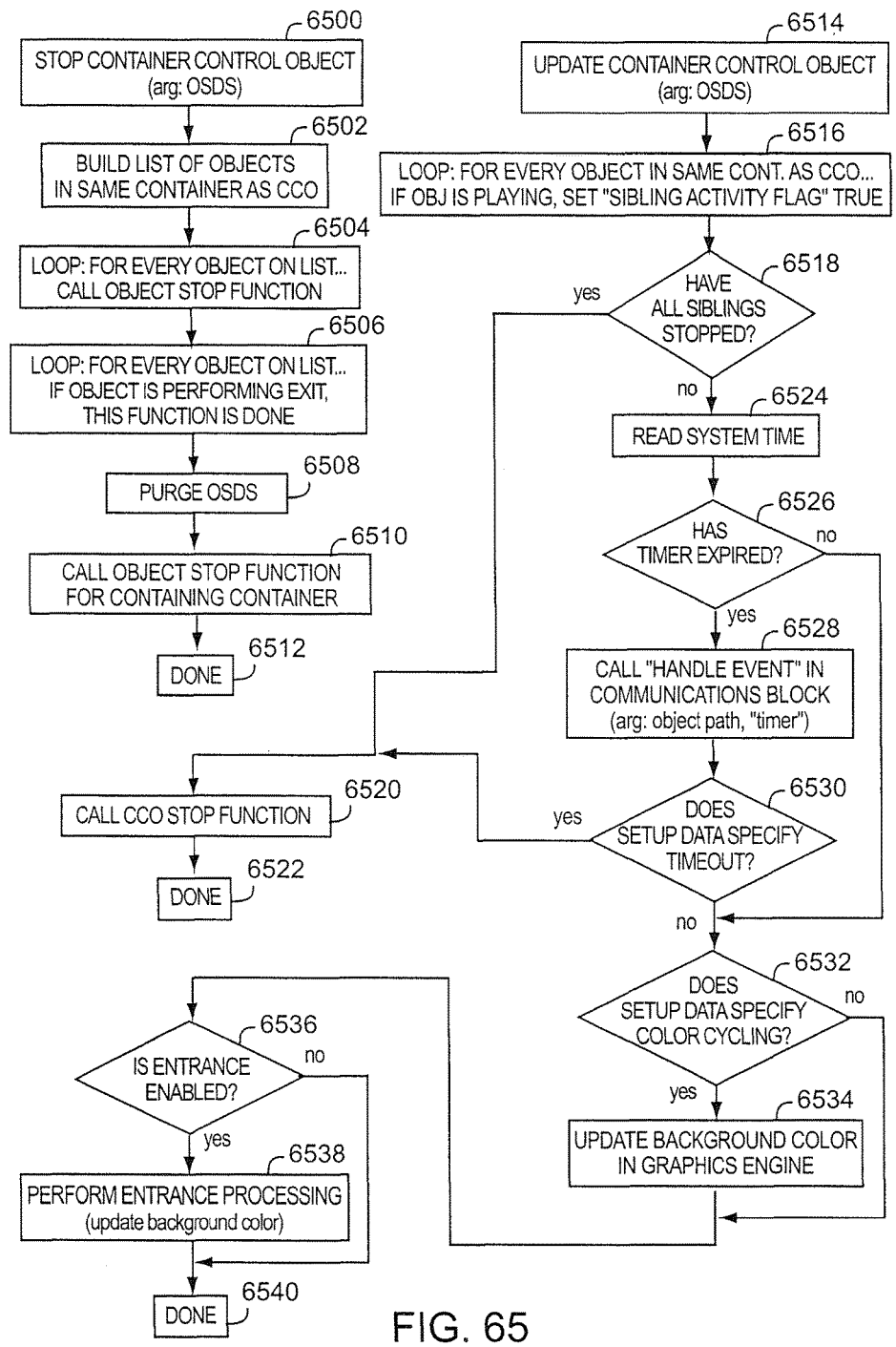
Figure 66:
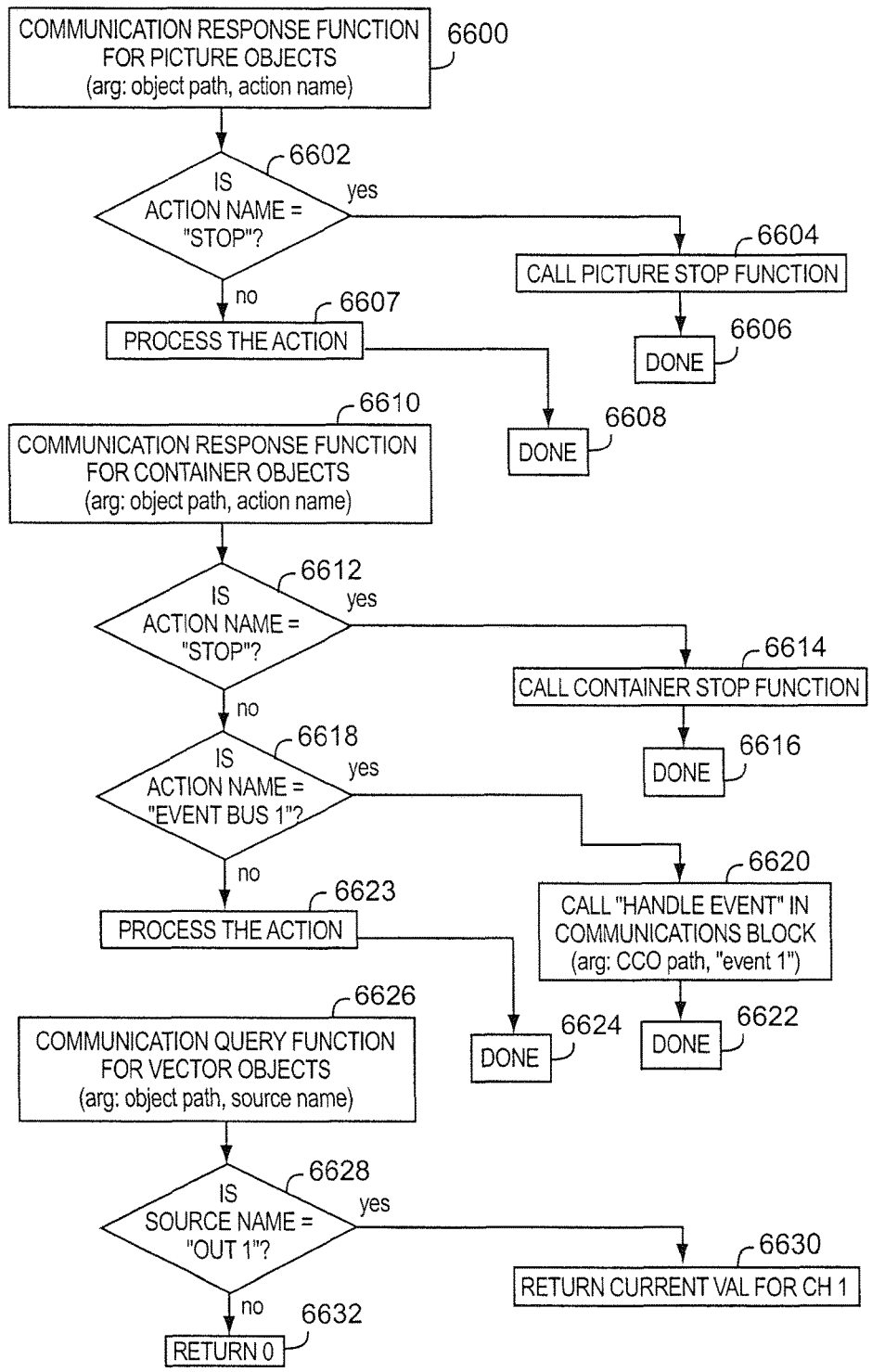

Now that the overall framework of relation-based communications in the preferred system has been explained, a detailed description is provided for the functionality of the type-specific functions block 5860 of FIG. 58 as follows. FIGS. 61 and 62 present flow diagrams for four picture-specific functions: "start picture object," "stop picture object," "refresh picture object" and "update picture object;" corresponding functions for other object types are discussed in reference to these picture object functions. FIG. 63 presents a flow diagram for a video processing function that provides video playback. FIGS. 64 and 65 present flow diagrams for three container control object functions: "start container control object," "stop container control object" and "update container control object." Finally, FIG. 66 presents some examples of communication response and communication query functions.

The left side of FIG. 61 shows a flow diagram of the function for starting a picture object, as implemented within the type-specific functions block 5860 of FIG. 58. The function begins at step 6100 when it is called by the object start function of FIG. 59 with an object state data structure (OSDS) 5910 passed as an argument. This OSDS, in addition to including the variables shown in FIG. 59, includes additional variables associated with type-specific functionality. In the case of the present picture functionality, those additional variables are shown in the data structure 6120 of FIG. 61. In step 6102, the picture start function queries the data manager for the setup data and content data of the picture object specified in the OSDS from step 6100. Next, in step 6104, the return code from the previous step is checked, and if it was not a success, the function returns with an error 6106. Otherwise, in step 6108, a function call is issued to the graphics engine to add the picture content from step 6102 to the draw list specified by the canvas ID stored in the OSDS 5910, and an item ID for the newly added picture is returned. Next, in step 6110, the display settings for the newly added picture are initialized, as per stored information in the setup data from step 6102, by calling the appropriate graphics engine functions with the canvas ID, item ID and desired value as arguments.

Next, in step 6112, the type-specific variables 6120 in the OSDS 5910 from step 6100 (hereinafter referred to as the TSF-OSDS) are initialized as follows. The "setup data" is set to the setup data returned in step 6102. The "item ID" is set to the item ID returned in step 6108. The "start time" is set to the current system time as per a function call to the system services. The "adjusted start time" is set to the current system time minus any time spent in edit mode since the initialization of the system; this adjusted start time allows the progress of certain time-based operations (such as timers expiring, video playing, etc.) to be determined based exclusively on time spent in play mode. The "trans type" is set to the appropriate entrance type as per the setup data of step 6102, or is set to null if no entrance is specified. If an entrance is specified, the "trans start time" is set to the current system time and the "trans end time" is set to the current system time plus the entrance duration specified in the setup data. Next, in step 6114, a function call is issued to the "handle event" function in the relation-based communications block 5760 of FIG. 57, specifying the current picture object and the event name "starting." Next, in step 6116, the picture update function is called, and when that function returns, the present function is done 6118.

Alternatively, step 6112 provides additional functionality in configurations which support tweening as seen in FIGS. 28B-D. This additional functionality evaluates "Tween" relations accessed via the data manager to determine if another object sharing the same canvas ID is the "tween partner" for the present object. If there is such a tween partner, the trans variables in the TSF-OSDS 6120 for both the present object and its tween partner, as well as various additional tween variables (not shown), are set as follows: "trans type" for both the current object and its tween partner is set to "tween;" "trans start time" for both the current object and its tween partner is set to the current system time; "trans end time" for both the current object and its tween partner is set to the current time plus the mean of the entrance duration specified in the setup data of the present object and the exit duration specified in the setup data of the tween partner; a set of initial display settings for the present object is set to the same values as the tween partner's display settings (except with opacity equal to zero); a set of final display settings for the tween partner is set to the same values as the present object's display settings (except with opacity equal to zero). The processing for these tween variables is described below in the discussion of the picture update function.

On the right side of FIG. 61 is a flow diagram of the function for stopping a picture object, as implemented within the type-specific functions block 5860 of FIG. 58. The function begins at step 6122 when it is called by the object stop function of the playback commands block 5820, or by the picture update function of FIG. 62, with an OSDS 5910 passed as an argument. In step 6124, a function call is issued to the "handle event" function in the relation-based communications block 5760 of FIG. 57, specifying the current picture object and the event name "stopping." Next, in step 6126, the setup data in the TSF-OSDS 6120 is examined, and if it specifies that an exit is to take place, then in step 6128 the trans variables in the TSF-OSDS 6120 are set as follows: "trans type" is set to the appropriate exit type as per the setup data; "trans start time" is set to the current system time; "trans end time" is set to the current time plus the exit duration specified in the setup data. After setting these variables, the function exits 6130. Otherwise, if an exit is not specified, then in step 6132 a function call is issued to the graphics engine to remove the picture item from its draw list, with the canvas ID from the OSDS 5910 and the item ID from the TSF-OSDS 6120 passed as arguments. Next, in step 6134, the OSDS 5910 is removed from the object list of the presentation data structure 5908 and deallocated, after which the function is done 6136.

Alternatively, step 6128 provides additional functionality in configurations which support tweening as seen in FIGS. 28B-D. This additional functionality evaluates "Tween" relations accessed via the data manager to determine if another object sharing the same canvas ID is the "tween partner" for the present object. If there is such a tween partner, the trans variables in the TSF-OSDS 6120 for both the present object and its tween partner, as well as various additional tween variables (not shown), are set as follows: "trans type" for both the current object and its tween partner is set to "tween;" "trans start time" for both the current object and its tween partner is set to the current system time; "trans end time" for both the current object and its tween partner is set to the current time plus the mean of the exit duration specified in the setup data of the present object and the entrance duration specified in the setup data of the tween partner; a set of final display settings for the present object is set to the same values as the tween partner's display settings (except with opacity equal to zero); a set of initial display settings for the tween partner is set to the same values as the present object's display settings (except with opacity equal to zero). The processing for these tween variables is described below in the discussion of the picture update function.

At the bottom right of FIG. 61 is a flow diagram of the refresh function for picture objects, as implemented within the type-specific functions block 5860 of FIG. 58. The function begins at step 6138 when it is called with an object path passed as an argument by the edit manager 5640 of FIG. 56 during user editing, or by the presentation update function of FIG. 60 when a change to the object's setup data or content data has been detected. In step 6140, the function acquires the specified object's current setup data and/or content data from the data manager as needed. In step 6142, the setup data stored in the object's TSF-OSDS 6120, as well as the object's current status in the graphics engine (its picture content and display settings), are updated to reflect the current data from step 6140. With that, the function is done 6144.

FIG. 62 shows a flow diagram of the update function for picture objects, as implemented within the type-specific functions block 5860 of FIG. 58. The function begins at step 6200 when it is called by the presentation update function of FIG. 60, or by the picture start function of FIG. 61, with an OSDS 5910 passed as an argument. Before proceeding with the step by step description, it should be noted that in a number of steps in this picture update function, adjustments are made to picture display settings based on various operations occurring; these adjustments are cumulative in nature, in that the final value for any given display setting is the nominal value for that setting (stored in the setup data of the TSF-OSDS 6120) plus the sum of any adjustments made within the present function.

In step 6202, the "read source" function in the relation-based communications block 5760 of FIG. 57 is called for each display setting that can be usefully modulated by information from other objects (examples being shown in FIGS. 27B and 28A); in the preferred system, this includes the following display settings shown in FIGS. 4A through 6B: x-position, y-position, size, color hue, color brightness, color saturation, transparency, rotation, x-stretch, y-stretch, left cropping, right cropping, top cropping, bottom cropping, shape and softness. For each display setting, the "read source" function is passed the object name and the display setting name, and returns the cumulative value of any data sources "connected" to that display setting via low-level relations; if the returned value is non-zero, the display setting is adjusted accordingly.

In step 6204, the current system time is read from the system services. The elapsed time between the start time previously stored in the TSF-OSDS 6120 and this current system time provides a basis for the time-based processing of the next several steps. In step 6206, the setup data stored in the TSF-OSDS 6120 is checked, and if it specifies that "undulation" is enabled, then in step 6208 the size of the picture is adjusted in a manner such as that seen in FIG. 7A (the elapsed time is divided by the cycle period and the remainder yields the current cycle phase, from which the adjustment is derived). Next, in step 6210, the setup data is checked again, and if it specifies that "bouncing" is enabled, then in step 6212 the position of the picture is adjusted in a manner such as that seen in FIG. 7B (once again, the cycle phase is calculated and the adjustment is derived from that). Then in step 6214, the setup data is checked again, and if it specifies that "color cycling" is enabled, then in step 6216 the color of the picture is adjusted in a manner such as that seen in FIG. 7C (once again, the cycle phase is calculated and the adjustment is derived from that).

In step 6218, a software timer is evaluated as follows if it has not previously expired. First, the system time from step 6204 is adjusted to remove any time spent in edit mode since the initialization of the system. Next, the "adjusted start time" previously stored in the TSF-OSDS 6120 is subtracted from this adjusted system time to yield the "elapsed playing time" (distinct from the elapsed time above in that it only includes time spent in play mode). Next, this elapsed playing time is compared with the timer duration stored in the setup data of the TSF-OSDS 6120, and if the elapsed playing time exceeds the timer duration, then the timed has expired. If this is the case, then in step 6220 a function call is issued to the "handle event" function in the relation-based communications block 5760 specifying the current picture object and the event name "timer." Next, in step 6222, the setup data in the TSF-OSDS 6120 is examined, and if the timeout flag specifies that "timing out" is enabled (as seen in FIG. 7F), then in step 6224 the picture stop function of FIG. 61 is called, after which the present function is done 6226. Otherwise, if either the timer has not expired or timing out is not enabled, then in step 6227 collision processing accesses relations via the data manager to determine if the current object has any "collision partners" (other playing objects related to the current object via "Collision" relations); if there are any such collision partners, and if the current object and a collision partner are graphically overlapping in the playback display, then a third object is started or stopped according to an associated relation accessed via the data manager.

Next, in step 6228 the "trans type" stored in the TSF-OSDS 6120 is examined, and if it does not specify that a transition is in progress, then the function is done 6238. Otherwise, if the "trans type" specifies an entrance, exit or tween, then in step 6230 the appropriate trans processing takes place. This trans processing will vary somewhat depending on the type of transition involved, but in general it involves interpolating one or more display settings from a starting value to an ending value, based on how far along the current system time is between the "trans start time" and "trans end time" stored in the TSF-OSDS 6120. In the case of an entrance, the trans processing can include ramping up the size (as seen in FIG. 7D) and/or the opacity of the picture from zero to its nominal value. In the case of an exit, the processing can include ramping down the size and/or the opacity (as seen in FIG. 7E) of the picture from its nominal value to zero. In the case of a tween (as seen in FIGS. 28B-D), the display setting starting values (for the starting object) and ending values (for the stopping object) will have been stored in the TSF-OSDS 6120 by the picture start and/or stop functions of FIG. 61, as discussed above. Over the course of the tween, the display settings for the starting object are interpolated from the stored starting values to their nominal values, and the display settings for the stopping object are interpolated from their nominal values stored to the stored ending values.

Once the trans processing of step 6230 has been completed, then in step 6232 an evaluation is made as to whether or not the trans processing resulted in the end of an exit (or the end of a tween for a stopping object). If it did not, then the function is done 6238. Otherwise, in step 6234, a function call is issued to the graphics engine to remove the picture item from its draw list, with the canvas ID from the OSDS 5910 and the item ID from the TSF-OSDS 6120 passed as arguments. Next, in step 6236, the OSDS 5910 is removed from the object list of the presentation data structure 5908 and deallocated, after which the function is done 6238.

Four functions of the picture object sub-module of the type-specific functions block 5860 of FIG. 58 have just been discussed in reference to FIGS. 61 and 62: "start picture object," "stop picture object," "refresh picture object" and "update picture object." These four functions may be seen as a model for the corresponding functions in many of the other type-specific sub-modules, and in particular, for those sub-modules of the following object types: text objects, video objects, sound objects, vector objects, script objects and container objects. At the same time, within the corresponding functions in these other sub-modules, various operations may take place which are not included in the above picture functionality, and these are described as follows.

The type-specific functions block 5860 of FIG. 58 provides a type-specific sub-module for text objects. Within this type-specific sub-module for text objects, the functionality of the start, stop, refresh and update functions is essentially identical to that for picture objects. The only noteworthy exception is that various common text style options, such as font, fontsize, bold, underline, italic, etc. may be stored as setup data and/or included within the content data. Like the display settings in the picture functions discussed above, these various text options are read from the data manager and are passed to the graphics engine where they are used by the rendering functionality.

The type-specific functions block 5860 of FIG. 58 provides a type-specific sub-module for video objects. Within this type-specific sub-module for video objects, the functionality of the start, stop, refresh and update functions includes all of the operations seen above with picture objects, and in addition includes some special functionality associated with video object playback as follows. The preferred implementation of the video sub-module takes advantage of the fact that image data is passed to the graphics engine via a data pointer, and implements video playback as a picture object whose content buffer is continually being overwritten by new image data corresponding to the current "frame" of video playback. This is a relatively straightforward mechanism that both supports the desired video functionality, and conveniently leverages the features of the invention that apply to picture objects. Of course other implementations for the video sub-module may also be effective, and many proprietary and publicly available video playback systems exist with enough control features to successfully implement the desired functionality.

In the preferred implementation of the video sub-module, the TSF-OSDS for video objects includes all of the variables shown in the picture object TSF-OSDS 6120 of FIG. 61. Moreover, the TSF-OSDS for video objects (not shown) includes some additional variables: "frame count," "current frame," "msec per frame," "duration" (in msec), "loop offset" (in msec), "marker index" and an array of markers.

The start function of the video sub-module, in addition to its other operations, initializes these extra variables of the video TSF-OSDS as follows. The frame count, msec per frame and duration are set to values specified in the video content data which is read at the beginning of the function (as was done in step 6102 of FIG. 61). The loop offset, current frame and marker index are set to zero. The marker array is an array of cue points where each cue point corresponds to a low-level relation associated with the video object being started. To create the marker array, the video start function queries the data manager for the listing of relations in the same container as the current video object, and then it searches the listing for any relations where the event object is the current video object, and the event name begins with the text "T-" followed by a number of milliseconds, such as "T-8000" specifying 8000 milliseconds. Relations such as this are created by the edit manager 5640 of FIG. 56 when handling the programming function of FIGS. 25A-B "video object A, upon reaching cue point, starts object B." For each such relation, the number of milliseconds specified in the event name gets added as a cue point in the marker array of the TSF-OSDS for the video object; when the array is complete, it is sorted so that it proceeds from earliest cue time to latest cue time.

In addition to initializing these extra variables of the video TSF-OSDS, the start function for video objects allocates a picture buffer and fills it with the bitmap of the first video frame from the above-mentioned content data. It is this picture buffer which is added to the graphics engine draw list in the step corresponding to step 6108 of FIG. 61. Finally, the video start function calls the system audio services to initiate audio playback for the audio component of the video data. The stop function and refresh functions for video objects are essentially the same as those for picture objects; the one noteworthy difference is that the stop function must call the system audio services to stop the audio playback process initiated in the start function.

The update function for video objects, prior to performing its general update operations as discussed above for picture objects, issues a subroutine call to a video processing function that performs special processing operations associated with video playback. The operation of this "process video" function is detailed in the flow diagram of FIG. 63. The function begins at step 6300 when it is called by the video update function with an OSDS 5910 passed as an argument. In step 6302, if the system is in edit mode, then the function is done 6304, which effectively causes video playback to pause during edit mode (as seen in FIG. 25A). Otherwise, in step 6306, the system time is read from the system services, and is adjusted to remove any time spent in edit mode since the initialization of the system.

In step 6308, a "while loop" is performed to trigger any markers whose cue time has been exceeded since the last call to this function. Starting at the marker indicated by the "marker index" variable stored in the video TSF-OSDS, the cue time of the marker is added to the adjusted start time stored in the TSF-OSDS, and if the total is less than the adjusted system time from step 6306, then the following steps are performed. In step 6310, a function call is issued to the "handle event" function in the relation-based communications block 5760 of FIG. 57. For this function call, the current video object is specified as the event object, and the event name is a combination of "T-" plus the cue time of the marker in milliseconds (such as "T-8000"); note that the marker list was created in the first place by finding relations of this form and performing a reverse operation, so these arguments will specify a valid relation and the "handle event" function will trigger the appropriate behavior. Next, in step 6312, the marker index in the video TSF-OSDS is incremented, and the evaluation of step 6308 is repeated for the new marker index. This "while loop" of step 6308 continues until the marker index either reaches the end of the array, or is incremented to a marker whose cue time has not yet been exceeded.

In step 6314, the "adjusted start time" stored in the TSF-OSDS is subtracted from the adjusted system time of step 6306. The result, which is the current elapsed playing time of the video object, is divided by the "msec per frame" variable in the video TSF-OSDS, and the result of the division yields the current video "frame." In step 6316, if the newly calculated frame from the previous step does not exceed the last frame of the video as specified by the "frame count" variable in the TSF-OSDS, then in step 6318 the newly calculated frame is compared with the "current frame" previously stored in the TSF-OSDS. If they are the same, then the function is done 6324. Otherwise in step 6320, the bitmap in the video content data which corresponds to the newly calculated frame from step 6314 is written into the picture buffer that was passed to the graphics engine by the video start function, causing the bitmap for the new frame to appear in the playback display upon the next rendering by the graphics engine. Next, in step 6322, the "current frame" variable in the TSF-OSDS is updated to the newly calculated frame from step 6314, and the function is done 6324.

Returning to step 6316, if the newly calculated frame from step 6314 exceeds the last frame of the video as specified by the "frame count" variable in the TSF-OSDS, then in step 6326 the setup data stored in the TSF-OSDS is checked to see if video "end-looping" is enabled (as seen in FIG. 7H). If video end-looping is not enabled, then in step 6328 the stop function for video objects is called, and when that function returns, the present function is done 6330 (alternatively in configurations which support video freeze-frame or overall looping, typical handling for these capabilities may be provided at this point). Otherwise, if video end-looping is enabled, then in step 6332 the "loop offset" variable in the TSF-OSDS is checked, and if it is zero, then it is set as follows: a random time between 1000 and 3000 milliseconds is subtracted from the "duration" variable in the TSF-OSDS, and the result is stored in the "loop offset" variable in the TSF-OSDS. Next, in step 6334, the "adjusted start time" stored in the TSF-OSDS is subtracted from the adjusted system time of step 6306, yielding the elapsed playing time; the "duration" in the TSF-OSDS is subtracted from this elapsed playing time to produce the "excess time" (the portion of the elapsed playing time which exceeds the end of the video data).

When end-looping is enabled, a certain amount of this excess time is dedicated to a "video crossfade," to smoothly blend between the final frame of the video and the frame corresponding to the loop offset selected in step 6332. In step 6336, an evaluation is made as to whether or not the excess time from step 6334 has exceeded the desired crossfade duration (350 milliseconds being currently preferred). If it has not, then in step 6338 a series of operations is performed to blend the two frames mentioned above into the picture buffer. First, the excess time from step 6334 is divided by the crossfade duration (in this case 350) to produce a percentage of completion for the crossfade. Next, the "loop offset" variable in the TSF-OSDS is divided by the "msec per frame" variable in the TSF-OSDS to produce the frame number for the frame that corresponds to the loop offset (the "loop frame"). Then, the two bitmaps from the video content data corresponding to the loop frame and the final frame of the video are acquired from the data manager, and are "alpha-blended" into the picture buffer pixel by pixel. The pixels for the loop frame are blended in at a percentage equivalent to the percentage of completion of the crossfade, and the pixels for the final frame are blended it at a percentage equivalent to one hundred percent minus the percentage of completion of the crossfade. Once the blending is complete, the function is done 6340.

If the evaluation of step 6336 determines that the excess time from step 6334 has exceeded the desired crossfade duration, then in step 6342 a series of operations is performed to reposition video playback so that thereafter playback will continue from the loop frame. First, the "loop offset" variable in the TSF-OSDS is subtracted from the adjusted system time of step 6306, and result is written into the "adjusted start time" variable in the TSF-OSDS. Next, the "loop offset" in the TSF-OSDS is divided by the "msec per frame" in the TSF-OSDS (as was done in step 6338, above), and the resulting loop frame is written into the "current frame" variable in the TSF-OSDS. Next, the bitmap for the loop frame (now the "current frame") is written into the picture buffer so that it will be displayed by the graphics engine the next time rendering occurs. Finally, the "loop offset" in the TSF-OSDS is set to zero, and the function is done 6344.

The type-specific functions block 5860 of FIG. 58 provides a type-specific sub-module for sound objects. Within this type-specific sub-module for sound objects, the start, stop, refresh and update functions include many of the same operations seen earlier in connection with picture objects and video objects. The main difference, of course, is that sound has no visual component; unlike the above sub-modules which manage visual data by interacting with the graphics engine, the sound sub-module manages audio data by interacting with the system sound services. In particular, the sound start function, rather than adding a picture item to a draw list in the graphics engine, initiates an audio playback process by adding a sound item to a "play list" in the sound services. Thereafter, the sound update function calls a sound processing function that is substantially similar to the video processing function of FIG. 63, except that rather than checking to see if a new frame needs to be passed to the graphics engine, it checks to see if more audio data needs to be passed to the sound services to fill the audio playback buffer. Once the end of the sound is detected by this sound processing function, then depending on the setup data, it either loops the sound by resetting the relevant variables, or it stops the sound by calling the sound stop function. The sound stop function, rather than removing a picture item from the graphics engine, removes the sound item from the sound services.

Aside from the differences cited above, the sound sub-module includes much of the same functionality seen so far in the sub-modules for picture and video objects. For example, the sound sub-module includes similar interactions with the data manager to read setup and content data, as well as similar calls to the "handle event" function when sound objects start and stop. Likewise, refresh functionality such as that of the picture refresh function is included, as is timer functionality and entrance and exit functionality such as that of the picture update function (except that sound entrances and exits involve volume fades rather than visual fades). Also, the sound processing function, like the video processing function, skips sound processing during edit mode so that sound playback is paused (it also mutes audio so that looping of the unattended sound buffer is not heard).

Finally, the sound sub-module includes marker functionality such as that seen in the video sub-module for triggering relation-based communications. This marker functionality includes operations in the sound start function such as those in the video start function for creating a marker array based on relations of a similar format. This marker functionality also includes operations in the sound processing function such as those in the video processing function for checking if any markers have been exceeded by the elapsed playing time, and if so, making appropriate calls to the "handle event" function of the relation-based communications block.

The type-specific functions block 5860 of FIG. 58 provides a type-specific sub-module for vector objects (as seen in FIG. 28A). Within this type-specific sub-module for vector objects, the start, stop, refresh and update functions include many of the same operations seen earlier in connection with picture objects and video objects. The main difference, of course, is that vector objects have no visual component; unlike those other sub-modules which manage visual data by interacting with the graphics engine, the vector object sub-module manages time-based playback for a series of stored values (each with an associated millisecond offset) that comprise the vector object content data. The current output value for each vector object can be acquired at any time via the communication query function of the vector object sub-module, which is described below in connection with FIG. 66. Calls to this query function are made by the "read source" function of the relation-based communications block 5760, which is itself called when an "info sink" operation in a type-specific module requests the current value for any "info sources" connected to it via relations (as is done, for example, in step 6202 of the picture update function of FIG. 62).

Compared to the start function for picture and video objects, the vector object start function, rather than adding a picture item to a draw list in the graphics engine, merely initiates a vector playback process by initializing the variables in its TSF-OSDS. Thereafter, the vector update function calls a vector processing function that is generally similar to the video processing function of FIG. 63, but with some differences due to the different nature of the content. The main difference is that rather than passing bitmaps to the graphics engine, the vector processing function sets the current output value (or values in the case of multiple output channels) for the vector playback process by aquiring from the vector content data the value or values corresponding to the elapsed playing time (this can involve interpolating between values if needed). In addition, the setup data in the TSF-OSDS contains a scale setting and a speed setting which affect the overall output scale and playback speed (respectively) of the vector playback processing; moreover, these scale and speed settings may be adjusted by function calls to the "read source" function in the relation-based communications block 5760 (similar to the way display settings for picture objects may be adjusted in step 6202 of FIG. 62). In addition, the playback position of the vector playback process may also be adjusted by a function call to the "read source" function in a similar fashion. Once the end of the vector content data has been exceeded by the elapsed playing time, then depending on the setup data, the vector processing function either loops playback by resetting the relevant variables, or it stops the vector object by calling the vector object stop function. The stop function purges the OSDS to end the process.

Aside from the differences cited above, the vector object sub-module includes much of the same functionality seen so far in the sub-modules for picture and video objects. For example, the vector object sub-module includes similar interactions with the data manager to read setup and content data, as well as similar calls to the "handle event" function when vector objects start and stop. Likewise, refresh functionality such as that of the picture refresh function is included, as is timer functionality and entrance and exit functionality such as that of the picture update function (except that vector object entrances and exits involve scaling the dynamic range of vector object output). Also, the vector object processing function, like the video processing function, skips vector object processing during edit mode so that the progress of vector objects is paused.

Finally, the vector sub-module includes marker functionality such as that seen in the video sub-module for triggering relation-based communications. This marker functionality includes operations in the vector start function such as those in the video start function for creating a marker array based on relations of the proper format. This marker functionality also includes operations in the vector processing function such as those in the video processing function for checking if any markers have been exceeded by the elapsed playing time, and if so, making appropriate calls to the "handle event" function of the relation-based communications block.

The type-specific functions block 5860 of FIG. 58 provides a type-specific sub-module for script objects. Within this type-specific sub-module for script objects, the start, stop, refresh and update functions include many of the same operations seen earlier in connection with picture objects and video objects. The main difference, of course, is to that script objects have no visual component. So unlike those other sub-modules which manage visual data by interacting with the graphics engine, the script object sub-module is essentially an "interpreter" that interprets a list of script commands that comprise the script object content data. The script object sub-module can communicate from its internal script playback processes to other types of objects (or to other script objects) using relation-based communications, such as by issuing calls to the "handle event" function of the relation-based communications block 5760 when certain internal script events occur, and by providing a communication query function that allows the "read source" function of the relation-based communication blocks 5760 to read the current value of internal script variables.

Compared to the start function for picture and video objects, the script object start function, rather than adding a picture item to a draw list in the graphics engine, merely initiates a script playback process by initializing the variables in its TSF-OSDS. Thereafter, the script update function calls a script processing function that is substantially similar to the video processing function of FIG. 63, except that rather than passing bitmaps to the graphics engine, it interprets the current script command and performs any specified actions (using typical script playback functionality as described earlier in the background section). The stop function, rather than removing a picture item from the graphics engine, merely purges the OSDS to end the process.

Aside from the differences cited above, the script object sub-module includes much of the same functionality seen so far in the sub-modules for picture and video objects. For example, the script object sub-module includes similar interactions with the data manager to read content data, as well as similar calls to the "handle event" function when script objects start and stop. Likewise, refresh functionality such as that of the picture refresh function is included, as is timer functionality and entrance and exit functionality such as that of the picture update function (except that script object entrances and exits involve scaling the dynamic range of script object data outputs). Also, the script object processing function, like the video processing function, skips script object processing during edit mode so that the progress of script objects is paused.

The type-specific functions block 5860 of FIG. 58 provides a type-specific sub-module for container objects. This type-specific sub-module for container objects performs various duties involved with container object playback. In addition, it provides functionality for associating container objects with nested sub-displays (as seen in FIGS. 40 through 45C). Finally, as stated earlier, the container object sub-module may also include some or all of the functionality associated with container control objects (which is detailed in connection with FIGS. 64 and 65).

In providing sub-display functionality, the container object sub-module relies on a special feature of the graphics engine, detailed in connection with FIGS. 78 and 79. Briefly, this special feature involves "sub-display" items, which can be added to draw lists in the graphics engine just as picture items and text items may be added. A sub-display item defines a visual field in the playback display and associates the visual field with a separate, nested draw list. The nested draw list is a subordinate draw list for the sub-display item, such that any item added to the nested draw list is rendered within the visual field defined by the sub-display item. In addition, any of the display settings that can be applied to picture items can also be applied to sub-display items, producing a variety of possibilities for altering the appearance of sub-display visual fields.

In the case of a container object whose setup data specifies that sub-display functionality is enabled, the start, stop, refresh and update functions employ all of the operations seen above with picture objects. The most significant difference is that the various graphics operations are performed on sub-display items rather than picture items. For example, in the container start function, in the operation corresponding to step 6108 of FIG. 61, a sub-display item rather than a picture item is added to the graphics engine draw list. This involves first allocating a new draw list by calling a graphics engine function that returns a canvas ID; the returned canvas ID for the new draw list is stored as a "sub-canvas ID" in the container object TSF-OSDS, and it is this sub-canvas ID which is specified as the nested draw list when the new sub-display item is added. Like other visual items, the new sub-display item is added to the draw list specified by the canvas ID in the OSDS 5910 of FIG. 59 (this draw list may itself be a nested draw list for some other sub-display item, resulting in a sub-display within a sub-display as seen in FIG. 41). Once the sub-display item is added, then in the operation corresponding to step 6110 of FIG. 61, the display settings of the sub-display item are initialized as per the setup data read earlier in the function. Likewise, the other operations of the picture sub-module apply within the context of the container sub-module in a similar way.

In the case of a container object whose setup data specifies that sub-display functionality is not enabled, the above operations involving the graphics engine are not required; the other operations of the picture sub-module, however, are still included in the container sub-module. Moreover, whether or not sub-display functionality is enabled, the container sub-module also includes special functionality for managing container object playback as follows.

The container object start function, after going through its other operations as discussed above, checks if the container control object (CCO) in the container being started is already playing; if it is not, then a function call is issued to the object start function of FIG. 59 to start the CCO (the CCO, in turn may start one or more other objects in the same container to implement the "start propagation" of FIGS. 8A-B). When starting the CCO, the container start function passes as an argument either the canvas ID from its OSDS 5910 of FIG. 59, or if sub-display functionality is enabled, the "sub-canvas ID" previously stored in the TSF-OSDS (the latter case resulting in all of the contained objects being rendered within the visual field of the sub-display). Next, the container start function examines the setup data in the TSF-OSDS, and if the container object is navigable and its sub-display functionality is disabled, the container start function calls the "navigate" function in the navigation block 5740 of FIG. 57, passing it the OSDS 5910 of the just started container object in order to navigate to it (as depicted in FIGS. 38A-B). If the above conditions are not met, or after the navigation call has returned, the container start function is done.

The container object refresh function, in addition to operations such as those seen for pictures, includes operations for detecting when there has been a change to the flag in the setup data that specifies whether or not sub-display functionality is enabled. This flag changes from disabled to enabled whenever the user enables sub-display functionality for a playing container object (as seen in FIG. 40). In such cases, the container object refresh function first performs certain operations already discussed in connection with the container start function, including allocating a new nested draw list, creating a new sub-display item associated with the nested draw list, and initializing the display settings for the new sub-display item. Next, it identifies any playing objects which are hierarchically below the container object (i.e., contained by it either directly or indirectly) and which also have the same canvas ID as the container object (as specified within the OSDS data structures for the container and its contained objects). For each such object, it sets the canvas ID in its respective OSDS to the canvas ID of the nested draw list just created. Alternatively, when the sub-display flag in the setup data changes from enabled to disabled, the refresh function performs essentially the reverse operations: each currently playing object with a canvas ID the same as that of the nested draw list has its canvas ID set to that of the container object, and the sub-display item and nested draw list are deallocated. In addition, the container object refresh function includes functionality for detecting when there has been a change to the flag in the setup data that specifies whether or not the container object is navigable. In such cases, if sub-display functionality is not enabled, the container object is stopped by calling the container object stop function.

The container object stop function, in addition to operations such as those seen for pictures, deallocates the nested draw list if one is currently allocated for a sub-display, and also calls the general object stop function to stop its associated container control object; the container control object in turn stops all of the objects contained by the container (as per the "stop propagation" of FIG. 8A). This additional functionality for deallocating the nested draw list and stopping the container control object is also included in the container update function in the case where the end of an exit is reached (corresponding to steps 6234 and 6236 in FIG. 62).

In the case of a container object which is entering into a tweening process with another container, the container object start and stop functions provide additional tweening-related functionality beyond that seen for pictures. In particular, these functions make a determination as to which objects in the stopping container should transition to which objects in the starting container. Depending on system configuration, this determination may be made using various factors, such as similarity of media data, similarity of display settings, similarity of object names, special instructions or programming by the user, etc. Based on the results of this determination, tweening processes are established for one or more object pairs, each object pair consisting of an object in the stopping container that is tweening to an object in the starting container. The initiation of these tweening processes is accomplished using techniques already discussed in connection with picture objects (FIG. 61, steps 6112 and 6128).

The type-specific functions block 5860 of FIG. 58 provides a type-specific sub-module for container control objects (CCOs). Three functions within this type-specific sub-module for CCOs are illustrated in the flow diagrams of FIGS. 64 and 65: "start container control object," "stop container control object" and "update container control object." These three functions are explained below after a brief discussion of the CCO refresh function. As stated earlier, some or all of the functionality of this CCO sub-module may be included within the sub-module for container objects (in some cases requiring minor adaptation).

The main task of the CCO refresh function, like the other type-specific refresh functions, is to make sure that the playback process for a CCO accurately reflects its stored data (which in this case is setup data only, since CCO's do not have content data). In addition to reading the CCO setup data from the data manager and writing it into the TSF-OSDS (shown as CCO-OSDS 6442 in FIG. 64), the CCO refresh function also checks the value of the background color in the new setup data (which specifies the desired background color for the draw list corresponding to the canvas ID in the CCO's OSDS 5910). If it detects that the background color in the new setup data is different than the background color in the old the setup data, it issues a function call to the graphics engine to update the draw list background color, causing it to change to the new color the next time the draw list is rendered (this step is skipped if the present CCO is not the hierarchically topmost CCO assigned to this canvas ID). Like the other type-specific refresh functions, the CCO refresh function is called by the general presentation update function of FIG. 60 whenever a change to the setup data is detected; this will typically happen when the "color dragging" editing function of FIG. 4C is applied to the playback display backdrop and is handled by the edit manager 5640 of FIG. 56 (resulting in real-time changes to the playback display background color).

FIG. 64 shows a flow diagram of the start function for container control objects, as implemented within the type-specific functions block 5860 of FIG. 58. The function begins at step 6400 when it is called by the object start function of FIG. 59 with an OSDS 5910 passed as an argument. In step 6402, the setup data for the CCO specified in the previous step is read from the data manager (and as in steps 6104 and 6106 of the picture start function of FIG. 61, the success of the previous step is evaluated, and if it was a failure, the function returns with an error code). Next, in step 6404, the CCO-OSDS 6442 (the type-specific portion of the OSDS from step 6400) is initialized as follows. The "setup data" is set to the setup data read in step 6402. The "start time" is set to the current system time as per the system services. The "adjusted start time" is set to an altered version of the current system time, which is the current system time minus any time spent in edit mode since the initialization of the system. The "color trans old color" is set to the current background color of the draw list specified by the canvas ID in the OSDS from step 6400 (this is in case the old color is needed for entrance processing as discussed shortly). The "sibling activity flag" is set to false. Next, the background color of the above-mentioned draw list is set to the background color specified in the setup data by calling a graphics engine function and passing it the color and canvas ID (this step is skipped if the present CCO is not the hierarchically topmost CCO assigned to this canvas ID).

Next, starting at step 6408 and continuing through step 6434, the majority of the CCO start function is dedicated to providing start propagation functionality as discussed in connection with FIGS. 8A-B (this functionality may be omitted in system configurations where start propagation is not supported). In step 6408, a list of potential "start propagation targets" is constructed, the list consisting of one instance of data structure 6444 for each object in the same container as the current CCO. To build the list, a contents listing is acquired from the data manager by passing it the container path, which is produced by removing the CCO name from the end of the object path in the OSDS from step 6400. For each object listed by the data manager which is not the current CCO, a start propagation target (SPT) data structure 6444 is initialized (by writing the object name and setting the other variables to zero) and added to the list. This "SPT list" is used throughout the start propagation functionality as follows.

The first thing that happens with the SPT list is that the "group ID" and "first in group flag" for each entry is set. To understand the purpose of these variables, recall that there is a "start propagation exemption" which was discussed in connection with FIGS. 8A-B, whereby objects which are programmed to be started by other objects are not started by the start propagation (since that would defeat the purpose of the programming). In the present function, the test for whether or not an object should be exempted is as follows: if the object in question has a low-level relation connected to its "start" action, and the "partner" object on the other side of that relation is not in the same group as the object in question, then the object in question is exempted from start propagation. In this context, grouping for objects is based on whether they have been programmed with the function of FIG. 17: "objects A and B play together." Any objects which have been grouped via this function (and recall that it is transitive) are considered to be in the same group, and the relation-based communications block 5760 provides a query function that returns a listing of the partner objects which have been grouped with a given object via the function of FIG. 17.

In order to set the "group ID" and "first in group flag" as discussed above, step 6410 comprises a loop that is performed once for each entry in the SPT list as follows. First, in step 6412, if the group ID in the SPT 6444 is currently set to zero, then it is set to the next available non-zero ID that has not yet been used, and the "first in group flag" is set to true. Next, in step 6414, a function call is issued to the above-mentioned query function in the relation-based communications block 5760 to get a listing of the partner objects grouped with the current SPT object; the arguments passed to this query function are the object path of the current SPT object (produced by adding the object name in the current SPT to the end of the container path used in step 6408), and the text string "play together" (to identify the function of FIG. 17). Next, in step 6416, a sub-loop is performed for each partner object returned in the previous step, as follows. Starting with the next SPT past the current SPT, all of the remaining SPTs are checked, and if an SPT has the same object name as the current partner object, the group ID for that SPT is set to the same value as the group ID for the current SPT. When both loops (the sub-loop of step 6416 and the loop of step 6410) have finished, the "group ID" and "first in group flag" for each entry in the SPT list will be properly set.

Next, in step 6418, a loop is performed to set the "no start flag" for each entry in the SPT list. For each entry in the list, the following operations are performed. First, in step 6420, if the current SPT represents a container object (as per a call to the data manager to read the object's properties data), and if that container object is both navigable and does not have sub-display functionality enabled (as per a call to the data manager to read the object's setup data), then the "no start flag" in that SPT is set to true (this blocks start propagation for such objects, since otherwise navigation would be triggered automatically, producing undesirable results). Next, in step 6422, a data manager function is called to get a listing of the partner objects connected via low-level relations to the "start" action of the current SPT object. Next, in step 6424, a sub-loop is performed for each partner object returned in the previous step as follows. Starting with the first entry in the SPT list, all of the SPTs are checked, and if an SPT has the same object name as the current partner object, the group ID for that SPT is checked, and if it is different from that of the current SPT, then the "no start flag" for the current SPT is set to true, and moreover, the "no start flag" for every other SPT in the SPT list with the same group ID as the current SPT is also set to true (requiring yet another nested loop). When all the loops, including the sub-loop of step 6424 and the loop of step 6418, have finished, the "no start flag" for each entry in the SPT list will be properly set.

Next, in step 6426, if the setup data from step 6402 specifies that random start is enabled for the current CCO, then in step 6428 a group from the SPT list is randomly selected for start propagation as follows. First, a "group count" variable is set to zero. Then, all of the entries in the SPT list are examined, and for any entry where the "first in group flag" is set to true and the "no start flag" is set to false, the group count is incremented. Then a random group number is selected based on the above group count. Next, in step 6430, a loop is performed to start all of the objects in the selected group, as follows. For each entry in the SPT list, if the group ID in the SPT 6444 is equal to the selected group number, then the object represented by that SPT is started by calling the object start function of FIG. 59.

Alternatively, if the setup data checked in step 6426 specifies that random start is not enabled, then in step 6432 a loop is performed to start the appropriate objects as follows. For each entry in the SPT list, if the "no start flag" in the SPT 6444 is set to false, then the object represented by that SPT is started by calling the object start function of FIG. 59. In either case, whether random start is enabled or not, in the next step 6434 the SPTs in the SPT list are deallocated. Next, in step 6436, a function call is issued to the "handle event" function in the relation-based communications block 5760, specifying the current CCO and the event name "starting." Next, in step 6438, the update function for container control objects is called, and when that function returns, the present function is done 6440.

The left side of FIG. 65 shows a flow diagram of the function for stopping a container control object, as implemented within the type-specific functions block 5860 of FIG. 58. The function begins at step 6500 when it is called by the object stop function of the playback commands block 5820, or by the CCO update function on the right side of FIG. 65, with an OSDS 5910 passed as an argument. In step 6502, a list is created for all the objects in the same container as the current CCO (by calling the data manager for the container listing and omitting the current CCO). In step 6504, a loop is performed in which the object stop function of the playback commands block 5820 is called for every object on the list from step 6502. Next, in step 6506, a loop is performed in which the playback status of every object on the list from step 6502 is checked via the status checking function of the playback commands block 5820, and if any of them is still playing, the present function exits (this allows the CCO to remain active while other objects are performing exit processing). In step 6508, assuming the function did not exit in the previous step, the OSDS from step 6500 is removed from the object list of the presentation data structure 5908 and deallocated. Next, in step 6510, if the container object which contains the CCO is still playing, it is stopped by calling the object stop function in the playback commands block 5820. With that, the function is done 6512.

On the right side of FIG. 65 is a flow diagram of the update function for container control objects, as implemented within the type-specific functions block 5860 of FIG. 58. The function begins at step 6514 when it is called by the presentation update function of FIG. 60, or by the CCO start function of FIG. 64, with an OSDS 5910 passed as an argument. In step 6516, a loop is performed to detect when all the objects in the same container as the CCO specified by the OSDS from step 6514 have stopped playing, as follows. First, a list is created for all the objects in the same container as the current CCO (by calling the data manager for the container listing and omitting the current CCO). Then, the playback status of each object in the list is checked via the status checking function of the playback commands block 5820, and if any object is found to be playing, then a local "sibling activity flag" (initialized to false) is set to true.

Next, in step 6518, if the local sibling activity flag from the previous step is true (meaning that other objects in the same container as the above CCO are playing), then the "sibling activity flag" in the CCO-OSDS 6442 of FIG. 64 is set to true and operation continues at step 6524. Alternatively, if both the local sibling activity flag from the previous step and the "sibling activity flag" in the CCO-OSDS are false, then that means no other objects in the same container were ever playing, and execution also continues at step 6524. Only if the local sibling activity flag from the previous step is false and the "sibling activity flag" flag in the CCO-OSDS is true does it mean that other objects were once playing and have now stopped, in which case the CCO stop function on the left side of FIG. 65 is called in step 6520. Note that in step 6510 of the CCO stop function, the enclosing container object is also stopped, which in this case results in "inverse stop propagation" as seen in FIG. 8B. When the function call of step 6520 returns, the present function is done 6522.

Otherwise, in step 6524, the current system time is read from the system services. Next, in step 6526, the system time from the previous step is adjusted to remove any time spent in edit mode since the initialization of the system, and the "adjusted start time" stored in the CCO-OSDS 6442 is subtracted from this adjusted system time to yield the elapsed playing time. If this elapsed playing time exceeds the timer duration stored in the setup data of the CCO-OSDS (and if the timer has not previously expired), then in step 6528 a function call is issued to the "handle event" function in the relation-based communications block 5760 specifying the current container control object and the event name "timer." Next, in step 6530, the setup data in the CCO-OSDS is checked, and if the timeout flag specifies that "timing out" is enabled (as seen in FIG. 7F), then in step 6520 the CCO stop function on the left side of FIG. 65 is called, after which the present function is done 6522.

Otherwise, in the next several steps, the elapsed time between the "start time" stored in the CCO-OSDS 6442 and the system time read in step 6524 becomes the basis for the following time-based processing. In step 6532, the setup data stored in the CCO-OSDS is checked, and if it specifies that "color cycling" is not enabled, then operation continues at step 6536. Otherwise, in step 6534, the background color of the draw list specified by the canvas ID in the OSDS from step 6514 is adjusted in a manner such as that seen in FIG. 7C (the elapsed time is divided by the cycle period and the remainder yields the current cycle phase, from which the adjustment is derived). In an enhanced implementation, the color setting for draw list backgrounds can involve a "color queue" managed by the graphics engine, such that each change to the background color of a draw list appears to "emanate" from the center of the background and progress outward to fill the background; when this capability is used with frequent color updates (such as those that occur when CCO color cycling is enabled), it results in a visual effect consisting of multiple bands of color emanating from the center of the background.

Next, in step 6536, the setup data stored in the CCO-OSDS is checked, and if it specifies that "entrance" is not enabled, then the function is done 6540. Otherwise, in step 6538, the background color of the draw list specified by the canvas ID in the OSDS from step 6514 is adjusted as follows. A color interpolation is performed between the "color trans old color" stored in the CCO-OSDS and the current background color (the latter being either the background color stored in the setup data, or if color cycling is enabled, the color produced in step 6534). This color interpolation involves taking the elapsed time and dividing it by the entrance duration specified in the setup data to determine the percentage of completion of the entrance. If the result is greater than one, then the entrance duration has been exceeded and the function is done 6540. Otherwise, a color blend is performed between the current color (at a level equal to the percentage of completion of the entrance) and the old color (at a level equal to one hundred percent minus the percentage of completion of the entrance). The color resulting from this blend operation is passed to the graphics engine, and becomes the background color for the above draw list. With that, the function is done 6540.

In the preceding discussion, four type-specific functions (start, stop, refresh and update) have been described for each of the eight sub-modules in the type-specific functions block 5860 of FIG. 58. In addition to these four type-specific functions, each of the sub-modules also contains two more type-specific functions: a communication response function and a communication query function. These latter two functions (representative examples of which are described below) are called from within the relation-based communications block 5760 of FIG. 57 whenever the "handle event" function or "read source" function, respectively, finds a low-level relation corresponding to the specified event or sink. In essence, calls to these type-specific communication response functions or communication query functions complete communications which are initiated by calls to "handle event" or "read source," respectively.

At the top of FIG. 66 is a flow diagram of the communication response function for picture objects, as implemented within the type-specific functions block 5860 of FIG. 58. The function begins at step 6600 when it is called by the "handle event" function of the relation-based communications block 5760, with an object path and an action name passed as arguments. In step 6602, the action name from the previous step is evaluated, and if it is equal to the text string "stop," then in step 6604 the picture stop function of FIG. 61 is called to stop the object specified in step 6600 (this requires searching the object list in the presentation data structure 5908 to find the OSDS with an object path the same as that from step 6600, and that OSDS is passed to the stop function as an argument). When the function call of step 6604 returns, the present function is done 6606. Otherwise, if the action name evaluated in step 6602 is not "stop," then in step 6607 the incoming action is processed. To handle the "Attribute" action, various object attributes may be modified. When the incoming action has been processed, the present function is done 6608. Regarding the communication response functions for the other type-specific sub-modules, they all provide essentially the same functionality as the above picture function, except for those in the container sub-module and container control object sub-module, which are described as follows.

In the middle of FIG. 66 is a flow diagram of the communication response function for container objects, as implemented within the type-specific functions block 5860 of FIG. 58. The function begins at step 6610 when it is called by the "handle event" function of the relation-based communications block 5760, with an object path and an action name passed as arguments. In step 6612, the action name from the previous step is evaluated, and if it is equal to the text string "stop," then in step 6614 the container stop function is called to stop the container object specified in step 6610 (this requires searching the object list in the presentation data structure 5908 to find the OSDS with an object path the same as that from step 6610, and that OSDS is passed to the stop function as an argument). When the function call of step 6614 returns, the present function is done 6616.

Otherwise, if the action name evaluated in step 6612 is not "stop," then in step 6618 the action name is evaluated again. If the action name is "event bus 1," then in step 6620 the present function effectively "busses" the relation down one hierarchical level (an example of this was seen in FIG. 48) by issuing a function call to the "handle event" function in the relation-based communications block 5760, specifying the path for the CCO contained by the current container (produced by adding the name "CCO" to the end of the path from step 6610) and the event name "event 1." When the function call of step 6620 returns, the present function is done 6622.

Otherwise, if the action name evaluated in step 6618 is not "event bus 1," then in step 6623 the incoming action is processed as follows. To handle the "Next" action, the current container is stopped and the next container in the sequence (as determined by evaluating "Next" relations via the data manager) is started. To handle the "Previous" action, the current container is stopped and the previous container in the sequence (as determined by evaluating "Next" relations via the data manager) is started. To handle the "Navigate" action, if the current container is playing as a sub-display then navigation to the current container is initiated. To handle the "Back" action, if there has been navigation without corresponding back navigation then back navigation is initiated. To handle the "Attribute" action, various container attributes may be modified. When the incoming action has been handled, the present function is done 6624.

It should be noted that the relation-bussing functionality in the above communication response function involves a single bus that provides bussing for an event-action relation in a hierarchically downward direction. The above function could easily provide multiple busses of the same type by simply repeating the test of step 6618 for other action names ("event bus 2," "event bus 3," etc.) and passing corresponding event names to the "handle event" function in step 6620. Likewise, the communication response function for container control objects provides one or more similar busses going in the other direction (up) by replicating steps 6618 and 6620 (in this case calling the "handle event" function with the path of the containing container object as the first argument). Moreover, in the same way that this bussing for event-action relations is provided via the communication response functions of the container and CCO sub-modules, bussing for sink-source relations is provided via the communication query functions in a similar fashion (the main differences being that the communication query function looks for a source name rather than an action name, such as "sink bus 1," and calls the "read source" function rather than the "handle event" function and passes it a sink name, such as "sink 1").

At the bottom of FIG. 66 is a flow diagram of the communication query function for vector objects, as implemented within the type-specific functions block 5860 of FIG. 58. The function begins at step 6626 when it is called by the "handle event" function of the relation-based communications block 5760, with an object path and a source name passed as arguments. In step 6628, the source name from the previous step is evaluated, and if it is not equal to "out 1," then in step 6632 the function returns a null value to the caller. Otherwise, if the source name is "out 1," then in step 6630 the function returns the current value for its dynamically changing output (previously stored in the vector TSF-OSDS by the vector object processing function). Of course by replicating the evaluation of step 6628 for other source names ("out 2," "out3," etc.) a number of channels of vector object output may be supported. With regard to the communication query functions for the other type-specific sub-modules, beyond the relation bussing noted above, these functions can be configured to provide access to a variety of useful information about objects, such as display settings, various playback parameters (including flags), variables within script objects (including text strings), etc.

We now turn to a discussion of the relation-based communications block 5760 of FIG. 57. This component provides communications between object playback processes based on low-level relations read from the data manager (5030, 5130). An overview of the relation-based communications functionality of the preferred system was provided earlier in the discussion of the type-specific functions block 5860 of FIG. 58. Recall from that discussion that two forms of relation-based communications are provided: "event-action" communications and "sink-source" communications. These two forms of relation-based communications are implemented in the functions "handle event" and "read source," respectively. The relation-based communications block 5760 also provides query functions for converting from low-level relations read from the data manager into high-level relations that correspond to the programming functions of the sentence paradigm (discussed in reference to FIGS. 9A through 27D). The above functions of the relation-based communications block 5760 are now described.

Figure 67:
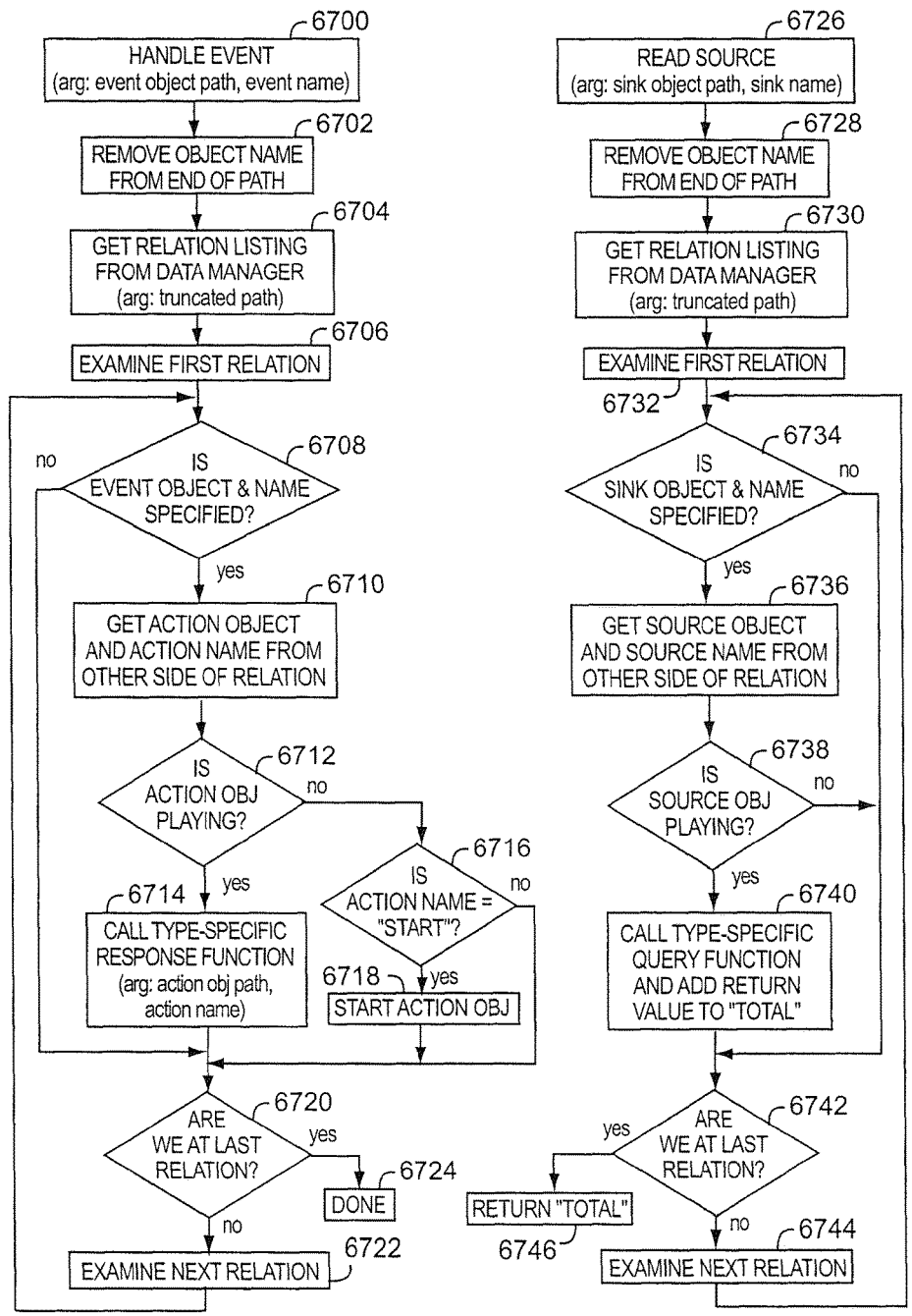

The left side of FIG. 67 shows a flow diagram of the function "handle event," as implemented within the relation-based communications block 5760 of FIG. 57. The function begins at step 6700 when it is called by the type-specific functions block 5860 of FIG. 58, or by the user input handling block 5780 of FIG. 57, with an event name and the path of an "event object" passed as arguments. In step 6702, a path string for the container containing the event object is created by removing the object name from the end of the path from step 6700. Next, in step 6704, a listing of the relations among the objects contained in the container of step 6702 is acquired from the data manager. Recall that in the preferred implementation of the system, a low-level relation relates two objects (which can be one and the same object) that are directly contained within a container, by specifying each object name of the two objects and the name and type of a relational capability for each object. Recall also that the capability types include: event, action, sink and source.

After the listing of relations is acquired in step 6704, the rest of the "handle event" function comprises a loop that processes the relation listing as follows. In step 6706, the first relation in the listing is specified as being the current relation for the present loop iteration. Next, in step 6708, each "side" of the current relation (consisting of object name, capability name and capability type) is compared with the event object and event name from step 6700 and the capability type "event." If there is no match, then the function continues at step 6720.

Otherwise, if there is a match in step 6708, then in step 6710 the "action object" and the "action name" are acquired from the other side of the relation. Next, in step 6712, a query is issued to the playback commands block 5820 of FIG. 58 to determine if the action object from the previous step is playing. If it is, then in step 6714 a function call is issued to the communication response function for the action object (in type-specific functions block 5860), with the action object and action name specified as arguments. Otherwise, if the action object is not playing, then in step 6716 the action name is compared to the text string "start," and if there is no match, then operation continues at step 6720. Otherwise, if there is a match, then in step 6718 the object start function of FIG. 59 is called to start the action object. In addition, steps 6716 and 6718 support the random start functionality of FIG. 14B as follows: if the text string matched in step 6716 is "r-start" rather than "start," then in step 6718 the action object is not started but is rather placed on a random start list, and before exiting, the function randomly selects one object from this random start list and starts it. In step 6720, when the above handling for the current relation is complete, if the current relation is the last relation in the listing from step 6704, the function is done 6724. Otherwise, in step 6722, the next relation in the listing is made current, and the loop continues at step 6708.

The right side of FIG. 67 shows a flow diagram of the function "read source," as implemented within the relation-based communications block 5760 of FIG. 57. The function begins at step 6726 when it is called by the type-specific functions block 5860 of FIG. 58, with a sink name and the path of a "sink object" passed as arguments. In step 6728, a path string for the container containing the sink object is created by removing the object name from the end of the path from step 6726. Next, in step 6730, a listing of the low-level relations among the objects contained in the container of step 6728 is acquired from the data manager. Recall again that in the preferred implementation of the system, a low-level relation relates two objects (which can be one and the same object) that are directly contained within a container, by specifying each object name of the two objects and the name and type of a relational capablity for each object. Recall also that the capability types include: event, action, sink and source.

After the listing of relations is acquired in step 6730, the rest of the "read source" function comprises a loop that processes the relation listing as follows. In step 6732, the first relation in the listing is specified as being the current relation for the present loop iteration. Next, in step 6734, each "side" of the relation (consisting of object name, capability name and capability type) is compared with the sink object and sink name from step 6726 and the capability type "sink." If there is no match, then the function continues at step 6742.

Otherwise, if there is a match in step 6734, then in step 6736 the "source object" and the "source name" are acquired from the other side of the relation from the matching object. Next, in step 6738, a query is issued to the playback commands block 5820 of FIG. 58 to determine if the source object from the previous step is playing. If it is not, then the function continues at step 6742. Otherwise, if it is playing, then in step 6740 a function call is issued to the communication query function for the source object (in type-specific functions block 5860), with the source object and source name specified as arguments; the return value from this function call is added to a "total" variable (which was initialized to zero at the beginning of the function). In step 6742, when the above handling for the current relation is complete, if the current relation is the last relation in the listing from step 6730, the function returns the value of the "total" variable to the caller 6746. Otherwise, in step 6744, the next relation in the listing is made current and the loop continues at step 6734.

As mentioned above, the relation-based communications block 5760 also provides query functions for converting from low-level relations accessed from the data manager into high-level relations corresponding to the functions of the sentence paradigm. Three such query functions are provided. The first query function provides a listing of all the high-level relations existing among objects in a given container (including an activity level for each such relation based on how recently it was last triggered). The second query function provides a listing of any high-level relations associated with a given object (also, as above, including an activity level for each such relation). The third query function provides a listing of any "partner objects" associated with a given high-level relation for a given object. These three query functions, detailed in the following paragraphs, are called from the control display manager 5060 when rendering map view and list view control displays (as seen in FIGS. 30A-B); the third one is also called from the CCO start function of FIG. 64 when performing start propagation.

Before describing the three query functions of the relation-based communications block 5760, some associated support functionality is explained. First, a subroutine is provided for determining whether or not a given low-level relation is an embodiment, either in whole or in part, of a high-level relation (and if so, which one). It does this by examining the given low-level relation (as well as, potentially, other low-level relations in the same container) to determine which high-level function created it; this is essentially the opposite of the logic that occurs when low-level relations are created via the sentence programming paradigm (which is detailed in connection with the edit manager 5640). Second, an "activity" history, consisting of a list of recently triggered high-level relations and the time that each was last triggered, is maintained by the relation-based communications block 5760 as follows. Whenever the "handle event" function of FIG. 67 performs step 6714 or 6718, the corresponding high-level relation is derived using the above support routine, and is added to or updated in the activity history (its trigger time is set to the current time). The first two of the three query functions below, in order to return the activity level for a given high-level relation, search this activity listing for that relation, and if it is there, derive the activity level based on the the amount of time passed since the relation was last triggered (starting at one hundred percent when the relation is triggered and going down to zero percent over a preferred time duration).

The first of the three query functions of the relation-based communications block 5760 of FIG. 57 provides a listing of all the high-level relations existing among the objects in a given container, and an activity level for each such relation, as follows. First, the function builds an overall list of all of the high-level relations within the specified container. To do this, it gets the listing of low-level relations from the data manager, and for each low-level relation, it uses the above support routine to determine what if any high-level relation it corresponds to. Each high-level relation derived in this way, if it is not redundant with one already on the list, is added to the list. Next, the function acquires the current activity level for each high-level relation in the list as per the above support functionality. Once all the high-level relations and their activity levels have been added to the list, the list is returned.

The second of the three query functions of the relation-based communications block 5760 of FIG. 57 provides a listing of any existing high-level relations associated with a given object and an activity level for each such relation, as follows. First, using techniques similar to those in the previous query function, the present function builds an overall list of all the high-level relations within the container that contains the specified object. Next, the function searches this overall list for any high-level relations that include the specified object (if the relation is "directional" as per the discussion of the sentence paradigm of FIGS. 9A through 27D, then the specified object must be the "acting" object in order for there to be a match). Any matching relations found in this way are added to a secondary list, along with their current activity level as per the above support functionality. Once all the relations in the overall list have been evaluated in this way, the secondary list is returned.

The third of the three query functions of the relation-based communications block 5760 of FIG. 57 provides a listing of any "partner objects" associated with a given high-level relation for a given object, as follows. First, as above, the function builds an overall list of all the high-level relations within the container that contains the object. Next, the list is searched for any high-level relations that match the specified relation and specified object, and for any such matching relations, the object which is not the matching object (i.e., the partner object) is added to a secondary list. Note that if the specified high-level relation corresponds to either the function of FIG. 17 ("objects A and B play together") or FIG. 18 ("objects A and B play separately"), then it is transitive, which requires that the process of finding matching relations be performed again for any partner objects which are found, and again for partners of those objects, etc. Finally, when the above matching process is complete, the function returns the secondary list.

We now turn to a discussion of the user input handling block 5780 of FIG. 57. The user input handling block 5780 interprets incoming user input 5782 and in response issues commands to any of the other functional blocks of playback manager 5700 (playback processing block 5720, navigation block 5740, relation-based communications block 5760). The incoming user input 5782 consists of various user actions, such as key commands, sequence commands, actions of a pointing device in the playback display, and selection of any of the following command icons: the edit mode command icon 130 of FIG. 1B; the container start toggle button 808 of FIG. 8A; the publish command icon 3100 of FIG. 31A. Moreover, as discussed earlier, when the system is in edit mode, the user input handling block 5780 receives user input 5782 and routes it 5784 out of the playback manager to the edit manager 5640 of FIG. 56 (in some cases performing initial processing on the user input before passing it along). The various handling functions of the user input handling block 5780 are now described.

To implement the handling for the three command icons mentioned above, at system initialization time the user input handling block 5780 calls the system menu services to create and place the various icons in the user interface; each icon is associated with a callback function in the user input handling block 5780. Thereafter, whenever the user selects one of these command icons, its associated callback function is called. The callback function for the edit mode command icon 130 of FIG. 1B operates as follows: it toggles edit mode by checking the current status of edit mode and setting it to the opposite. The callback function for the container start toggle button 808 of FIG. 8A operates as follows: it queries the playback processing block 5720 to get the master object path from the presentation data structure 5908 of FIG. 59, then it queries the playback processing block 5720 to see if that master object is playing; if it's playing it is stopped, and if it's not playing it is started.

The callback function for the publish icon 3100 of FIG. 31A operates as follows. First, it presents a dialog box to the user for selecting among various publishing options. Next, it exports a database containing the desired data by calling the data manager export function, passing as an argument the "master object path" from the presentation data structure 5908 which is assigned to the topmost playback display. Next, it publishes the just created database according to the selected option presented in the above dialog box: (1) by adding an executable "wrapper" to the database so that it may be "launched" within a standard operating system or other computing environment; (2) by copying the database over a network to a known server location; or (3) by logging the database with a peer-to-peer filesharing system. For a more extensive explanation of the network-related capabilities and options of the present invention, see the discussion provided earlier in connection with FIG. 49.

Figure 68:
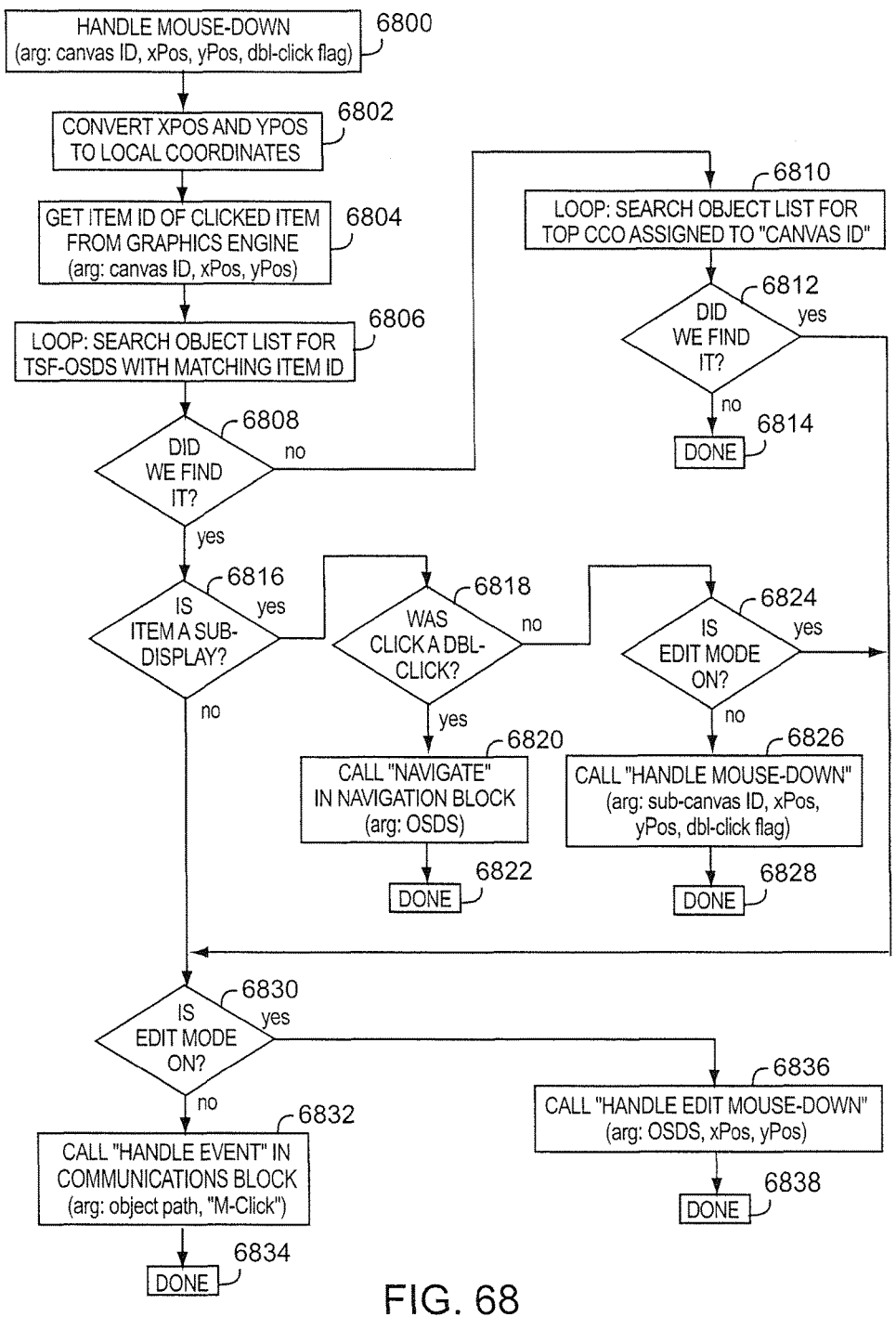

FIG. 68 shows a flow diagram of the function for handling "mouse down" input events (which are caused by user activation of the mouse button or other pointing device), as implemented within the user input handling block 5780 of FIG. 57. The function begins at step 6800 when it is called by the main loop, or by itself recursively (as discussed below), with a canvas ID, click x-position and y-position, and a double-click flag passed as arguments. In step 6802, the x and y coordinates from the previous step (which use the coordinate system of the context of the specified canvas) are converted into local coordinates for the specified canvas; this is accomplished by calling a utility function in the graphics engine which calculates the local coordinates based on the current zoom and scroll settings for the specified canvas. Next, in step 6804, a graphics engine function is called to determine if the x and y coordinates from the previous step (i.e., where the user clicked) is a location over an item on the draw list of the specified canvas ID; this graphics engine function is passed the canvas ID from step 6800 and the adjusted click position from the previous step, and returns the item ID of the top item hit (or zero if no item was hit).

Next, in step 6806, an attempt is made to find a playing object that corresponds to the item ID returned in the previous step; to do this, the object list in the presentation data structure 5908 of FIG. 59 is searched, with the goal of finding an OSDS 5910 whose type-specific portion (TSF- OSDS 6120 of FIG. 61) has an item ID equal to the item ID returned in the previous step. Next, in step 6808, the success of the previous step is evaluated, and if no such object was found, then in step 6810 it is assumed that the user clicked on the background, and an attempt is made to find a playing container control object responsible for the background of the draw list specified by the canvas ID from step 6800; to do this, the object list is again searched to find an OSDS 5910 whose object type is equal to CCO and whose canvas ID equal to the above canvas ID (if there are several CCOs sharing the specified canvas ID due to nested container playback, the one highest in the hierarchy is selected). Next, in step 6812, the success of the previous step is evaluated, and if no such object was found, the function is done 6814; otherwise, if an appropriate CCO was found, the operation of the function continues at step 6830.

If the evaluation of step 6808 was successful, meaning that an object matching the item ID from step 6804 was found, then in step 6816 an evaluation is made as to whether or not the item that the user clicked on is a sub-display being managed by a container object. If it is not, then the operation of the function continues at step 6830. Otherwise, if the item is a sub-display, then in step 6818 the double-click flag from step 6800 is evaluated to determine whether or not the mouse-down event currently being handled is the second click of a double-click (i.e., the second of two clicks in quick succession). If the double-click flag is set to true, then in step 6820 the "navigate" function in the navigation block 5740 of FIG. 57 is called to trigger user navigation into the clicked upon sub-display (as seen in FIG. 43), with the OSDS 5910 of the container object from step 6806 passed as an argument. When the function call of step 6820 returns, the present function is done 6822.

Otherwise, if the double-click flag examined in step 6818 is set to false, then in step 6824 the mode of the system is checked, and if edit mode is currently active, the function continues at step 6830. Otherwise, if edit mode is not active, then in step 6826 the present function calls itself recursively in order to pass the click "into the sub-display" for further handling; this allows users to interact with presentations that are being displayed within nested sub-displays (as seen in FIG. 40). For the recursive function call of step 6826, the canvas ID passed as an argument is the "sub-canvas ID" which was stored in the TSF-OSDS when the container start function first allocated the nested draw list associated with the sub-display item; also, before passing the x-position and y-position from step 6802 as arguments, they are adjusted so that they are relative to the upper left corner of the sub-display item. When the recursive function call of step 6826 returns, the function is done 6828.

In step 6830, the mode of the system is checked, and if edit mode is active, then in step 6836 a function call is issued to the "handle edit mouse-down" function in the edit manager 5640 of FIG. 56. This function performs edit processing as discussed later in this specification, and the arguments passed to it are the OSDS 5910 for the object found in step 6806 or 6810, and the x and y coordinates from step 6802. When the function call of step 6836 returns, the present function is done 6838. Otherwise, if edit mode is not active, then in step 6832 a function call is issued to the "handle event" function in the relation-based communications block 5760 of FIG. 57, with the text string "M-Click" and the path of the object found in step 6806 or 6810 passed as arguments. This call to the "handle event" function triggers any programmed behavior associated with the user clicking on an object (as seen in many of the functions of the sentence programming paradigm of FIGS. 9A through 27D). When the function call of step 6832 returns, the present function is done 6834.

In addition to the "handle mouse-down" function just described, the user input handling block 5780 of FIG. 57 also includes handling functions for mouse-up events (the release of the mouse button or pointing device), mouse-move events (movement of the mouse or pointing device), sequence commands (user-initiated commands to progress to the next item in a sequence, as might be used in a slide presentation), and keystroke events (pressing of keys on a keypad); these handling functions are described as follows.

The handling function for mouse-up events receives the same arguments as the above mouse-down handling function. First it converts the click position to local coordinates (as was done in the above mouse-down function), and then if edit mode is active, it calls the "handle edit mouse-up" function in the edit manager 5640 of FIG. 56, passing it the adjusted x and y coordinates as arguments.

The handling function for mouse-move events receives as arguments a canvas ID and the pointer position. First it converts the pointer position to local coordinates (as was done in the above mouse-down function), and then if edit mode is active, it calls the "handle edit mouse-move" function in the edit manager 5640 of FIG. 56, passing it the adjusted x and y coordinates as arguments. If edit mode is not active, the function checks for movement of the pointer over (or off of) graphical items, in order to generate "mouse over" and "mouse leave" events that can be used to provide the functionality seen in FIG. 16B. To do this, it determines if the pointer is over a graphical item corresponding to a playing object (in a manner similar to the above mouse-down handling function, including calling itself recursively if the pointer is over a nested sub-display). If such an object is found, and it was not found in the previous call to this function, then a function call is issued to the "handle event" function in the relation-based communications block 5760, with the path of the found object and the text string "M-Over" as arguments. If such an object is not found, and it was found in the previous call to this function, then a function call is issued to the "handle event" function with the path of the previously found object and the text string "M-Leave" as arguments.

The handling function for sequence commands reads one or more "next" relations from the data manager along with the play state of their associated objects, determines which is the earliest object in the sequence that is not playing, and starts that object.

Two handling functions are provided for keystroke events, one for handling key-down events and one for handling key-up events. Each of these functions receives an ascii key code, and if edit mode is active, calls a corresponding keystroke handling function in the edit manager 5640 of FIG. 56 (passing it the ascii key code as an argument). In addition, in the key-down handling function, if the key is the "escape" key and edit mode is not active and "back navigation" is pending, then the "navigate back" function of the navigation block 5740 of FIG. 57 is called (note that this key command is redundant with the back navigation command icon, such as icon 3850 of FIG. 38B).

We now turn to a discussion of the navigation block 5740 of FIG. 57. This navigation block provides functionality for user navigation as seen in FIGS. 38A-B, as well as in other figures where user navigation is shown in conjunction with other features (such as networking in FIGS. 39A-B, sub-displays in FIGS. 43 through 45C, etc.). To implement user navigation as seen in these figures, the navigation block 5740 provides two functions, "navigate" and "navigate back." These two functions are complementary to one another, making use of a "back navigation stack" where objects preempted by navigation are preserved until corresponding back navigation restores them, as follows.

Figure 69:
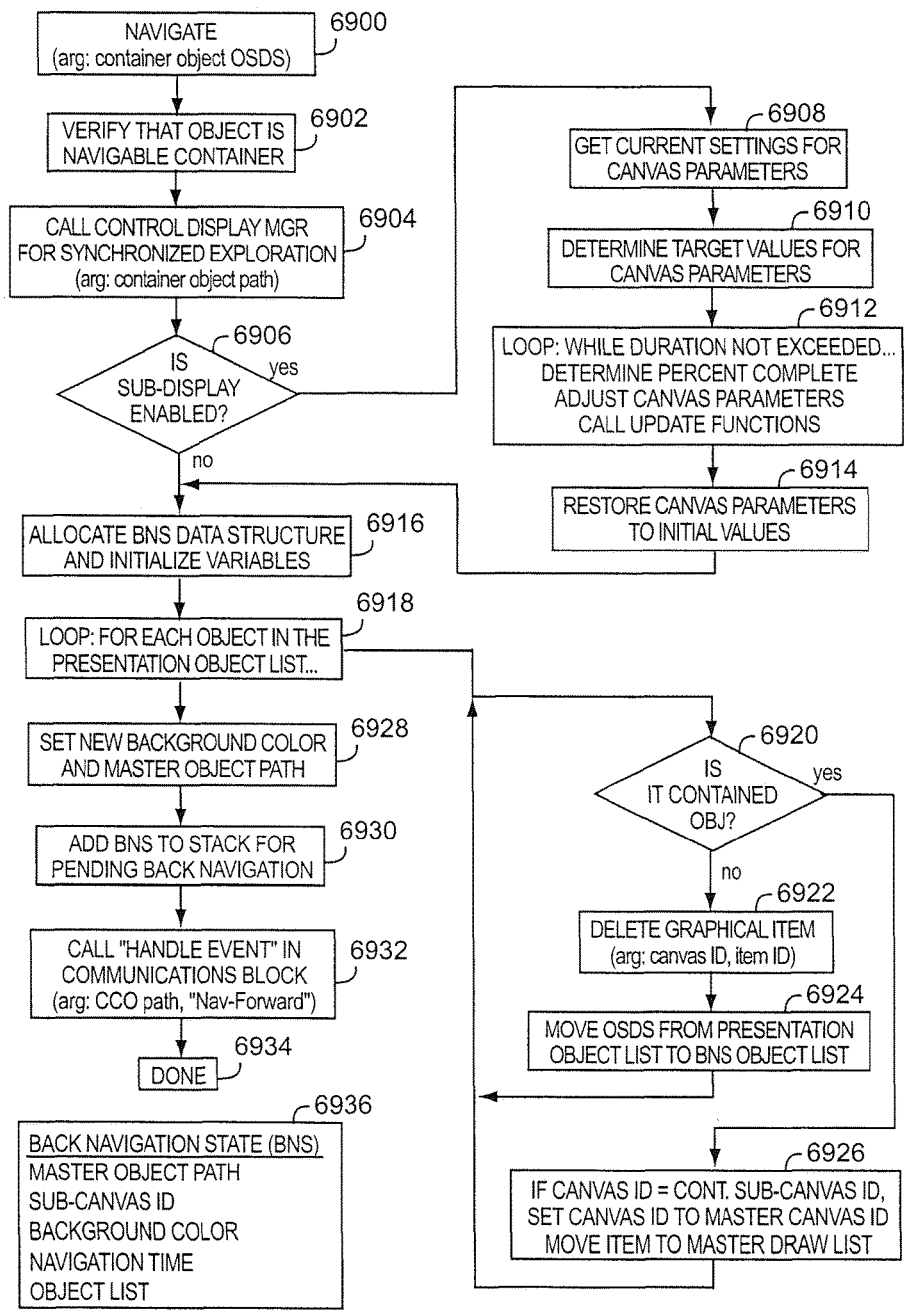

FIG. 69 shows a flow diagram of the "navigate" function, as implemented within the navigation block 5740 of FIG. 57. The function begins at step 6900 when it is called either by the container start function in the type-specific functions block 5860, or by the mouse-down function in the user input handling block 5780, with an OSDS 5910 passed as an argument. In step 6902, the function verifies that the object type in the OSDS from the previous step specifies a container object, and that the "navigable flag" in the setup data stored in the type-specific portion of the OSDS is set to true (the function returns with a failure code if either is not the case). Next, in step 6904, a function call is issued to the control display manager 5060 to initiate "synchronized exploration" (as seen in FIGS. 38A-B), with the object path from the above OSDS passed as an argument.

In step 6906, the "sub-display flag" in the setup data stored in the type-specific portion of the OSDS from step 6900 is checked to determine if sub-display functionality is enabled. If the flag is set to false, meaning that sub-display functionality is not enabled, then operation continues at step 6916. Otherwise, a "zoom-in" effect for the sub-display (such as that depicted in FIGS. 45A-C) is provided as follows. Two draw lists, referred to as "canvases" in the following discussion, are involved in this zoom effect: an "outer canvas" that corresponds to the overall playback display (specified by the master canvas ID in the presentation data structure 5908), and an "inner canvas" that corresponds to the sub-display being zoomed into (specified by the item ID in the type-specific portion of the OSDS from step 6900). In step 6908, the current parameter settings for the outer canvas (width, height, zoom, scroll) and inner canvas (its various display settings) are read from the graphics engine and stored. Next, in step 6910, the target values for those same parameters are determined based on what they need to be in order for the sub-display to exactly fill the playback display (with the outer canvas still surrounding it as before, but unseen beyond the borders of the playback display).

Next, in step 6912, a "while loop" is performed for a preferred "zoom duration," with each iteration of the loop performing the following operations. First, the percentage of completion of the zoom is determined based on the start time for the zoom, the current time and the zoom duration. Then, the above canvas parameters for both canvases are adjusted to interpolate between their initial values and their target values based on the percentage of completion of the zoom. Then, various update functions are called as needed to maintain the operation of the system (these are normally called by the system services, but this loop prevents that and must therefore make the update calls). Once the loop in step 6912 detects that the zoom duration has been exceeded, then in step 6914 the above parameters for both canvases are restored to their initial values from step 6908 (this last step is not displayed in the playback display, but is merely "cleanup" to return the canvases to their normal states in preparation for ensuing operations).

In step 6916, a "back navigation state" (BNS) data structure 6936 is allocated, and its variables are initialized as follows: the "master object path" is set to the master object path from the presentation data structure 5908; the "sub-canvas ID" is set to the sub-canvas ID in the type-specific portion of the OSDS from step 6900 (it was set by the container start function of the type-specific functions block 5860 when the sub-display item was created, or is zero if there is no sub-display); the "background color" is set to the current background color of the playback display; the "navigation time" is set to the current system time.

Next, in step 6918, a loop is performed for each OSDS 5910 in the object list of the presentation data structure 5908, as follows. In step 6920, the object path from the current OSDS is compared with the container path from the OSDS of step 6900 to see if the current object is contained (either directly or indirectly) within the container object from step 6900. If it is not contained in that container, then in step 6922, any graphical item (or sound item) currently being displayed for the current object is removed by calling the graphics engine (or sound services) and passing it the canvas ID and item ID from the current OSDS (the item ID being stored in the type-specific portion). Then, in step 6924, the current OSDS is removed from the object list of the presentation data structure 5908 and is added to the object list of the BNS data structure 6936 (maintaining the object's playback state so that when corresponding back navigation occurs the preempted presentation data is restored to its pre-navigation condition). Otherwise, if the current object is contained in the container from step 6900 (which by implication means that sub-display functionality is enabled for that container), then in step 6926, if the canvas ID in the type-specific portion of the current OSDS is the same as the sub-canvas ID in the type-specific portion of the OSDS from step 6900 (meaning that the current object is directly displayed within the sub-display of the container from step 6900), then the canvas ID of the current OSDS is set to the master canvas ID from the presentation data structure 5908, and the graphical item specified by the item ID in the type-specific portion of the current OSDS is moved accordingly (by deleting it from the sub-display draw list and adding it to the master draw list).

Once the loop of step 6918 is complete, then in step 6928 the background color for the draw list specified by master canvas ID in the presentation data structure 5908 is set to the background color specified in the setup data for the container control object directly contained in the container object of the OSDS from step 6900, and the master object path in the presentation data structure 5908 is set to the path of the container object of the OSDS from step 6900. Next, in step 6930, the BNS data structure 6936 from step 6916 is added to a "back navigation stack," where it is preserved pending corresponding back navigation (if this is the first such BNS added to the stack, then a "back navigation command icon" such as icon 3850 in FIG. 38B is added to the user interface via the system services and associated with the "navigate back" function of FIG. 70). Next, in step 6932, a function call is issued to the "handle event" function in the relation-based communications block 5760 of FIG. 57, specifying the container control object directly contained in the container object of the OSDS from step 6900 and the event name "Nav-Forward" (this supports the function of FIGS. 26A-B "container object A, upon navigation into sub-display, starts contained object B"). When the function call of step 6932 returns, the present function is done 6934.

Figure 70:
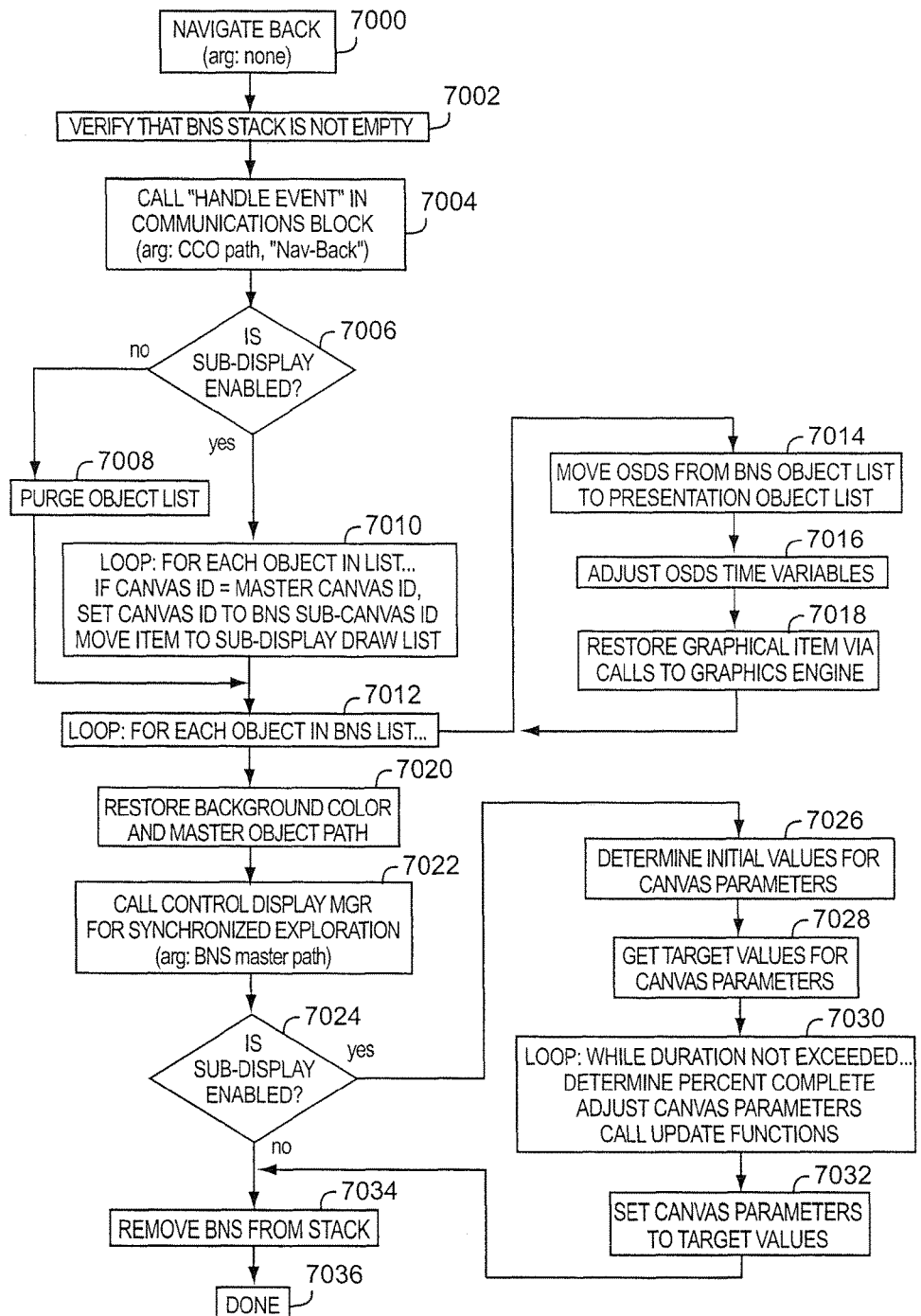

FIG. 70 shows a flow diagram of the function "navigate back," as implemented within the navigation block 5740 of FIG. 57. The function begins at step 7000 when it is called either by the system services in response to user selection of the "back navigation command icon" mentioned above, by the key-down function in the user input handling block 5780, or by the presentation update function in the update function block 5840. In step 7002 the function verifies that the back navigation stack (discussed above in connection with the "navigate" function of FIG. 69) has at least one BNS data structure 6936 on it from a previous call to the "navigate" function (the present function returns with a failure code if this is not the case). Next, in step 7004, a function call is issued to the "handle event" function in the relation-based communication block 5760 of FIG. 57, specifying the container control object directly contained by the current master object in the presentation data structure 5908, and the event name "Nay-Back" (this supports the function of FIGS. 26C-D "container object A, upon navigation back from sub-display, stops contained object B").

Next, in step 7006, the sub-canvas ID in the top BNS 6936 on the back navigation stack is checked to determine if sub-display functionality is enabled. If the sub-canvas ID is zero, meaning that sub-display functionality is not enabled, then in step 7008 the object list in the presentation data structure 5908 is purged (all OSDS data structures are removed and deallocated, and their graphical items are deleted from their respective draw lists). Otherwise, in step 7010 a loop is performed for each OSDS in the object list of the presentation data structure 5908 as follows: if the canvas ID in the type-specific portion of the current OSDS is the same as the master canvas ID in the presentation data structure 5908, then the canvas ID in the current OSDS is set to the sub-canvas ID stored in the top BNS 6936 on the back navigation stack, and the graphical item specified by the item ID in the type-specific portion of the current OSDS is moved accordingly (by deleting it from the master draw list and adding it to the sub-display draw list).

Next, in step 7012, a loop is performed for each OSDS in the object list of the top BNS 6936 on the back navigation stack, as follows. In step 7014, the current OSDS is removed from the object list of the BNS and is added to the object list of the presentation data structure 5908. Next, in step 7016, any time variables in the current OSDS (including the type-specific portion) are adjusted to account for the time spent on the back navigation stack (the "navigation time" in the BNS is subtracted from the current system time, and the result is added to the OSDS time variables). Next, in step 7018, if the current object is a type that involves a graphical item (or sound item), then the graphics engine (or sound services) is called and the item is created and initialized (by performing operations similar to those in the type-specific start function for objects of that type).

Once the loop of step 7012 is complete, then in step 7020 the background color for the draw list specified by the master canvas ID in the presentation data structure 5908 is set to the "background color" from the top BNS 6936 on the back navigation stack, and the master object path in the presentation data structure 5908 is set to the master object path from the top BNS. Next, in step 7022, a function call is issued to the control display manager 5060, with the master object path from the top BNS passed as an argument, to initiate "synchronized exploration" (this time for back navigation).

In step 7024, the sub-canvas ID in the top BNS is checked to determine if sub-display functionality is enabled. If the sub-canvas ID is zero, meaning that sub-display functionality is not enabled, then operation continues at step 7034. Otherwise, a "zoom-out" effect for the sub-display (similar to that depicted in FIGS. 45A-C, except in reverse) is provided as follows. As with the zoom effect in the above "navigate" function, two draw lists, referred to as "canvases," are involved: an "outer canvas" that corresponds to the overall playback display, and an "inner canvas" that corresponds to the sub-display being zoomed away from. In step 7026, the initial parameter settings for the outer canvas (width, height, zoom, scroll) and inner canvas (its various display settings) are determined such that the inner canvas exactly fills the playback display and the outer canvas surrounds it but is unseen beyond the borders of the playback display (as it was at the end of the zoom in the above "navigate" function). Next, in step 7028, the target parameter settings for both canvases, i.e., their normal values independent of any zooming, are stored.

Next, in step 7030, a "while loop" is performed for a pre-determined "zoom duration," with each iteration of the loop performing the following operations. First, the percentage of completion for the zoom is determined based on the start time for the zoom, the current time and the zoom duration. Then, the above canvas parameters for both canvases are adjusted to interpolate between their starting and target values based on the percentage of completion for the zoom. Then, system update functions are called as needed to maintain the operation of the system (these are normally called by the system services, but this loop prevents that and must therefore make the calls). Once the present loop determines that the zoom duration has been exceeded, then in step 7032 the above parameters for both canvases are set to their target values from step 7028, completing the zoom operation.

In step 7034, the top BNS data structure 6936 is removed from the back navigation stack and deallocated (if this removal leaves the stack empty, then the "back navigation command icon" previously created by the above "navigate" function is removed from the user interface). With that, the function is done 7036.

We now turn to a discussion of the edit manager block 5640 of FIG. 56. As discussed earlier, this block responds to user input 5642 by modifying presentation data via edit commands 5646 sent to the data manager (5030, 5130), and also provides refresh calls 5644 to the playback manager 5620 to keep playback processes and playback output up to date as objects are being edited. In addition to handling user input 5642, the edit manager 5640 is called by the system services whenever an edit command icon is selected by the user, and is also called by the control display manager 5060 whenever an object icon or display backdrop is selected in a control display by the user.

The edit manager 5640 includes various functions for providing editing functionality, as follows. First, three functions are provided for handling user input that involves a mouse or other pointing device: "handle edit mouse-down" is called when the user presses the mouse button or pointing device; "handle edit mouse-move" is called when the user moves the mouse or pointing device; and "handle edit mouse-up" is called when the user releases the mouse button or pointing device. Next, two functions are provided for handling user input that involves keys on a keypad: "handle edit key-down" and "handle edit key-up" are called when keys are pressed and released, respectively. Next, an "update edit" function provides periodic time-based processing associated with various editing operations. Finally, three functions are provided for handling user input that involves command icons: "handle edit command" is called when the user selects a command icon for an edit command; "cmd object click" is called when the user selects an object in either the playback display or control display; and "cmd background click" is called when the user selects the background of either the playback display or control display. These last three functions comprise a "state machine" that can handle user commands involving more than one user action; in an alternate implementation, this state machine can be extended by one level to handle the additional state produced by discrete selection of the triggering event and triggered action for certain functions of the sentence paradigm (as exemplified in the functions of FIGS. 9C-D and 10C-D). Each of these functions of the edit manager 5640 is now described.

Figure 71:
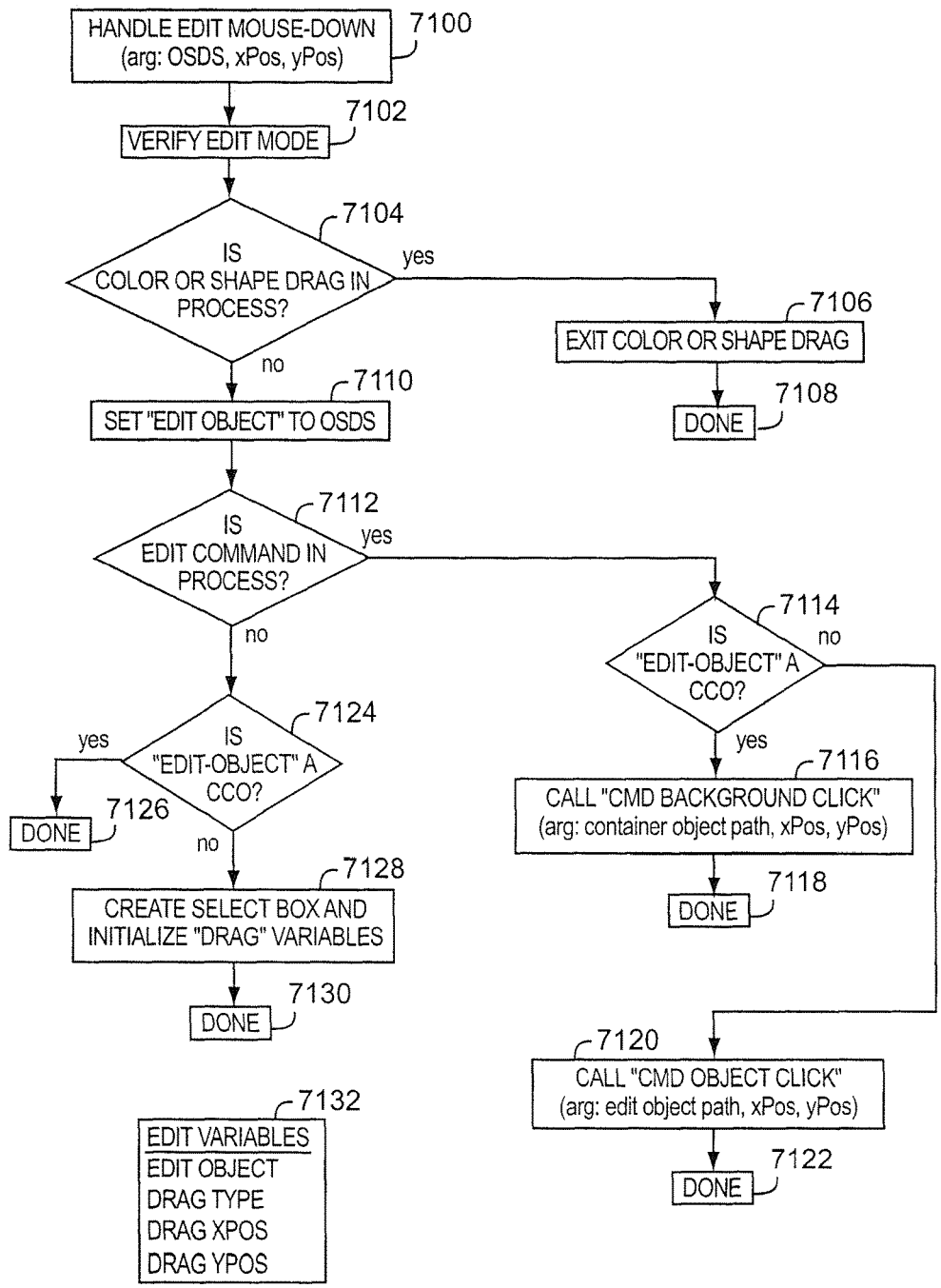
FIGS. 71-76 illustrate software flow diagrams showing procedures of the edit manager component of the presentation engine of FIG. 56, according to an embodiment of the present invention.

FIG. 71 shows a flow diagram of the function "handle edit mouse-down," as implemented within the edit manager block 5640 of FIG. 56. The function begins at step 7100 when it is called by the "handle mouse-down" function of the user input handling block 5780 of FIG. 57, with the OSDS 5910 of the clicked object and the current mouse position passed as arguments. In step 7102, the function verifies that edit mode is active, and returns with an error if it is not. Next, in step 7104, it checks to see if either color dragging or shape/softness dragging (as seen in FIGS. 4C and 6B, respectively) is in process by examining the "drag type" variable in the edit variables 7132 shown at the bottom of FIG. 71. If this "drag type" variable specifies that either color dragging or shape/softness dragging is in process, then in step 7106 the "drag type" variable is set to null and the function is done 7108. Otherwise, in step 7110, the "edit object" variable in the edit variables 7132 is set to the OSDS from step 7100.

Next, in step 7112, it is determined whether or not an edit command is currently in process. This will be the case if an edit command has been initiated by selection of an edit command icon, but a required additional selection has not yet occurred (a full explanation of this edit command functionality is provided below in the discussion of FIGS. 74 through 77). If an edit command is in process, then in step 7114 the object type of the "edit object" in the edit variables 7132 is evaluated, and if it is a container control object, then in step 7116 a function call is issued to the "cmd background click" function of FIG. 76 to conclude the edit command (the click position from step 7100 and the path of the container object that contains the "edit object" are passed as arguments). When the function call of step 7116 returns, the present function is done 7118. Otherwise, if the evaluation of step 7114 determines that the "edit object" is not a container control object, then in step 7120 a function call is issued to the "cmd object click" function of FIG. 75 to conclude the edit command (the click position from step 7100 and the path of the "edit object" are passed as arguments). When the function call of step 7120 returns, the present function is done 7122.

If it is determined in step 7112 that an edit command is not in process, then in step 7124 the object type of the "edit object" in the edit variables 7132 is evaluated, and if it is a container control object (meaning that the user clicked on the playback display background), then the function is done 7126. Otherwise, if the "edit object" is not a container control object (meaning that the user clicked on a visual item such as text, picture, video, sub-display, etc.), then in step 7128 a select box with side and corner drag handles (as seen in FIGS. 5C-D) is created around the clicked upon item, and a drag operation is started by initializing the three drag-related variables in the edit variables 7132, as follows. The "drag xPos" and "drag yPos" variables (which maintain the current x and y position of the pointing device) are set to the "xPos" and "yPos" from step 7100 (the click location). The "drag type" is set according to where the click is located relative to the graphical boundaries of the item being clicked on. If the click corresponds to one of the four side drag handles (as seen in FIG. 5C), then the "drag type" variable is set to one of four "stretch" drag types depending on which side drag handle was clicked. If the click corresponds to one of the four corner drag handles (as seen in FIG. 5D), then the "drag type" variable is set to one of four "crop" drag types depending on which corner drag handle was clicked. If the click corresponds to neither a side nor corner drag handle, then the "drag type" variable is set to "move" (as seen in FIG. 4A). With that, the function is done 7130.

Figure 72:
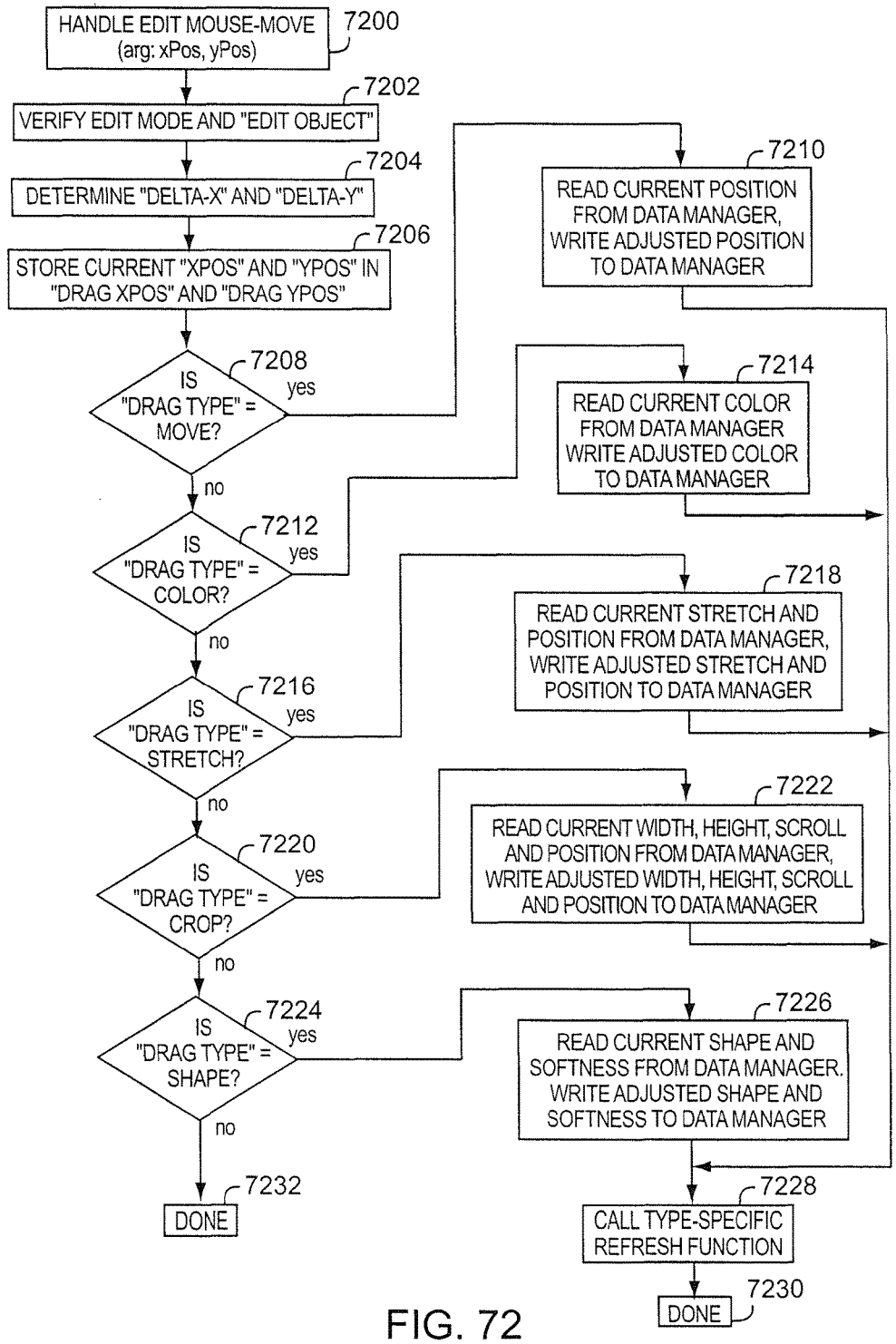

FIG. 72 shows a flow diagram of the function "handle edit mouse-move," as implemented within the edit manager block 5640 of FIG. 56. The function begins at step 7200 when it is called by the "handle mouse-move" function of the user input handling block 5780 of FIG. 57, with the current mouse position passed as an argument. In step 7202, the function verifies that edit mode is active and that the "edit object" in the edit variables 7132 of FIG. 71 is properly set (it returns with an error if either condition is not met). Next, in step 7204, the difference between the current mouse position, specified by the "xPos" and "yPos" arguments from step 7200, and the previous mouse position, specified by the "drag xPos" and "drag yPos" variables in the edit variables 7132, is calculated and stored in two local variables, "delta-x" and "delta-y," representing the change in the x and y coordinates, respectively. Next, in step 7206, the "xPos" and "yPos" arguments from step 7200 are written into the "drag xPos" and "drag yPos" variables in the edit variables 7132 (so as to be the "previous" position next time this function is called). In the remainder of the function, the "drag type" variable in the edit variables 7132 is evaluated and the appropriate steps are taken depending on what type of drag is in progress, as follows.

In step 7208, if the "drag type" is set to "move" (as seen in FIG. 4A), then in step 7210 the current display settings for the x and y position of the "edit object" are read from the data manager, new settings are calculated based on the "delta-x" and "delta-y" variables from step 7204, and the new settings are written to the data manager.

Otherwise, in step 7212, if the "drag type" is set to "color drag" (as seen in FIG. 4C), then in step 7214 the current display setting for the color of the "edit object" is read from the data manager and a new setting is determined based on the "delta-x" and "delta-y" variables from step 7204, as follows. The color is stored as RGB values (red, green, blue). Using a standard conversion function, the color is converted to HSL values (hue, saturation, luminosity). The "delta-x" is used to determine a new hue value, with a "wraparound" when the maximum or minimum hue value is exceeded. The "delta-y" is used to determine a new luminosity (brightness) value. Once the new values have been determined, the HSL is converted back to RGB using a standard conversion function, and the new color setting is written to the data manager.

Otherwise, in step 7216, if the "drag type" is set to one of the four "stretch" drag types (as seen in FIG. 5C), then in step 7218 the current display settings for the x and y stretch and x and y position of the "edit object" are read from the data manager, and new settings are determined based on the "delta-x" and "delta-y" variables from step 7204. The determination of the new settings takes into account which side was selected and any resulting interaction between the stretch of the item and the position of the item (for example, when stretching the left side to the left to increase the "x-stretch" of the item, the position of the item must be moved to the left so that the right side doesn't move). Once the new settings have been determined, they are written to the data manager.

Otherwise, in step 7220, if the "drag type" is set to one of the four "crop" drag types (as seen in FIG. 5D), then in step 7222 the current display settings for the width, height, x and y scroll and x and y position of the "edit object" are read from the data manager, and new settings are determined based on the "delta-x" and "delta-y" variables from step 7204. This determination takes into account which corner was selected and any resulting interaction between the various display settings just mentioned (for example, when cropping the upper left corner downward to make the height smaller, the position of the item must be moved downward so that the bottom doesn't move, and the vertical scroll must be adjusted to keep the content from shifting downward). Once the new settings have been determined, they are written to the data manager.

Otherwise, in step 7224, if the "drag type" is set to "shape/softness drag" (as seen in FIG. 6B), then in step 7226 the current display settings for the "shape" and "softness" of the "edit object" are read from the data manager and new settings are determined based on the "delta-x" and "delta-y" variables from step 7204, as follows. The "delta-x" is used to determine a new "shape" value, and the "delta-y" is used to determine a new "softness" value. Once the new settings have been determined, they are written to the data manager.

If any of the above tests for "drag type" is successful and the relevant display settings are adjusted (in any of steps 7210, 7214, 7218, 7222, 7226), then operation of the function continues at step 7228 in which the type-specific refresh function in the type-specific functions block 5860 is called for the "edit object" to update its playback processing and graphical display. When the function call of step 7228 returns, the present function is done 7230. Otherwise, if none of the above tests for "drag type" is successful, then the function is done 7232.

The "handle edit mouse-up" function of the edit manager block 5640 is called by the "handle mouse-up" function of the user input handling block 5780 of FIG. 57 when the user releases the mouse button or pointing device while edit mode is active. In this function, if the "drag type" is currently "move," "stretch" or "crop," then the "drag type" is set to null, which causes drag operations of those types to end upon release of the mouse button.

The "handle edit key-down" and "handle edit key-up" functions of the edit manager block 5640 are called by the corresponding key handling functions of the user input handling block 5780 of FIG. 57 when the user presses or releases a keypad key while edit mode is active. In the present embodiment, four keys are used to control edit operations: the up and down arrow keys, and the left and right arrow keys. The status of these keys is maintained in two variables, "up-down status" and "left-right status," by the above key handling functions as follows. Each of the above key handling functions receives an ascii key code as an argument. In the "handle edit key-down" function, if the key code specifies "up arrow" then "up-down status" is set to 1, and if the key code specifies "down arrow" then "up-down status" is set to −1; likewise, if the key code specifies "right arrow" then "left-right status" is set to 1, and if the key code specifies "left arrow" then "left-right status" is set to −1. In the "handle edit key-up" function, if the key code specifies "up arrow" or "down arrow" then "up-down status" is set to 0, and if the key code specifies "right arrow" or "left arrow" then "left-right status" is set to 0. As a result of these operations, the "up-down status" and "left-right status" variables reflect the current status of the four arrow keys, expressed as a positive or negative polarity (or zero) for the vertical and horizontal axes, respectively. These variables are used in the "update edit" function as follows.

Figure 73:
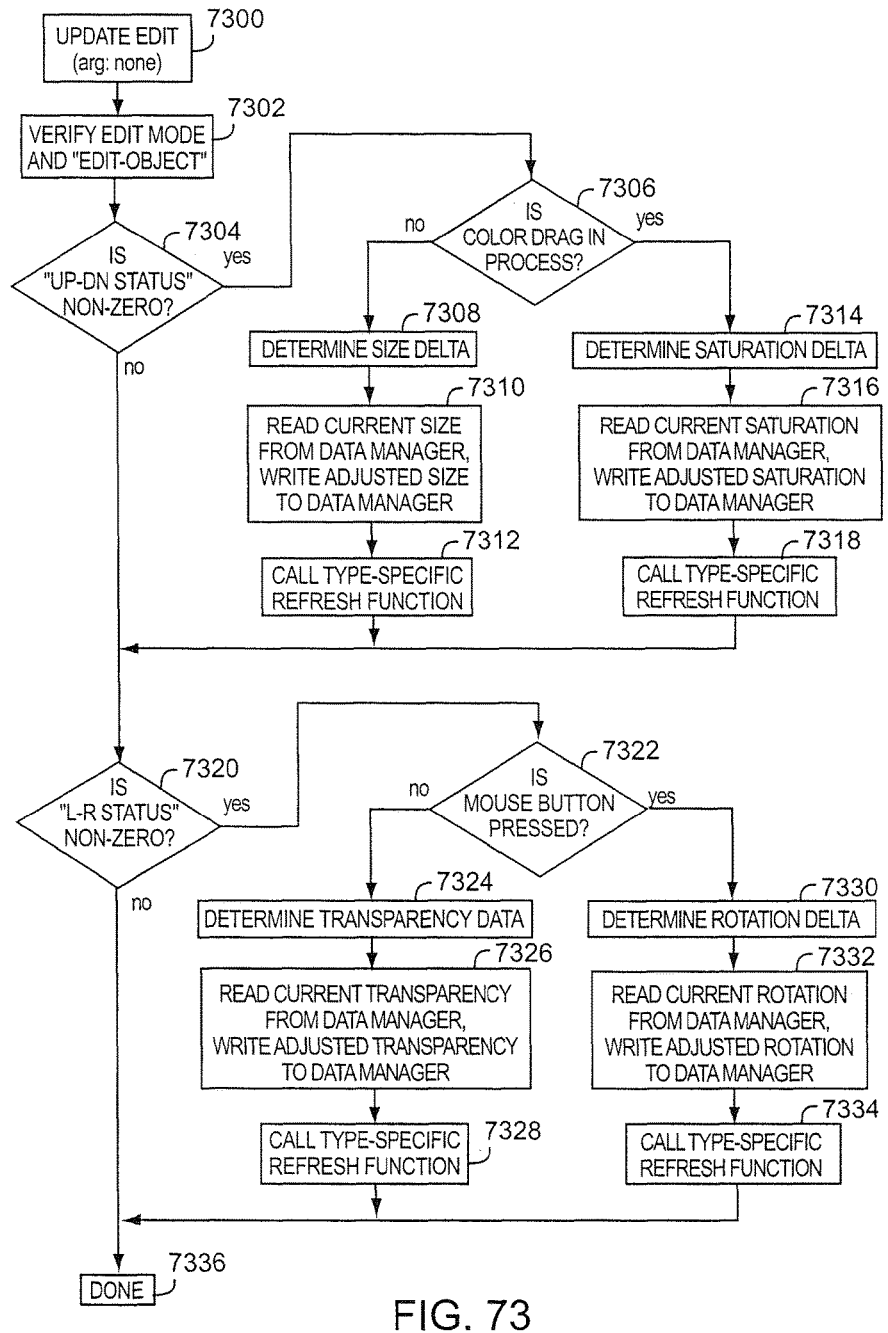

FIG. 73 shows a flow diagram of the function "update edit," as implemented within the edit manager block 5640 of FIG. 56. The function begins at step 7300 when it is called by the "update presentation" function of FIG. 60. In step 7302, it verifies that edit mode is active and that the "edit object" in the edit variables 7132 of FIG. 71 is properly set (it returns with an error if either condition is not met). Next, in step 7304, the current value of the "up-down status" variable discussed above is evaluated, and if it is non-zero, then in step 7306 the "drag type" variable in the edit variables 7132 is examined to determine if color dragging is in process. If color dragging is not in process, then the pressing of the up or down key represented in the "up-down status" variable causes an adjustment to the size of the "edit object," as seen in FIG. 4B. To accomplish this, in step 7308 the size delta is determined based on the polarity of the "up-down status" variable and the amount of time passed since the last call to the present update function. Next, in step 7310, the current display setting for the size of the "edit object" is read from the data manager, and the adjusted size is written back to the data manager. Next, in step 7312, the type-specific refresh function in the type-specific functions block 5860 is called for the "edit object" to update its playback processing and graphical display, after which operation continues at step 7320.

Otherwise, if the evaluation of step 7306 determines that color dragging is in progress, then the pressing of the up or down key represented in the "up-down status" variable causes an adjustment to the color saturation of the "edit object," as seen in FIG. 4C. To accomplish this, in step 7314 the saturation delta is determined based on the polarity of the "up-down status" variable and the amount of time passed since the last call to the present update function. Next, in step 7316, the display setting for the color of the "edit object" is read from the data manager, and as in the "handle edit mouse-move" function of FIG. 72, a standard RGB to HSL conversion is performed to isolate the saturation setting. The saturation is adjusted based on the saturation delta from the previous step, and the color parameters are then converted back to RGB and written back to the data manager. Next, in step 7318, the type-specific refresh function in the type-specific functions block 5860 is called for the "edit object" to update its playback processing and graphical display, after which operation continues at step 7320.

In step 7320, the current value of the "left-right status" variable discussed above is evaluated, and if it is non-zero, then in step 7322 it is determined whether or not the mouse button is being pressed (to do this, the "drag type" variable in the edit variables 7132 is examined, and if the drag type is "move," "stretch" or "crop," the mouse button is being pressed). If the mouse button is not being pressed, then the pressing of the left or right key represented in the "left-right status" variable causes an adjustment to the transparency of the "edit object," as seen in FIG. 5A. To accomplish this, in step 7324 the transparency delta is determined based on the polarity of the "left-right status" variable and the amount of time passed since the last call to the present update function. Next, in step 7326, the display setting for the transparency of the "edit object" is read from the data manager, and the adjusted transparency is written back to the data manager. Next, in step 7328, the type-specific refresh function in the type-specific functions block 5860 is called for the "edit object" to update its playback processing and graphical display, after which the function is done 7336.

Otherwise, if the evaluation of step 7322 determines that the mouse button is being pressed, then the pressing of the left or right key represented in the "left-right status" variable causes an adjustment to the rotation of the "edit object," as seen in FIG. 5B. To accomplish this, in step 7330 the rotation delta is determined based on the polarity of the "left-right status" variable and the amount of time passed since the last call to the present update function. Next, in step 7332, the display setting for the rotation of the "edit object" is read from the data manager, and the adjusted rotation is written back to the data manager. Next, in step 7334, the type-specific refresh function in the type-specific functions block 5860 is called for the "edit object" to update its playback processing and graphical display, after which the function is done 7336.

Figure 74:
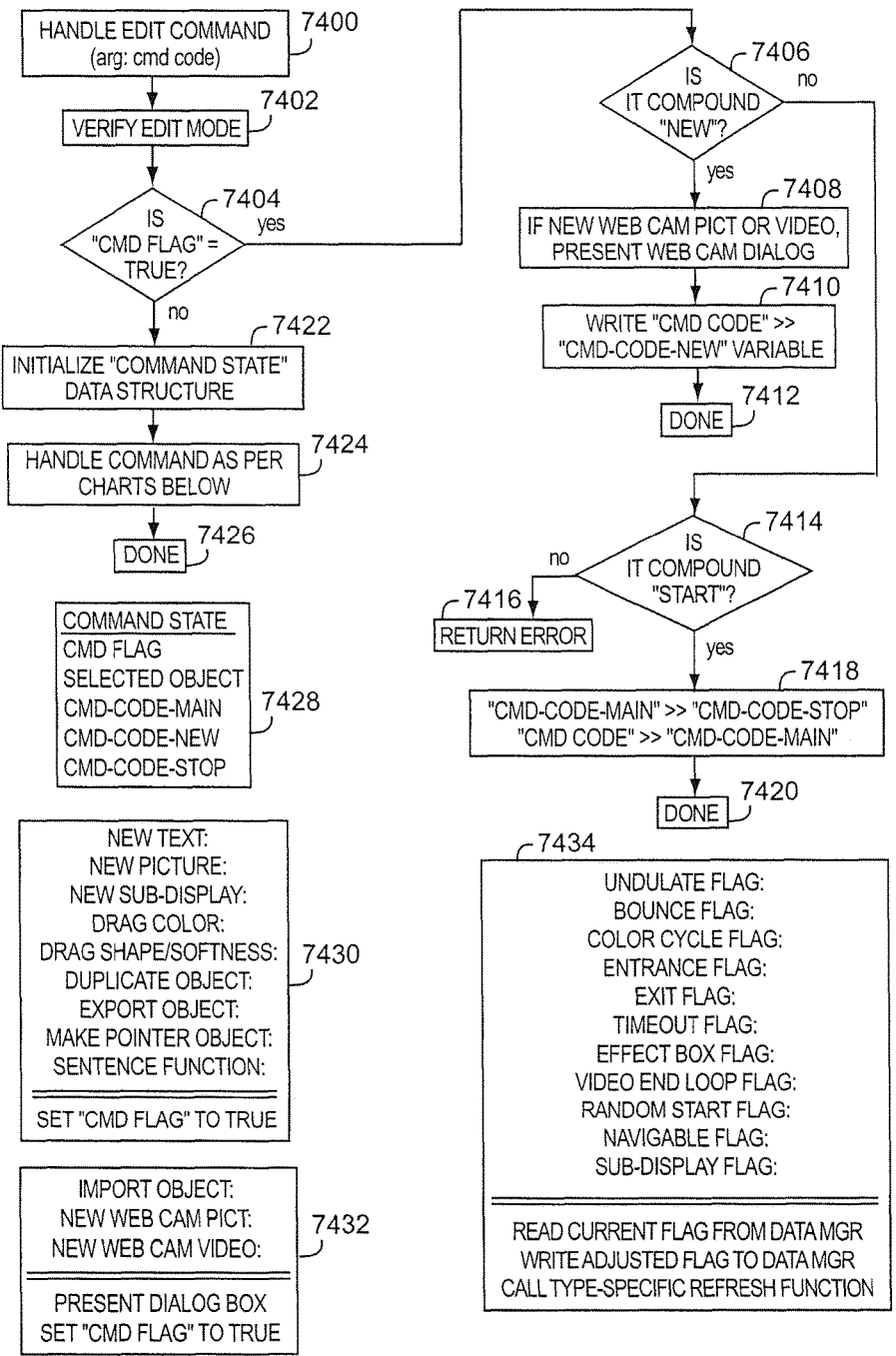

FIG. 74 shows a flow diagram of the function "handle edit command," as implemented within the edit manager block 5640 of FIG. 56. The function begins at step 7400 when it is called by the system services in response to user selection of an edit command icon, with a "cmd code" that identifies the selected icon passed as an argument. In step 7402, it verifies that edit mode is active and returns with an error code if it is not. Next, in step 7404, the "cmd flag" in the command state data structure 7428 of FIG. 74 is evaluated, and if it is set to true, then a previous command is currently in process, and operation continues at step 7406 (this case involves multiple commands being combined together, and will be explained presently).

Otherwise, if the "cmd flag" is false, then there is no previous command in process and the present command is occurring with a "clean slate," in which case the command state data structure 7428 is initialized in step 7422 as follows. The "cmd flag" is not changed in this step, since it may need to stay false depending on which command is being handled. As for the "selected object," if the most recently used display window is the playback display, then the "selected object" is set to the "edit object" in the edit variables 7132 of FIG. 71; alternatively, if a control display is the most recently used display, the control display manager 5060 is queried for a selected object, and the result of this query is written into the "selected object" variable. As for the rest of the command state data structure 7428, in all cases but one, "cmd-code-main" is set to the "cmd code" from step 7400 and "cmd-code-new" and "cmd-code-stop" are set to null. The one exception is when the "cmd code" from step 7400 signifies the "repeat" icon 2416 seen in FIG. 24A; in this case, the three "cmd-code" variables in the command state data structure 7428 are left unchanged so as to repeat the previous edit command (alternatively or additionally, equivalent functionality may be provided in the "handle edit key-down" function when the user presses the "ctrl key," in which case that function sets the "selected object" as discussed above and sets the "cmd flag" to true).

Next, in step 7424, one or more operations are performed which depend on the value of the "cmd-code-main" variable in the command state data structure 7428. These operations are summarized below in the charts 7430, 7432 and 7434. After performing the operations specified in these charts, the function is done 7426.

Chart 7430 indicates the handling when "cmd-code-main" signifies any one of the following: the new text command of FIG. 2A, the new picture command of FIG. 2B, the new sub-display command of FIG. 3C, the drag color command of FIG. 4C, the drag shape/softness command of FIG. 6B, the duplicate command of FIG. 2D, the export command of FIG. 37A, the make pointer object command of FIG. 34A, or one of the "sentence paradigm" commands of FIGS. 9A through 27D. For each of these commands of chart 7430, the "cmd flag" in the command state data structure 7428 is set to true.

Chart 7432 indicates the handling when "cmd-code-main" signifies any one of the following: the import command of FIG. 2C, the new web cam picture command of FIG. 3A, or the new web cam video command of FIG. 3B. For each of these commands of chart 7432, a dialog box is presented to the user to acquire the necessary data (which is temporarily stored for later use by the "cmd background click" function), and the "cmd flag" in the command state data structure 7428 is set to true.

Chart 7434 indicates the handling when "cmd-code-main" signifies any one of various commands used to toggle the settings of flags, including: the undulate flag of FIG. 7A, the bounce flag of FIG. 7B, the color cycle flag of FIG. 7C, the entrance flag of FIG. 7D, the exit flag of FIG. 7E, the timeout flag of FIG. 7F, the effect box flag of FIG. 7G, the video end loop flag of FIG. 7H, the random start flag of FIG. 8B, the navigable flag of FIG. 38A, and the sub-display flag of FIG. 40. For each of these commands of chart 7434, the current value of the relevant flag for the "selected object" specified in the command state data structure 7428 is read from the data manager (the flags are part of the object's setup data), the opposite value is written back to the data manager, and the type-specific refresh function for the "selected object" is called to update its playback processing and graphical display. Note that since these commands are fully executed within the present function, the "cmd flag" in the command state data structure 7428 is not changed and remains false. Also note that in the case of the color cycling flag and the random start flag being changed for a container object, it is actually the container control object for the container in question which stores the flag; it is therefore the setup data of the container control object which is accessed as above.

Returning now to step 7404, it can be understood that in many cases after the present "handle edit command" function is called, an additional user selection (resulting in a call to "cmd object click" or "cmd background click") is required to complete the command. When this is the case, the pending status of the command is represented by the "cmd flag" in the command state data structure 7428 being set to true. If this is the condition when the "handle edit command" function is called, as determined in step 7404, then the new command does not have a "clean slate" to work from, but must rather be combined with the pending command to form a "compound sentence" as follows.

Compound sentence programming was discussed in connection with the sentence paradigm of FIGS. 9A through 27D. Recall from that discussion that the combining of functions can be accomplished using three methods. The first method is to join a "stop action" with a "start action" whereby the "subject of the start action" does double duty as the "object of the stop action." The second method is to join a "start or associate action" with an "object creation action" whereby the "object of the start or associate action" is created as a result of the sentence programming process. The third method, a blend of the first two, is to join a "stop action," a "start action" and an "object creation action" whereby the "subject of the start action" does double duty as the "object of the stop action" and the "object of the start action" is created as a result of the sentence programming process. The presently preferred implementation for each of these methods is provided in part in the present function as follows.

In step 7406, the "cmd code" from step 7400 and the pending "cmd-code-main" in the command state data structure are evaluated to see if they meet the requirements of the second method cited above: the joining of a "start or associate action" with an "object creation action" (the incoming "cmd code" being the object creation action and the pending "cmd-code-main" being the start or associate action). If the requirements are met, then in step 7408, if the object creation action is a new web cam picture or video, a dialog box is presented to the user to acquire the necessary data (which is temporarily stored for later use by the "cmd background click" function). Next, in step 7410, the object creation action in the "cmd code" from step 7400 is written into the "cmd-code-to new" variable in the command state data structure 7428 (making it part of the pending command). With that, the function is done 7412.

Otherwise, if in step 7406 the requirements of the second method cited above are not met, then in step 7414 the "cmd code" from step 7400 and the pending "cmd-code-main" in the command state data structure are evaluated to see if they meet the requirements of the first method cited above: the joining of a "stop action" with a "start action" (the incoming "cmd code" being the start action and the pending "cmd-code-main" being the stop action). If the requirements are not met, then the function returns with an error code 7416. Otherwise, if the requirements are met, then in step 7418 the pending stop action in "cmd-code-main" is written into the "cmd-code-stop" variable in the command state data structure 7428, and the start action in the "cmd code" from step 7400 is written into the "cmd-code-main" variable (replacing the previous stop action). With that, the function is done 7420. Note that this leaves the command state data structure in a condition where a further call to "handle edit command" can be made for an object creation action, resulting in implementation of the third method cited above.

Figure 75:
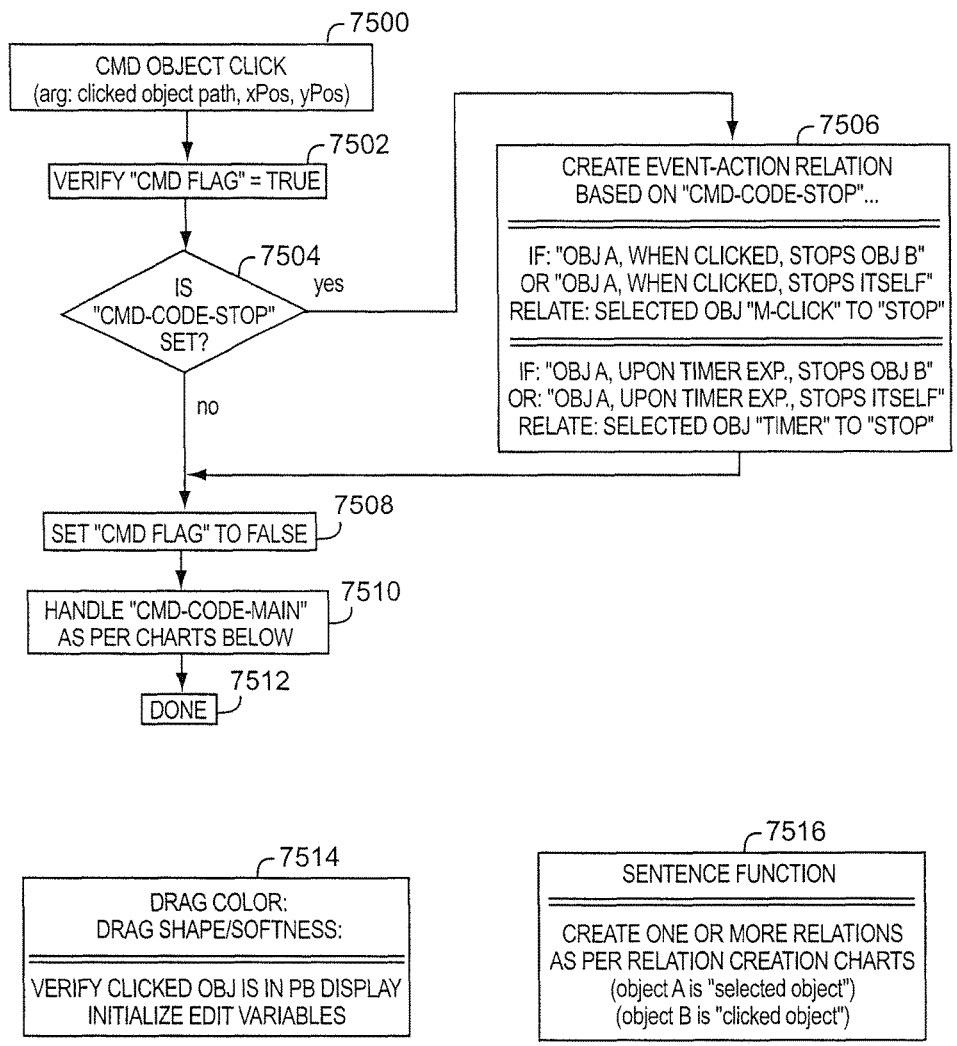

FIG. 75 shows a flow diagram of the function "cmd object click," as implemented within the edit manager block 5640 of FIG. 56. The function begins at step 7500 when it is called either by the "handle edit mouse-down" function of the edit manager 5640, or by the control display manager 5060 when the user clicks on an object icon, with the path of the clicked object and the current mouse position passed as arguments. In step 7502, it verifies that the "cmd flag" in the command state data structure 7428 of FIG. 74 is set to true, and returns with an error code if it is not. Next, in step 7504, it checks the "cmd-code-stop" variable in the command state data structure to see if that variable is set to valid code. If "cmd-code-stop" is not set to a valid code, the operation of the function continues at step 7508.

Otherwise, if "cmd-code-stop" is set to a valid code, it signifies that a stop action has been joined with a start action according to one of the compound sentence programming methods discussed above, and in step 7506 the data manager is called to create the appropriate low-level relation as follows. If "cmd-code-stop" signifies either the function of FIG. 11 ("object A, when clicked, stops object B") or the function of FIG. 12 ("object A, when clicked, stops itself"), then an event-action relation is created between the "M-Click" event and the "Stop" action of the object specified in the "selected object" variable of the command state data structure 7428. Otherwise, if "cmd-code-stop" signifies either of the "timer expiration siblings" of the above two functions ("object A, upon timer expiration, stops object B" or "object A, upon timer expiration, stops itself"), then a relation is created between the "Timer" event and the "Stop" action of the object specified in the "selected object" variable of the command state data structure 7428. In either case, the operation of the function then continues at step 7508.

In step 7508, the "cmd flag" in the command state data structure 7428 is set to false, meaning that after the present function returns there will no longer be a command pending. Next, in step 7510, one or more operations are performed which depend on the specific command pending in the "cmd-code-main" variable of the command state data structure 7428. These operations are summarized below in charts 7514 and 7516. After performing the operations specified in these charts, the function is done 7512.

Chart 7514 indicates the handling when "cmd-code-main" is either the drag color command of FIG. 4C or the drag shape/softness command of FIG. 6B. For each of these commands, the "cmd object click" function performs the following operations. First, it verifies that the "clicked object" from step 7500 was clicked in the playback display (color dragging or shape/softness dragging does not apply to object icons clicked in the control display); if this verification fails, the function returns with an error code. Assuming the verification succeeds, then the edit variables 7132 of FIG. 71 are initialized as follows: the "edit object" is set to the "clicked object" from step 7500, the "drag type" is set to color or shape/softness drag, and the "drag xPos" and "drag yPos" are set to the "xPos" and "yPos" from step 7500.

Chart 7516 indicates the handling when "cmd-code-main" is one of the "sentence paradigm" commands of FIGS. 9A through 27D. For each of these commands, the "cmd object click" function calls the data manager to create one or more low-level relations as per the charts shown in FIGS. 77A-B. When creating the relations shown in these charts, "object A" is the "selected object" in the command state data structure 7428, and "object B" is the "clicked object" from step 7500.

Figure 76:
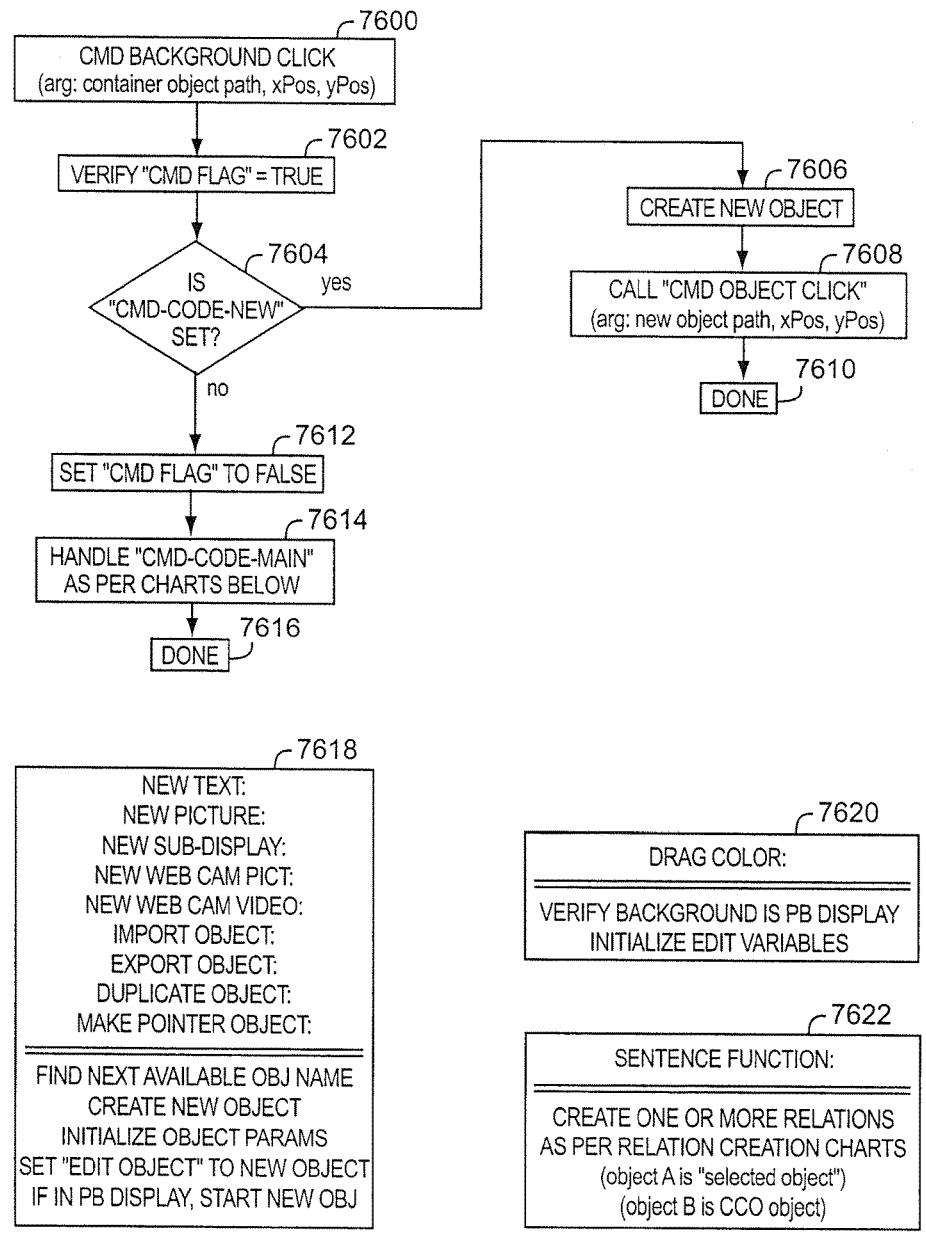

FIG. 76 shows a flow diagram of the function "cmd background click," as implemented within the edit manager block 5640 of FIG. 56. The function begins at step 7600 when it is called either by the "handle edit mouse-down" function of the edit manager 5640, or by the control display manager 5060 when the user clicks on the background of a control display, with the path of a container object and the current mouse position passed as arguments. In step 7602, it verifies that the "cmd flag" in the command state data structure 7428 of FIG. 74 is set to true, and returns with an error code if it is not. Next, in step 7604, it examines the "cmd-code-new" variable in the command state data structure 7428 to see if that variable is set to a valid code. If "cmd-code-new" is not set to a valid code, the operation of the function continues at step 7612.

Otherwise, if "cmd-code-new" is set to a valid code, it signifies that a start or associate action has been joined with an object creation action according to one of the compound sentence programming methods discussed above. If this is the case, then in step 7606 the present function creates the new object using operations similar to those described below in reference to chart 7618 (which describes the handling when "cmd-code-main" is an object creation action). Next, in step 7608, a function call is issued to the "cmd object click" function of FIG. 75 with the path of the newly created object and the "xPos" and "yPos" from step 7600 passed as arguments. This call implements the "compound sentence" functionality discussed above, and when it returns, the function is done 7610.

Otherwise, if "cmd-code-new" is not a valid code, then in step 7612 the "cmd flag" in the command state data structure 7428 is set to false, meaning that after the present function returns there will no longer be a command pending. Next, in step 7614, one or more operations are performed which depend on the specific command pending in the "cmd-code-main" variable in the command state data structure 7428. These operations are summarized below in the charts 7618, 7620 and 7622. After performing the operations specified in these charts, the function is done 7616.

Chart 7618 indicates the handling when "cmd-code-main" signifies any of the following: the new text command of FIG. 2A, the new picture command of FIG. 2B, the new sub-display command of FIG. 3C, the new web cam picture command of FIG. 3A, the new web cam video command of FIG. 3B, the import command of FIG. 2C or 3D, the export command of FIG. 37A, the duplicate command of FIG. 2D, or the make pointer object command of FIG. 34A. For each of these commands, the "cmd background click" function performs its operations as follows.

First, the next available object name is determined by appending "−1", "−2" etc. to a default name so that the name of the new object will not conflict with an existing object. Then, the new object is created in the container from step 7600 by calling the appropriate data manager function as follows. For the duplicate, export and make pointer object commands, corresponding data manager functions ("duplicate object," "export object" and "make pointer object," respectively) are called and are passed as arguments the path of the "selected object" in the command state data structure 7428 and the intended path for the new object (which is created by appending the new object name to the container path from step 7600). For the import command, the "duplicate object" command is called with the same arguments as above. In the case of the other commands, the data manager function "new object" is called and is passed as arguments the type and intended path for the new object; in the case of commands involving a dialog box (new web cam pict, new web cam video and import), the previously stored data from the "handle edit command" dialog box is also passed as an argument. Each of the above data manager functions is detailed later in this specification in the discussion of the data manager (5030, 5130).

Once the new object has been created, then various object parameters are set to initial values; this includes using the "xPos" and "yPos" from step 7600 for either the display position of the object content (if the click was in the playback display) or for the icon position of the object (if the click was in a control display), and in the case of creating or importing a sub-display (as seen in FIGS. 3C and 3D) setting the sub-display flag for the newly created container object to true. Then, if the click was in the playback display, the newly created object is started so that its content appears in the playback display. Finally, the "edit object" in the edit variables 7132 of FIG. 71 is set to the newly created object, and in the case of the new picture command of FIG. 2B the drag variables are set to initiate corner dragging as shown in that figure.

Chart 7620 indicates the handling when "cmd-code-main" signifies the drag color command of FIG. 4C. For this command, the "cmd background click" function performs the following operations. First, it is verified that the user clicked on the background of the playback display (color dragging does not apply to the background of the control display); if this verification fails, the function returns with an error code. Assuming the verification succeeds, then the edit variables 7132 of FIG. 71 are initialized as follows: the "edit object" is set to the CCO contained by the container object from step 7600; the "drag type" is set to color drag; and the "drag xPos" and "drag yPos" are set to the "xPos" and "yPos" from step 7600.

Chart 7622 indicates the handling when "cmd-code-main" signifies one of the "sentence paradigm" commands of FIGS. 9A through 27D. For each of these commands, the "cmd background click" function calls the data manager to create one or more low-level relations as per the charts shown in FIGS. 77A-B. When creating the relations shown in these charts, "object A" is the "selected object" in command state data structure 7428, and "object B" is the CCO contained by the container object from step 7600.

Figure 77A:
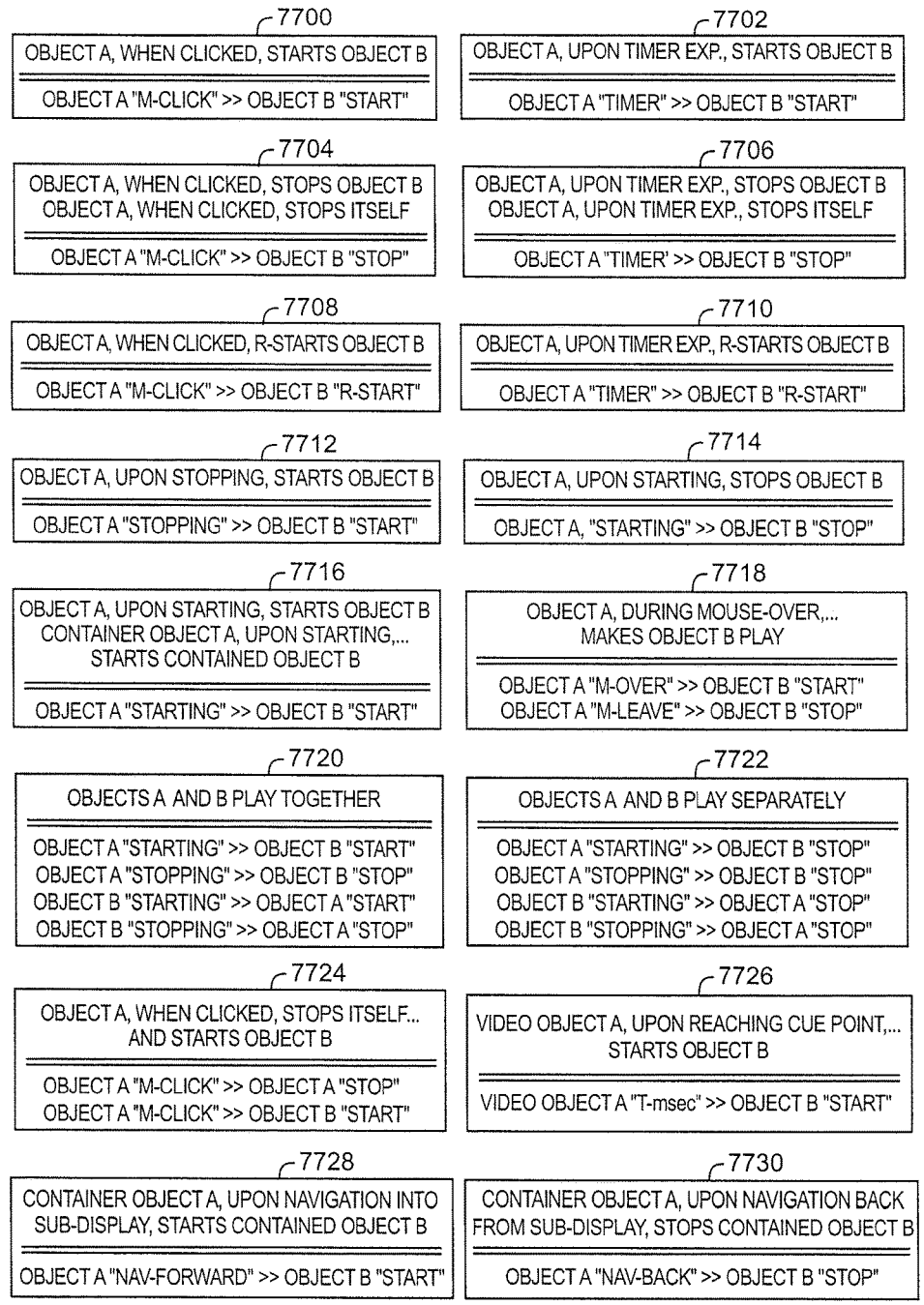
FIGS. 77A-B illustrates conversion charts showing command handling procedures of the edit manager component of the presentation engine of FIG. 56, according to an embodiment of the present invention.
Figure 77B:
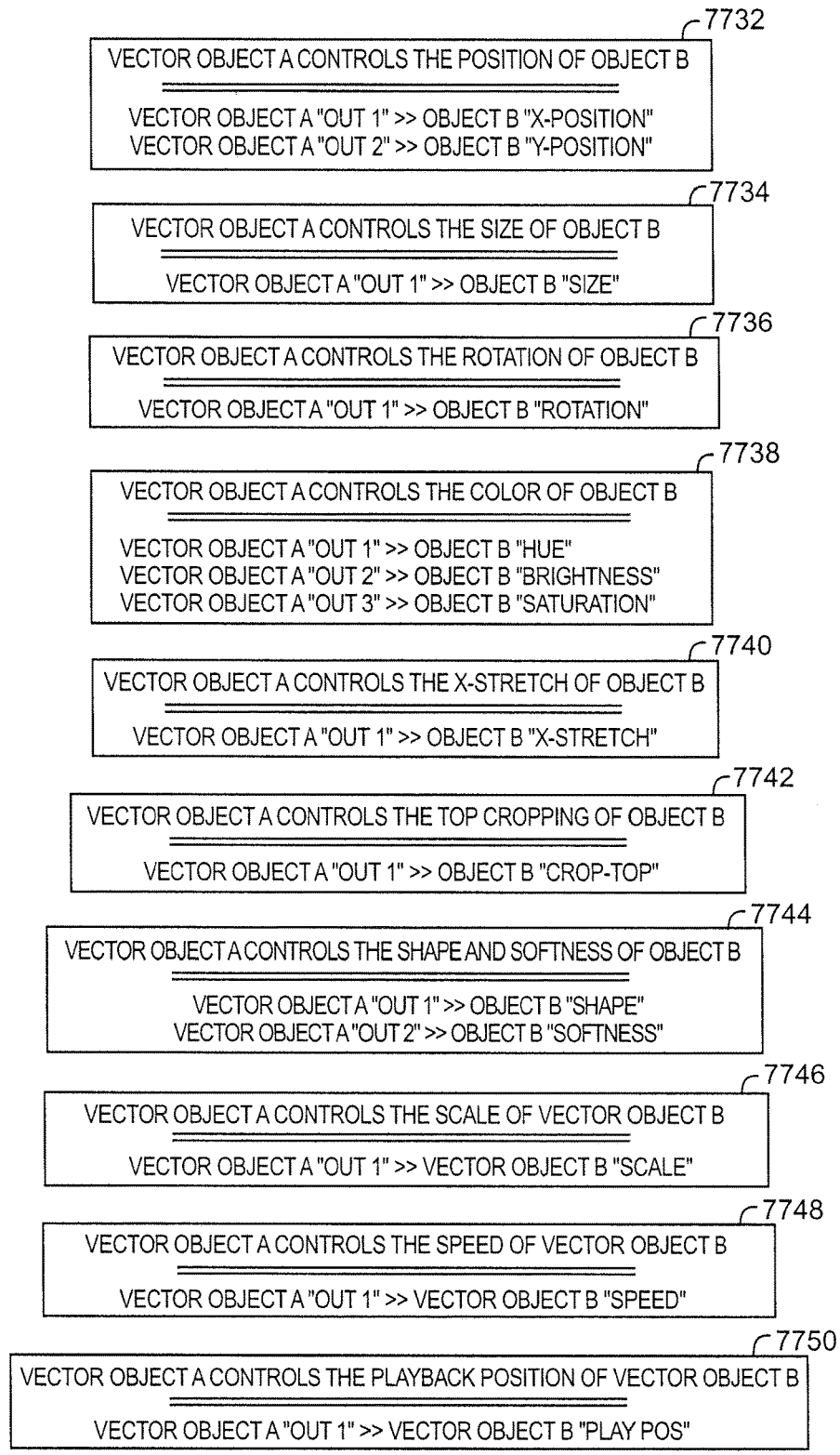

FIGS. 77A-B show a series of charts that correlate between the high-level functions of the sentence paradigm of FIGS. 9A through 27D, and the low-level relations created by "cmd object click" and "cmd background click" when the user executes a programming command of the sentence paradigm (as discussed in connection with FIGS. 75 and 76). FIG. 77A shows charts involving "event-action" relations, and FIG. 77B shows charts involving "sink-source" relations. In addition to the handling shown in the charts of FIGS. 77A-B, further handling for additional functions is described in the text which follows the discussion of FIGS. 77A-B. Moreover, various other programming functions discussed in connection with FIGS. 9A through 27D may be easily derived from the charts of FIGS. 77A-B and associated discussion. Each of these charts is now discussed in turn, beginning with the charts of FIG. 77A.

Chart 7700 shows that when the user selects the function of FIGS. 9A-B ("object A, when clicked, starts object B"), an event-action relation is created between the "M-Click" event of object A and the "Start" action of object B.

Chart 7702 shows that when the user selects the function of FIGS. 10A-B ("object A, upon timer expiration, starts object B"), an event-action relation is created between the "Timer" event of object A and the "Start" action of object B. Recall that this function of FIGS. 10A-B is the "timer expiration sibling" of the function of FIGS. 9A-B, and that other functions involving the condition "when clicked" also have "timer expiration siblings."

Chart 7704 shows that when the user selects the function of FIGS. 11A-B ("object A, when clicked, stops object B") or the function of FIGS. 12A-B ("object A, when clicked, stops itself"), an event-action relation is created between the "M-Click" event of object A and the "Stop" action of object B. Note that in the case of the function of FIGS. 12A-B, object A and object B are the same object.

Chart 7706 shows that when the user selects the "timer expiration sibling" of the function of FIGS. 11A-B ("object A, upon timer expiration, stops object B") or the "timer expiration sibling" of the function of FIGS. 12A-B ("object A, upon timer expiration, stops itself"), an event-action relation is created between the "Timer" event of object A and the "Stop" action of object B. As above, note that in the case of the "timer expiration sibling" for the function of FIGS. 12A-B, object A and object B are the same object.

Chart 7708 shows that when the user selects the function of FIGS. 14A-B ("object A, when clicked, randomly starts object B"), an event-action relation is created between the "M-Click" event of object A and the "R-Start" action of object B.

Chart 7710 shows that when the user selects the "timer expiration sibling" of the function of FIGS. 14A-B ("object A, upon timer expiration, randomly starts object B"), an event-action relation is created between the "Timer" event of object A and the "R-Start" action of object B.

Chart 7712 shows that when the user selects the function of FIGS. 13A-B ("object A, upon stopping, starts object B"), an event-action relation is created between the "Stopping" event of object A and the "Start" action of object B.

Chart 7714 shows that when the user selects the function of FIGS. 15C-D ("object A, upon starting, stops object B"), an event-action relation is created between the "Starting" event of object A and the "Stop" action of object B.

Chart 7716 shows that when the user selects the function of FIGS. 15A-B ("object A, upon starting, starts object B")

or the function of FIGS. 19A-B ("container object A, upon starting, starts contained object B"), an event-action relation is created between the "Starting" event of object A and the "Start" action of object B.

Chart 7718 shows that when the user selects the function of FIGS. 16A-B ("object A, during mouse-over, makes object B play"), two event-action relations are created: (1) between the "M-Over" event of object A and the "Start" action of object B, and (2) between the "M-Leave" event of object A and the "Stop" action of object B.

Chart 7720 shows that when the user selects the function of FIGS. 17A-B ("objects A and B play together"), four event-action relations are created: (1) between the "Starting" event of object A and the "Start" action of object B, (2) between the "Stopping" event of object A and the "Stop" action of object B, (3) between the "Starting" event of object B and the "Start" action of object A, and (4) between the "Stopping" event of object B and the "Stop" action of object A.

Chart 7722 shows that when the user selects the function of FIGS. 18A-B ("objects A and B play separately"), four event-action relations are created: (1) between the "Starting" event of object A and the "Stop" action of object B, (2) between the "Stopping" event of object A and the "Stop" action of object B, (3) between the "Starting" event of object B and the "Stop" action of object A, and (4) between the "Stopping" event of object B and the "Stop" action of object A.

Chart 7724 shows that when the user selects the function of FIGS. 20A-B ("object A, when clicked, stops itself and starts object B"), two event-action relations are created: (1) between the "M-Click" event of object A and the "Stop" action of object A, and (2) between the "M-Click" event of object A and the "Start" action of object B. Note that the "timer expiration sibling" for this function (not shown) may be provided by substituting the "Timer" event for the "M-Click" event as in the earlier sibling functions.

Chart 7726 shows that when the user selects the function of FIGS. 25A-B ("video object A, upon reaching cue point, starts object B"), an event-action relation is created between the "T-msec" event of video object A and the "Start" action of object B. The "T-msec" event for video object A includes the actual cue time, in milliseconds, of the current playback point of the video object when the function is programmed; for example, if video object A is paused at three and a half seconds at the time of the programming, the "T-msec" event for video object A will be "T-3500." In addition, equivalent functionality for creating similar relations is provided for two additional functions described in connection with FIGS. 25A-B: "sound object A, upon reaching cue point, starts object B" and "vector object A, upon reaching cue point, starts object B." Moreover, similar functionality is provided for three additional functions described in connection with FIGS. 25A-B: "video object A, upon reaching cue point, stops object B," "sound object A, upon reaching cue point, stops object B" and "vector object A, upon reaching cue point, stops object B;" the creation of the event-action relation for each of these three additional functions is the same as that for the corresponding "starts object B" functions, except that the action portion of the relation is the "Stop" action of object B rather than its "Start" action.

Chart 7728 shows that when the user selects the function of FIGS. 26A-B ("container object A, upon navigation into sub-display, starts contained object B"), an event-action relation is created between the "Nay-Forward" event of object A and the "Start" action of object B. Note that for this function, object A is a container control object whose containing container has sub-display functionality enabled.

Chart 7730 shows that when the user selects the function of FIGS. 26C-D ("container object A, upon navigation back from sub-display, stops contained object B"), an event-action relation is created between the "Nay-Back" event of object A and the "Stop" action of object B. Note that for this function, object A is a container control object whose containing container has sub-display functionality enabled.

Turning now to FIG. 77B, various charts involving vector objects and the creation of "sink-source" relations are shown. The charts 7732 and 7746 show the handling for two functions which were illustrated in FIGS. 27A-B and 27C-D, respectively; the other charts in FIG. 77B show the handling for functions which were described in the associated discussion.

Chart 7732 shows that when the user selects the function of FIGS. 27A-B ("vector object A controls the position of object B"), two sink-source relations are created: (1) between the source "out 1" of vector object A and the sink "x-position" of object B, and (2) between the source "out 2" of vector object A and the sink "y-position" of object B.

Chart 7734 shows that when the user selects the function "vector object A controls the size of object B," a sink-source relation is created between the source "out 1" of vector object A and the sink "size" of object B.

Chart 7736 shows that when the user selects the function "vector object A controls the rotation of object B," a sink-source relation is created between the source "out 1" of vector object A and the sink "rotation" of object B.

Chart 7738 shows that when the user selects the function "vector object A controls the color of object B," three sink-source relations are created: (1) between the source "out 1" of vector object A and the sink "hue" of object B, (2) between the source "out 2" of vector object A and the sink "brightness" of object B, and (3) between the source "out 3" of vector object A and the sink "saturation" of object B.

Chart 7740 shows that when the user selects the function "vector object A controls the x-stretch of object B," a sink-source relation is created between the source "out 1" of vector object A and the sink "x-stretch" of object B.

Chart 7742 shows that when the user selects the function "vector object A controls the top cropping of object B," a sink-source relation is created between the source "out 1" of vector object A and the sink "crop-top" of object B.

Chart 7744 shows that when the user selects the function "vector object A controls the shape and softness of object B," two sink-source relations are created: (1) between the source "out 1" of vector object A and the sink "shape" of object B, and (2) between the source "out 2" of vector object A and the sink "softness" of object B.

Chart 7746 shows that when the user selects the function of FIGS. 27C-D ("vector object A controls the scale of vector object B"), a sink-source relation is created between the source "out 1" of vector object A and the sink "scale" of vector object B.

Chart 7748 shows that when the user selects the function "vector object A controls the speed of vector object B," a sink-source relation is created between the source "out 1" of vector object A and the sink "speed" of vector object B.

Chart 7750 shows that when the user selects the function "vector object A controls the playback position of vector object B," a sink-source relation is created between the source "out 1" of vector object A and the sink "play-position" of vector object B.

In addition to the function handling discussed above in connection with FIGS. 77A-B, additional function handling can be provided as follows:

When the user selects the function of FIGS. 18C-D ("objects A and B, upon collision, start object C"), two event-action relations are created: (1) between the "Collision" event of object A and the "Collision" action of object B, and (2) between the "Collision" event of object A and the "Start" action of object C. These two relations do not produce event-action processing; rather they are evaluated as part of the update function for each object (see FIG. 62, step 6227), wherein detection of a graphical collision between an object and its "collision" partner causes a third object to be started. Note that an alternate version of the function may be provided by substituting a "Stop" action for the "Start" action in the second relation above.

When the user selects the function of FIGS. 19C-D ("object A, upon sequence command, starts object B"), an event-action relation is created between the "Next" event of object A and the "Next" action of object B. This relation does not produce event-action processing; rather, when a sequence command is received in the user input handling block 5780 in FIG. 57, one or more of these "next" relations is evaluated (along with the play state of their associated objects) to determine which object in the sequence should play next, and that object is started.

When the user selects the function of FIGS. 19E-F ("object A tweens to object B"), three event-action relations are created: (1) between the "Timer" event of object A and the "Stop" action of object A, (2) between the "Timer" event of object A and the "Start" action of object B, and (3) between the "Tween" event of object A and the "Tween" action of object B. This last relation does not produce event-action processing; rather, the type-specific start and stop functions evaluate these "tween" relations when objects are starting and stopping (see FIG. 61, steps 6112 and 6128) to determine if tweening should be provided. Note that a "mouse click sibling" for this function may be provided by substituting the "M-Click" event for the "Timer" event in the first two relations above (the inverse of the earlier sibling functions).

When the user selects the function of FIGS. 26E-F ("object A, when clicked, initiates container transition"), one of four event-action relations is created depending upon of the type of container transition being programmed: between the "M-Click" event of object A and the "Next" action of object B; between the "M-Click" event of object A and the "Previous" action of object B; between the "M-Click" event of object A and the "Navigate" action of object B; between the "M-Click" event of object A and the "Back" action of object B. Each of these relations produces event-action processing that is handled in the communication response function for container objects (see FIG. 66, step 6623). Note that the "timer expiration sibling" for this function may be provided by substituting the "Timer" event for the "M-Click" event as in the earlier sibling functions.

When the user selects the function of FIGS. 26G-H ("object A, when clicked, changes attribute of object B"), an event-action relation is created between the "M-Click" event of object A and the "Attribute" action of object B. The "Attribute" action of this relation is handled in the type-specific communication response functions in FIG. 66 (see steps 6607 and 6623). The "Attribute" action additionally specifies which attribute is being changed, and whether the attribute is being enabled, disabled or set (and in the latter case what the new setting is). Note that the "timer expiration sibling" for this function may be provided by substituting the "Timer" event for the "M-Click" event as in the earlier sibling functions.

We now turn to a discussion of the graphics engine component 5660 of FIG. 56. The graphics engine is a system component that manages one or more "draw lists." In the preferred system, a draw list is a data structure that includes a list of zero or more graphical items (such as text items, picture items, sub-display items, etc.) and their associated display settings, as well as various global settings for the draw list as a whole (such as background color, zoom and scroll settings, etc.). Each draw list is identified by a unique "canvas ID" which is assigned to the draw list when it is created. The graphics engine provides various functions for managing draw lists, such as functions for creating new draw lists, adding items to draw lists, adjusting display settings for items in draw lists, adjusting global settings for draw lists, performing draw list utility functions, etc. In the preferred system, these functions are called by the playback manager 5620 during its playback processing operations (as discussed earlier), as shown by the graphics calls 5628 of FIG. 56. In addition, the graphics engine provides a function for rendering a specified draw list into a provided bitmap; this rendering function is called every frame by the playback display manager 5050 when it needs a new bitmap to present in a playback display, as shown by the playback output 5662 of FIG. 56. Each of the above functions of the graphics engine 5660 is now described in turn.

The graphics engine 5660 provides functions for creating and removing draw lists. As stated above, a draw list is a data structure in the graphics engine that includes a unique canvas 1D, a list of graphical items and their display settings, and various global settings that affect the way the draw list is rendered. The function for creating a new draw list allocates and initializes a new draw list data structure, assigns a unique canvas ID to it, and returns the canvas ID to the caller of the function so that it can later be passed to other graphics engine functions to identify the draw list.

The graphics engine 5660 provides functions for adding and removing graphical items to and from draw lists. The function for adding an item to a draw list receives as arguments the graphical data for the item to be added and the canvas ID of the draw list it should be added to, and it returns an "item ID" for the newly added item so that the item may be referenced in subsequent calls to graphics engine functions. In the preferred system, the supported graphical items include text items, picture items that are bitmaps, picture items that are vector graphics (providing various geometric shapes), and sub-display items. Each of these supported item types is common in the field except for sub-display items. Regarding sub-display items, a sub-display item defines a visual field in the playback output of the draw list of which is is part, and associates this visual field with a separate, nested draw list whose items are rendered within the nested visual field by the rendering function; this sub-display functionality is illustrated in FIGS. 40 through 45C, and is discussed at length below. In addition, it should be noted that in the case of adding a picture item which is a bitmap, the bitmap data is provided as a pointer to a bitmap buffer, which allows video playback to be implemented as a picture item whose bitmap buffer is continually being overwritten by a new bitmap corresponding to the current "frame" of video playback.

The graphics engine 5660 provides functions for reading and writing display settings for items on draw lists. In the preferred system, the supported display settings include: x-position, y-position, size, color, transparency, rotation, x-stretch, y-stretch, width, height, x-scroll, y-scroll, shape and softness. The visual effects of these display settings can be seen in FIGS. 4A through 6B (the "cropping" effect shown in FIG. 5D is achieved using a combination of width, height, x-position, y-position, x-scroll and y-scroll, as discussed in connection with the "handle edit mouse move" function of FIG. 72). Moreover, the functions for reading and writing display settings also support reading and writing of parameters associated with "effect boxes" (such as that shown in FIG. 7G); these parameters, which include the box size and position and the effect type for each active effect box, are treated as display settings within the graphics engine. Each item on a draw list has its own set of display settings, which are used by the rendering function to determine how that item should look when it is rendered. Note that any of the above display settings may be applied to any of the item types supported by the graphics engine.

The graphics engine 5660 provides functions for reading and writing global settings for draw lists. In the preferred system, the supported global settings include: background color, zoom, x-scroll and y-scroll. The zoom setting determines the overall scale when the rendering function renders a draw list into a bitmap. The scroll settings determine the overall placement of draw list items within the bitmap. The background color is a "fill color" used by the rendering function to fill the bitmap before rendering individual draw list items. In addition, in the preferred implementation of the graphics engine, whenever the background color of a draw list is changed, the old color is placed on a "color queue," and thereafter during rendering, the new color appears to "emanate" from the center of the background and progress outward to fill the background; when this capability is used with frequent color updates (such as those that occur when background color cycling is enabled), it results in a visual effect consisting of multiple bands of color emanating from the center of the background.

The graphics engine 5660 provides utility functions for converting graphics coordinates and for performing "hit detection." The first of these utility functions takes a canvas ID and a set of x and y coordinates that use a coordinate system in which the zoom and scroll of the specified draw list are not taken into account (such as the pixel location of the mouse cursor over a sub-display), and adjusts for the zoom and scroll settings to produce "local" coordinates that are logically meaningful within the context of the draw list. The second of these utility functions takes a canvas ID and a pair of local x and y coordinates as arguments, and returns the item ID of the top item at the specified coordinates (or returns zero if no item is at those coordinates).

Before describing the rendering function of the graphics engine 5660, a more detailed discussion of sub-display items is now provided. As stated above, a sub-display item can be added to a draw list just like any other type of item (such as text or pictures); however unlike those other items, which have their own visual data, a sub-display item instead defines a visual field in the rendered output of the draw list of which is is part, and associates this visual field with a separate, nested draw list. This nested draw list, whose canvas ID is specified as an argument when the new sub-display item is created, is subordinate to the sub-display item such that the items in the nested draw list are rendered within the visual field defined by the sub-display item. Moreover, sub-display items may be added to a nested draw list, producing nested bitmaps within nested bitmaps, etc. In addition, any of the display settings that can be applied to picture and text items can also be applied to sub-display items, producing a variety of possibilities for altering the appearance of sub-display visual fields.

Figure 78:
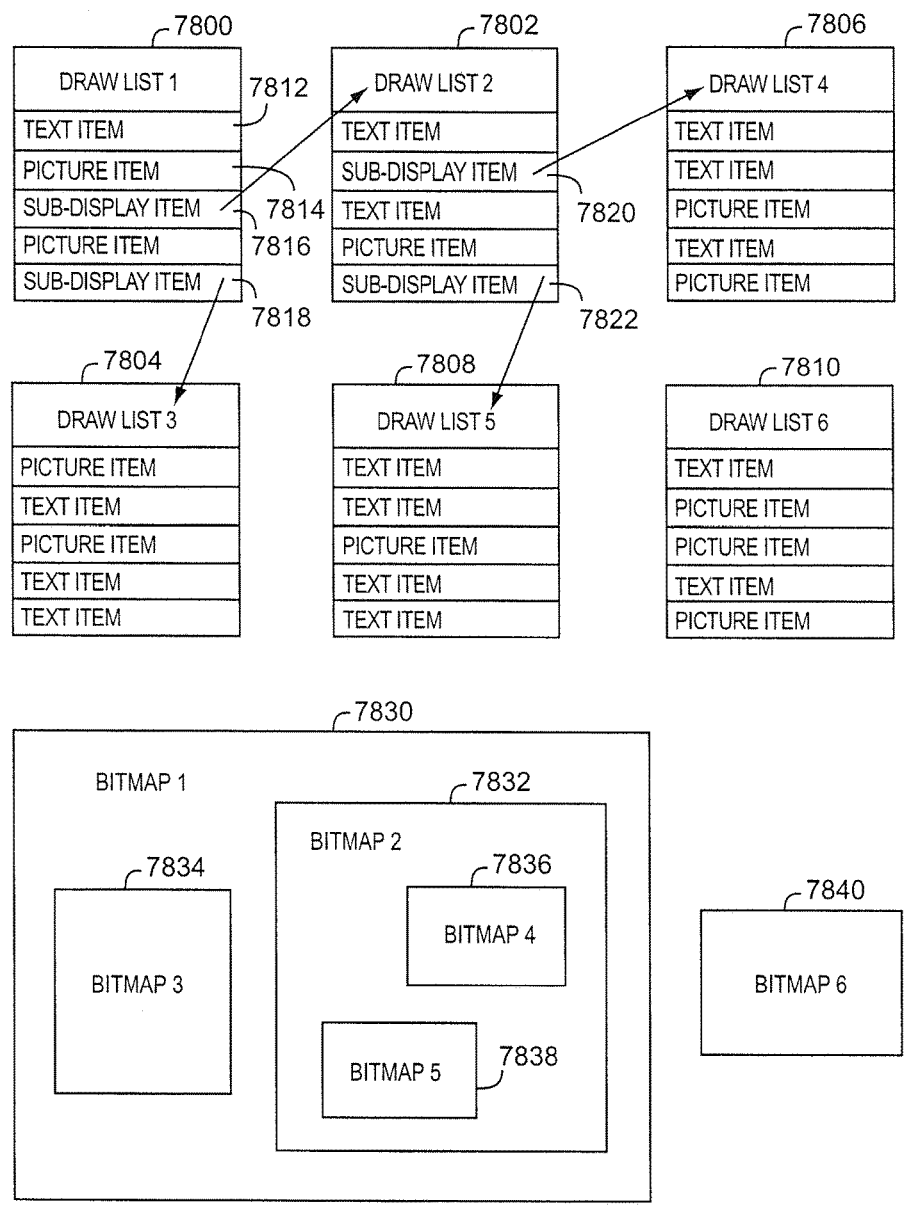
FIG. 78 illustrates a block diagram of the graphics engine component of the presentation engine of FIG. 56, according to an embodiment of the present invention.
Figure 79:
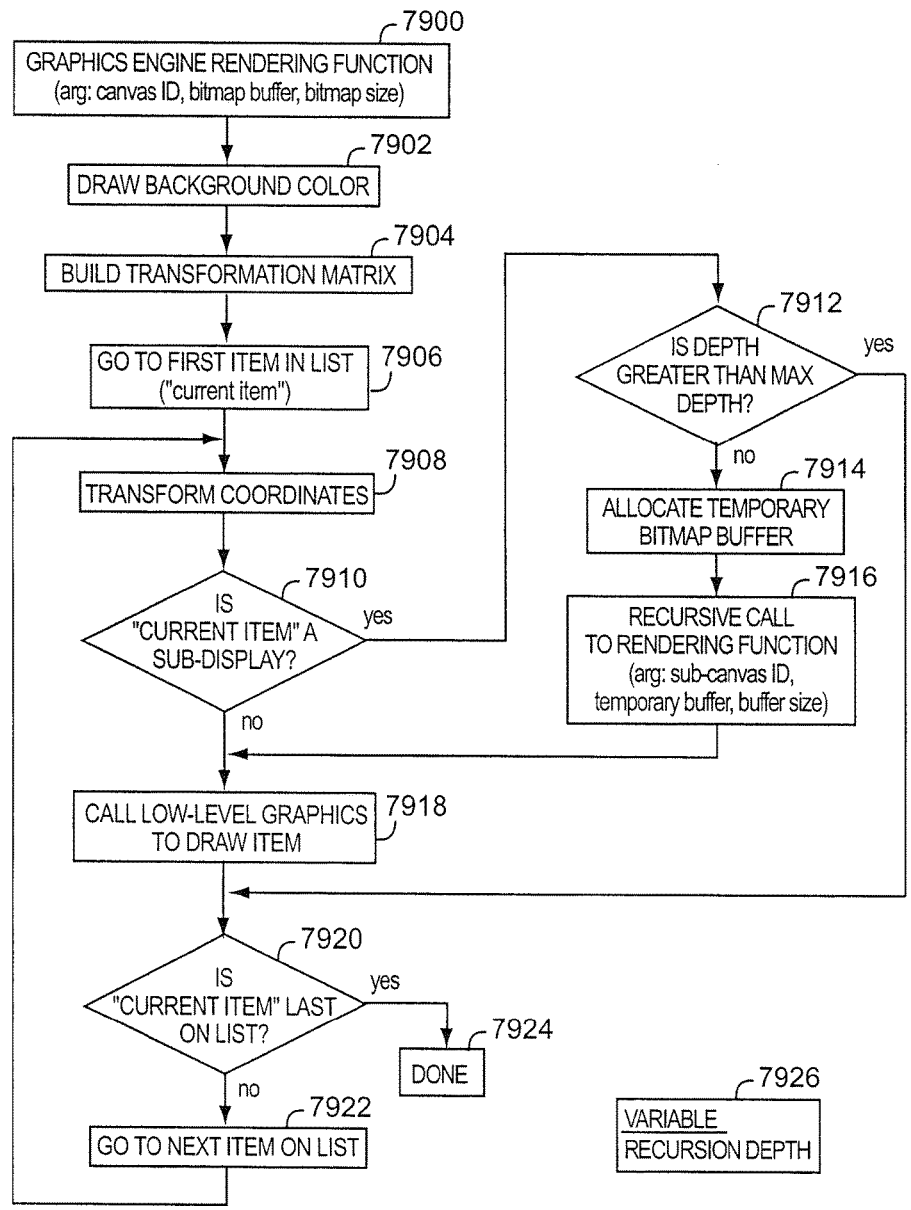
FIG. 79 illustrates a software flow diagram showing procedures of the graphics engine component of the presentation engine of FIG. 56, according to an embodiment of the present invention.

FIG. 78 illustrates the nesting of draw lists within draw lists using sub-display items, and the resulting visual output consisting of bitmaps nested within bitmaps, according to embodiments of the present invention. The upper portion of the figure shows exemplary draw lists 1 through 6 (7800, 7802, 7804, 7806, 7808, 7810). Each draw list includes various text, picture and sub-display items, such as text item 7812, picture item 7814 and sub-display item 7816. As seen in "draw list 1" 7800, the sub-display item 7816 references "draw list 2" 7802, and the sub-display item 7818 references "draw list 3" 7804, indicating that the contents of "draw list 2" and "draw list 3" are each subordinate items within "draw list 1." In a similar fashion, as seen in "draw list 2," the sub-display item 7820 references "draw list 4" 7806, and the sub-display item 7822 references "draw list 5" 7808, indicating that the contents of "draw list 4" and "draw list 5" are each subordinate items within "draw list 2." By contrast, "draw list 6" 7810, like "draw list 1," is an independent draw list that is not subordinate to another draw list.

In the lower portion of FIG. 78 it can be seen how the nested draw lists shown in the upper portion of the figure are rendered as bitmaps nested within bitmaps. The lower portion of the figure shows exemplary bitmaps 1 through 6 (7830, 7832, 7834, 7836, 7838, 7840) which represent the rendered output, respectively, of draw lists 1 through 6 discussed above. In the current example, "draw list 1," which is an independent draw list, is rendered as "bitmap 1" 7830, an independent bitmap. "Draw list 2" and "draw list 3," which are subordinate draw lists of "draw list 1," and are rendered (respectively) as "bitmap 2" 7832 and "bitmap 3" 7834, which appear as nested bitmaps within "bitmap 1." Similarly, "draw list 4" and "draw list 5," which are subordinate draw lists of "draw list 2," are rendered (respectively) as "bitmap 4" 7836 and "bitmap 5" 7838, which appear as nested bitmaps within "bitmap 2." By contrast, "draw list 6," an independent draw list, is rendered as "bitmap 6" 7840, an independent bitmap.

Finally, the graphics engine provides a rendering function for rendering the items of a specified draw list into a bitmap according to the display settings for each item and the global settings for the draw list overall. FIG. 79 shows a flow diagram of this graphics engine rendering function, as implemented within the graphics engine 5660 of FIG. 56. The function begins at step 7900 when it is called either by the playback display update function of FIG. 53, or by itself recursively, with a canvas ID, a bitmap buffer and a bitmap size passed as arguments (the bitmap size is specified as a width and height in pixels).

In step 7902, the bitmap buffer from the previous step is filled with the background color specified for the draw list identified by the canvas ID from the previous step. Moreover, as discussed above, when the background color of a draw list is changed, the old color is placed on a color queue. As part of step 7902, if there are any old background colors currently included in the color queue for the present draw list, then they are added to the bitmap as follows. Colors in the color queue are processed from youngest to oldest, and for each such color, the bitmap is filled with that color, but with a soft-edged "hole" in the center of the bitmap which is not filled; the size of this hole is proportional to the amount of time since that color was put on the color queue. When the hole for a given color covers the entire bitmap area (meaning that it is no longer seen in the bitmap), then that color is removed from the color queue. As a result of this functionality, when the background color of a draw list is changed, the new color appears to "emanate" from the center of the background and progress outward to fill the background; with frequent color changes, multiple bands of color emanating from the center of the background are produced.

In step 7904, a transformation matrix is built. When items are to be rendered, this transformation matrix is used to transform from local draw list coordinates to bitmap coordinates. This technique of using transformation matrices to convert between coordinate systems is a standard practice in 2-D and 3-D graphics programming, covered in detail by almost all graphics programming textbooks; Shaum's Outlines Graphics Programming describes the type of matrices used by the graphics engine of the preferred system. Next, in step 7906, the first graphical item in the present draw list is identified as the "current item." In the preferred system, the draw list is stored in sorted order, back to front, so the render loop can employ the standard painter's algorithm (rendering items from back to front like someone painting the background of a picture before adding foreground elements). The remainder of the function is dedicated to a loop which is performed for each item in the draw list as follows.

In step 7908, the coordinates of the current item are transformed using the transformation matrix from step 7904. Next, in step 7910, the item type of the current item is evaluated, and if it is not a sub-display item, then operation continues at step 7918. Otherwise, if the current item is a sub-display item, then in step 7912 the recursion depth variable 7926 shown at the bottom of FIG. 79 is examined. This recursion depth variable starts out at zero when the present function is called from the playback display update function of FIG. 53, and is incremented each time the present function calls itself recursively (as described below). In step 7912, if incrementing this recursion depth would exceed a maximum depth (such as five or six levels deep, beyond which nested bitmaps are typically too small to be useful), then the current sub-display item is not rendered and operation of the function continues at step 7920. Otherwise, in step 7914, a temporary bitmap buffer is allocated which is the size of the visual field specified by the present sub-display item. Next, in step 7916, the present function calls itself recursively (after first incrementing the recursion depth variable 7926), with the canvas ID of the nested draw list of the present sub-display item (the "sub-canvas ID") and the address and size of the temporary bitmap buffer from the previous step passed as arguments. In this recursive function call to the present function, the nested draw list of the present sub-display item is rendered into the bitmap from the previous step, and when the function returns, the recursion depth variable is decremented and operation continues at step 7918.

In step 7918, the graphical data for the current item will be either text data or image data specified by the item, or in the case of a sub-display item, the bitmap buffer from step 7914 containing the rendered output of the nested draw list of the sub-display item. In either case, the low-level graphics library is called to render the graphical data for the current item into the bitmap from step 7900 according to the current display settings and effect box parameters for that item (for the display settings, the graphics library employs standard graphics programming techniques well known in the field; for the effect box parameters, the graphics library applies various algorithms for processing graphical data which are also well known, but with time-based modifications to provide a changing appearance over time). Next, in step 7920, the current item is evaluated to see if it is the last item in the present draw list. If not, then in step 7922 the next item on the list becomes the current item and another iteration of the loop begins at step 7908. Otherwise, if the current item is the last on the list, the function is done 7924.

We now turn to a discussion of the data manager component (5030, 5130) of the systems of FIGS. 50 and 51. The data manager enables other system components to read and write presentation data, and provides various functions for managing and manipulating presentation data. In the preferred embodiment of the system, the data manager function interface includes: a query function to get the listing of objects contained in a specified container; a query function to get the properties data for a specified object; functions for making new objects; functions for deleting and renaming objects; functions for reading and writing setup or content data for a specified object; functions for reading and writing low-level relations and associated information.

In addition to the above function interface, which provides an abstraction layer through which other system components access presentation data, the preferred embodiment of the data manager includes two advantageous features for providing the required functionality in an optimal manner. First, due to the practical importance of managing data efficiently, especially over a network, the data manager includes a specialized data caching mechanism that works in conjunction with a custom database file format to optimize low level data access operations. Second, in system configurations which include pointer objects, the data manager provides "path resolution" functionality to resolve pointer object indirection and access the appropriate data; this path resolution functionality provides a clean and efficient solution for enabling the kinds of "virtual hierarchies" shown in FIGS. 46 and 47.

The following discussion of the data manager system component begins with a general explanation of the data manager and its role within the preferred system (including a discussion of some concepts presented earlier in connection with FIG. 50). Next the internal structure of the data manager is discussed, followed by an explanation of the structure and format of presentation data in the preferred system. Next, the function interface of the data manager is described, followed by descriptions of various internal data manager functions which provide caching and path resolution functionality. Finally, the discussion concludes with a description of the object model for the preferred system.

The main role of the data manager is to make presentation data available to other system components for reading and writing. As discussed throughout this specification, presentation data is multimedia content that can be authored and played by users of the system. Depending on system configuration, the presence or absence of certain system features can affect the nature of this presentation data, and by extension, whether or not certain associated capabilities of the data manager are required. In particular, the container nesting functionality of FIGS. 32A-B and the pointer object functionality of FIGS. 34A through 37C are examples of features which are specifically supported by aspects of data manager functionality described in the following discussion (container listing and path resolution, respectively). In addition, the data manager functions associated with low-level relations are provided to support relation-based communications (as described in the discussions of the presentation engine and control display manager). Beyond these capabilities associated with particular features of the system, the basic functionality of the data manager, which is to allow other system components to access, manage and edit objects and their associated data, may be implemented in a relatively straightforward manner as might be typical in any system involving objects and object data.

For the purposes of the present discussion, the preferred implementation of the data manager, which supports all of the above features, is described. The preferred data manager makes presentation data accessible to other system components in the form of a hierarchical data tree of one or more levels. This data tree is comprised of data objects, with each object containing three forks of data: properties data, setup data and content data (as detailed below in connection with FIG. 85). Briefly, the properties data for each object consists of variables and flags that specify general object characteristics, such as object type and icon position. The setup data for each object consists of variables and flags that specify certain type-specific object characteristics, such as display settings for visual objects. The content data for each object, in the case of media objects, consists of media data such as text data, image data, video data, sound data, etc., and in the case of vector objects and script objects, consists of data that defines the object's playback activity. In the case of container objects, the content data is the set of low-level relations contained in that container object, which are accessed via a set of relation-oriented functions provided in the data manager function interface.

The entry point into this hierarchical data tree provided by the data manager is a "root database," which is specified to the data manager at initialization time. An appropriate format for databases is detailed later in this discussion, but in brief, the currently preferred format involves a hierarchically structured database with one container object at its top internal level that either directly or through container nesting contains the rest of the objects in the database. In the case of the root database, this top level container object acts as the "root object" for the system, providing an entry point through which the hierarchical data tree can be accessed. Other system components access this data tree by requesting object listings for container objects, starting with the root object and going down the branches of the tree as needed.

Throughout the system (except for the internal operation of the data manager), objects are identified using path strings in the form of a "root path," in which the first entry in the path string is the root object, the last entry in the path string identifies the object in question, and the intervening entries identify any intervening container objects. These root paths in the preferred system are equivalent to the root paths discussed earlier in the Example Scenarios section in connection with FIGS. 46 and 47, except that in the preferred system it is assumed that the database for a root path is the root database specified at initialization time, and therefore the database is not specified explicitly as part of each individual root path (and of course the path strings use object names rather than diagram reference numbers to identify objects). Upon receiving a request or command with one of these root paths, the data manager performs path resolution on the root path to convert it into a "physical path," in which the database (which may or may not be the root database) is specified explicitly; it is this physical path which is used by the data manager in its internal operations.

In the presently preferred embodiment of the system, there is just one root object at a time, i.e., only one entry point into the presentation data. To understand the role of this root object, and how its role may vary in different system configurations, it is important to understand that the system can also be implemented with multiple root objects instead of just one; for example, multiple root objects might each represent a different "presentation" that the user is playing. In the preferred system, in which there is just one root object at a time, the need to support a variety of user scenarios may be satisfied by adapting the way in which the root object is managed. Some examples were provided earlier in connection with FIG. 50 describing how this might be done for a variety of user scenarios. These scenarios cover cases such as the user being interested in only one presentation at a time, or being interested in maintaining a "home" data file where multiple presentations can be managed and arranged, or being interested in managing multiple presentations stored as individual database files on the host computer, etc. In each case, as discussed in connection with FIG. 50, the approach of having just one root object can be successfully adapted to handle the situation.

Figure 80:
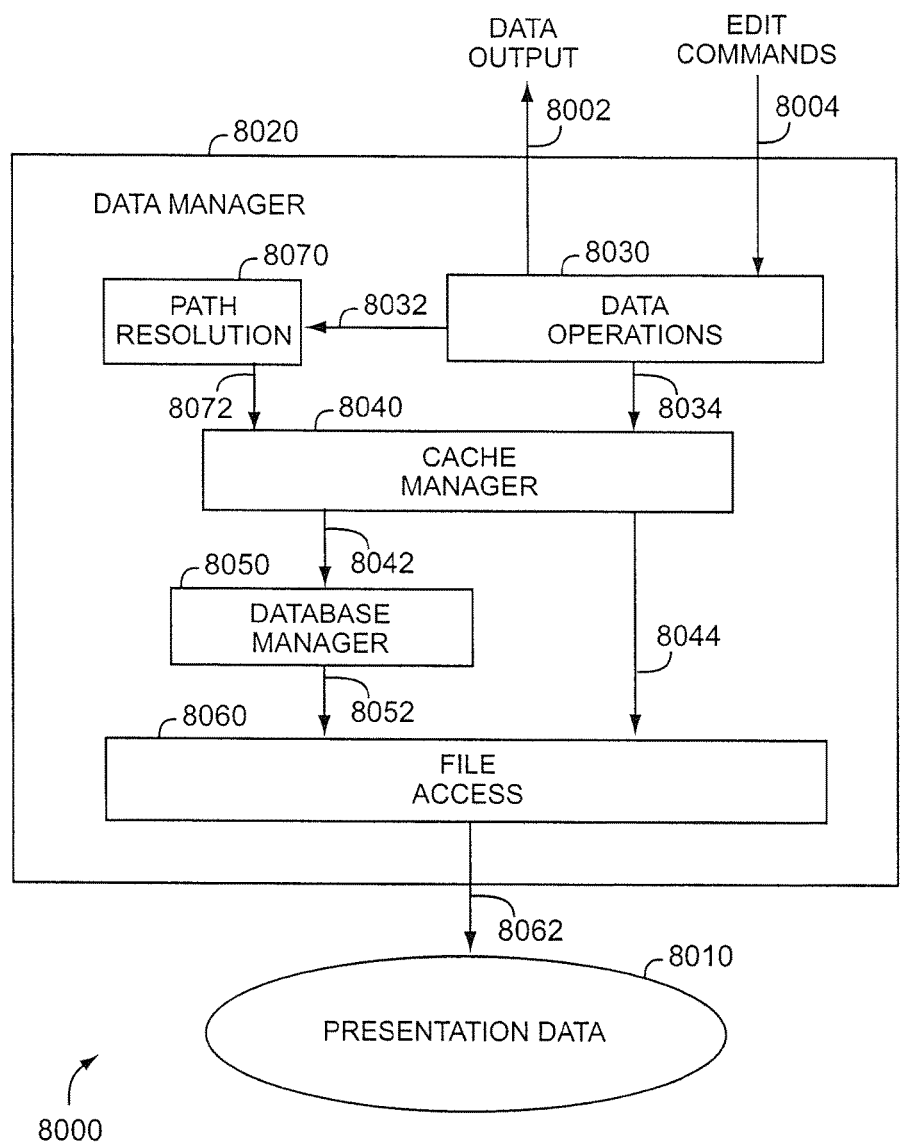
FIG. 80 illustrates a block diagram of the data manager component of the systems of FIGS. 50 and 51, according to an embodiment of the present invention.

Turning now to a discussion of the internal structure of the preferred data manager, FIG. 80 shows a block diagram of the data manager component (5030, 5130) of the systems of FIGS. 50 and 51. The data manager representation 8000 of FIG. 80 includes the data manager block 8020 and some exemplary presentation data 8010, which is accessible to the data manager via the file and network services of the system. In the embodiment of FIG. 80, the data manager 8020 makes presentation data available to other system components by responding to data requests, as shown by data output 8002. Additionally, in embodiments involving editing of presentation data, the data manager can receive edit commands 8004 that result in the addition, removal or modification of presentation data.

The diagram of FIG. 80 shows data output 8002 and edit commands 8004 being handled by a data operations block 8030, which handles data requests and edit commands by reading and writing 8034 presentation data via the cache manager 8040. The cache manager, in turn, is shown accessing presentation data either by reading and writing 8044 directly to the file access module 8060 (which it does in the case of HFS objects), or by reading and writing 8042 presentation data via the database manager 8050 (which it does in the case of database objects). In the latter case, the database manager 8050 accesses the data by reading and writing 8052 to the file access module 8060. In either case, the file access module 8060 performs the requested read or write operation using the file or network services of the system. In addition, in embodiments that support pointer objects, the data operations block 8030 issues function calls 8032 to the path resolution block 8070 to establish the physical location of the relevant data before performing the requested operations. This path resolution block 8070 may in turn issue function calls 8072 to the cache manager block 8040 to acquire additional information needed during the path resolution process.

Figure 81:
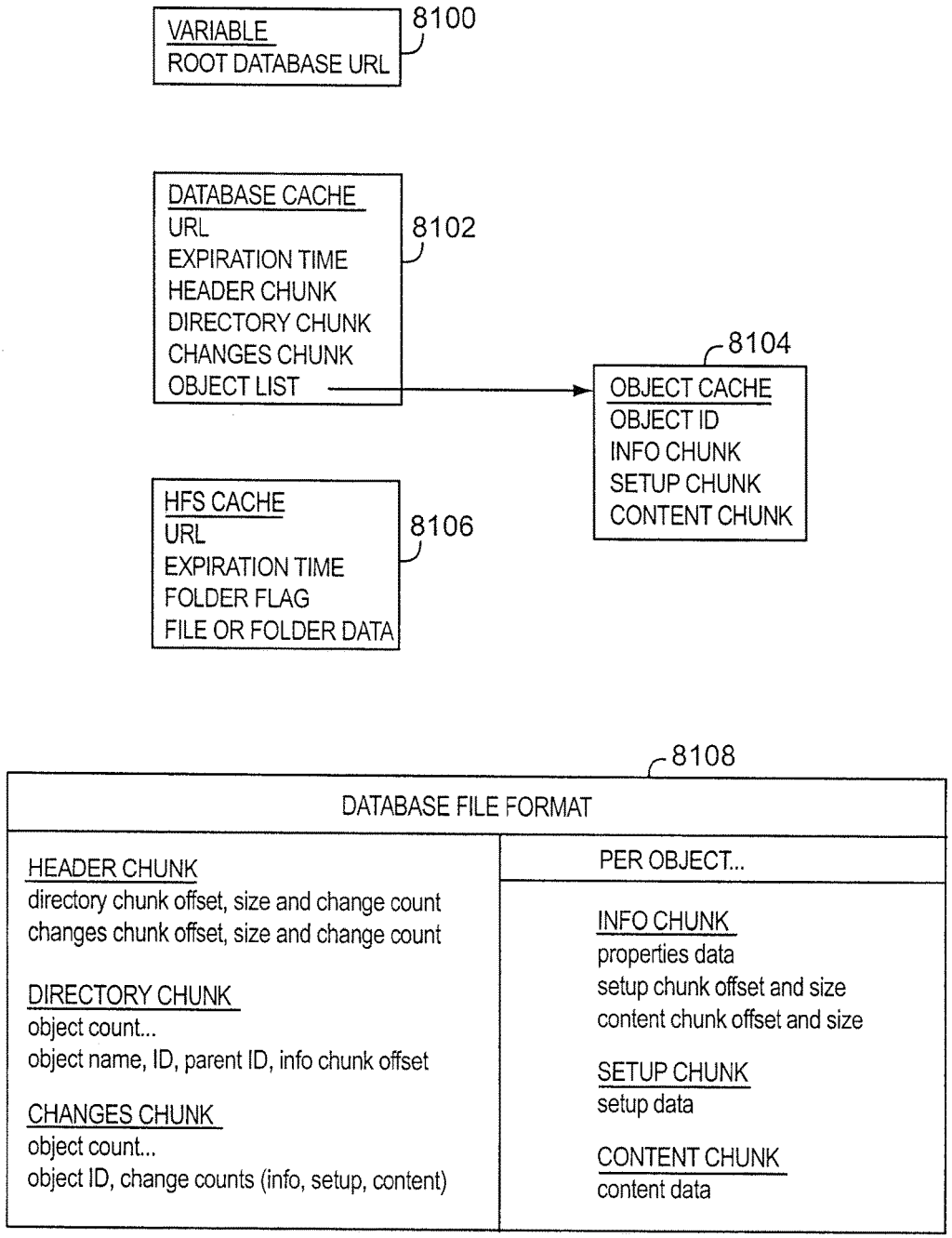
FIG. 81 illustrates block diagrams of the cache format and file format of the data manager component of the systems of FIGS. 50 and 51, according to an embodiment of the present invention.

Turning now to FIG. 81, we see some exemplary data structures which are used by the sub-blocks of the data manager as follows. First, recall from the discussion above that at initialization time a root database is specified to the data manager. The location of this root database is specified in the form of a Universal Resource Locator (URL), such as a file path or network address. At initialization time, the URL for the root database is stored in a data manager variable 8100, "root database URL." Thereafter, when the data operations block 8030 of FIG. 80 handles data requests and edit commands from other system components, it first "resolves" any root paths by calling the "resolve database path" function of the path resolution block 8070, passing as an argument this "root database URL" from the variable 8100 (as well as the root path being resolved and several flags explained later in the discussion).

FIG. 81 also shows two cache lists that are maintained inside the cache manager 8040 of FIG. 80, a database cache 8102 and an HFS cache 8106. Only one instance of each data structure is shown, but in the cache manager there are typically multiple instances maintained on lists. Each database cache 8102 represents a database file which has recently been accessed, and includes the database URL, the expiration time at which the cached data needs to be re-verified, and various chunks of data corresponding to the database file format (explained below). Each HFS cache 8106 represents an HFS folder or file which has recently been accessed, and includes the URL of the folder or file, the expiration time at which the cached data needs to be re-verified, and either file data or a listing of the contents of the folder (as well as a flag to distinguish between the two). Additionally, for each database cache 8102, a set of object cache data structures 8104 for that database is maintained (again, only one instance of the object cache structure is shown, but multiple objects at a time are typically cached for each database). Each object cache 8104 includes an object ID and various chunks of data corresponding to the database file format (explained below).

Using these cache data structures 8102, 8104 and 8106, the cache manager 8040 provides prediction and update functionality as follows. For prediction, the cache manager pre-loads database data and HFS data into its cache data structures according to a predictive method to provide more immediate access to data when it is first requested. The cache manager's predictive method uses the hierarchical structure of the presentation data to determine which data to load next; in the preferred embodiment this involves loading data for objects in the same container as and nested below any recently requested objects. For update functionality, the cache manager detects when previously loaded data has been changed and is no longer valid. The exact mechanism is detailed in connection with FIG. 82, but briefly, it involves using "change counts" maintained in the database file format (discussed below) which list the number of times each piece of data in the database has been modified. By polling the appropriate change counts in a database file and comparing them with the cached versions, the cache manager is able to determine when data previously loaded into the memory cache has been changed and needs to be reloaded (such as during collaborative editing as seen in FIG. 31B).

The lower portion of FIG. 81 shows a database file format 8108 which supports the preferred functionality of the data manager of FIG. 80. Within this data manager of FIG. 80, the database manager sub-block 8050 is responsible for determining the location of requested data within database files, which is accomplished according to the database file format 8108 of FIG. 81. As shown in FIG. 81, the preferred database file format consists of various "chunks" of data, which is a common approach for organizing data files.

The left side of the database file format 8108 shows information relating to the entire database file; this information consists of three data chunks: a header chunk, directory chunk and changes chunk. The header chunk provides information enabling the data manager to access the directory and changes chunks (including change counts for each of those chunks). The directory chunk is a listing of all the objects in the database, with each entry including an object name, the object ID number (which is non-zero and unique for each object in a database), the object ID of the parent container (which is zero for the top object in the database internal hierarchy), and the file offset of the object's info chunk. The changes chunk is also a listing of all the objects in the database, with each entry including the object ID and the change counts for the object's info chunk, setup chunk and content chunk. By using a consolidated block of change counts for all the objects in a database file, there is no need to perform a separate polling operation for each object individually, which saves substantial time when operating over a network.

The right side of the database file format 8108 shows information relating to individual objects; this information consists of three chunks per object: an info chunk, setup chunk and content chunk. These three chunks correspond to the object's properties data, setup data and content data, respectively (with the info chunk additionally including information that provides access to the setup chunk and content chunk independently from one another).

We now provide a description of the data manager function interface, as implemented within the data operations block 8030 of FIG. 80. Each of the functions of the data manager function interface, before handling the request or command, converts any root paths specified by the caller into physical paths via the "resolve database path" function of the path resolution block 8070. The returned physical path includes a URL and an object ID, the latter of which will be either non-null (in the case of a database object) or null (in the case of an HFS object). Also, "resolve database path" accepts some arguments which select among certain options involved in the path resolution process. Specifically, these options involve whether or not to resolve the last element of the path (called a "leaf") if it can be resolved. There are three cases where this may happen: (1) the leaf is a pointer object or container pointer object; (2) the leaf is a folder pointer object; and (3) the leaf is a database file within an HFS folder. Three flag arguments are provided to the "resolve database path" function ("resPtrLeaf," "resFdrLeaf" and "resDbLeaf," respectively) to specify whether or not the final resolution should take place in each of these three cases. Unless otherwise noted, all three of these flags are set to true when "resolve database path" is called by the functions of the data manager function interface, which are described as follows.

The "get container listing" function of the data manager function interface returns the listing of objects directly contained within a specified container (which may be a container object, a container pointer object, a folder pointer object, or an HFS folder). The root path of the specified container is passed as an argument, and after the path is resolved, the listing of objects contained in that container is acquired from the cache manager 8040 using the physical path. Depending on whether the physical path identifies a container object in a database or identifies a folder in an HFS (as per the object ID being non-null or null, respectively), the cache manager either derives a container listing from the (possibly cached) directory chunk read from the database manager 8050, or acquires and returns a file listing from the file access block 8060. In the former case, the directory chunk shown in database file format 8108 is searched for objects whose "parent ID" is the same as the object ID of the specified container object, and the listing of those objects is returned.

The "get object properties" function of the data manager function interface returns the properties data for a specified object. The root path of the specified object is passed as an argument, and the root path is resolved twice, once with all the flags mentioned above ("resPtrLeaf," "resFdrLeaf," "resDbLeaf") set to false, and another time with all of them set to true. The physical path returned when the flags were false is used to acquire all of the properties data except for the "content change count," which is acquired using the physical path returned when the flags were set to true (in the case of pointer objects, content data is "owned" by the base object and therefore full resolution is appropriate). After the path is resolved and the cache manager has been called for the properties data, the cache manager either returns the properties data from the object's (possibly cached) info chunk read from the database manager 8050, or in the case of an HFS object, returns null. In addition, the data manager function interface provides a function for changing the icon position of an object (the one object property which may be changed from outside the data manager). The specific data comprising object properties in the present embodiment of the system is shown in FIG. 85.

The data manager function interface includes several functions for making new objects. These functions, which are called by the "cmd background click" function of FIG. 76, include "new object," "duplicate object," "make pointer object" and "export object." Each of these is now discussed in turn.

The "new object" function of the data manager function interface is used to create new objects. The object type and root path for the new object are passed as arguments, as well as, optionally, data with which to initialize the new object (such as media data in the case of a new media object, or a database in the case of a new container object). First, the "new object" function determines the physical path of the container in which the new object is going to be located (the "destination container"), which it does by removing the new object name from the new object path and resolving the truncated path with all flags set to true. Next, the new object is created by calling the cache manager 8040 with the type and name for the new object and the physical path of the destination container. The cache manager creates the new object by calling the database manager 8050 if the destination container is a container object, or by calling the file access block 8060 if the destination container is a an HFS folder. If the newly created object is a container object in a database file, a new container control object is also created at the same time inside the newly created container object. Once the new object has been created, the properties data of the new object is initialized and any additional initialization data that was passed as an argument is written into the content data for the new object (or in the case of a newly created container object, additional initialization data becomes the initial hierarchical object tree contained by the container object).

The "duplicate object" function of the data manager function interface creates a new object by copying a "source object." The root path of the source object and the root path for the new object are passed as arguments. First, the "duplicate object" function determines the physical path of the container in which the new object is going to be located (the "destination container"), which it does by removing the new object name from the new object path and resolving the truncated path with all flags set to true. Next, it determines the physical path of the source object by taking the source object root path which was passed as an argument and resolving it with just the "resDbLeaf" flag set to true (the setting of this flag supports the import function of FIG. 3D). Next, the new object is created by calling the cache manager 8040 with the type and name for the new object (the former of which is the same as the source object) and the physical path of the destination container. The cache manager creates the new object by calling the database manager 8050 if the destination container is a container object, or by calling the file access block 8060 if the destination container is a an HFS folder. Once the new object has been created, the properties data, setup data and content data for the new object are copied from the respective data forks of the source object. In the case of a new container object, the hierarchical object tree contained by the source container object is copied to become the initial object tree contained by the newly created container object.

The "make pointer object" function of the data manager function interface creates a new pointer object that references an existing object as its "base object." The root path of the base object and the root path for the new pointer object are passed as arguments. First, the "make pointer object" function determines the physical path of the container in which the new pointer object is going to be located (the "destination container"), which it does by removing the new object name from the new object path and resolving the truncated path with all flags set to true. Next, it determines the physical path of the base object by taking the base object root path which was passed as an argument and resolving it with all flags set to true. Next, the new object is created by calling the cache manager 8040 with the type and name for the new object (the former of which is the same as the base object) and the physical path of the destination container. The cache manager creates the new object by calling the database manager 8050 if the destination container is a container object, or by calling the file access block 8060 if the destination container is a an HFS folder. Once the new object has been created, the properties data and setup data for the new object are copied from the respective data forks of the base object, and the content data of the new object is set to the physical path of the base object.

The "export object" function of the data manager function interface creates a new database file in an HFS folder, and copies the hierarchical tree of objects contained in a "source container object" into the newly created database. The root path of the source container object and the root path for the new database file are passed as arguments. First, the "export object" function determines the physical path of the HFS folder in which the new database file is going to be located (the "destination folder"), which it does by removing the new database file name from the new database path and resolving the truncated path with all flags set to true. Next, it determines the physical path of the source container object by taking the source container object root path which was passed as an argument and resolving it with all flags set to true. Next, a new database file is created by calling the cache manager 8040 with the name for the new database file and the physical path of the destination folder. The cache manager creates the new database file by calling the file access block 8060. Once the new database file has been created, the source container object and its contained hierarchical object tree are copied into the newly created database file.

The "delete object" function of the data manager function interface deletes a specified object. The root path of the object to be deleted is passed as an argument. First, the "delete object" function determines the physical path of the object to be deleted, which it does by taking the root path which was passed as an argument and resolving it with all flags set to false. Next, the object is deleted by calling the cache manager 8040 with the physical path of the object to be deleted. When deleting the object, the cache manager also purges any existing caches associated with the object.

The "rename object" function of the data manager function interface renames a specified object. The root path of the object to be renamed and its new name are passed as arguments. First, the "rename object" function determines the physical path of the object to be renamed, which it does by taking the root path which was passed as an argument and resolving it with all flags set to false. Next, the object is renamed by calling the cache manager 8040 with the physical path of the object to be renamed and its new name. When renaming the object, the cache manager also updates any existing caches associated with the object, and updates any low-level relations which reference the object.

The "setup read" and "setup write" functions of the data manager function interface are used for reading and writing setup data, respectively. For both functions, the root path of an object and a buffer for providing or receiving the setup data are passed as arguments. Both functions first determine the physical path of the object whose setup data is being accessed, which is done by taking the root path which was passed as an argument and resolving it with only the "resolveDbLeaf" flag set to true. Next, the setup data for the object is read or written by calling the respective cache manager function with the physical path of the object and the above buffer passed as arguments. In the case of the cache manager function for reading setup data, certain cache management procedures are involved which are detailed below in connection with FIG. 82.

The "content read" and "content write" functions of the data manager function interface are used for reading and writing content data, respectively. For both functions, the root path of an object and a buffer for providing or receiving the content data are passed as arguments. Both functions first determine the physical path of the object whose content data is being accessed, which is done by taking the root path which was passed as an argument and resolving it with all flags set to true. Next, the content data for the object is read or written by calling the respective cache manager function with the physical path of the object and the above buffer passed as arguments. In the case of the cache manager function for reading content data, certain cache management procedures are involved which are similar to those detailed below in connection with FIG. 82.

The "create relation" and "delete relation" functions of the data manager function interface are used for adding and removing low-level relations, respectively. For both functions, the root path of a container object and a description of a relation (the latter comprising two object names, two capability names and two capability types) are passed as arguments. Both functions first determine the physical path of the container in which the relation is being added or removed, which is done by taking the container object root path which was passed as an argument and resolving it with all flags set to true. Next, the described low-level relation is added to or removed from the content data of the above container object; the content data is read, modified and written back by calling the respective cache manager functions with the physical path of the container object and a data buffer as arguments.

The "read relations" function of the data manager function interface returns a listing of all the low-level relations directly container within a specified container object. The root path of a container object is passed as an argument. First, the "read relations" function determines the physical path of the container containing the relations, which it does by taking the container object root path which was passed as an argument and resolving it with all flags set to true. Next, the content data for the above container object is read by calling the cache manager 8040 with the physical path of the container object and a data buffer passed as arguments. The returned content data includes a listing of the relations contained by the specified container, and this listing is returned to the caller of the function.

The "get partner objects" function of the data manager function interface returns a listing of all the objects which are connected via low-level relations to a specified relational capability on a specified object. The root path of the specified object and the name and type of a relational capability are passed as arguments. First, the "get partner objects" function determines the physical path of the container containing the specified object, which it does by removing the object name from the object path and resolving the truncated path with all flags set to true. Next, the content data for the above container object is read by calling the cache manager 8040 with the physical path of the container object and a data buffer passed as arguments. The returned content data includes a listing of the relations contained by that container, and this listing is searched for any relations where one "side" of the relation matches the specified object and relational capability. For any such relations it finds, it adds the object specified on the other side of the relation to a list of partner objects. When it is done searching, it returns the list of partner objects.

Figure 82:
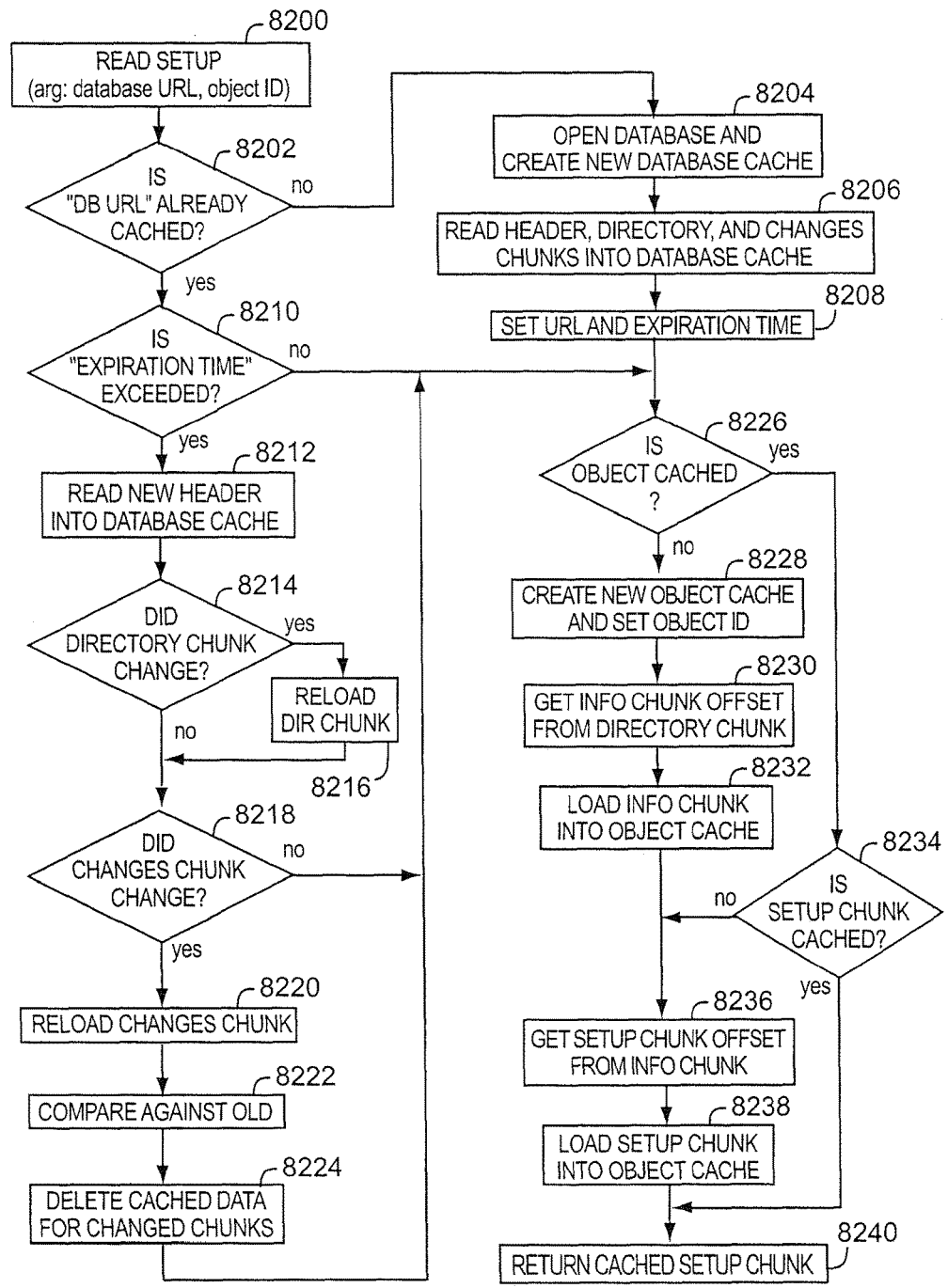
FIGS. 82-84 illustrate software flow diagrams showing procedures of the data manager component of the systems of FIGS. 50 and 51, according to an embodiment of the present invention.

Turning now to FIG. 82, the figure shows a flow diagram of the cache manager function for reading the setup data of a database object, as implemented within the cache manager block 8040 of FIG. 80. This function illustrates the way in which the cache manager, by using the database caches 8102 and object caches 8104 of FIG. 81, in conjunction with the database file format 8108, is able to minimize the amount of data access and thereby improve system performance (note that the steps involving database access may be implemented within the database manager 8050). The function begins at step 8200, when it is called by the above "setup read" function of the data manager function interface with a database URL and an object ID passed as arguments. Next, in step 8202, the database URL from the previous step is compared with the URL of each item in the list of cached databases 8102 until a match is found, or until the list is traversed without a match. If there wasn't a match, then in step 8204 the database file specified by the database URL is opened and a corresponding database cache 8102 is allocated and added to the cache list. Next, in steps 8206 and 8208, the newly added database cache 8102 is initialized: the header chunk, directory chunk and changes chunk are read from the database file and written into the cache; the URL is set to the database URL from step 8200; and the expiration time is set to the present system time plus a preferred duration (typically under a minute). After initializing the new database cache, operation of the function continues at step 8226.

Otherwise, if there was a match in step 8202, then in step 8210 the expiration time in the database cache from step 8202 is compared against the system clock. If the expiration time has not been exceeded, then execution of the function continues at step 8226. Otherwise, in step 8212, the header chunk currently in the database cache is temporarily archived, and a fresh copy of the header chunk is read from the database file and written into the cache. Next, in step 8214, the change count for the directory chunk (part of the newly read header chunk) is compared against the archived version. If there is a discrepancy, then in step 8216 the directory chunk is reloaded from the database file. Next, in step 8218, the change count for the changes chunk (part of the newly read header chunk) is compared against the archived version. If there is no discrepancy, then operation continues at step 8226. Otherwise, in step 8220, the changes chunk currently in the database cache is temporarily archived, and a fresh copy of the changes chunk is read from the database file. Next, in step 8222, the change counts for the various data forks of each object (as per the newly read changes chunk) are compared against the archived values, and in step 8224, the cached data for any chunks which have changed is deleted.

Next, in step 8226, the list of object caches 8104 attached to the database cache 8102 is searched, and if an object cache is found which matches the object ID from step 8200, then in step 8234 the cached setup chunk within the object cache 8104 is checked, and if it is present, then in step 8240 the address of the cached setup chunk is returned to the caller and the function is done. Otherwise, if in step 8234 the cached setup chunk is not present, operation continues at step 8236. Returning to step 8226, if no object cache 8104 matching the object ID from step 8200 is found, then in step 8228 a new object cache entry is created and added to the list of cached objects, and its object ID is set to the object ID from step 8200. Next, in step 8230, the directory chunk in the database cache 8102 is searched for the data offset of the info chunk corresponding to the object ID from step 8200. Next, in step 8232, the info chunk for the specified object is read from the database file and written into the newly created object cache. Next, in step 8236, the file offset for the setup chunk is read from the info chunk (which may need to be loaded as above if the function arrived at this step from step 8234 and the info chunk is not already present in the object cache). Next, in step 8238, using the file offset from the previous step, the setup chunk is loaded from the database file and written into the newly created object cache. Next, in step 8240, the address of the cached setup chunk is returned to the caller and the function is done.

Figure 83:
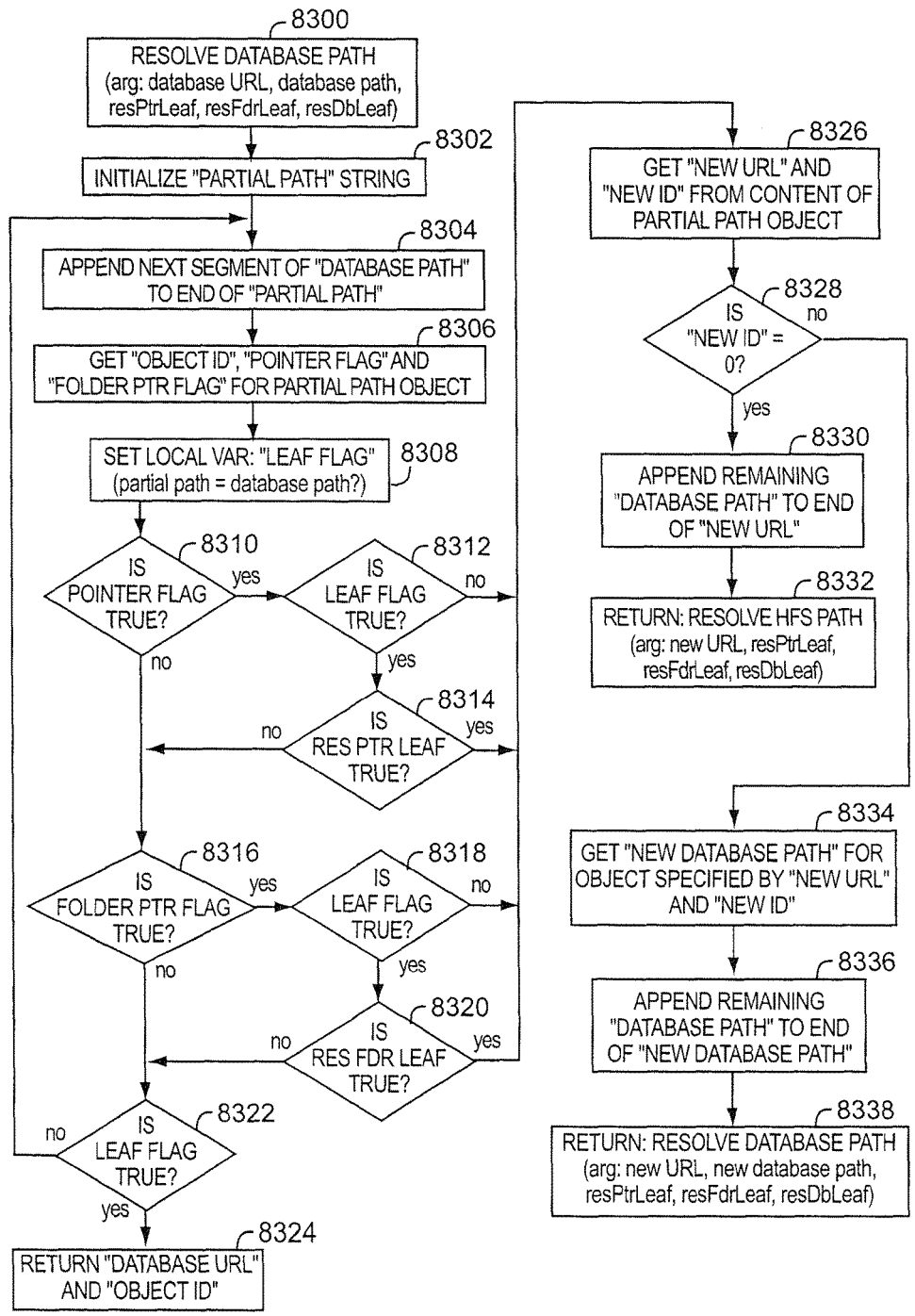
Figure 84:
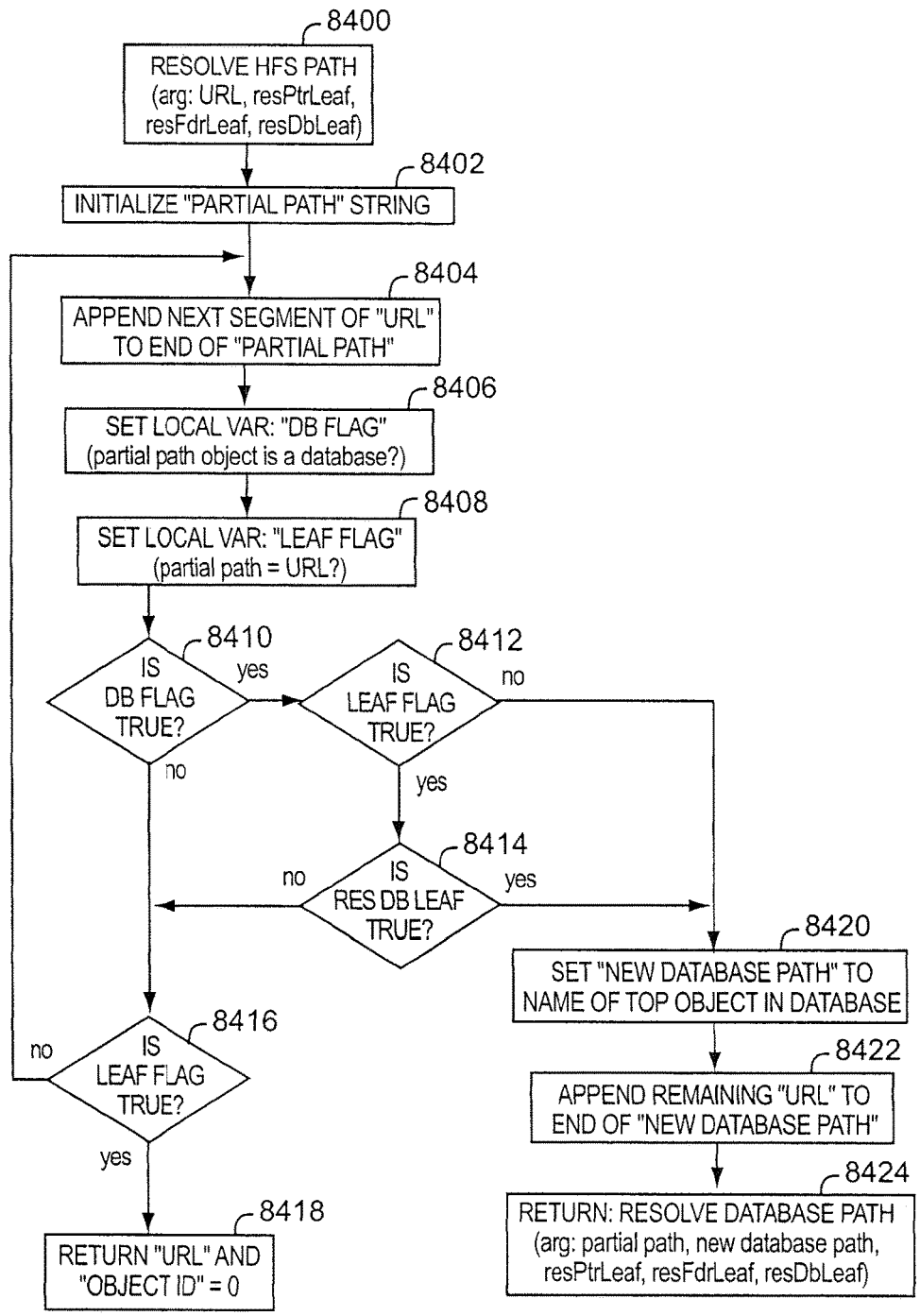

FIGS. 83 and 84 illustrate two functions of the path resolution block 8070 of FIG. 80: "resolve database path" and "resolve HFS path." Some examples of path resolution were provided earlier in reference to the "virtual hierarchies" of FIGS. 46 and 47. In the preferred implementation provided by the above two functions, the path resolution process begins with a function call to "resolve database path." This "resolve database path" function concludes in one of three ways: (1) by calling itself recursively and returning the results; (2) by calling the "resolve HFS path" function and returning to the results; or (3) by returning a database URL and non-zero object ID. The "resolve HFS path" function concludes in one of two ways: (1) by calling the "resolve database path" function and returning the results; or (2) by returning the URL of an HFS object and a null object ID. Together, these two path resolution functions support the path resolution requirements of the preferred system.

FIG. 83 shows a flow diagram of the function "resolve database path," as implemented within the path resolution block 8070 of FIG. 80. The function begins at step 8300, when it is called either from the data operations block 8030 of FIG. 80, from the "resolve HFS path" function as discussed above, or from itself recursively, with a "database URL," a "database path," and three flags, "resPtrLeaf," "resFdrLeaf" and "resDbLeaf" (which were discussed earlier) passed as arguments. The "database path" argument is similar to a root path in that the first entry in the path specifies the top object in a database; however unlike a root path, the database for the "database path" argument is specified explicitly by the "database URL" argument, and may be a database other than the root database.

In step 8302, a string variable "partial path" is initialized to be empty. Next, a loop is performed in which each segment of the "database path" from step 8300, starting at the beginning and working toward the end, is successively appended to the "partial path" and evaluated, as follows. In step 8304, the next segment of the "database path" is appended to the "partial path." Next, in step 8306, the cache manager 8040 is queried for the "object ID," "pointer flag" and "folder pointer flag" (the latter two being part of the properties data) for the object specified by the "database URL" from step 8300 and the current "partial path." Next, in step 8308, a local boolean variable "leaf flag" is set to indicate if the segment appended in step 8304 is the final segment (the "leaf") of the "database path" from step 8300 (which is the case when the "partial path" equals the "database path").

Next, in step 8310, if the "pointer flag" from step 8306 is equal to true, then in step 8312 the "leaf flag" from step 8308 is checked, and if that flag is not true, then operation continues at step 8326. Otherwise, if the "leaf flag" in step 8312 is true, then in step 8314 the "resPtrLeaf" flag from step 8300 is checked (to determine if pointer objects which are the last element of a path should be resolved), and if that flag is true, then operation continues at step 8326. Otherwise, if the "resPtrLeaf" flag is false, or if the "pointer flag" checked in step 8310 is false, then operation of the function continues at step 8316.

In step 8316, if the "folder pointer flag" from step 8306 is equal to true, then in step 8318 the "leaf flag" from step 8308 is checked, and if that flag is not true, then operation continues at step 8326. Otherwise, if the "leaf flag" in step 8318 is true, then in step 8320 the "resFdrLeaf" flag from step 8300 is checked (to determine if folder pointer objects which are the last element of a path should be resolved), and if that flag is true, then operation continues at step 8326. Otherwise, if the "resFdrLeaf" flag is false, or if the "folder pointer flag" checked in step 8316 is false, then operation of the function continues at step 8322.

In step 8322, the "leaf flag" from step 8308 is checked, and if it is equal to true, meaning that the entire database path from step 8300 has been evaluated, then path resolution is complete and in step 8324 the function returns the "database URL" from step 8300 and the "object ID" from step 8306. Otherwise, operation continues at step 8304 where another iteration of the loop begins.

If the function reaches step 8326, then together the "database URL" and "partial path" specify an object which needs to be dereferenced (either a pointer object, which includes container pointer objects, or a folder pointer object). In step 8326, the content data of this object is read from the cache manager 8040. The returned content data contains a URL and object ID which specify the base object for the above object, and these are written into two variables, "new URL" and "new ID," respectively. Next, in step 8328, the "new ID" is examined, and if it is equal to zero, meaning that the base object is an HFS object, then in step 8330 the remaining portion of the "database path" from step 8300 (the last part of the path that has not yet been appended to "partial path") is appended to the end of "new URL." Next, in step 8332, the "resolve HFS path" function of FIG. 84 is called with the "new URL" and the three flags from step 8300 passed as arguments.

Otherwise, if the "new ID" examined in step 8328 is non-zero, meaning that the base object is a database object, then in step 8334 a cache manager function is called with the "new URL" and "new ID" passed as arguments to acquire the database path for this base object. This cache manager function constructs the database path (which becomes the "new database path") by starting with the name of the object specified by the object ID, and successively adding container object names to the beginning of the path as per the parent ID for each successive object, until the name of the top container object in the database is added. Next, in step 8336, the remaining portion of the "database path" from step 8300 (the last part of the path that has not yet been appended to "partial path") is appended to the end of this "new database path" from the previous step. Next, in step 8338, the present function calls itself recursively with the "new URL," the "new database path" and the three flags from step 8300 passed as arguments.

FIG. 84 shows a flow diagram of the function "resolve HFS path," as implemented within the path resolution block 8070 of FIG. 80. The function begins at step 8400, when it is called from the "resolve database path" function of FIG. 83 with the URL of an HFS object and three flags, "resPtrLeaf," "resFdrLeaf" and "resDbLeaf" (which were discussed earlier) passed as arguments. In step 8402, a string variable "partial path" is initialized to be empty. Next, a loop is performed in which each segment of the URL from step 8400, starting at the beginning and working toward the end, is successively appended to the "partial path" and evaluated, as follows. In step 8404, the next segment of the URL is appended to the "partial path." Next, in step 8406, a local boolean variable "db flag" is set to indicate if the object currently specified by the "partial path" is a database file (which is determined by calling the cache manager 8040). Next, in step 8408, a local boolean variable "leaf flag" is set to indicate if the segment appended in step 8404 is the final segment (the "leaf") of the URL from step 8400 (which is the case when the "partial path" equals the URL).

Next, in step 8410, if the "db flag" from step 8406 is equal to true, then in step 8412 the "leaf flag" from step 8408 is checked, and if that flag is not true, then operation continues at step 8420. Otherwise, if the "leaf flag" in step 8412 is true, then in step 8414 the "resDbLeaf" flag from step 8400 is checked (to determine if database files which are the last element of a path should be resolved), and if that flag is true, then operation continues at step 8420. Otherwise, if the "resDbLeaf" flag is false, or if the "db flag" checked in step 8410 is false, then operation continues at step 8416. In step 8416, the "leaf flag" from step 8408 is checked, and if it is true, meaning that the entire URL from step 8400 has been evaluated, then path resolution is complete and in step 8418 the function returns the URL from step 8400 and a null object ID. Otherwise, operation continues at step 8404 where another iteration of the loop begins.

If the function reaches step 8420, then the "partial path" variable specifies a database file which needs to be converted into a database path for the top container object in that database file. In step 8420, a "new database path" variable is set to the name of the top object in the database (which is acquired by calling the cache manager 8040). Next, in step 8422, the remaining portion of the URL from step 8400 (the last part that has not yet been appended to "partial path") is appended to the end of the "new database path." Next, in step 8424, the "resolve database path" function of FIG. 83 is called with the "partial path" (which is a database URL as per step 8406), the "new database path" and the three flags from step 8400 passed as arguments.

Turning now to FIG. 85, we see the object model for the presently preferred implementation of the system. This object model shows how the various elements of the presentation data discussed throughout this specification may be organized to fit the preferred database file format 8108 of FIG. 81. As can be seen in the object model 8500, all of the object types share the same set of properties data, which includes object type, icon position (for map view in the control display), pointer flag, folder pointer flag, setup change count and content change count. Also, as can be seen in the object model 8500, the setup data and content data for each of the object types contain different sets of data as appropriate for each type. The setup data for many of the object types includes display settings and playback params, and the specific variables included in each of these are listed in the bottom section of the object model.

Several additional aspects of the object model 8500 should be noted. First, the content data for container objects is the set of low-level relations existing among the objects directly contained in that container; the data format for these low-level relations is shown at the bottom of the object model. Second, the display settings and playback params in the setup data for a container object apply only to its sub-display, and are used only if the sub-display flag is set to true. Third, not all of the playback params listed at the bottom of the object model are necessarily used by every object type with playback params in its setup data, since certain playback params are not applicable to certain object types. Finally, pointer objects (which includes container pointer objects) and folder pointer objects are identified by the corresponding flags in the properties data, and as stated earlier, the content data for such objects contains the physical path of the base object.

Although the present invention has been shown and described with respect to preferred embodiments, various changes and modifications are deemed to lie within the spirit and scope of the invention as claimed. The corresponding structures, materials, acts, and equivalents of all means or step plus function elements in the claims which follow are intended to include any structure, material, or acts for performing the functions in combination with other claimed elements as specifically claimed.

What is claimed is:

1. A method of editing a shared multimedia presentation over a network, the method comprising:
 sending, by a network data server, a first playback display operating on a first user computer for displaying and editing first presentation data corresponding to the shared multimedia presentation;
 sending, by the network data server, a second playback display operating on a second user computer for displaying and editing second presentation data corresponding to the shared multimedia presentation;
 receiving, by the network data server, a first message indicating that a media object was added to the first presentation data via the first playback display by a first user, the media object containing media data, the media data including at least one of video data or animated graphics data;
 updating, by the network data server, the second playback display by adding the media object based on the first message, a default playback behavior associated with the media object;
 receiving, by the network data server, a second message by the data server indicating that the playback behavior data was modified from the default playback behavior for the media object by a second user programming playback behavior of the media object via the second playback display; and
 updating, by the network data server, the first playback display by modifying playback behavior data of the media object based on the second message.

2. The method of claim 1, further comprising:
 receiving, by the network data server, a playback request from the first playback display;
 initiating, by the network data server, playback of the shared multimedia presentation in the first playback display; and
 modifying, by the network data server, the media object in the shared multimedia presentation based on the playback behavior data.

3. The method of claim 2, wherein the modifying the media object in the shared multimedia presentation based on the playback behavior data includes applying, by the network data server, playback behavior described by the playback behavior data to the media object incrementally over a predetermined time period.

4. The method of claim 3, wherein the playback behavior is a transition effect selected from the group consisting of zoom-out, fade-in, fade-out, and pulsate.

5. The method of claim 1, wherein at least one of the first playback display and second playback display is a web page.

6. The method of claim 1, wherein the first presentation data includes a pointer to a remote graphics object stored on a remote server.

7. The method of claim 6, further comprising:
receiving, by the first playback display, a playback request from the first user;
retrieving, by the first playback display, the remote graphics object from the remote server using the pointer; and
presenting, by the first playback display, the remote graphics object in the first playback display.

8. A system for viewing and editing a shared multimedia presentation over a network, the system comprising:
a processor for generating a first playback display and a second playback display, wherein the first playback display and the second playback display permit viewing and editing of the shared multimedia presentation on a user computer;
a first communication module configured to send the first playback display to a first user computer and further configured to send the second playback display to a second user computer;
a second communication module configured to receive a first message indicating that a media object was added to the first presentation data via the first playback display the media object containing media data, the media data including at least one of video data or animated graphics data, and update the second playback display by adding the media object, a default playback behavior associated with the media object; and
a third communication module configured to receive a second message by the data server indicating that the playback behavior data was modified from the default playback behavior for the media object by a user programming playback behavior of the media object via the second playback display and update the first playback display by modifying playback behavior data of the media object.

9. The system of claim 8, further comprising:
a playback module configured to initiate playback of the shared multimedia presentation in the first playback display based on a playback request received from the first playback display.

10. The system of claim 9, wherein the playback module is further configured to apply playback behavior described by the playback behavior data to the media object incrementally over a predetermined time period during playback in the first playback display.

* * * * *